United States Patent [19]

Adams

[11] 4,371,871
[45] Feb. 1, 1983

[54] ALERT MESSAGE COMMUNICATION SYSTEM

[75] Inventor: John H. Adams, Dorking, England

[73] Assignee: Reuters Limited, London, England

[21] Appl. No.: 230,412

[22] Filed: Jan. 30, 1981

[51] Int. Cl.³ .............................................. G09G 1/00
[52] U.S. Cl. .............................. 340/717; 340/825.26; 340/825.36
[58] Field of Search ............... 340/717, 825.36, 825.26, 340/825.29

[56] References Cited

U.S. PATENT DOCUMENTS

| | | | |
|---|---|---|---|
| 2,986,723 | 5/1961 | Darwin et al. | 340/825.26 |
| 3,500,336 | 3/1970 | Cuccio | 340/717 X |
| 3,623,067 | 11/1971 | Deal et al. | 340/717 |
| 3,872,446 | 3/1975 | Chambers | 340/717 X |

Primary Examiner—David L. Trafton
Attorney, Agent, or Firm—Hubbell, Cohen, Stiefel & Gross

[57] ABSTRACT

A communication network (20) capable of providing a subscriber originated alert message to other designated subscribers (80B, 162, 164, 80C, 166, 168) in the network (20) which have been selected by the message originator (80A, 82). Both the content of the alert message and the designated recipients may be readily varied at will by the subscriber via a keyboard (82A) which is associated with a video display device (82B). The telephone type distribution network (20) includes a plurality of switch nodes (22-38) at different geographic locations which are interfaced with the various subscriber keystations (82, 160, 164, 166, 168) through keystation or terminal controllers (80). Each terminal controller has display control logic (304) including local display storage (310-318) for locally storing retrievable data display (310-316) and alert message displays, (318) directed to that controller (80). Each keystation (82) has a locally storable control page containing message routing control signals corresponding to different subscriber designated keystation recipient groups, with each designated controller (80) having a unique address code in that group. These control pages are locally stored at the switch node (22-38) associated with that originating keystation with which the controller (80) is associated and may be varied in content by the originating keystation. Once a control page has been predefined, the originating keystation (82) may rapidly select different sets of keystation recipient groups for a given alert message. A keystation (82) may thus contribute retrievable data as well as alert messages and message routing data to the network (20) to facilitate rapid individually tailored information dissemination to individually tailored recipient groups.

20 Claims, 34 Drawing Figures

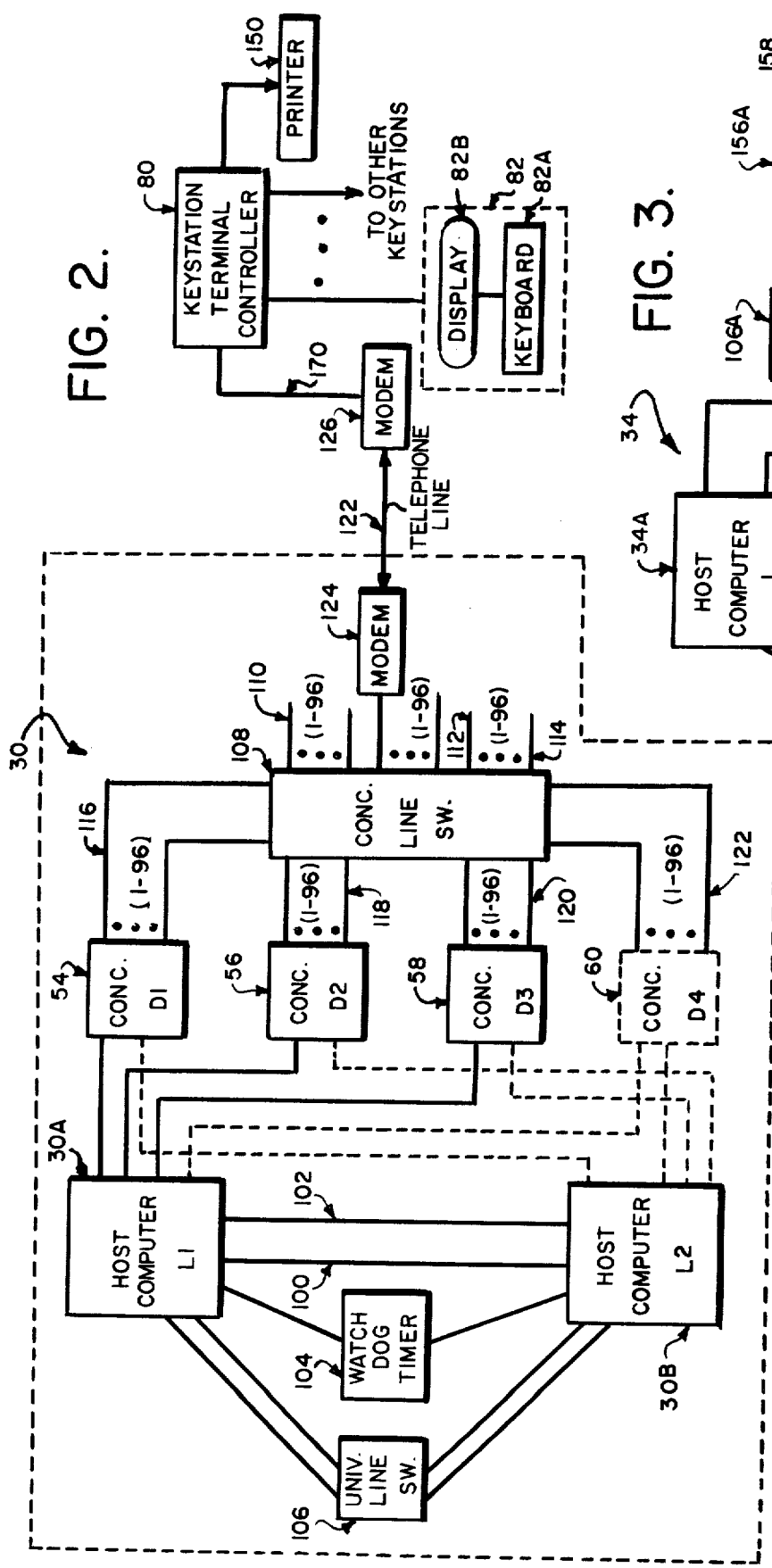
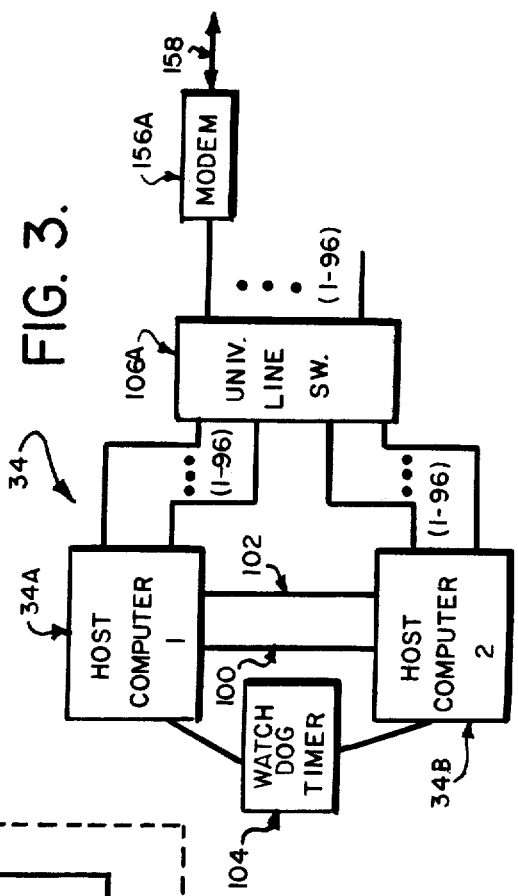
FIG. 2.
FIG. 3.

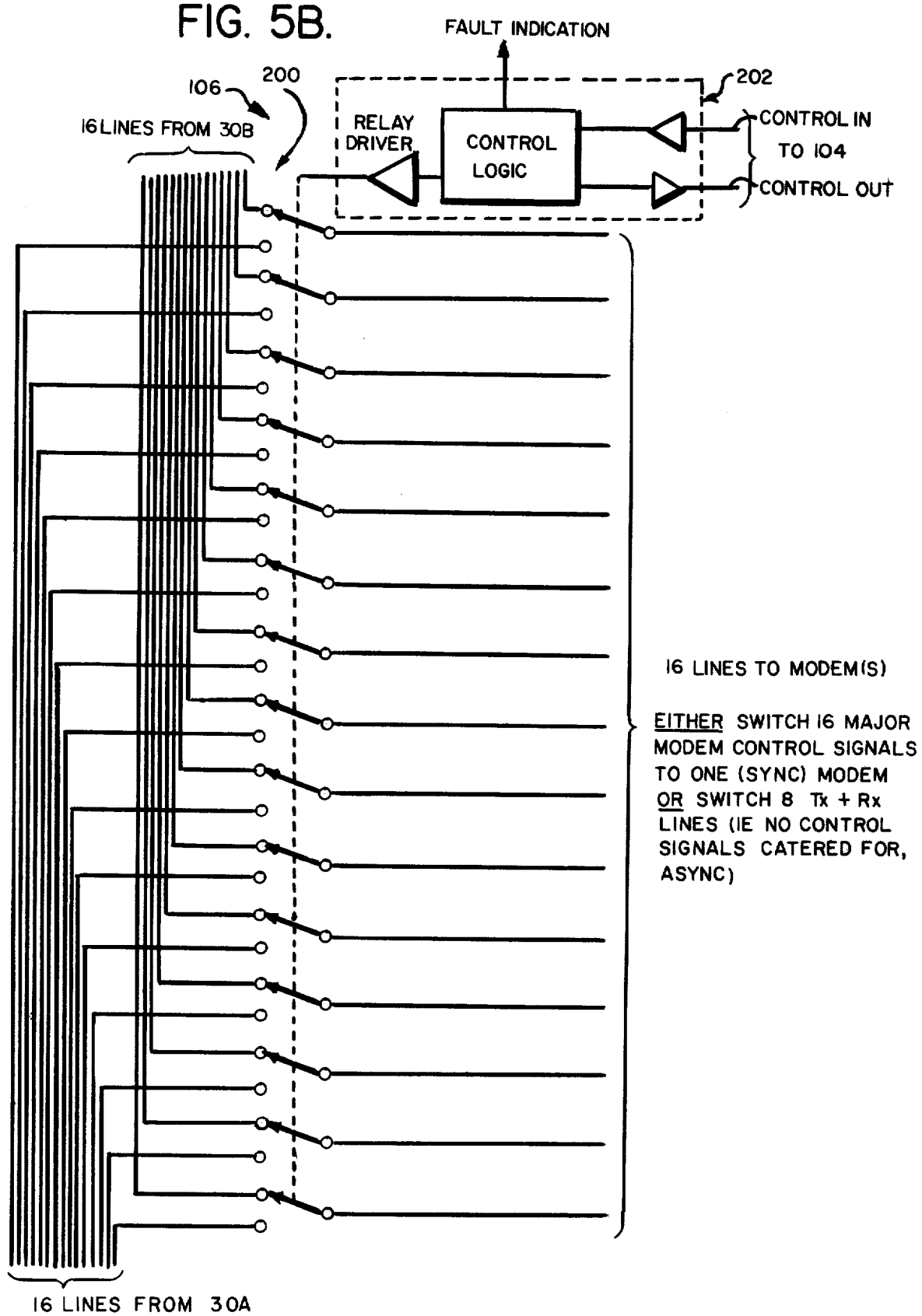

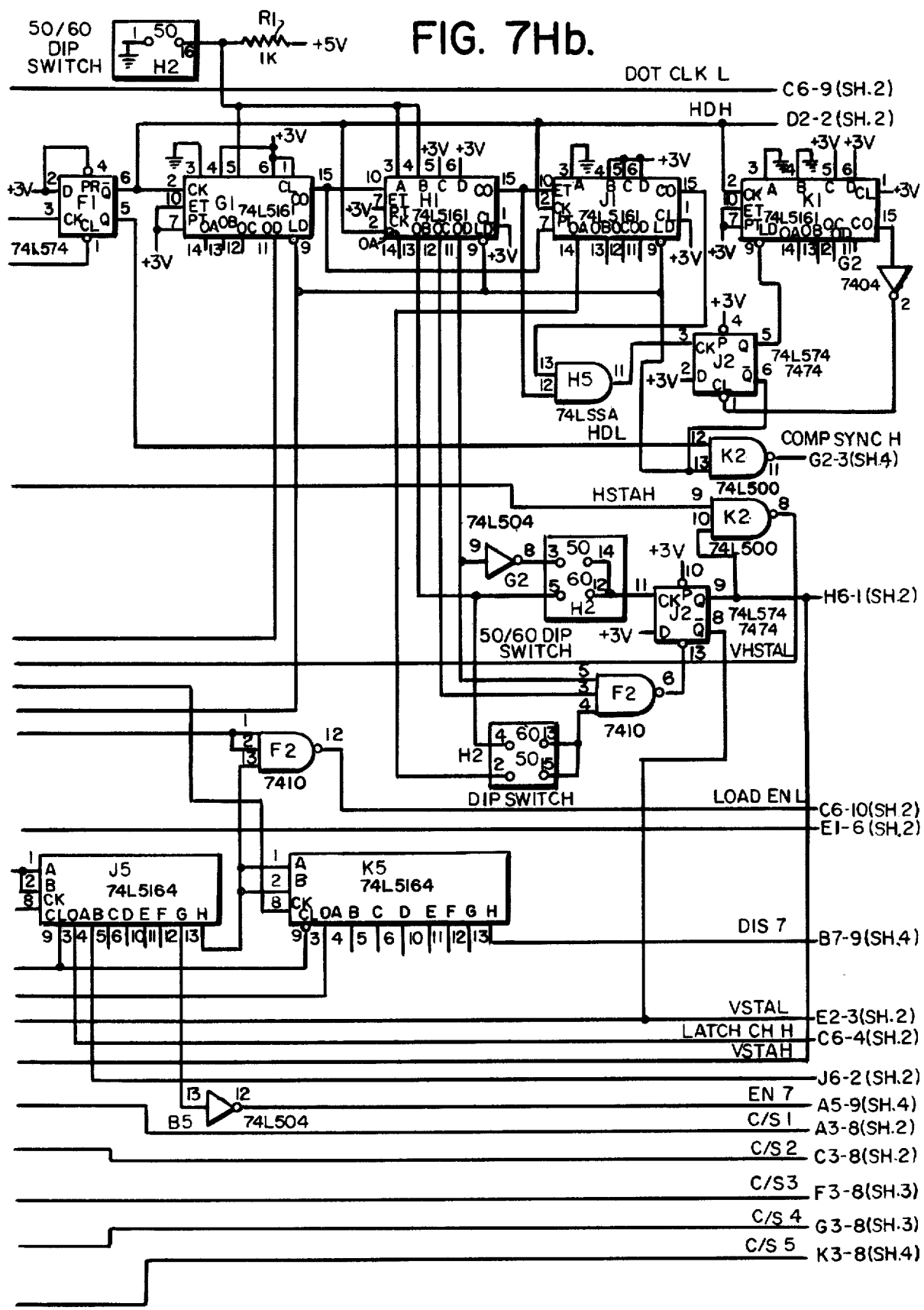

FIG. 8A.

1505     SHIPBROKERS INC, NEW YORK    555-9999    TX 123456     CONA

MARKET REPORT

ROW NUMBER

| | | | | | | |
|---|---|---|---|---|---|---|
| 1 | 1505 | SHIPBROKERS INC. NEW YORK | 555-9999 | TX 123456 | CONA |
| 2 | | MARKET REPORT | | | |
| 3 | A | Z0312 | | | |
| 4 | B | Z1032 Z0312 Z0256 T0012 | | | |
| 5 | C | Z2000 Z2020 | | | |
| 6 | D | Z1441 Z1400 | | | |
| 7 | E | Z1420 Z1430 Z1433 | | | |
| 8 | F | T1020 H0056 G1222 G0025 G0965 T1200 | | | |
| 9 | G | | | | |
| 10 | H | | | | |
| 11 | I | | | | |
| 12 | J | | | | |
| 13 | | | | | |
| 14 | | B / ALERT TEXT STRING | | | |
| | | ← PAGE STATUS MESSAGE | | | |
| 15 | [ | * B / ALERT TEXT STRING | | | |
| 16 | | | | | |

- DATA
- DELIMITER
- ALERT LIST SPECIFIER
- SHIPPING PREFIX

FIG. 8C.

1235    SHIPBROKERS INC. NEW YORK   555-9999   TX 123456    CONA

MARKET REPORT

A  Z0312

B  Z1032 Z0312 Z0256 T0012

C  Z2000 Z2020

D  Z1441 Z1400

E  Z1420 Z1430 Z1433

F  T1020 H0056 G1222 G0025 G0965 T1200

G

H

I

J

SEE SHPA

FIG. 8D.

ALERTS PAGE    LSTA

TIME OF RECEIPT BY NODE

EXPANDED ALERT MESSAGE TEXT

1322 SEE PAGE SHPC

1322 SEE PAGE SHPB

1321 SEE PAGE SHPA

– SEE ALERTS –

FIG. 8E.

```
         ┌─ INSERT ROWS
         │
    1  0000     SHIPBROKERS INC. NEW YORK   555-9999    TX 123456      SHPC

2  FIXTURES           OOOTON   N/SCALE         LOADING ARABIAN GULF

A  BROOKLYN           185 DTY 75     30/10  AG/INDONESIA PERTANINA

B  SEA SWIFT          245 DTY 55     NOV    AG/UKCONT-FINLAND NESTE

C  CITTA DI SAVONA     62 DTY 220    5/11   AG/AUSTRALIA NABALCO

D  PAULA              208 DTY 57.5   3/11   AG/CARRIBB CAYMAN ENERGY

E  ENERGY CREATION    220 DTY 50     PPT    AG/UKCONT-MED ELF UNION

F

G

H

I

J

K         L   M   N    O            P
         └─────────────────┬─────────────────┘
                      INSERT COLUMNS
```

ALERT MESSAGE COMMUNICATION SYSTEM

TECHNICAL FIELD

The present invention relates to communication systems and particularly to such systems capable of providing a subscriber originated alert message to other subscribers in the system which have been selected by the message originater.

BACKGROUND ART

Communication systems, and particularly two-way communication systems are well known in the art. In addition, communication systems capable of providing an alert message to selected subscribers are also known in the art. However, such prior art systems do not readily enable a subscriber to provide an alert message to a variable list or directory of subscribers or recipients for this message which may readily be varied at the will of the originating subscriber. Nor do they provide for priority queueing of multiple alert messages which may be received by a different subscriber and which may be selected by that subscriber in any order desired. These features are important to a two-way dynamic communication system in which the subscriber recipients may be rapidly changing as conditions vary, such as in a shipping market, commodities market, security market or money market environment, such as in an international system in which selected subscribers at different geographic locations, such as for example Paris, Frankfurt, Zurich, London, Hong Kong and New York may be substantially instantaneously provided with a common alert message. Thus, there are no satisfactory prior art alert communication systems known to applicants which have sufficient flexibility to disseminate and receive fast-moving market information on a world-wide basis, in particular where the desired recipients and contributors constantly change. These disadvantages of the prior art are overcome by the present invention.

DISCLOSURE OF INVENTION

The present invention relates to communication systems capable of providing a subscriber originated alert message to other subscribers in the system or network which have been selected by the message originator. Both the content of the alert message and the designated recipients may be readily varied at will by the subscriber at his keystation which comprises a keyboard for requesting and inputting textual data messages and associated data control signals and a display, such as a video display, for providing a textual display of the keyboard generated data. The network, which is a telephone type distribution network, includes a plurality of message routing node interfaces at different geographic locations to which are connected a plurality of keystation controller interfaces which interface the various keystations to the network. Each keystation controller has associated display control logic and local storage for locally storing and displaying alert messages which have been directed to the keystations associated with that keystation controller as well as for storing other retrievable data which the keystation may select for display. Each keystation is assigned a locally storable control page which contains the identification of keystation recipient groups throughout the network which a given subscriber keystation has predefined for receipt of his alert message. The control page, which may be varied at will by the subscriber, contains different sets of message routing logic control signals which correspond to different selected address groups of designated subscriber recipients. The control page is locally stored in the node interface logic for routing the alert message originated by an associated subscriber to the appropriate keystation controller interfaces logic for subsequent local storage and display selection by the designated subscriber recipients. Each keystation controller interface has a unique associated address code so that it may be uniquely identified in the message routing logic control signal. A printer is associated with each keystation controller interface for providing a hard copy print out of the referred alert messages if desired. Once a control page has been predefined, the originating subscriber may rapidly select different sets of subscriber keystations recipient groups for a given alert message. The subscriber keystation may contribute remotely storable retrievable data to the network as well as alert messages, and message routing data and selection control signals, so that the data message may rapidly inform selected subscribers of an event, such as market availability, while referring those subscribers to other retrievable data if they have an interest. This is particularly useful in rapid market dealing, such as in the shipping or commodities market.

BRIEF DESCRIPTION OF DRAWINGS

FIG. 2 is a functional block diagram illustrating a typical node in the network of FIG. 1 of the type having associated local concentrator computers;

FIG. 3 is a functional block diagram, similar to FIG. 2, illustrating a typical node in the network of FIG. 1 of the type having no associated concentrator computers;

FIGS. 5A-5B are illustrative of the universal line switch portion of FIGS. 2 and 3, with FIG. 5A being a functional block diagram of a typical line switch daisychain, and with FIG. 5B being a schematic, partially in block, of a typical switch network module for the universal line switch of FIG. 4A;

FIGS. 8A-8E are illustrative examples of typical page displays in connection with provision of an exemplary alert communication message for shipping market data, with FIGS. 8A-8C relating to a typical control page, FIG. 8D relating to a typical ALERTS PAGE, and FIG. 8E relating to a typical page of text.

BEST MODE FOR CARRYING OUT THE INVENTION

Figure 1:
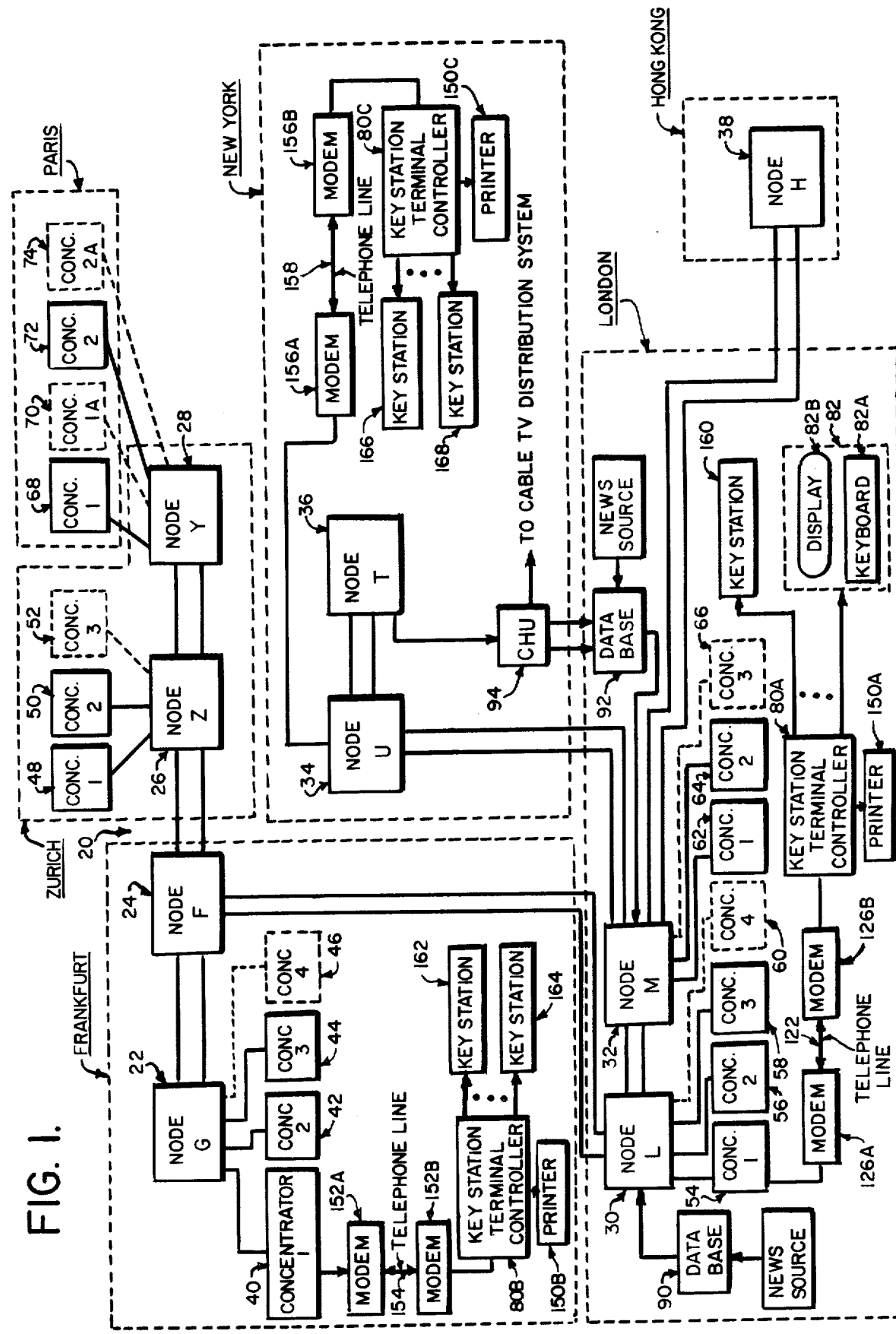
FIG. 1 is an overall system functional block diagram illustrating a typical alert communications network.

Referring now to the drawings in detail, and initially to FIG. 1 thereof, an overall system block diagram illustrating a typical communications network, generally referred to by the reference numeral 20 is shown. For the purposes of illustration, the network 20 shall be described in terms of a communications network having nine nodes 22, 24, 26, 28, 30, 32, 34, 36 and 38 by way of example. Furthermore, for the purposes of illustration, the communications network 20 is assumed to be a worldwide distribution network and, as such, the various nodes are shown by way of example as being located in Frankfurt, Zurich, London, New York and Hong Kong with a remote connection of one of the nodes, node 28, located in Zurich to Paris. A typical node, such as node 30 located in London, will be described in greater detail hereinafter with reference to FIG. 2. As will also be described in greater detail hereinafter, each of the nodes 22 through 38, respectively, functions substantially autonomously. The various nodes 22 through 38 are, in reality, computer configurations as illustrated in FIG. 2. As will be further described in greater detail with reference to FIG. 2, preferably, local concentrator computers are associated with the nodes. In the example of FIG. 1, however, only certain of the nodes, namely nodes 22, 26, 28, 30 and 32, by way of example, have associated local concentrator computers with the primary function of the local concentrator computer being to expand the number of lines which could be serviced by a given data base or node. Of course, if desired, nodes 24, 34, 36 and 38 could also employ local concentrator computers if it were desired to similarly expand the number of lines servicable by these nodes. By way of example, node 22 has four associated local concentrator computers 40, 42, 44 and 46 with, as will be described in greater detail hereinafter, concentrators 40, 42 and 44 being active and concentrator 46 being a stand-by concentrator in the event that one of the active concentrators 40, 42 or 44 fails so that its function can be assumed without any loss by the spare concentrator 46. Similarly, node 26 has three associated local concentrator computers 48, 50 and 52 with concentrators 48 and 50 being active and with concentrator 52 being a spare; node 30 also has four associated local concentrator computers 54, 56, 58 and 60 with concentrators 54, 56 and 58 being active and concentrator 60 being a spare; and node 32 has three associated concentrator computers, by way of example, 62, 64 and 66 with concentrators 62 and 64 being active and with concentrator 66 being a spare. As was previously mentioned, with respect to node 28, it has two pair of local concentrator computers 68-70 and 72-74 which are remotely located in another city, such as Paris. Each of these pairs 68-70 and 72-74 consists of an active concentrator computer 68, 72 and a stand-by concentrator computer 70-74 with these concentrator pairs 68-70, 72-74 preferably being connected via telephone land lines to the node 28 located in Zurich. Each local concentrator computer 40 through 74 is, respectively, a processor which handles network communication functions and supports terminal controllers associated therewith, to be described in greater detail hereinafter with reference to FIG. 2, which terminal controllers 80, by way of example in FIG. 2, provide an interface between the subscriber terminal, 82 by way of example in FIG. 2, and the respective node, such as node 30. The nodes, such as node 30, comprise a host computer pair with the host computer being the main communications interface between other nodes in the system and the various associated local concentrators and the data base. As also shown and preferred in FIG. 1, node 30 receives external data, such as news from an external computer system 90 as is also illustrated for node 32 which receives external data such as news from a different external computer system 92. In addition, as further illustrated in FIG. 1 another computer 34 may be used as a two-way data interchange for providing additional data to data base 92 and to node 36 as well as for providing the data from node 36 to an external system, such as a cable television system if desired. The various nodes 22 through 38 are connected to adjacent nodes via trunk lines, such as at 4800 baud, which can either be conventional telephone land lines or satellite communications. As will be described in greater detail hereinafter, these various trunk lines are used to distribute subscriber originated data, such as alert communication messages, from the point of origin at the individual subscriber or keystation 82 to the various points of reception at other subscriber designated keystations throughout the world-wide network 20.

Referring now to FIG. 2, a typical node, such as node 30 located in London in the example of FIG. 1, is shown. FIG. 2 also illustrates the various concentrator computers 54, 56, 58 and 60 located at node 30 along with the associated communications equipment necessary for supporting the host computers 30A and 30B. For purposes of illustration, host computer 30A is assumed as being the active computer in the example of FIG. 2 and host computer 30B is assumed as being the stand-by computer. The two host computers 30A and 30B are shown as being interconnected by trunk lines 100 and 102 and have their respective states controlled by a watchdog timer network 104 to be described in greater detail hereinafter. In addition, there is a universal line switch 106, also to be described in greater detail hereinafter, which handles the switching interface with the other various nodes in the network 20. Each host computer, such as computer 30A, preferably consists of the processor itself, and associated supporting peripherals. Thus, for example, computer 30A may be a conventional PDP11/34 manufactured by Digital Equipment Corporation and associated peripherals such as the following Digital Equipment Corporation peripherals, namely: a DL11-W line frequency clock and serial interface, an RJS04 fixed head disc, an RK11 dual drive moving head disc system, an RX11 dual drive floppy disc, a DH11 16 line asynchronous multiplexer, a DMC11-AL 56 kilobits per second synchronous interface for each of the local concentrator computers associated with the host computer, such as the four concentrators 54, 56, 58 and 60 associated with either host computer 30A or 30B, and a DL11-W interface for communication with the watchdog timer 104. In the example of node 28 having remotely located concentrator computers 68, 70, 72 and 74, a DMC11-AR 9.6 kilobits per second synchronous interface is preferably used in place of the DMC11-AL interface. In addition, in the example of node 28 having the remotely located concentrator computer 68, 70, 72 and 74, node 28 can also support additional subscribers through additional DH11 interfaces.

By way of example, a typical local concentrator computer, such as concentrator 54, preferably contains a conventional processor and associated peripherals, such as a Digital Equipment Corporation PDP11/34, a DL11-W serial interface, a KW11-P programmable clock, an RX11 dual drive floppy disc system, six 16 line asynchronous DH11 multiplexers for communication with six subscriber terminal controllers 80 and two DMC11-AL 56 kilobits per second synchronous interfaces for communication with either of the host computers 30A or 30B. In the example of the remotely located concentrator computer 68, 70, 72 and 74, in place of the two aforementioned DMC11-AL synchronous interfaces, four DMC11-AR synchronous interfaces are employed with one being associated with each of the four concentrator computers 68, 70, 72 and 74. In addition, the 96 line outputs of each of the local concentrator computers 54, 56, 58 and 60 are provided to a conventional line switch 108 which conventionally switches the signals on the various 96 line inputs 110, 112, 114 to the respective lines 116, 118 and 120. In the instance of a failure of one of the active concentrators 54, 56 or 58, then the 96 input lines associated with that particular concentrator are switched so as to be associated with the 96 output lines 122 associated with the spare concentrator computer 60 which then takes over the function of the failed concentrator computer. Since the connections between the various subscriber keystation terminal controllers 80 and the nodes, such as node 30, are provided via telephone lines, with one such line 122 being shown by way of example in FIG. 2, operating at, for example, 1200 baud or bits per second, conventional modems 124 and 126, respectively, are provided at each end of the associated telephone line 122. The modem 126 at the subscriber's office preferably is connected to a terminal controller 80 to be described in greater detail hereinafter with reference to FIGS. 6A–6B and FIGS. 7A–7K, which controller 80 acts as communications oriented intelligent terminal employing a microprocesser for controlling, by way of example, up to four subscriber keystations 82 and also locally storing an alert message page, which page is preferably unique to the keystations 82 associated with the particular controller 80. In addition, the controller 80, as will be described in greater detail hereinafter, can request and retrieve information from the central system or node 30 such as news data for display on the various video display screens associated with the keystations being serviced by the controller 80.

Referring again to FIG. 1, three such terminal controllers 80A, 80B and 80C are illustrated, by way of example, associated, respectively, with concentrator 54 at node 30, concentrator 40 at node 22 and directly with the host computer at node 34. The absence of the concentrator in connection with node 34 does not in any way affect the functioning of the system but merely limits the number of lines which can be serviced by node 34. In addition, each of the controllers 80A, 80B and 80C has an associated local printer 150A, 150B and 150C, respectively for local printing of news data or alert messages as will be described in greater detail hereinafter. In addition, terminal controller 80A is connected to concentrator 54 via modems 126A and 126B and telephone line 122, terminal controller 80B is connected to concentrator 40 via modems 152A and 152B and telephone line 154, and terminal controller 80C is connected to node 34 via modems 156A and 156B and telephone line 158. The various exemplary keystations illustrated in FIG. 1 are respectively labelled 82 and 160 for terminal controller 80A, 162 and 164 for terminal controller 80B and 166 and 168 for terminal controller 80C. As shown and preferred in FIG. 2, the respective terminal controller 80 is connected to the associated modem 126 via conventional 4 wire EIA line 170.

Referring now to FIG. 3, a typical node configuration for node 34 by way of example, wherein concentrator computers are not associated with the host computers is shown. Thus, as can readily be seen by comparing FIGS. 2 and 3, the primary difference between the node configuration 34 illustrated in FIG. 3 and the node configuration 30 illustrated in FIG. 2 is the absence of the concentrators 54 through 60 and the subsequent replacement of the concentrator line switch 108 by the universal line switch 106A which is preferably functionally identical to universal line switch 106 in FIG. 2 with the exception that it is capable of switching 96 lines as opposed to the 16 lines switched by the universal line switch 106 in FIG. 2. Thus, a watchdog timer 104 controls the state of the host computer pair 34A-34B which are interconnected by lines 100, 102 as well as controlling the switching of the universal line switch 106A whose output is provided via modem 156A to telephone line 158, by way of example, and therefrom to modem 156B and to the associated terminal controller 80C and its associated keystations 166 and 168, by way of example (FIG. 1).

Figure 4A:
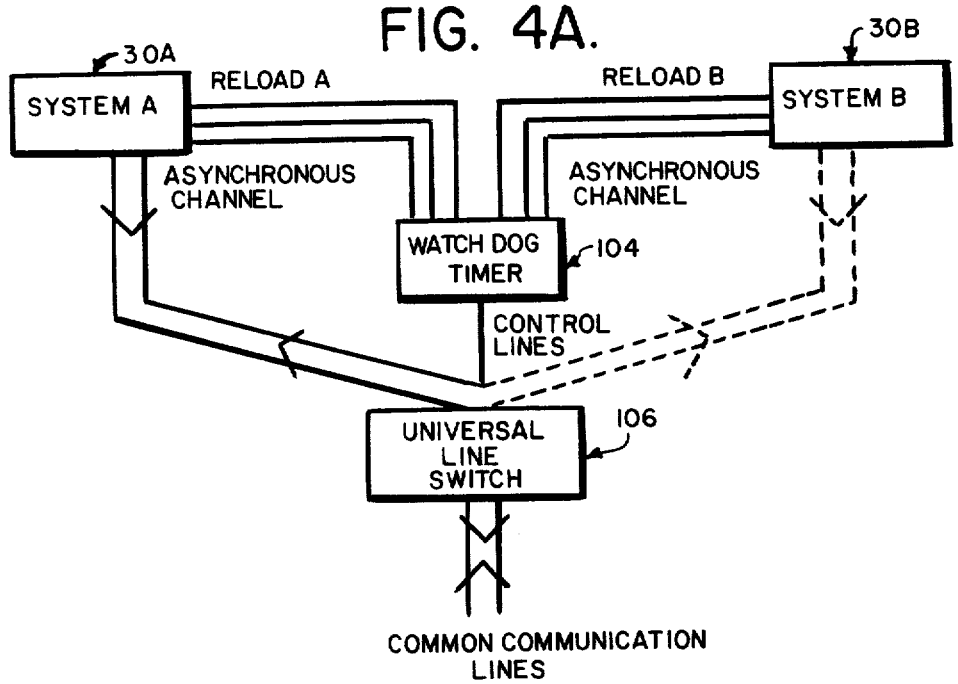
FIGS. 4A-4B are illustrative of the operation of the watchdog timer portion of the nodes of FIGS. 2 and 3, with FIG. 4A being a functional block diagram of the interface between the watchdog timer, line switch and dual processors and with FIG. 4B being a graphic illustration of the watchdog timer timing cycle.
Figure 4B:
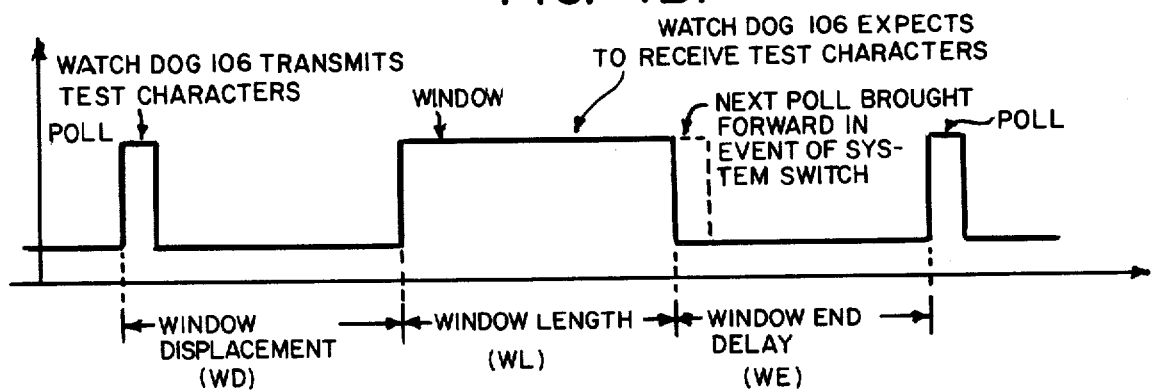
Figure 5A:
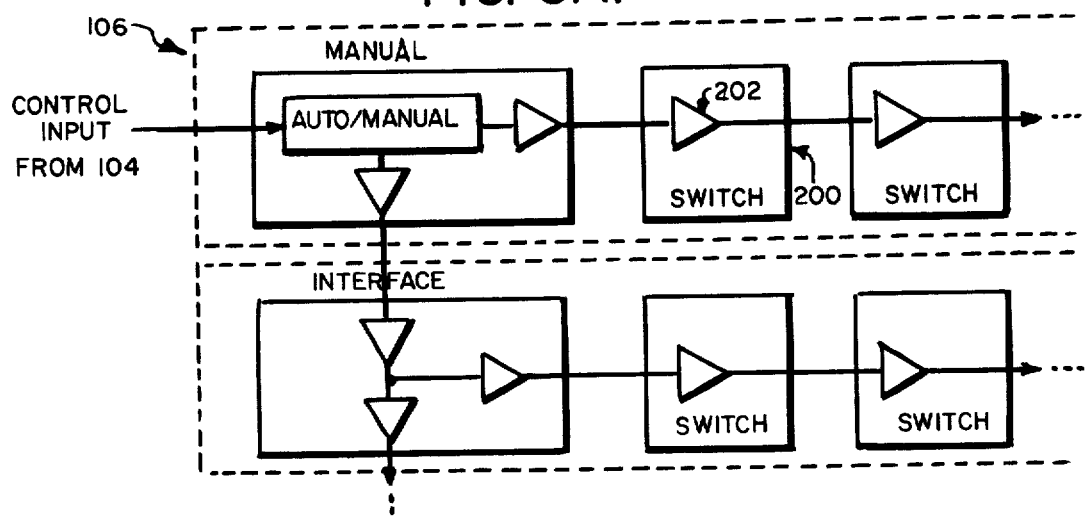

Referring now to FIGS. 4A and 4B, the function of the watchdog timer 104 shall briefly be described. The configuration illustrated in FIG. 4A comprises the two host computers 30A and 30B by way of example or 34A and 34B depending upon the node configuration, the watchdog timer 104, and the universal line switch 106 for the configuration of node 30 and 106A for the configuration of node 34, the only difference being in the number of lines being serviced by the universal line switch. FIG. 4B is a graphic illustration of a timing diagram illustrating the timing cycle of the watchdog timer 104. Suffice it to say that the watchdog timer 104 is an electronic switch which preferably provides a continual monitor of the main and stand-by computers 30A and 30B, respectively, by way of example, within a dual processor system arranging to interchange their roles as and when necessary. Of course, if such a dual processor system is not desired, then the watchdog timer 104 may be omitted as is true for any other stand-by equipment. However, in a real time communications service it is preferably preferred that instantaneous back-up be available. Preferably, the watchdog timer 104, when employed, connects each processor or host computer 30A, 30B using an asynchronous serial line interface as well as providing control signals to the universal line switch 106 or 106A which preferably enables common communication lines to be routed to the processor 30A or 30B which is currently considered the main or active processor. In addition, if desired, the watchdog timer 104 can be employed to signal the universal line switch 106 or 106A when both main and stand-by processors 30A and 30B or 34A and 34B are intended to be functional simultaneously so that the total communication load could be shared between them if desired. The watchdog timer 104, which preferably utilizes conventional logic components and itself contains power supply and battery back-up unit, preferably communicates with the processor pair 30A-30B or 34A-34B using a polling mechanism such as illustrated in FIG. 4B. Thus, at a predetermined time in its timing cycle, the watchdog timer 104 sends a character to each processor 30A and 30B or 34A and 34B. These characters which may be switch selectable, are preferably, by way of example, an L to the active or live processor 30A or 34A and an S to the stand-by processor 30B or 34B. The watchdog timer 104 then preferably generates a delay followed by a window period within which the watchdog timer 104 expects to receive back from each processor 30A and 30B or 34A and 34B the same character that was sent. Any error either in time, that is if the character was returned outside the window interval or not at all, or in content, that is if the wrong character were returned, indicates a failure of that processor 30A or 30B or 34A or 34B. If the stand-by processor has indicated a failure, that is processor 30B or 34B, the watchdog timer 104 merely notes this condition and provides some type of visual alarm so that it may be corrected. If, however, it is the active or main processor 30A or 34A which has indicated a failure condition, and the stand-by processor 30B or 34B has not indicated a failure condition, an alarm is preferably provided and an exchange of roles between the active processor and the stand-by processor is automatically triggered. This is accomplished by the watchdog timer 104 preferably swapping the transmitted characters so that the previously designated stand-by processor 30B or 34B would then receive the active processor test character and the previous active or main processor 30A or 34A would receive the designated stand-by processor test character. The poll test characters when received by the processors 30A-30B and 34A-34B would preferably interrupt to trigger various programming checks which ultimately determine the response. The watchdog timer 104 then preferably attempts a periodic reload of the failed processor. The desired poll frequency and window length graphically illustrated in FIG. 4B is preferably determined by various switch settings on the conventional logic boards with the watchdog timer 104 preferably not permitting switching to a failed processor nor allowing too frequent switching between systems so as to prevent oscillation should both processors have intermittent faults. By way of example, the maximum poll rate for the watchdog timer 104 in the slow cycle may be 2.8 seconds and in the fast cycle 300 milliseconds with a minimum poll rate being set as a function of the baud rate selected. Similarly, the maximum window length in the slow cycle may be 800 milliseconds and in the fast cycle 100 milliseconds with a minimum window length in the slow cycle of 8 milliseconds and in the fast cycle 1 millisecond, by way of example. In addition, the reload frequency may have a maximum of 1 minute 40 seconds and a minimum of 1 second by way of example with a 1 millisecond reload pulse and a corresponding transmission speed having a maximum of 9600 baud and a minimum of 75 baud, by way of example. With respect to the universal line switch 106 or 106A, a typical such universal line switch is illustrated in FIGS. 5A and 5B. Thus FIG. 5A diagramatically illustrates a universal line switch comprising a plurality of switch networks 200 each of which, as shown and preferred in FIG. 5B, which illustrates a typical switch network 200, is a relay network capable of switching, in the asynchronous mode, 8 duplex lines or in the synchronous mode, 16 lines, with control signal buffers 202 being provided for the control signal input from the watchdog timer 104. In addition, as illustrated in FIG. 5A, by way of example, an automatic/manual mode may be provided for the universal line switch 106 in order to manually override the coantrol signal input from the watchdog timer 104 if desired. In addition, the configuration in FIG. 5A illustrates daisy chaining of the control interface which may be employed depending on the number of lines to be switched with the understanding that each switch network 200 preferably is capable of switching 8 duplex asynchronous lines. Thus, if 16 asynchronous duplex lines are to be switched then two switch networks 200 would be needed whereas if 96 duplex asynchronous lines are to be switched then 12 such switch networks 200 would need to be employed in which instance they would preferably be daisy chained for purposes of size considerations primarily. FIG. 5B illustrates schemeatically the universal line switch 106, illustrating a typical switch module network 200 therein. The contents of the schematic drawing of FIG. 5B is essentially self-explanatory and will be readily understood by one of ordinary skill in the art. Accordingly, it will not be described in any greater detail hereinafter.

"Terminal Controller"

Figure 6A:
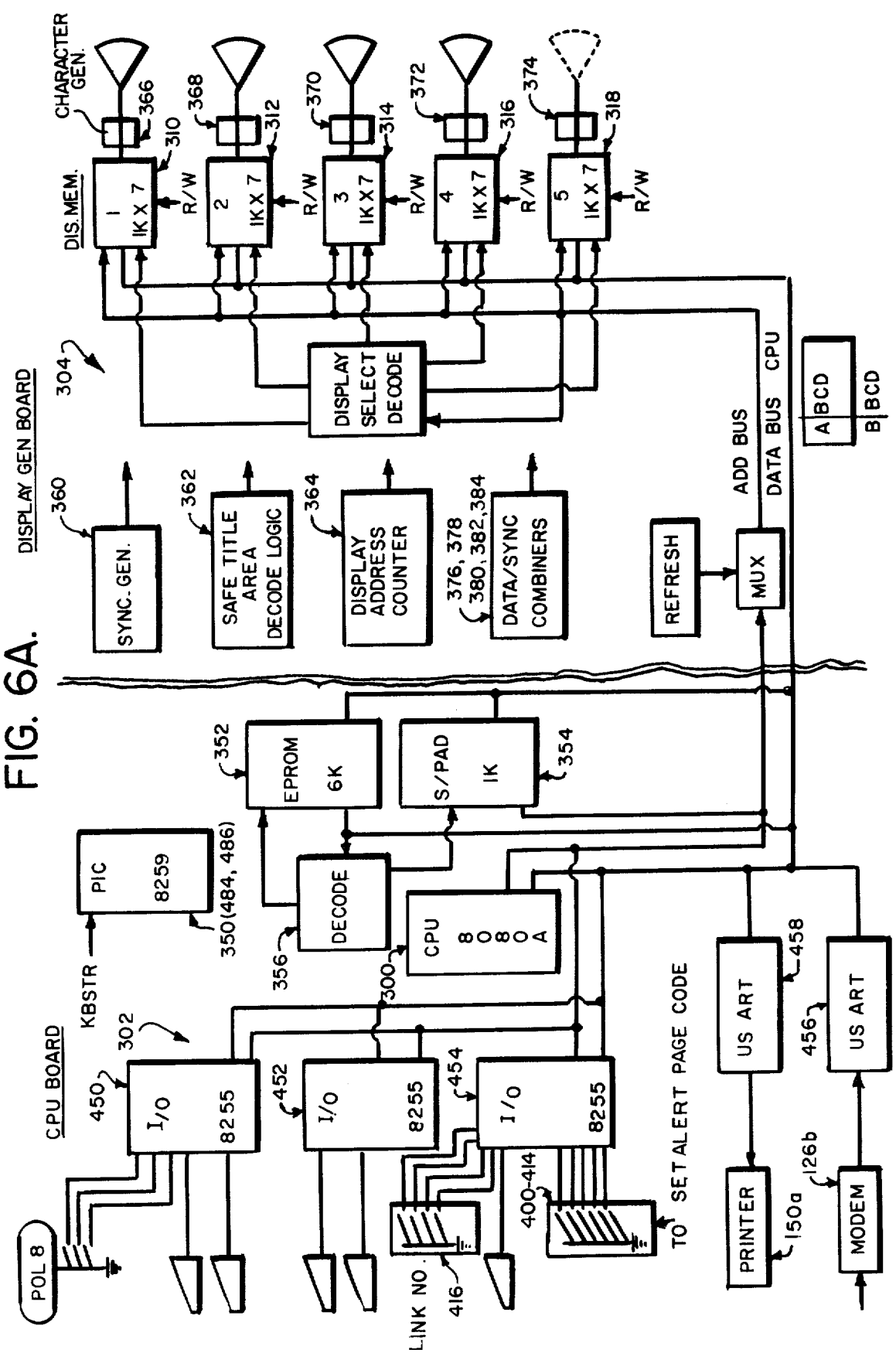
FIGS. 6A-6B are an overall system functional block diagram of a typical terminal controller, with FIG. 6A generally functionally illustrating the overall controller configuration, omitting certain portions for clarity, and with FIG. 6B further functionally illustrating the terminal controller.
Figure 6B:
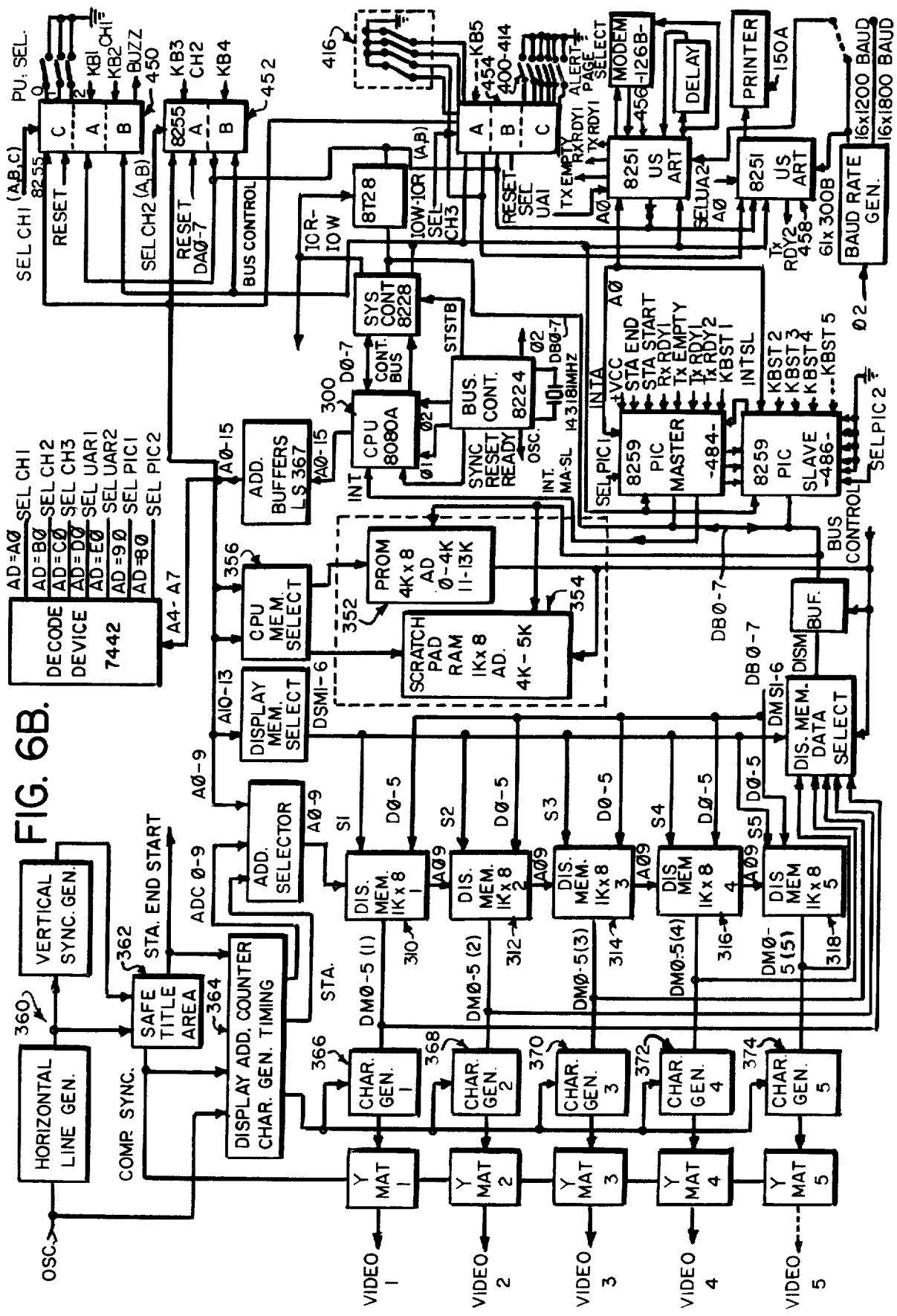

Referring now to FIGS. 6A through 6B and 7A through 7K, a typical preferred terminal controller 80 of the present invention, which interfaces the various associated subscriber keystations with the balance of the system network 20, shall now be described in greater detail. As will be described hereinafter in discussing the system operation, it is the address of the respective terminal controllers which are inserted in the subscriber control page list rows to designate recipients of the alert communication messages to be originated and transmitted by various subscriber contributors in the network 20. Moreover, as will also be described hereinafter, it is the terminal controller 80 and not the node computers at nodes 22 through 38 which stores the alerts page for the subscriber recipients associated with that terminal controller 80. Referring initially to FIGS. 6A and 6B which provide an overall system functional block diagram of a typical terminal controller, such as terminal controller 80A, employed in the alert communication system network 20 of the present invention, the terminal controller 80A is preferably a communications oriented intelligent terminal utilizing a conventional microprocessor 300, such as an Intel 8080A micro-processor with its conventionally associated supporting peripherals, with the terminal controller 80A preferably being functionally divided into an input/output portion 302, the central processing unit 300 and its associated peripherals, a display generator portion 304 and conventional bus switching circuitry. The terminal controller 80A is employed to request, retrieve and supply information to and from its associated node 22 through 38 with the terminal controller 80A which is illustrated in FIG. 6A, 6B and 7A through 7K, by way of example, being selectable so as to be usable either as a terminal controller capable of providing an alerts communication message along with the ability to request and retrieve the information from the system or one which is solely capable of requesting and retrieving information from the system without having the capability of providing alert communication message control. Thus, in both instances, the terminal controller 80A includes five conventional display memories or RAMs 310, 312, 314, 316 and 318; however, in the mode in which alert communication message control is provided, then one of the display memories, such as display memory 318 by way of example, would be employed to maintain a local alerts page, such as illustrated in FIG. 8D in which instance, the terminal controller 80A could only support four keystations. However, if the terminal controller 80A is operated in the mode in which the alert message communication control is not desired, that is where no alert page is to be locally maintained at terminal controller 80A, then display memory 318 may be used to support a fifth keystation. As will be described in greater detail hereinafter, the two modes of the terminal controller 80A are switch selectable. Of course, if desired, this mode selection feature could be omitted and the terminal controller 80A could solely be used in the mode in which display memory 318 would be dedicated to local alerts page message storage. In addition, as shown and preferred in FIGS. 7A through 7K, the terminal controller 80A may have a plurality of selectable alerts pages, such as eight pages designated LSTA through LSTF. For purposes of explanation, however, it shall be assumed that only one such alerts page or list namely LSTA is employed. As will be described in greater detail hereinafter, a subscriber contributor through an associated terminal controller 80 and the associated node 22 through 38, can direct specifically formatted alert communication messages to other designated terminal controllers 80 which will cause an alert message "SEE ALERTS LIST" to be displayed, for example, on row 14 of the display at each keystation associated with the designated terminal controller or controllers, and the text of the alert communication message will be written to an alerts page maintained in each fifth display RAM 318. This alert communications message will preferably appear as a page of data to the alert page LSTA in the example to be described herein. By way of example, the alert communication message originated by the subscriber contributor is provided to the various designated terminal controller 80 in the network 20 in the following format: SOH ADRI STX LSTA * DATA ETX BCC, where SOH is a start of header, ADRI is the controller identifier, STX is the start of text, LSTA is the alerts page number identifier, * is the unique identifier used to define an alert, DATA is the alert communication message comprising up to a total of 64 characters as will be described in greater detail hereinafter with reference to FIG. 8B, ATX is the end of text, and BCC is the sum check. The terminal controller 80 in the alert communication message mode, will preferably detect the above alert message as being an alert message by the last character of the page name and the unique character following the page name. Thus, if the terminal controller is set up for the page name LSTA and it receives an alert for the page name LSTB then it would escape that message and only accept alerts for the page name or names that it is set up for. Preferably, the aforementioned alert message is structured such that if it is directed to a terminal controller that is not in the alert message communication mode then the terminal controller will escape the message. As will be described in greater detail hereinafter, each alert received by the terminal controller will be written to the local alerts page stored in the terminal controller 80 and an alert message will be flashed on row 14 of each keystation associated with that terminal controller 80. The alerts page or list will be updated such that the last message will always preferably be displayed on row 3, as illustrated in FIG. 8D, and any previous messages will be rolled down by one row with the oldest alert message appearing on the bottom most row. Moreover, the updating of the alerts page for that terminal controller 80 will cause any keystations currently displaying that alerts page to be updated accordingly. The subscriber keystation associated with that terminal controller 80 may display the alerts page in one of three fashions; namely by retrieving the page LSTA which causes that page to be instantaneously dumped from the alerts page RAM 318; the video feed from this RAM 318 may alternatively be fed into one or more slave screens 82B which would enable the alerts page to be displayed at all times; or the video feed from the alerts page RAM 318 could be connected to a video switch which would enable the subscriber to instantaneously switch between his regular display and the alerts page display. Preferably, the alerts page once on display may not be cleared or altered by the subscriber, with the only keyboard operations available when the alerts page is on display preferably being reset and print. In addition, preferably, while the alerts page is on display, all row 14 alert messages will be directed to the screen 82B.

Figure 7A:
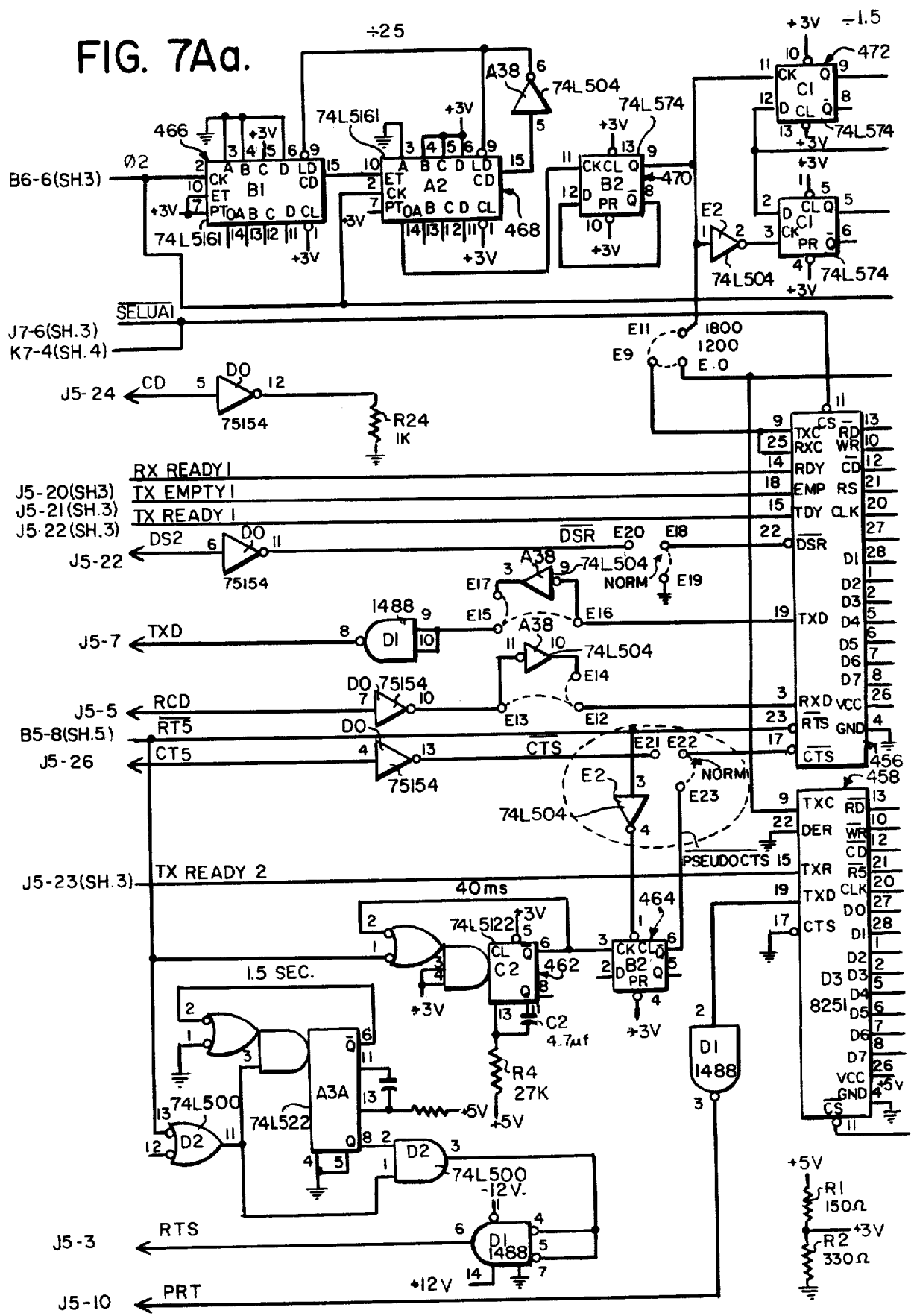
FIGS. 7A-7K are schematic diagrams of the typical preferred terminal controller of FIGS. 6A-6B, with FIGS. 7A-7F comprising a schematic diagram of the CPU control portion of the controller, FIG. 7G comprising a schematic diagram of the connector assembly portion of the controller and with FIGS. 7H-7K comprising a schematic diagram of the display generator and memory portion of the controller.
Figure 7A:
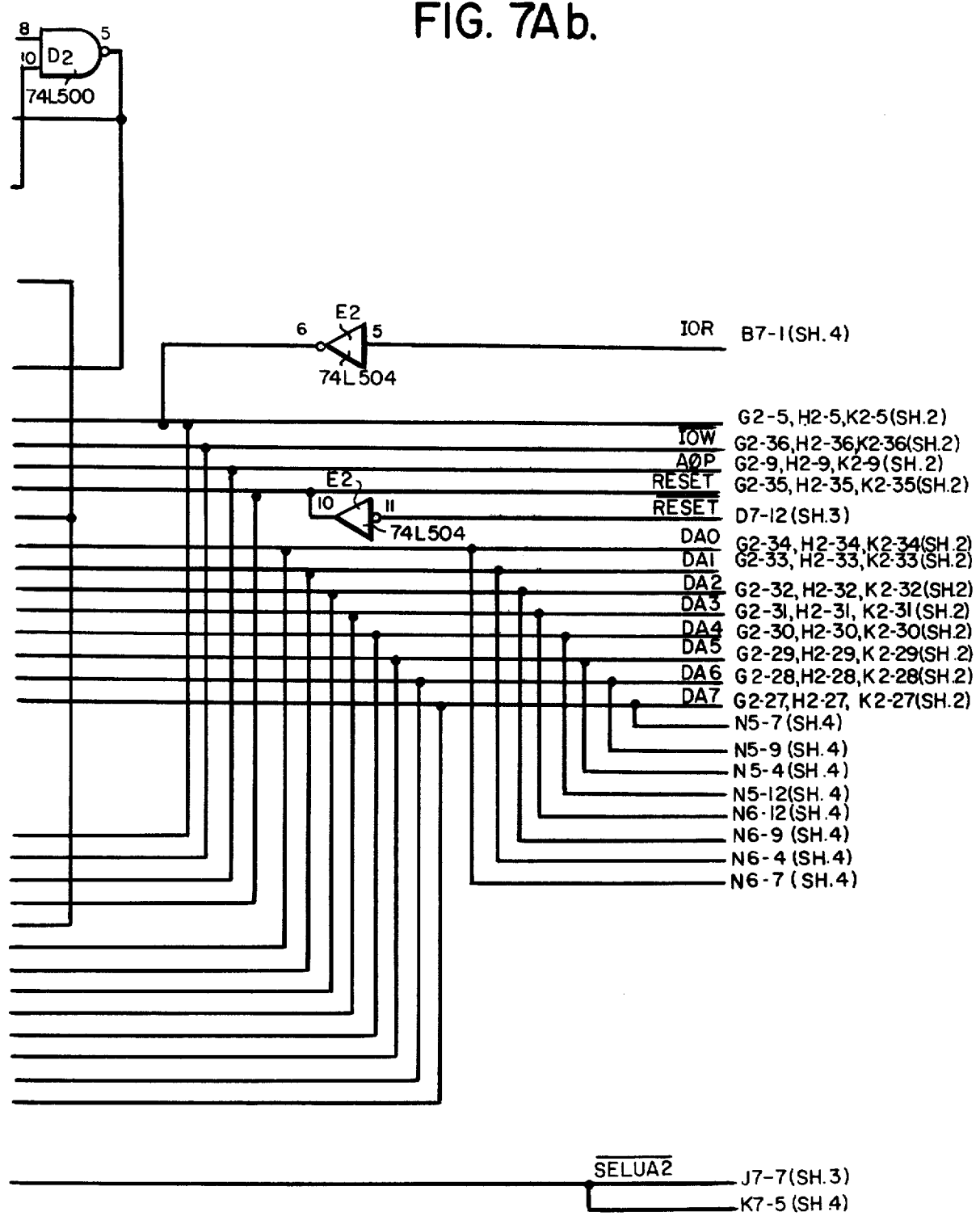
Figure 7B:
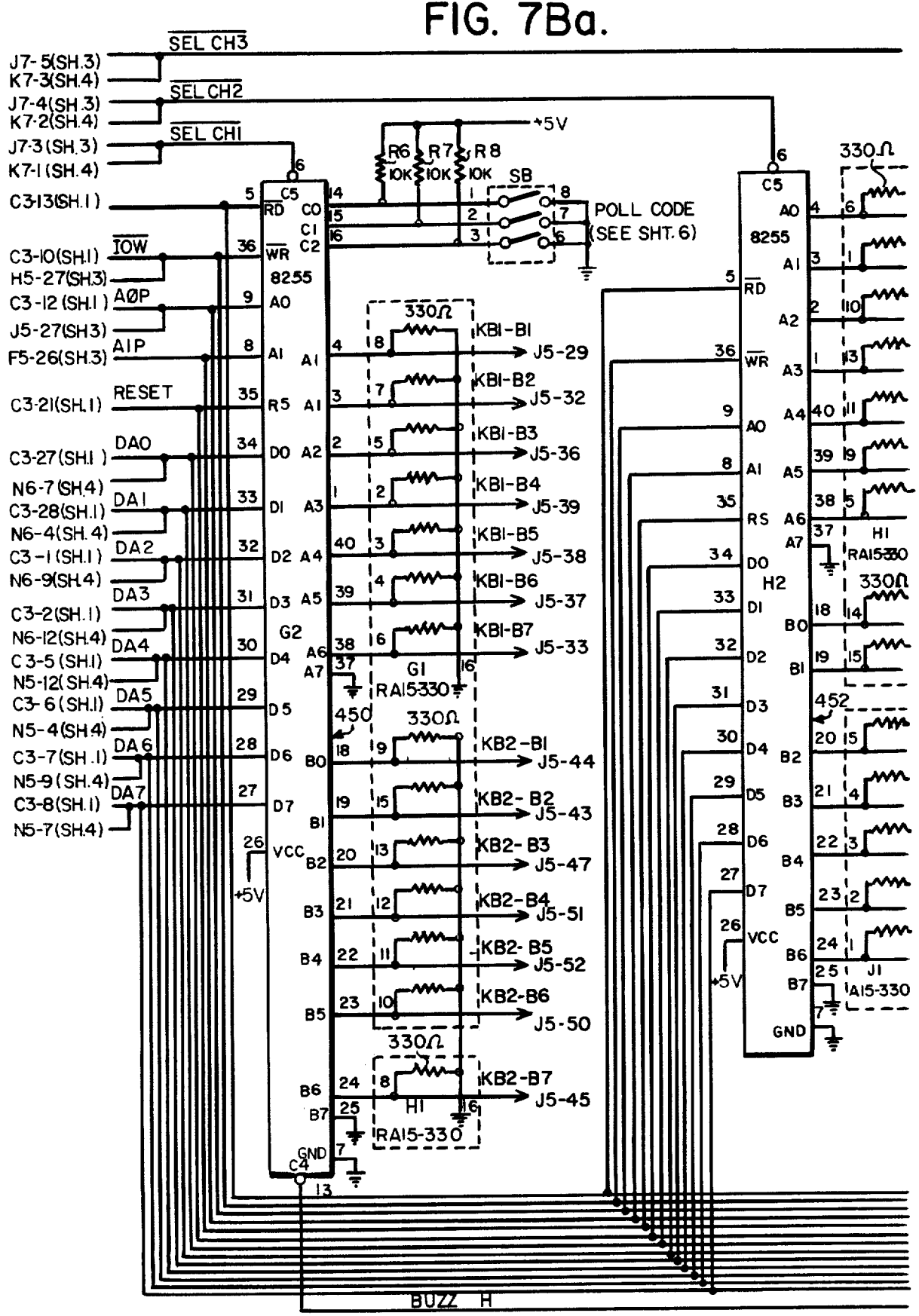
Figure 7B:
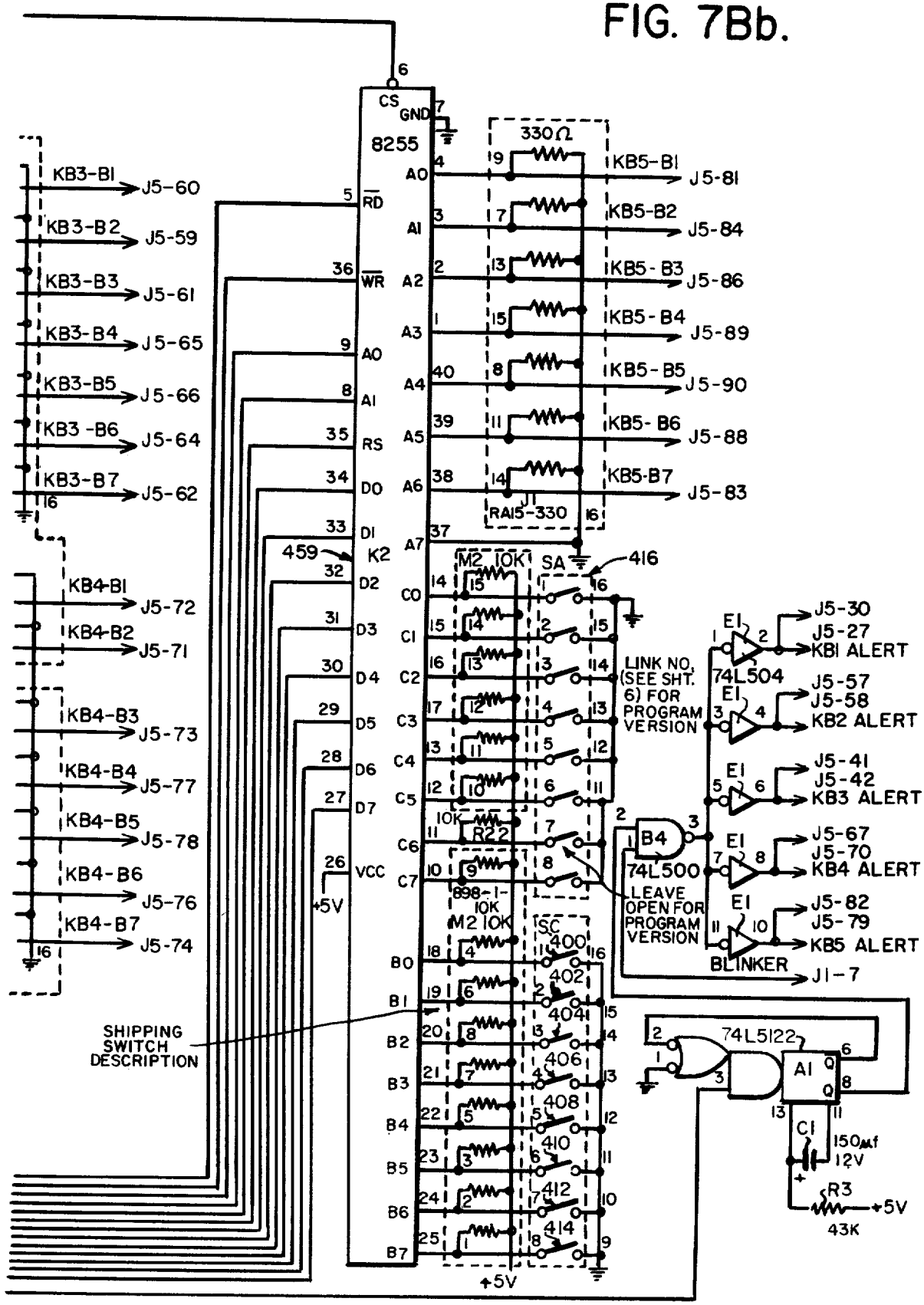

As shown and preferred in FIG. 7B by way of example, the terminal controller 80A preferably includes eight external link switches 400, 402, 404, 406, 408, 410, 412 and 414 with switches 400, 402 and 404 preferably being utilized to select the page name of the alerts page, for example 0 equals LSTA, 1 equals LSTB and so forth for the eight possible combinations provided by the three switches 400 through 404. Switch 410 is preferably used to select the mode of the terminal controller 80A with the terminal controller 80 supporting five keystation and not, thereby, capable of local alerts page storage when switch 410 is closed and with the terminal controller 80A supporting four keystations and local storage of the alerts page in the fifth display RAM 318 when switch 410 is open. Updates to a page on display on the screen may be enabled to flash for five seconds after its reception at the terminal controller when switch 408 is open. With respect to switch 406, this preferably determines hard copy printing from printer 150A, for example, with the hard copy printer 150A being dedicated solely for the printing of alert communication messages as they are received when switch 406 is open and with this feature being disabled when switch 406 is closed. Once this feature has been selected, however, it may then be enabled or disabled only via the main keystation such as keyboard 1 in the example of FIGS. 7A through 7K. With respect to switch 412 this switch preferably determines whether the link code will be derived from a switch block 416 or off the line. Thus, by way of example, if switch 412 is open, the link number or code will be derived off the line whereas if switch 412 is closed the link code or number will preferably be derived from the position of the various switches comprising switch block 416. By way of example, with respect to the use of switches 400, 402 and 404 to select the available alert page or list identifiers, LSTA may correspond to switches 400, 402 and 404 being closed, page LSTB may correspond to switch 400 being open and switches 402 and 404 being closed, page LSTC may correspond to switches 400 and 404 being closed and switch 402 being open, page LSTD may correspond to switches 400 and 402 being open and switch 404 being closed, switch LSTE may correspond to switches 400 and 402 being closed and switch 404 being open, page LSTF may correspong to switches 400 and 404 being open and switch 402 being closed, page LSTG may correspond to switch 400 being closed and switches 402 and 404 being open, and page LSTH may correspond to switches 400, 402 and 404 all being open. With respect to the aforementioned printer 150A, it is preferably a conventional hard copy printer such as one running at 30 cycles per second with the input line thereto being at 120 cycles per second in which instance the terminal controller 80A preferably buffers up to 11 alert communication messages for output to the printer 150A with the effective buffering level being on the order of magnitude of 13 or 14 alert communication messages since the printer 150A would be outputting as new alert communication messages are coming in. Of course, if desired, a 1200 baud printer could be used if a more rapid output rate were desired.

Referring again to FIGS. 6A and 6B, the input/output 302 of the terminal controller 80A preferably consists of nine input/output ports which transfer data between the various peripheral devices and the central processing unit 300, with these peripheral devices consisting of either four or five keyboards depending on the mode of the terminal controller 80A, a modem 126B associated with the terminal controller 80A and the printer 150A. The central processor portion preferably comprises the microprocessor 300 along with the associated conventional interrupt control logic 350, the U.V. erasable memory 352, a volatile memory 354 and the address decoding logic 356. The purpose of the microprocessor 300 in the terminal controller 80A is to control the input/output portion 302 of the terminal controller 80A, interpret the information coming from the various peripheral devices, write or read the information to the display generator memories 310 through 318 and output this information to the devices. These functions are preferably achieved in a sequence dictated by the program memory. An example of such a typical control program for the Intel 8080A microprocessor 300 in the terminal controller 80A, assuming the terminal controller 80A is used in the mode in which the RAM 318 stores the alerts page, is given below in Table A, with this exemplary control program being written in Intel 8080 assembler language:

TABLE A (see attached program listing)

The display generator portion 304 of the terminal controller 80A preferably comprises a video sync generator 360, safe title area decode logic 362, a display address counter 364, the previously mentioned display memories 310 through 318, five associated character generators 366, 368, 370, 372 and 374, respectively, and five data/sync combiners 376, 378, 380, 382 and 384, respectively. The purpose of the display generator portion 304 of the terminal controller 80A is to produce a television sync signal, inform the central processing unit 300 when it may access the display memory 310 through 318, convert the data stored in the display memories 310 through 318 into intelligible form and produce a composite video signal for display on the respective screens 82B of the keystations associated with the terminal controller 80. The bus switching network preferably conventionally consists of transceiver devices whose purpose is to connect the input/output portion 302 or the display generator portion 304 to the central processing unit address or data bus.

Referring now to FIGS. 7A through 7F, the input/output portion 302 and central processing unit portion of the terminal controller 80A shall now be described. As shown and preferred in FIG. 7B, the input/output portion 302 of the terminal controller 80A preferably comprises three conventional parallel ports 450, 452 and 454 such as conventional Intel 8255 parallel ports, and two conventional Universal Synchronous Asynchronous Receiver and Transmitters or USARTS 456, 458 (FIG. 7A) such as Intel 8251 USARTS. The purpose of the parallel ports 450, 452 and 454 is to preferably read in the link and poll number, parallel data from the various associated keyboards, the necessary alert message control information via switchbank 400–414 and output the buzzer signal to the respective keyboards 82A. Each of the Intel 8255 parallel ports 450, 452, 454 is a programmable interface which has, by way of example, 24 input/output lines. Preferably, each of these interfaces 450, 452 and 454 is programmed by the microprocessor 300 to function in the appropriate mode, such as one which enables each group of twelve lines to be programmed in sets of four for input or output. The respective responsibilities of the interfaces 450, 452 and 454 may readily be determined by reference to FIG. 7B with a previously noted, interface 454 being responsible for keyboard 5 and/or associated display RAM 318 via switchbank 400–414, inclusive. It should be noted that when the absolute address of any one of the display memories 310 through 318, inclusive, is asserted, this address is decoded to select a particular display memory 310, 312, 314, 316 or 318. This may represent the upper four bits of the address bus, with the lower ten bits of the address bus, by way of example, used to select a particular location within that display memory 310–318.

Preferably, to transfer data to or from the parallel ports 450, 452 and 454, the microporcessor 300 must issue a chip select signal level SELCH1, SELCH2, or SELCH3, with the chip select signal being a decode of the lower eight bits of the CPU address bus. The CPU 300 must also select which port will input or output data to the CPU data bus with this being accomplished by the A0 and A1 address lines of the CPU address bus. With respect to the USARTS 456 and 458, these are programmable communication interfaces with interface 456 preferably being programmed for eight bit asynchronous operation and being used to receive and transmit serial data to the modem 126B. Again, before the USARTS 456 or 458 can operate they must receive a chip select signal which, with respect to interface 456 is a decode of address D0. Interface 458 is preferably used to transmit data to the printer 150A. The I/O read and I/O write lines from the CPU 300 are preferably used in conjunction with the chip select signal to determine the direction of the data for interfaces 456 and 458. In addition, the CPU address A0 line informs the USARTS 456, 458 that the data bus has either a data word or control/status word. The baud rate clock which is shown as illustratively being connected to the USARTS 456 and 458 is preferably selected so as to be 16 times the required baud rate for interface 456 and 64 times the required baud rate for interface 458. The operation of interface 456 is as follows. When a character has been shifted in from the modem 126B, interface 456 buzzes the receiver ready line RXREADY high to inform the CPU 300 that a character is available. The CPU 300 then issues a chip select signal and an I/O read signal to take the character with this operation causing the receiver ready line to then go low in readiness for a further character. When the CPU 300 wishes to transmit a character, it must first receive a transmitter ready signal TXREADY. The CPU 300 then issues a chip select signal and an I/O write signal to load a command word which asserts the request to send line. When this line is asserted, a one-shot 462 is asserted for a preset period, such as approximately 40 milliseconds in which time the flip-flop 464 is clocked returning the clear to send line or CTS to interface 456. This informs interface 456 that data may be transmitted. It should be noted that preferably the operation of USART 458 is identical with that of USART 456 with the exception that USART 458 is preferably only used for transmission of data to the printer 150A. The aforementioned baud rate generator clock preferably consists of a pair of conventional counters 466 and 468 such as conventional 74LS161 counters which divide the CPU clock by 28. The output of this counter 466-468 is preferably then divided by 2 in flip-flop 470 to provide a symmetrical input for a divide by 1.5 flip-flop 472.

Figure 7C:
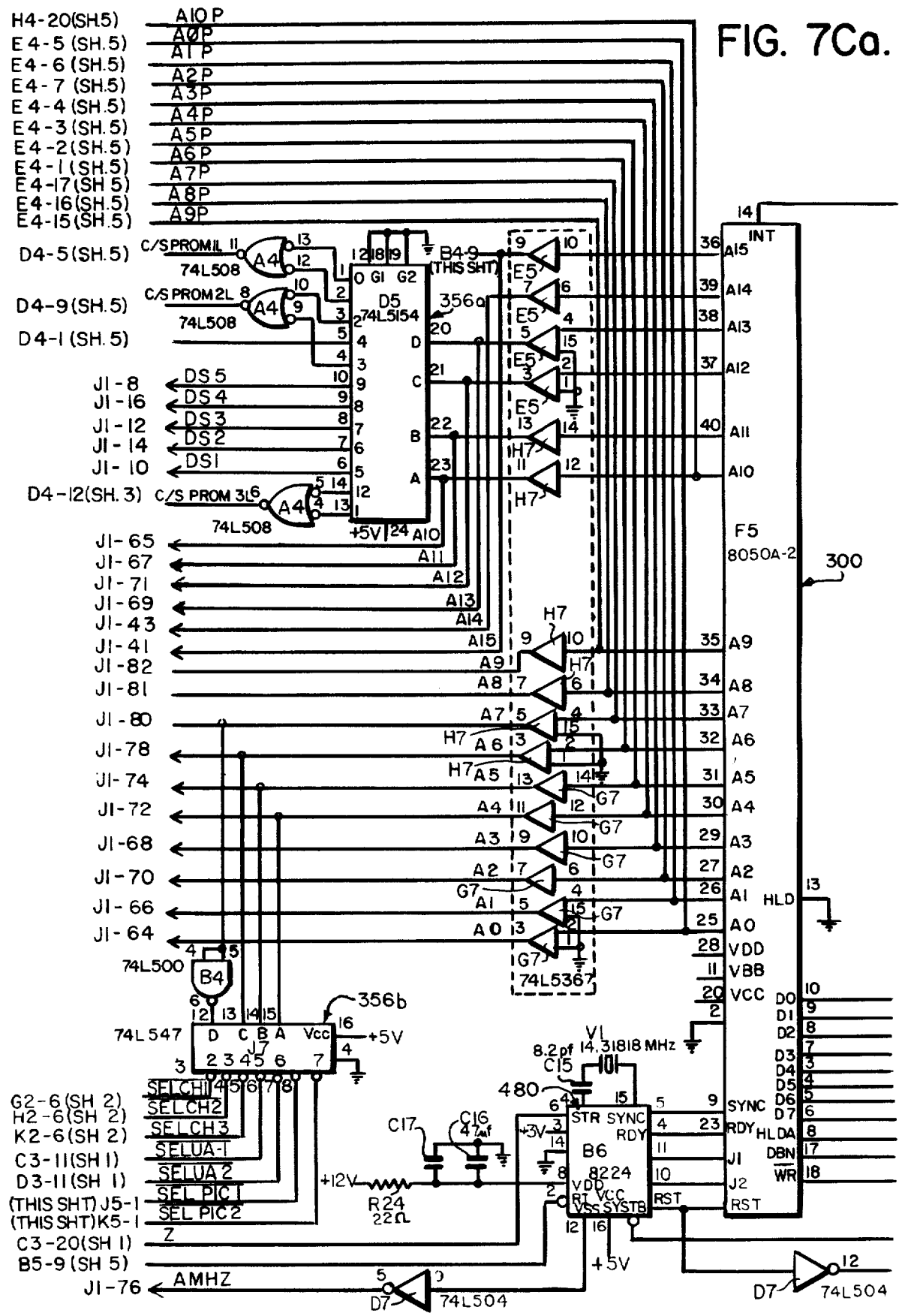
Figure 7C:
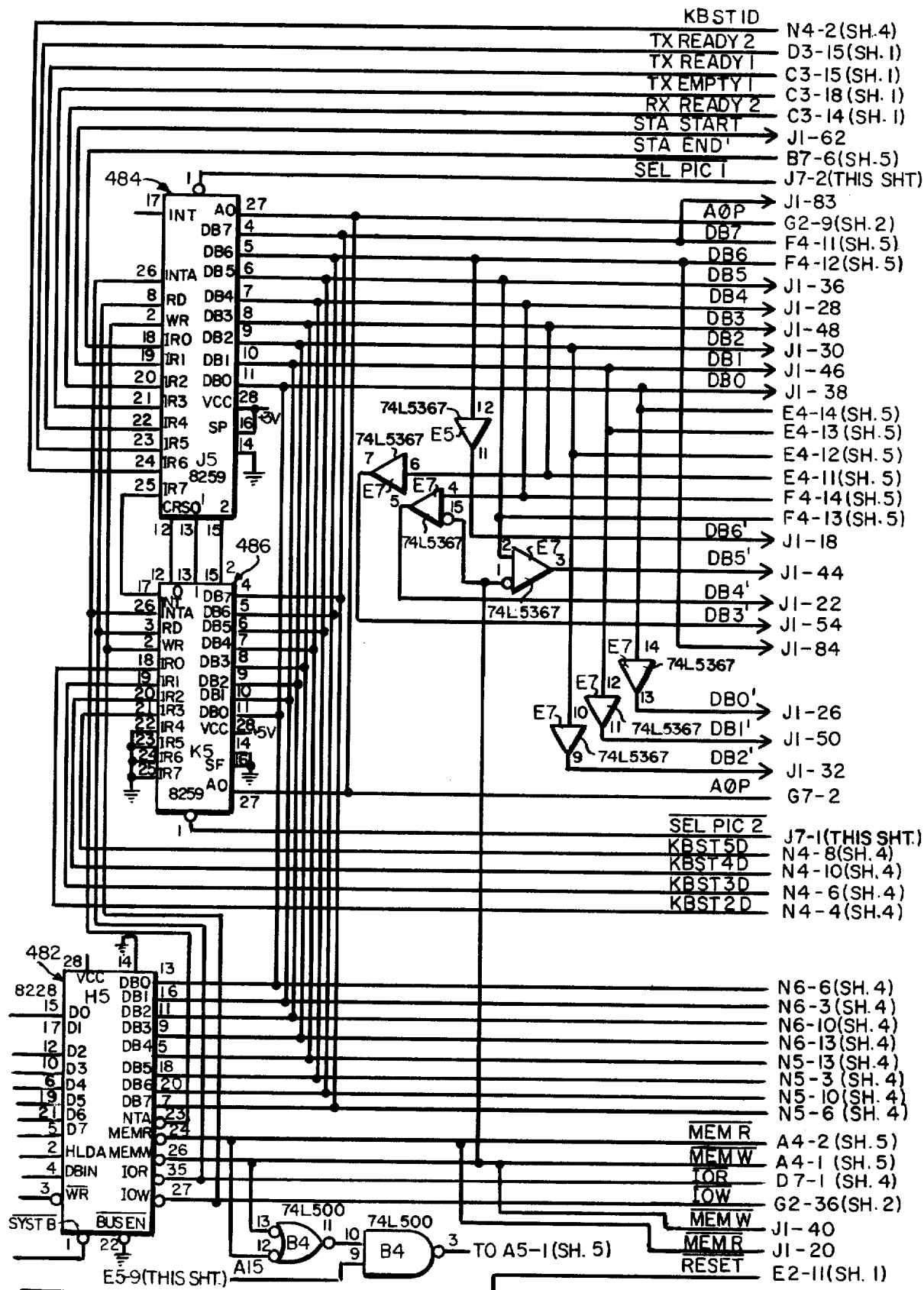
Figure 7D:
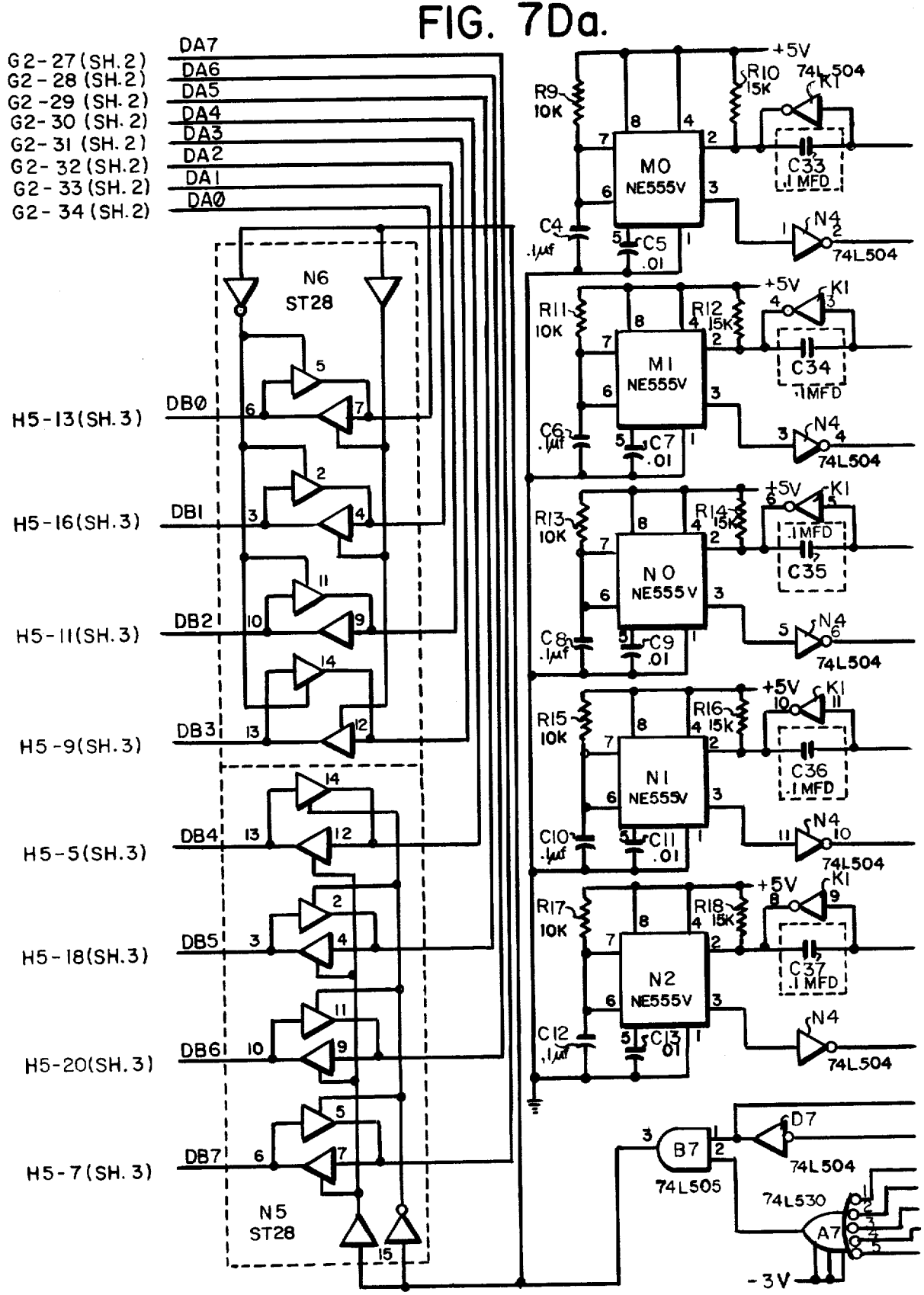
Figure 7D:
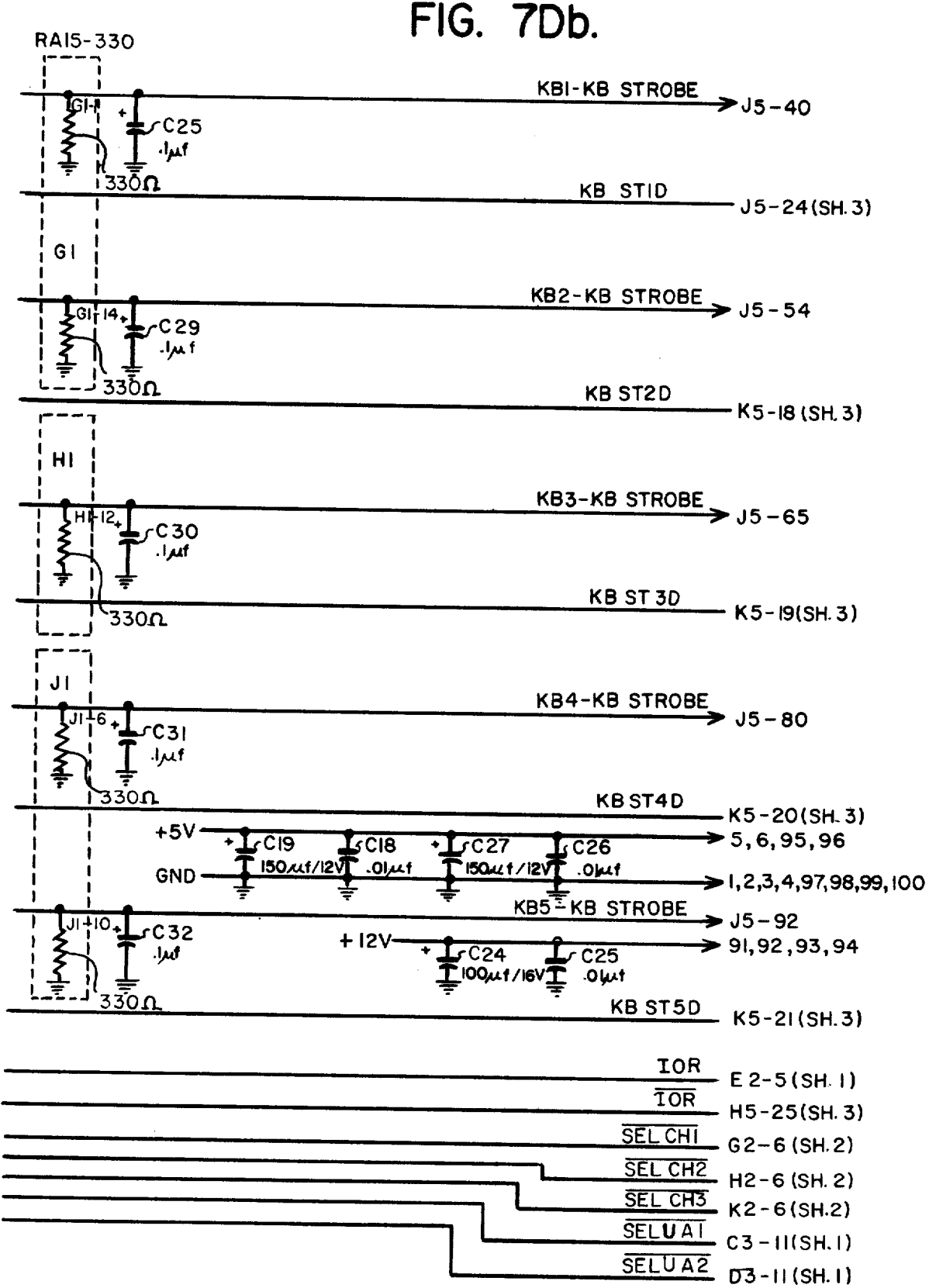

Referring now to FIG. 7C, the microprocessor configuration for the terminal controller 80A shall briefly be described in greater detail. Thus, as shown in FIG. 7C, the Intel 8080A microprocessor 300 conventionally requires a clock generator 480, such as an Intel 8224, and a system controller 482, such as an Intel 8228. The clock generator 480 conventionally produces the timing signals required by the microprocessor 300 while the system controller 482 conventionally decodes data from the microprocessor 300 into single command lines such as IOR, IOW, etc, and gates data between the CPU 300 and the data bus. The microprocessor 300 functions in a conventional manner to execute the illustrative control program provided above in Table A. Suffice it to say that the clock generator 480 is driven by a 14.3181 megahertz crystal which after conversion of TTL level, is fed to the display generators to produce all the required display timing signals and is further also divided by 9 within the clock generator 480 to produce the phase 1 and phase 'signals to the microprocessor 300 thereby providing a microprocessor 300 with a 628 nanosecond cycle time, by way of example. As further shown and preferred in FIG. 7C, all of the peripheral devices conventionally communicate with the CPU 300 under interrupt control which is conventionally achieved by programmable interrupt controllers 484, 486, such as Intel 8259 interrupt controllers. The various interrupt lines illustrated in FIG. 7C are labelled STAEND which informs the CPU 300 that it may write to the display memories 310 through 318, inclusive, START which informs the CPU 300 that it must stop writing to these display memories 310–318, RXREADY 1 which informs the CPU 300 that a character is available from the modem 126B, TXEMPTY 1 which informs the CPU 300 that it may drop the request to send or RTS line TXREADY 1 which informs the CPU 300 that it may load a character into the USART 456 for transmission to the node 30 via the modem 126B, TXREADY 2 which informs the CPU 300 that it may load a character into the USART 458 for transmission to the printer 150A, and KBSTID which informs the CPU 300 that a key has been depressed on one of the active keyboards. As soon as the interrupt controller 484 or 486 receives an interrupt on any input line, it preferably asserts the interrupt IN line on the CPU 300 and the device that caused the interrupt then waits for acknowledgement from the CPU 300.

The aforementioned address decoder 356, as shown and preferred in FIG. 7C preferably comprises an address decoder 356A, such as a conventional 74LS154 decoder which defines which 1 K block of memory is to be accessed, by way of example, address decoder 356A being a 4–16 line decoder, and a second decoder 356B, such as a conventional 74LS42 decoder, which decodes the lower eight bits of the address lines to provide the various peripheral chip select signals illustrated in FIG. 7C. Decoder 356B is, by way of example, a 4–10 line decoder.

Figure 7E:
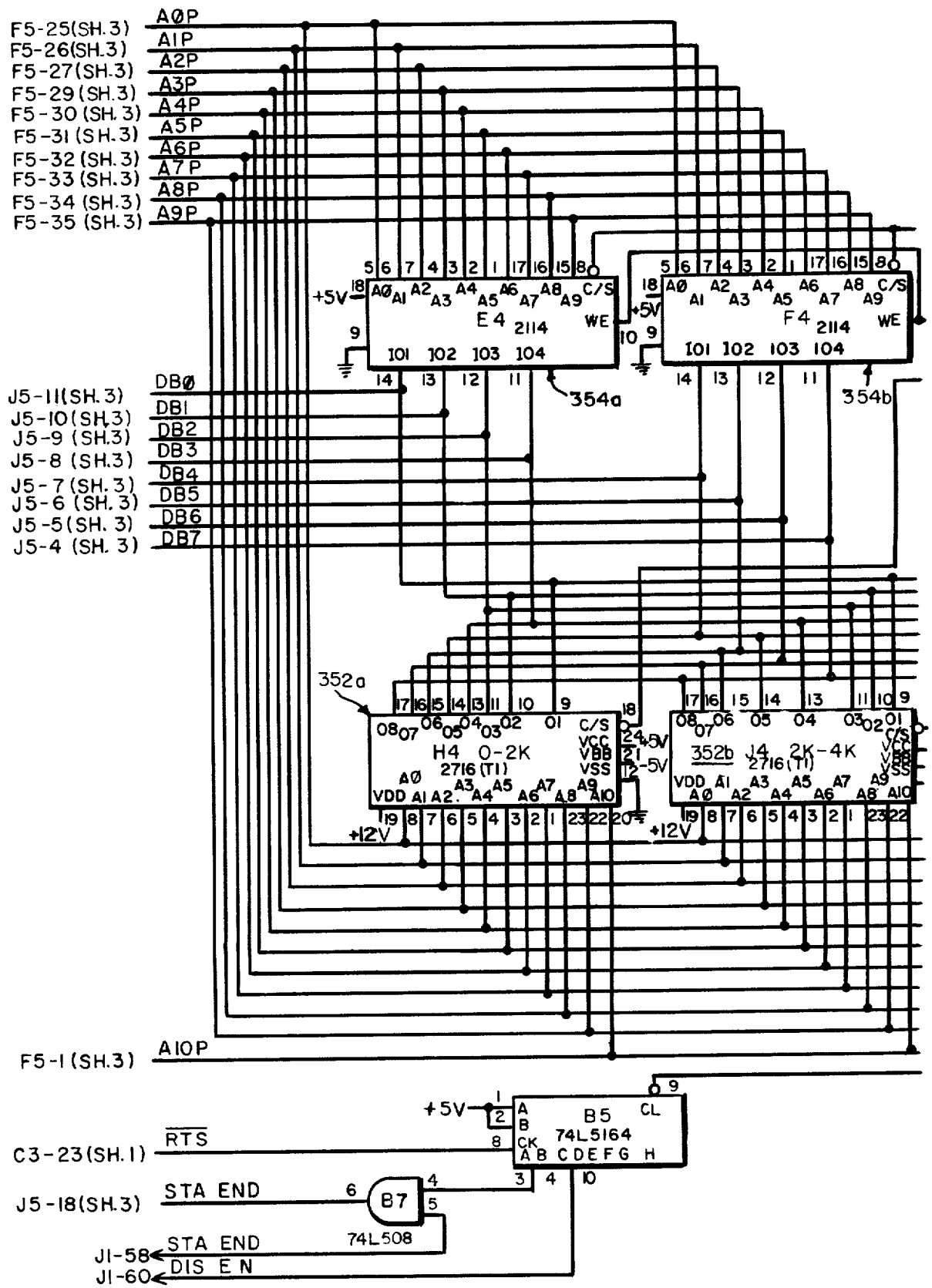
Figure 7E:
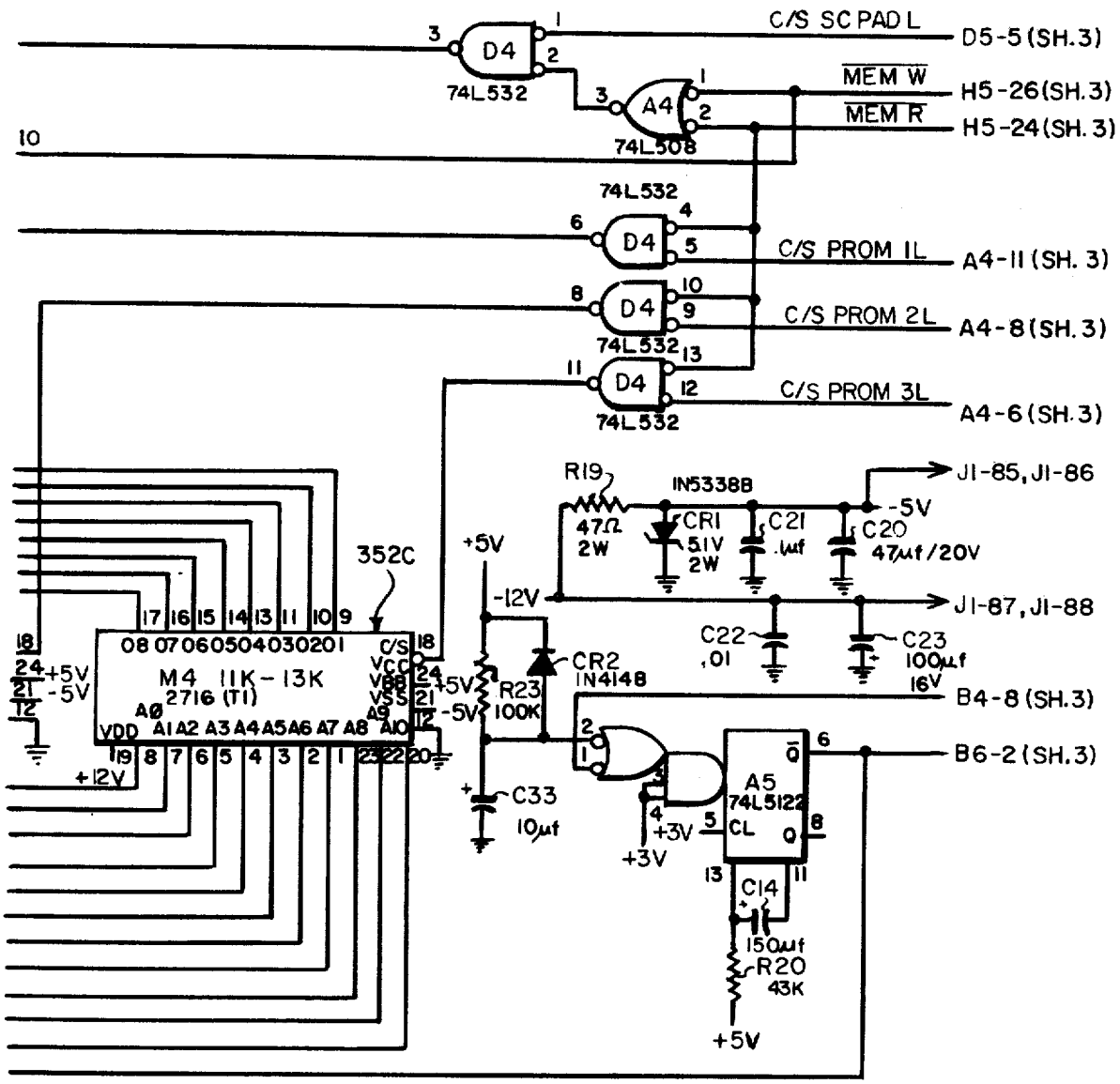
Figure 7F:
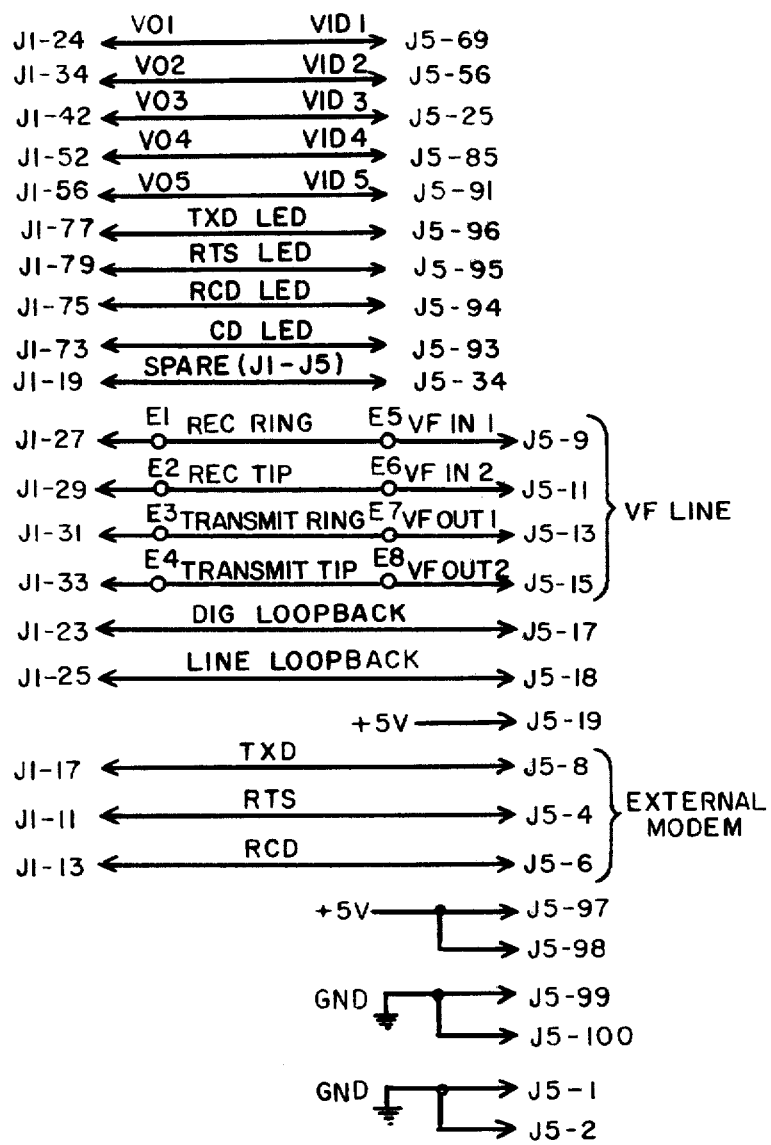
Figure 7G:
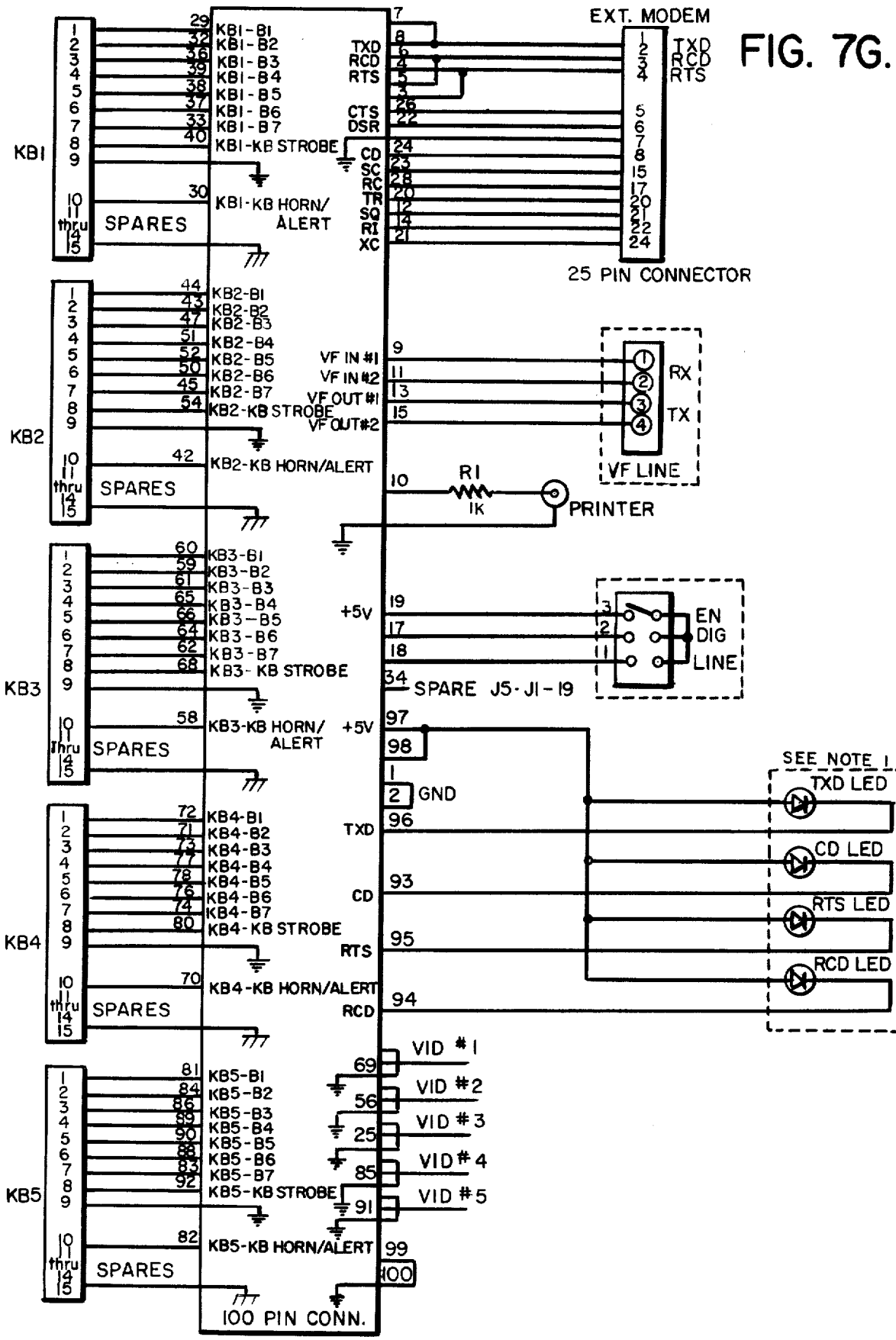
Figure 7H:
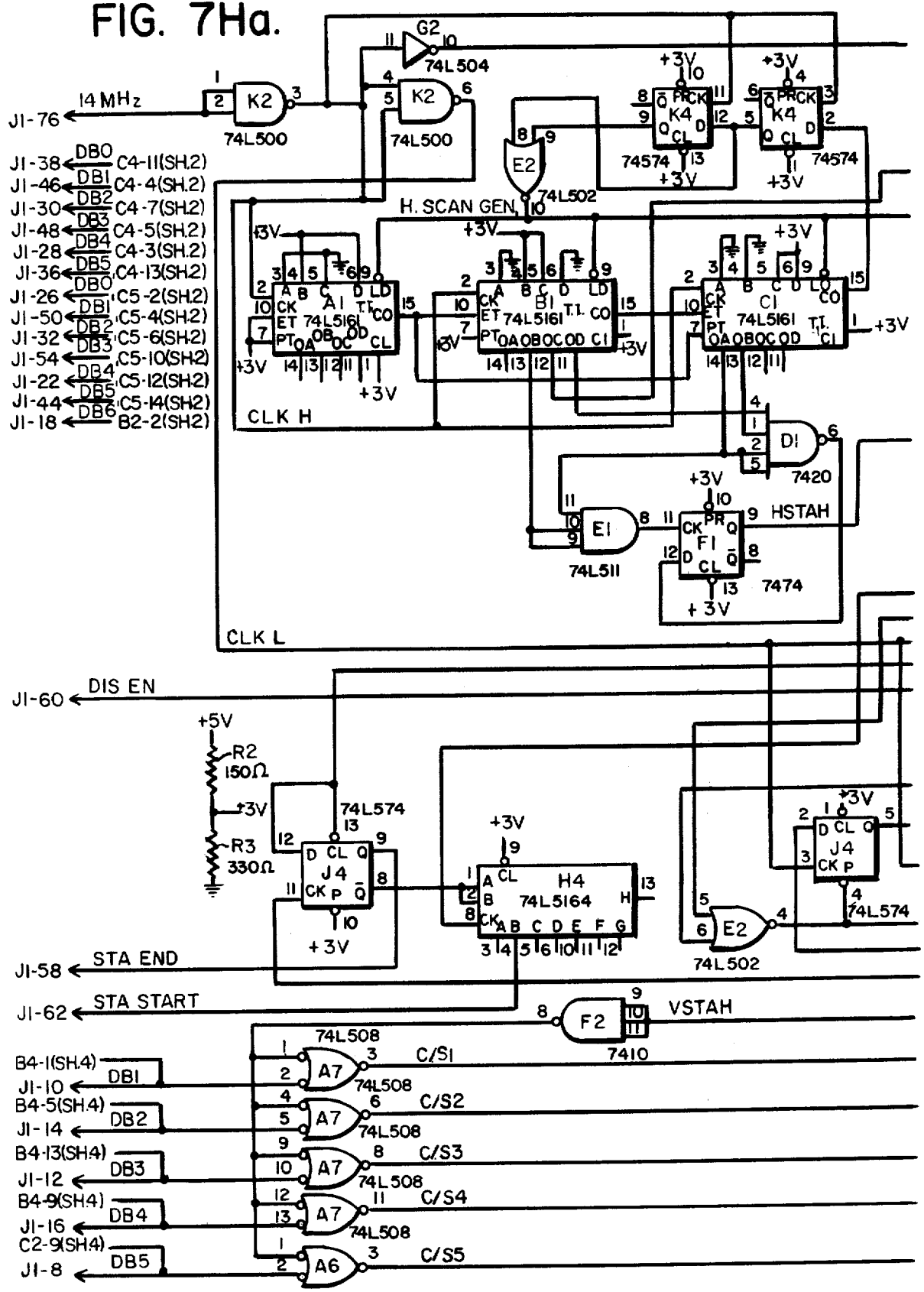
Figure 7I:
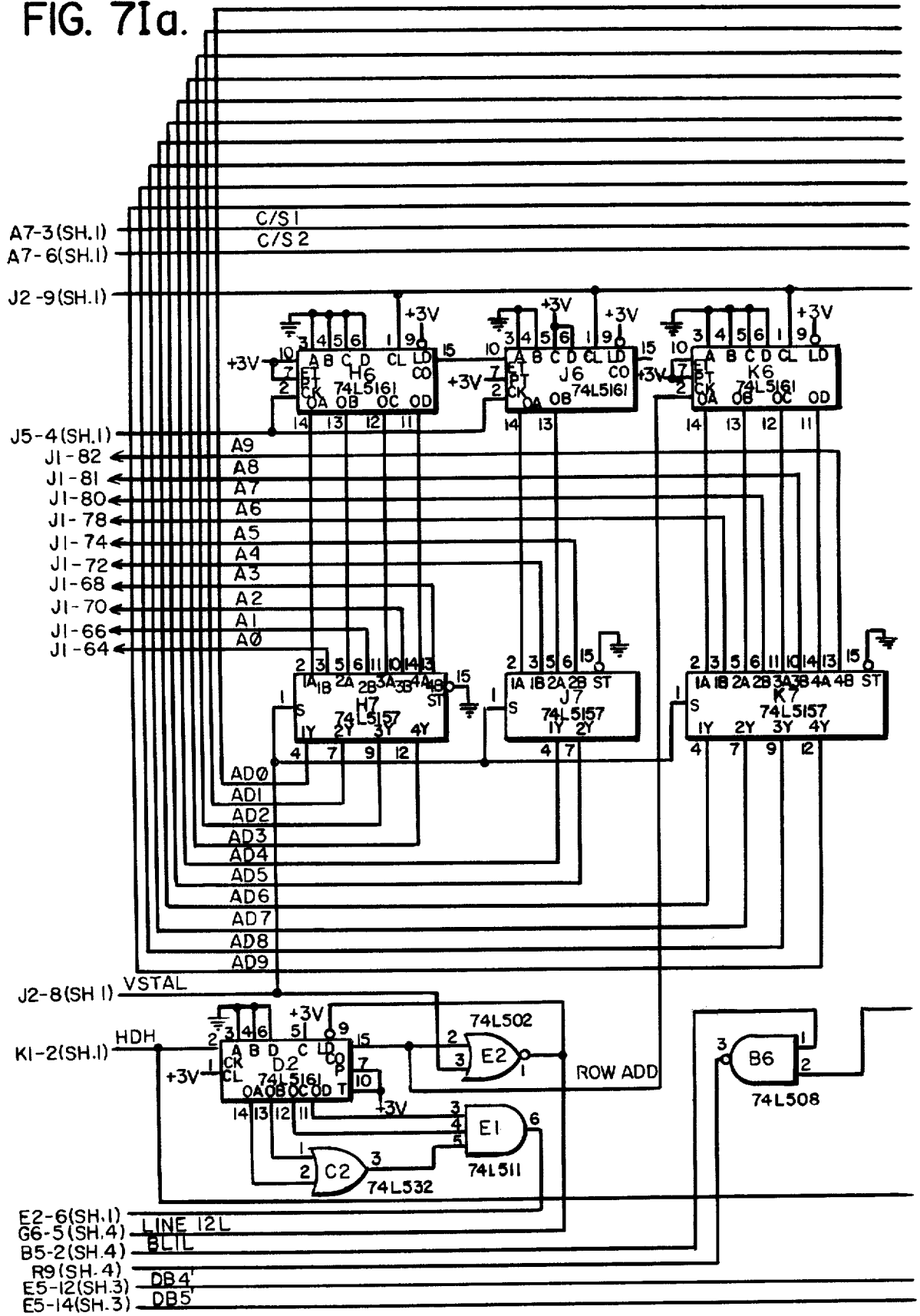
Figure 71B:
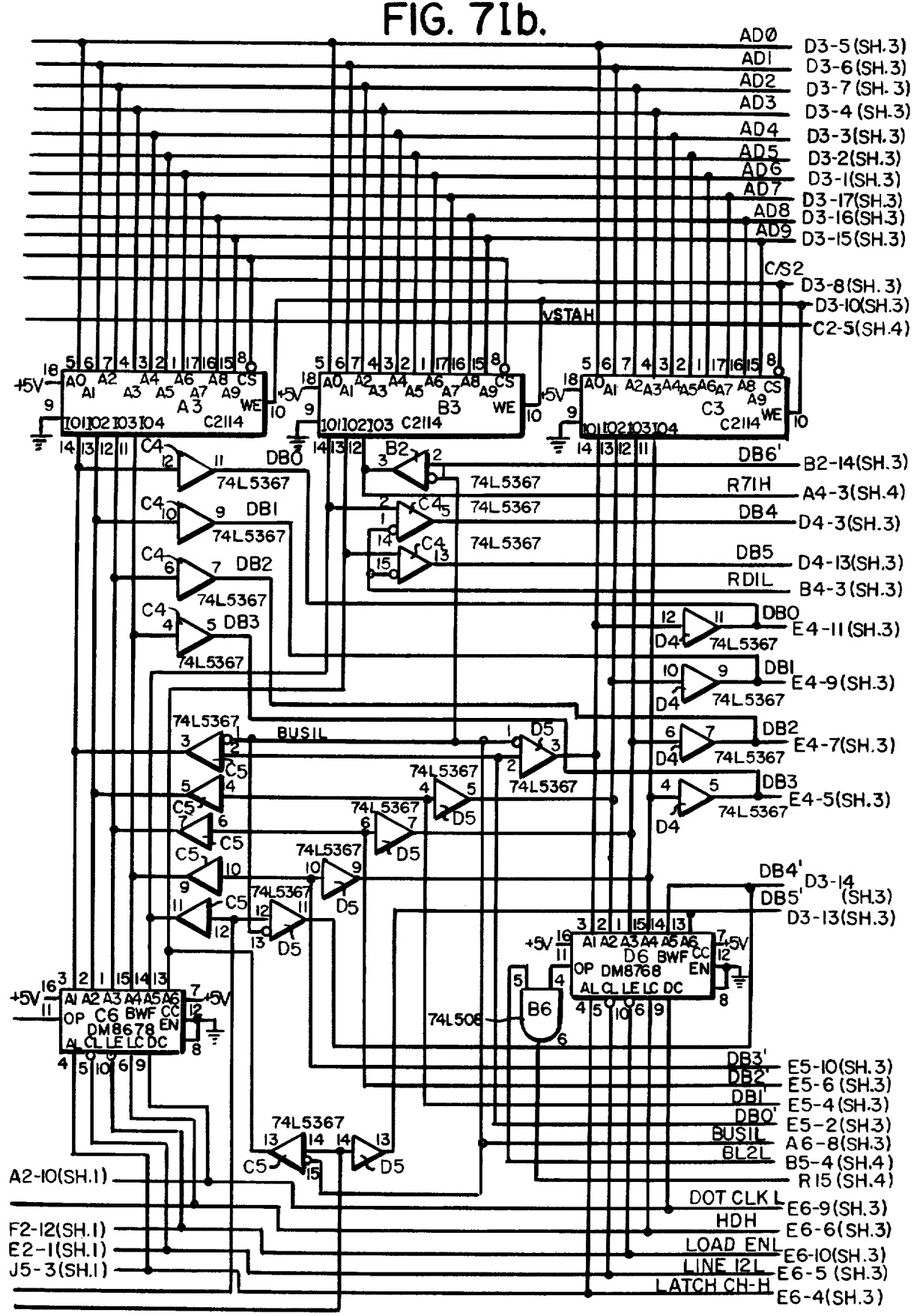
Figure 7J:
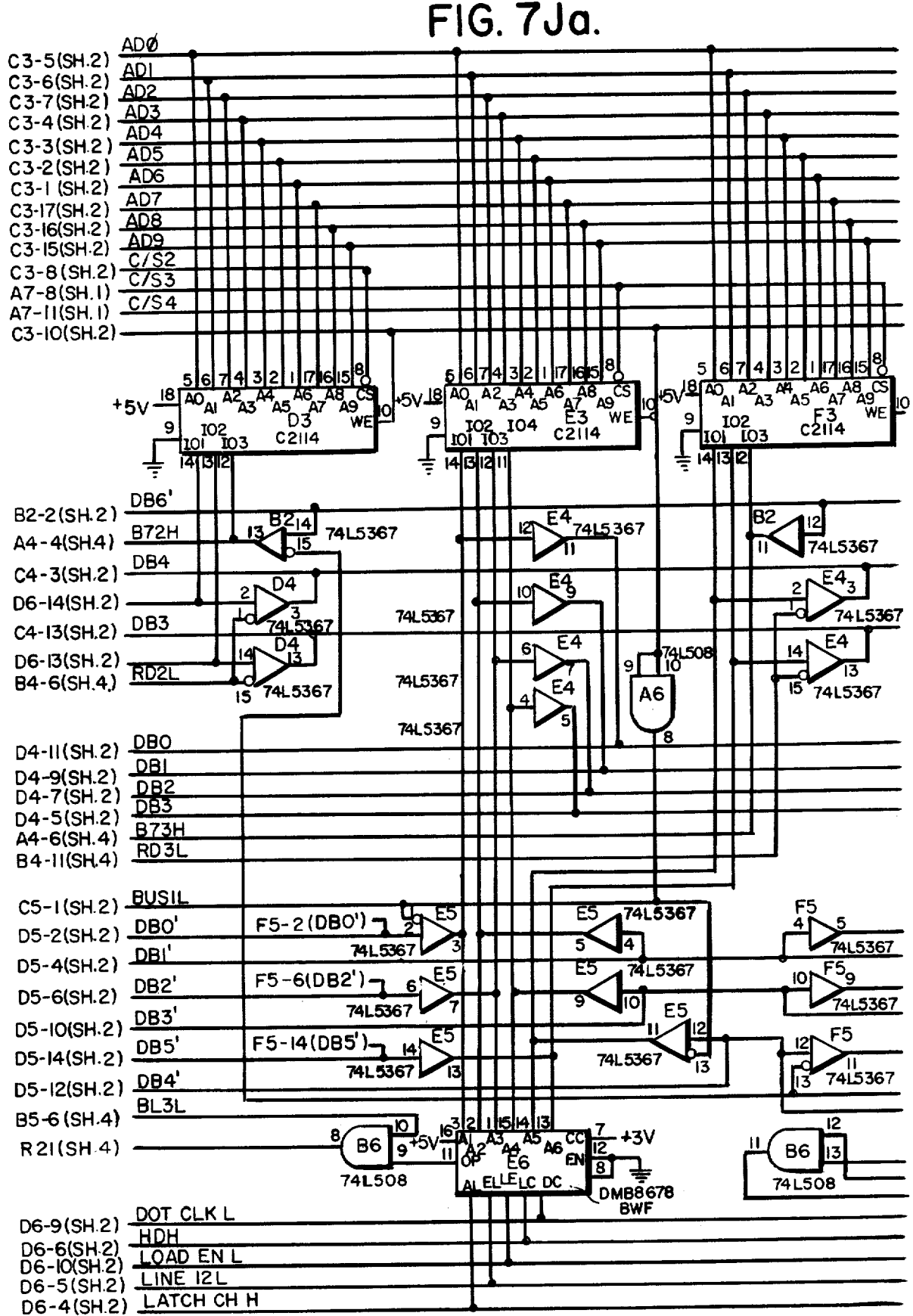
Figure 7J:
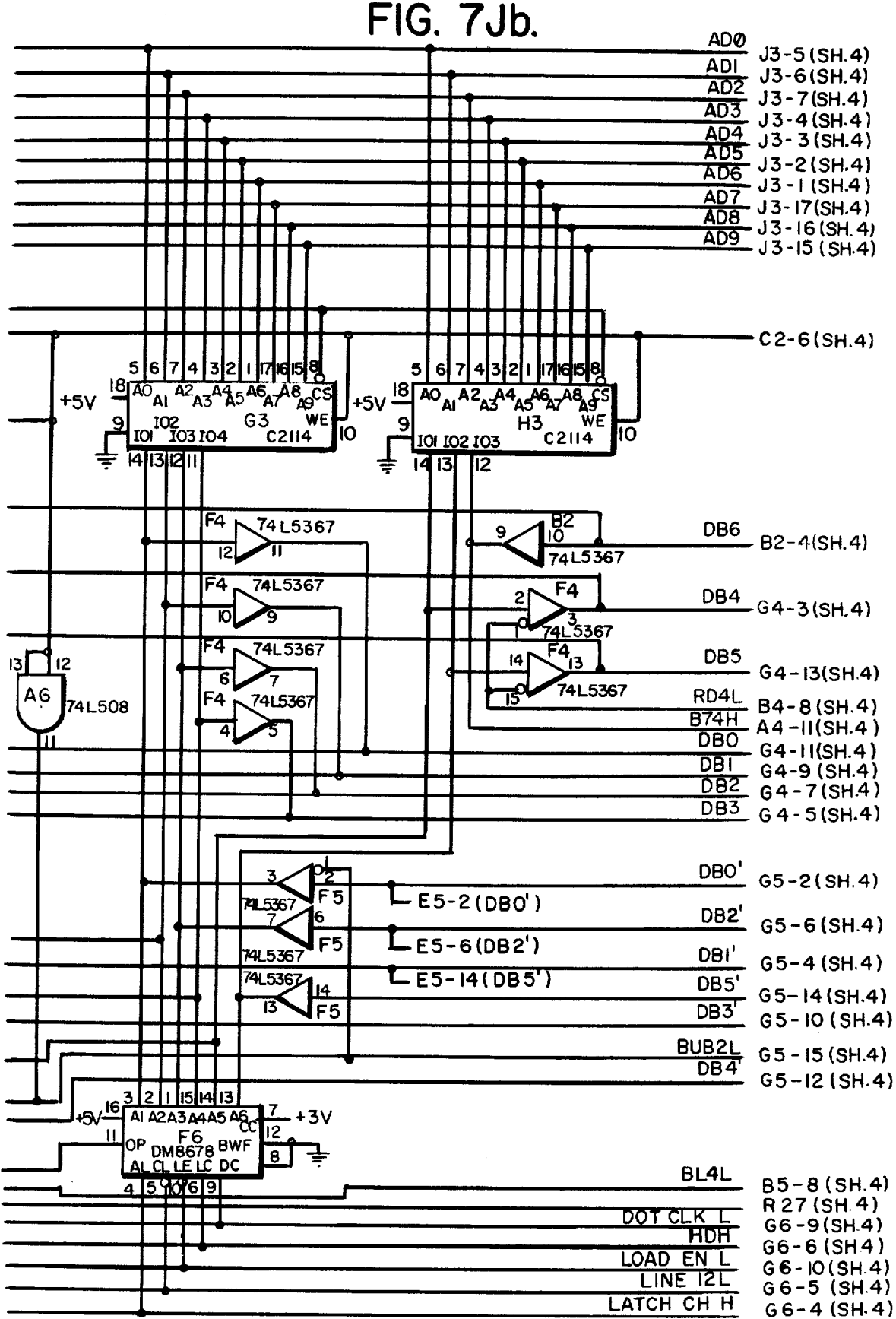
Figure 7K:
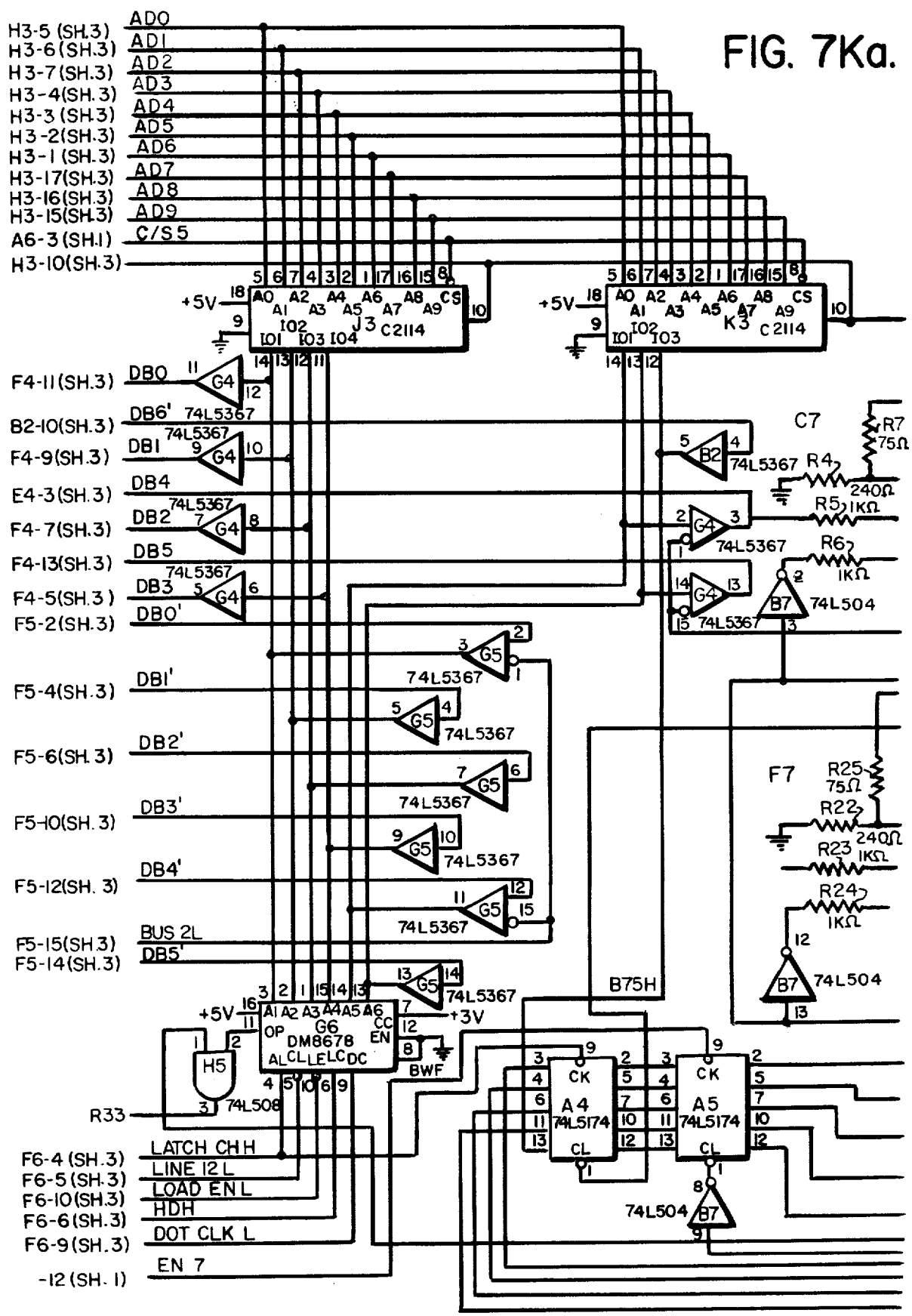
Figure 7K:
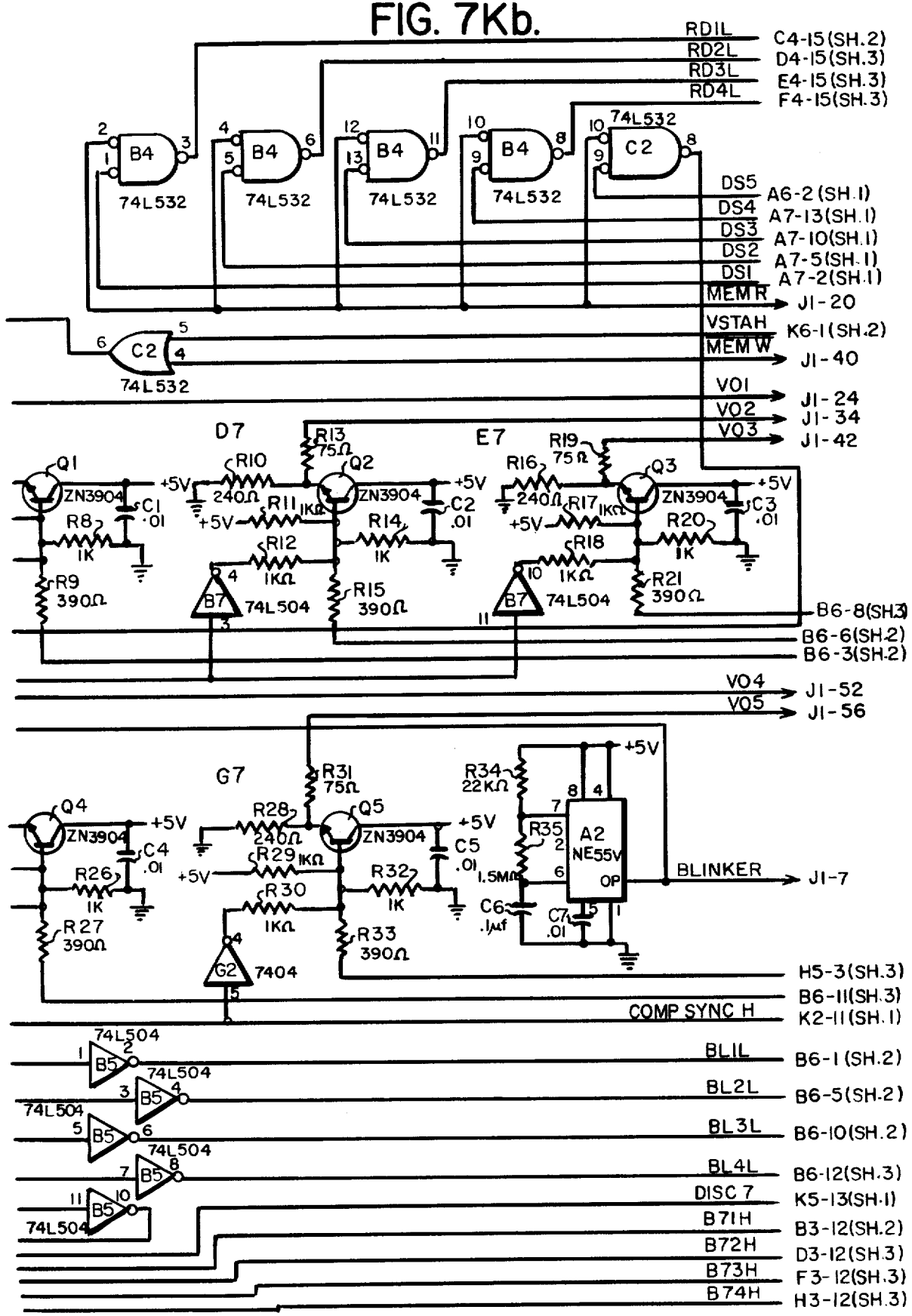

Referring to FIG. 7E, the program memory 352–354 as was previously mentioned consists of up to 6 K by 8 bits of UV erasable memory 352 and 1 K by 8 bits of scratch pad or random access volatile memory 354. The PROM memory 352A, 352B and 352C preferably comprises 3 conventional 2 K by 8 bit PROMs, such as conventional 2716 PROMs, and contain the control program for the microprocessor 300 such as the exemplary control program described above in Table A.

The random access memory or scratch pad memory 354 preferably comprises 2 RAMs such as conventional 2114 RAMs 354A, 354B each of which has a capacity of 1,024 by 8 bits. The balance of the circuitry of FIGS. 7A through 7F is believed to be essentially self-explanatory to one of ordinary skill in the art based on the foregoing description and will not be described in greater detail hereinafter.

Referring now to FIGS. 7A through 7K, the disclosure in the display generator portions 304 of the terminal controller 80A shall now be described in greater detail. Suffice it to say that the disclosure of the display generator portion 304 preferably contains all of the required circuitry to produce five independent CRT display signals, each consisting of 1,024 characters. However, as was previously mentioned, in the presently preferred mode of the terminal controller 80A when it is enabled to store alert pages in display memory 318, no fifth independent CRT display signal is provided. The display generators can preferably be separated into a TV sync portion, a safe title area decoder portion, a memory addressing and character generator timing portion, a display memory portion and the associated character generators and combiners. The purpose of the sync generator is to produce a non interlaced horizontal and vertical composite sync signal, to synchronize the horizontal and vertical time bases contained in the associated television monitor displays 82B; the purpose of the safe title area decoder is to define an area where the data will be displayed on the TV monitor screen 82B, the memory addressing and character generator timing determine whether the display memories 310-318 are addressed by either the CPU address bus or the display generator address bus, with the display generator address bus having priority over the CPU address bus. The display memories 310–318 each preferably consist of pairs of static random access memories, such as Intel 2114 Static Random Access Memories each having 1,024 by 4 bit capacity, and the character generators 366 through 374, where applicable, conventionally function to provide the video display of the data from the associated display memory 310-318. The operation of the display generator portion 304 of the terminal controller 80A would be readily apparent to one of ordinary skill in the art with reference to FIGS. 7H through 7K and the foregoing description including the exemplary control program. Suffice it to say that logic elements A1, B1, C1 and K4 form a synchronous divider which divides the CPU clock by 919 producing a load signal for itself every 64.18 microseconds with F1-1 also being included at this time and after the duration of 86 clocks, F1-3 is clocked producing a signal with a repetition rate of 64.18 microseconds and a pulse with of 6.1 microseconds which is the horizontal sync signal. This signal is used to produce the vertical sync signal utilising elements G1, H1, J1, J2 and K1 which form the vertical sync generator. The vertical and horizontal syncs are gated at K2-13 and 12 to produce a composite sync signal at K2-11. Similarly, the safe title area is conventionally obtained by decoding the required clock and line counts from the sync generator and although the display generator does not contain a unique character or row counter, the horizontal and vertical safe title areas are used to determine the character and row counts producing, by way of example, a horizontal safe title area of 44.69 microseconds in every duration of 640 clocks. The vertical safe title area is also conventionally obtained in a similar manner and is used to terminate the vertical display area as well as to inform the CPU 300 when it may write or read the display memories 310-318, with the CPU 300 not being enabled to access the display memories 310-318 during the display period. This is achieved by interrupting the CPU 300 at the beginning and end of the vertical safe title area. When the vertical safe title area is active, selectors H7, J7, and K7 are switched to route the output of the display address counter H6, J6 and K6, represented collectively by reference numeral 364, to the display address counter bus AD0-AD9 with the display address counter also being released at this time. The horizontal and vertical safe title areas are gated together at K2-9 and 10 to produce VHSTAL which is used to control the character generator display sequence. When VHSTAL is active, J4-5, J5 and K5 are released with J5-3 going high on the next dot clock and producing the latch signal to the address latches in the character genererataors 366 through 374 which are also labelled as C6, D6, E6, F6, and G6. Therefore, the data loaded into the five character generators 366 through 374 will be the contents of location 0 from all five display memories 310 through 318; that is, the first character to be displayed. Of course, the above explanation is based on the assumption that five keyboards and the resultant keyboard displays are controlled by the terminal controller 80A. However, as previously described, in the preferred mode for controller 80A, only four keyboards are controlled with display memories 310 through 316 being associated respectively with these keyboards, and with display memory 318 being solely dedicated to storage of the alert page for the terminal controller 80A. As was stated above, it is believed that no further explanation of the schematic diagrams of FIGS. 7A through 7K is needed other than heretofore provided. Suffice it to say before going on with the description of the system operation, that the various line transmissions between the nodes or PDP11 host computers and the terminal controllers 80 take place at 1200 baud in an asynchronous start/stop mode with the characters being 8 bit ASCII, that is 7 data bits plus a parity bit, with there being one start bit and one stop bit and with the subscriber lines all being full duplex. The data messages in both directions between the terminal controller 80 and the node computer 30A for example, are preferably checked using horizontal character parity and a longitudinal check character following each data message. In addition, the system network 20 preferably employs polling at each node 22 through 38 with a system parameter defining how many terminal controllers 80 may be polled by an associated node for each line with, for example, the minimum number being 1 and the maximum number being 8. Thus, the host computer preferably polls all defined controllers 80 on the line associated therewith in turn to check if they have any subscriber queries or messages. The node host computer is also able to send messages or updates to the terminal controllers 80 even when no query has been received with these messages being transmitted with a controller addressing sequence as a header which is recognised by the addressed controller 80 and the attached message is accepted. The terminal controller 80, in turn, poles the various keystations associated with it to determine if any of the keystations has a query which may subsequently be transmitted to the host computer at the node, such as node 30, when poled by the host computer.

The operation of the system following the present invention in providing an alert communication message shall now be described below with reference to FIGS. 8A through 8E in which it shall be described how a subscriber contributor may create both variable content lists of designated recipients as well as variable content alert messages for these recipients who may be located at different nodes 22 through 38.

"System Operation"

As was previously mentioned, the presently preferred alert communication system 20 of the present invention can be employed for providing any type of alert communication message throughout the world-wide network 20 with the alert communication message being originated by a particular subscriber at the subscriber keystation 82, for example, wherein the originating subscriber 82 may selectively designate other subscriber keystations through their associated terminal controllers in the network 20 to receive the alert communication message transmission. In the example of FIG. 1, three typical terminal controllers 80A, 80B and 80C, are illustrated. For purposes of explanation of the operations of the system 20, it shall be assumed that the subscriber keystation 82 associated with terminal controller 80A designates only selected controllers at the various node locations 22 through 38 to receive a given alert communication message. Furthermore, as was also previously described, although the alert communication message may be used for various purposes, such as commodities information, money rate information, securities information and information relative to the shipping market, as well as other purposes which will readily occur to one of ordinary skill in the art, it shall be assumed that the alert communication message relates to shipping information such as space availability on a ship or tanker which the originating subscriber 82 may wish to either purchase or sell as available space to other selected subscribers within the network 20. Thus, for example, shipbrokers can ensure that their clients are kept up to date with information whereas charterers, owners and broker subscribers can all have convenient access to essential market data such as enquiries and fixtures. In addition, the subscriber, such as subscriber 82, via his associated keyboard 82A may insert desired market report information. As will be described in greater detail hereinafter, when the contributing originating subscriber 82 has created the alert message, the subscriber then transmits this alert communication message to the various subscribers contained on the subscriber's control page which has been stored locally at each of the nodes 22 through 38 in the network 20. Referring now to FIGS. 8A through 8C, a typical control page for providing shipping market alert communication messages shall now be described. Each subscriber who is a contributor or originator of data is allocated one or more control pages in the various associated memories of the host computers located at the nodes 22 through 38, respectively. As illustrated in FIG. 8A, each control page, by way of example, is allocated 10 horizontally displayed lists, labelled A through J respectively, each of which may contain up to 10 designated subscriber recipient network addresses. With respect to these addresses, each network address is preferably made up of a letter prefix which designates the node 22 through 38 at which the recipient is located and a four position unique address within that node. Thus, for example in FIG. 8A, shipping list A contains only one subscriber recipient designated Z0312 indicating that that recipient is connected to node 26 and has identification number 0312. Similarly, with respect to shipping list F by way of example, there are subscriber recipients designated which are associated with node 36, namely those designated T1020 and T1200, associated with node 38, namely that designated H0056, and associated with node 22 namely those designated G1222, G0025 and G0965. The content of each of the respective 10 lists A through J in a control page is readily variable by the contributor or originator and only by that contributor or originator. Moreover, a given list may designate subscribers at any of the nodes 22 through 38 within the network 20 and, thus, may contain any desired mix of recipients without being confined to a particular node. As will be noted in FIG. 8A, lists can be left blank and contain no designated addresses, or, if desired, a given designated recipient can subsequently be blanked out by the subscriber contributor without affecting the balance of the contents of the list, such as illustrated in list E of FIG. 8A where the middle recipient of the three designated recipients is illustrated as subsequently being deleted which would result in a blank space ultimately existing between the other two designated recipients in list E. These various designees are altered in the manner described below with respect to the insert feature of the system 20. Referring now to FIG. 8B, the mechanism for generating an alert communication message is as follows. First, the contributing subscriber, for example subscriber 82, must set up the addresses of the desired recipients for each of the up to 10 lists A through J. Of course, these lists could have been pre-designated at a prior time and, if desired by the contributing subscriber, need not be changed until such time as it is desired to change one or more of the potential recipients for a particular alert communication message. Assuming the contributing subscriber wishes to create a list or to change a previously created list, the subscriber must first display the control page on the display screen 82B of the keystation 82. As will be described in greater detail hereinafter, the control page is divided into rows and columns and the subscriber indicates on his keyboard, by row and column, that information which is to be inserted or changed with the overriding requirement being that the address, as previously mentioned, must contain an identifier for the node as well as a four digit identification code for the particular recipient controller 80 at that designated node. After this has been accomplished, or assuming the originating subscriber is satisfied with the previously created control page, in order to generate an alert communication message an originating subscriber 82 must have the control page on display on the display screen 82B. The subscriber 82 then depresses an insert key on keyboard 82A followed by an alert message prefix which in the example of FIG. 8B is *, followed by a list identifier identifying one or more of the 10 potential lists displayed on the control page as recipients for this particular alert communication message, followed by a delimiter, such as a "/" which delimits the control information from the text information, and thereafter followed by a predesignated length character text string which comprises the alert communication message. Preferably, the alert text string may not, by way of example, exceed 59 characters out of a maximum of 64 potential characters in the row. Thus, if the alert list specifier exceeds more than one character, then the amount of potential characters available for the alert text string will decrease proportionately. With respect to the alert list specifier, the list identifiers may be specified singularly as illustrated in FIG. 8B or in ranges such as A-D meaning A, B, C, D or both such as AC-EG meaning list A, C, D, E and G. For example, this alert communication message is inserted on row 15 of the displayed control page. To transmit the alert to the designated subscriber recipients, the originating subscriber 82 must then depress the transmit button located on the keyboard 82A. The keyed in alert text string containing the alert communication message is then transmitted from the subscriber 82, through the terminal controller 80A, through the modems 126B and 126A and the telephone line 122, to the concentrator 54, therefrom to the associated node 30. Node 30 then verifies the correctness of the alert communication message and, assuming the message is verified, node 30 performs several functions. One of these functions is that an echo message is transmitted back to the concentrator 54 and therefrom through the terminal controller 80A to the originating keystation 82 where the alert communication message is displayed, for example, on row 13 of the control page such as illustrated in FIG. 8B. In addition, the node 30 determines whether there are any terminal controllers associated with node 30 which have been designated in the alert list specifier associated with the alert communication message and transmits this message to those terminal controllers so designated. Furthermore, node 30 transmits the alert communication message to all of the other nodes 22 through 38 in the system network 20. Each of these nodes 22 through 38, then independently determines if there are any terminal controllers associated with that particular node which have been designated in the address list in the respective stored control pages which correspond to the alert list specified in the alert communication message being transmitted by subscriber 82. If so, then the respective node transmits the alert communication message to the designated controllers, for example if terminal controller 80B and 80C were designated in the alert list specified for the particular alert communication message, then node 22 would transmit the message to terminal controller 80B and node 34 would transmit the message to terminal controller 80C. As further illustrated in FIG. 8C, the control page may also include a subscriber predesignated message which may subsequently be included as a portion of a subsequently generated alert communication message. In order to create this pre-defined text, the subscriber contributor must first retrieve and display the control page and thereafter depress the insert key on keyboard 82A and then the designator for such a pre-defined text such as for example the letter S followed by a delimiter such as the aforementioned "/", thereafter followed by up to 19 characters of pre-defined free format of text. It should be noted that this pre-defined text during its creation does not contain an alert list specifier since at this point the message is merely to be stored for subsequent transmission and is not being immediately transmitted to subscriber recipients. In order to store this pre defined text, the subscriber contributor depresses the transmit key on the keyboard 82A which causes the pre-defined text message to be transmitted through the terminal controller 80A to the node 30 which verifies the message and echos it back to the originating subscriber 82 through the concentrator 54 and the terminal controller 80A resulting in a display at row 14 of the control page being displayed on display 82B. Node 30 also transmits this message to each of the other nodes 22 through 38 in the system which store this message on the respective control page in their associated local storage. If the subscriber now wishes to incorporate this pre-defined text in an alert communication message, the subscriber creates the alert communication message in the same manner as previously described with reference to FIG. 8B with the exception that after the first delimiter following the alert list specifier, the subscriber inserts the code indicating pre-defined text which is the letter S followed by a subsequent delimiter followed by additional alert text. The second delimiter is identical to the first delimiter which is a "/". It should be noted that the length of permissible alert text string is still a maximum of up to 59 characters including the expanded length of the pre-defined text. Thus, for example, if the pre-defined text contains 19 characters, then only a maximum of an additional 40 characters may be included in the additional alert text being created, assuming that there is only one alert list specified with a proportionate reduction in the number of available characters occurring, as previously mentioned, as the amount of specified alert list increases. When this alert communication message has been created, the full expanded message is transmitted throughout the network and is echoed back to the originating subscriber 82 for display on row 13 of the control page as was true with respect to the previous description of an alert communication message. It should be noted that even though a pre-defined text has been created, the originating subscriber need not use it in an alert the "SEE ALERTS PAGE" visual display remains until cancelled by the subscriber by depression of the reset key on keyboard 82A. It should be noted that the alert communication message may contain information referring to a more complete page containing the data to which the originator would like the recipient to refer. Such a typical page of text data is illustrated in FIG. 8E. As previously mentioned, a printer 150 for example is associated with each terminal controller 80A for example, which may normally be utilized by any keystation 160, 82, for example, in order to print ordinary pages as exemplified by FIG. 8E by depression of the print button located on the respective keyboards 82A; however, if it is desired to print alert communication messages such as would normally be contained in the alerts page, this can preferably only be accomplished by a master control keystation associated with each terminal controller 80, such as for example by keystation 82.

It should be noted that as previously mentioned the printer 150A, for example, may be set to automatically print out alert communication messages as they arrive or may be set in the manual mode to print information pages on command. To enable the automatic print out of incoming alert communication messages, the associated keyboard 82A on the main keystation designated keyboard number 1, is employed. Thus, to enable the printer 150A to automatically print out incoming alert communication messages directed to terminal controller 80A, the reset button, the print button and the enable button are depressed on the keyboard 82A of the master keystation. Similarly, to disable these automatic print outs and return to the manual mode, the reset button, print button and disable button on the same keyboard 82A are depressed. Preferably, when the automatic print function for incoming alert communication messages is enabled, this information will be displayed on the alerts page such as by the use of the characters PE representing print enabled on line 1 of page LSTA. As was previously mentioned, selection of this automatic print-out function disables any regular hard copy printing of information messages until the printer 150A has been returned to the manual mode. To print any display of information messages in the manual mode, any of the keystations may accomplish this by passing the PRINT key on the associated keyboard and the display will be printed exactly as it appears on the screen at the time the PRINT key is depressed. Nevertheless, the page on display will continue to update and other pages could be selected without affecting printed data.

In addition, as shown and preferred in FIG. 8D, the reception of an alert communication message by the associated terminal controllers 80 to which the message is designated, preferably causes simultaneously the message "SEE ALERTS PAGE" to be flashed on each screen associated with the terminal controllers 80 receiving the message and causes the time of receipt by the nodes 22 through 38 to be displayed adjacent to the received alert text in the alerts page. By way of example, in the system disclosed herein, a subscriber contributor may direct an alert communication message to between 2 and 25 subscribers at a time.

Referring once again to FIG. 8E, as was previously mentioned, a displayable page is divided into insert rows and insert columns with the subscriber contributor inserting information to a page, whether it be a control page or a page of data, by insert row and insert column designation. Thus, for example, in FIG. 8E the insert rows are labelled respectively 1, 2, and the letters A through J, with the insert columns being labelled K through P. Preferably, with respect to the ordinary page of text data illustrated in FIG. 8E, the page is limited to a 64 character line length with rows 1 and 2 being fixed format heading rows and with rows A through J being rows in which subscriber originated data can be inserted. Information is preferably inserted to the page by nominating the page area to be updated or to which the information is to be inserted by using the two designated co-ordinates for the appropriate line and column. For example, in the illustration of FIG. 8E, the co-ordinate AK would nominate the position for "BROOKLYN". In order to insert information on a given page, the page on which the information is located is retrieved by the subscriber by designating the appropriate page code on the associated keyboard 82A and this page is then displayed on the screen 82B. The subscriber then depresses the INSERT button on keyboard 82A and a flashing cursor preferably appears in the lower right-hand corner, for example, of the screen 82B. The subscriber then keys in the two co-ordinates which designate the row and column of the information to be inserted, followed by the new or updated information to be inserted in this location and thereafter depresses the TRANSMIT button or key on the keyboard 82A. This subsequently results in the new update information appearing in this designated position or location. In order to insert more than one piece of information for a given row, this may be accomplished by separating each item with a semi-colon. The cursor can be employed to correct incorrect information in conventional fashion. Free format pages, that is pages which are not divided into several columns, are preferably defined with a single column and have a maximum line length of 64 characters, for example, over 10 insertable rows with semi-colons not being necessary to separate items of information. To delete all the information on a page, the page is retrieved as stated above, the INSERT key on the keyboard 82A is depressed, the word DELETE is keyed in and the TRANSMIT key or button on the keyboard 82A is depressed. This causes the display page to clear. On the other hand, to delete a single row on a page, the page is retrieved as stated above, the INSERT button or key on the keyboard 82A is depressed, the appropriate row or column co-ordinates are then keyed in via the keyboard 82A, the SPACE button or key on the keyboard 82A is depressed and then the TRANSMIT button or key is depressed, thus clearing the communication message. However, it may normally be utilized for repetitive type of information, such as the subscriber identifier, so as to minimize the creation time for the message.

Referring now to FIG. 8D, a typical alerts page or alerts list is illustrated. This alerts list, designated LSTA in the example of FIG. 8D, is normally stored at the respective terminal controller 80A, 80B or 80C, by way of example, in response to receipt of alert communication messages designated for that particular terminal controller 80. The last received message is preferably stored in row 3 of the displayable alerts list page with the previously received alerts communication messages being respectively scrolled down one row so that the first or earliest message would appear at the bottom most row of the list which can preferably contain up to 10 displayable alert communication messages. It should be noted that if more than 10 alert communication messages are received prior to display of one of these messages by the recipient, then the earliest received message is lost. In order to avoid this, if desired, the printer 150A, for example, may be enabled so that all incoming alert communication messages will be printed, thereby avoiding the possibility of any of these messages being lost. A recipient subscriber is advised that there is an alert communication message due to the display of a flashing message such as "SEE ALERTS PAGE" on row 14 of the display 82B. When the subscriber sees this message, he may input the alerts page designation, such as LSTA, via the keyboard 82A and thereafter depress the transmit button on keyboard 82A which will then cause display of the alerts page on the screen 82B. Preferably, at the same time that the "SEE ALBERTS PAGE" message comes up on the display 82B, a buzzer on the keyboard 82A will sound, providing an audible alarm signal to the subscriber for a pre-defined period, such as five seconds. The buzzer is self-cancelling after the five second interval; however, line or row. Thus, summarising the above alert communication system of the present invention, such as with respect to its utilization for providing international shipping market alerts, it enables essential market data such as enquiries, fixtures and market reports to be channelled rapidly and accurately to the required destination allowing subscriber contributors to insert items of information into their keystation and make this information, under their own name, available to the shipping market world-wide with the market data or alert communication messages being directed to subscriber recipients at the discretion and under the control of the subscriber contributor. In addition, recipients have access to information from named contributors displayed on the screen 82B at their keystation with general background information such as fixtures and market reports being available on contributed or subscriber originated pages which may be retrieved at any time. Thus, brief but urgent information can be sent to wide audiences in the form of alert communication messages while users may be informed in greater detail through the use of subscriber originated ordinary pages of data thereby enabling a subscriber contributor to rapidly inform the subscriber contributor's own designated variable list of recipients of essential market data rapidly and accurately.

TABLE A

```
LOC    OBJ       LINE        SOURCE STATEMENT

119         ASEG
0000             120         ORG    0
                 121
                 122 ; *********************************************************
                 123 ; POWER-ON AND SYSTEM INITIALIZATION CODE.
                 124 ;
                 125 ; THE PROGRAM STARTS HERE ON A POWER ON RESET
                 126 ; *********************************************************
0000  F3         127         DI              ; MAKE SURE INTERRUPTS OFF FOR A WARM START (DEBUG)
0001  310014     128         LXI    SP,RAMTOP ; SET STACK TO TOP OF RAM
0004  C32800     129         JMP    PWRUP    ; GO TO POWER-UP CODE
                 130
                 131 ; *********************************************************
                 132 ; RST VECTORS FOR CALLS TO OFTEN USED SUBROUTINES.
                 133 ; *********************************************************
0008             134         ORG    8        ; RST 1
0008  C30202     135         JMP    CMST1    ; IS A CALL TO ADD AN ENTRY TO THE DISPLAY QUEUE
                 136 ;-------------------
0010             137         ORG    10H      ; RST 2
0010  C3AE03     138         JMP    MOVE     ; IS A CALL TO STRING MOVE SUBROUTINE
                 139 ;-------------------
0018             140         ORG    18H      ; RST 3 IS A CALL TO......
                 141 ; *********************************************************
                 142 ; COMPARE (DE) TO (HL)
                 143 ;
                 144 ; IF (DE)=(HL) ZERO FLAG SET
                 145 ; IF (DE)>(HL) CARRY SET
                 146 ; IF(DE)<=(HL) CARRY RESET
                 147 ;
                 148 ; A REGISTER ALTERED
                 149 ; *********************************************************
0018  7C         150 CDEHL   MOV    A,H
```

```
LOC   OBJ        LINE      SOURCE STATEMENT

0019  BA         151       CMP     D       ;H=D?
001A  C0         152       RNZ             ;IF NOT, RETURN FLAGS SET
001B  7D         153       MOV     A,L     ;COMPARE L.S. BITS
001C  BB         154       CMP     E       ;FLAGS SET
001D  C9         155       RET             ;BYE
                 156  ;-------------------
0020             157       ORG     20H     ; RST 4
0020  C3AA03     158       JMP     UPTRM   ; IS A CALL TO UNPACK TERMINAL DATA SUBROUTINE
                 159  ;-------------------
0028             160       ORG     28H     ; RST 5
0028  C3B703     161       JMP     PKTRM   ; IS A CALL TO PACK TERMINAL DATA SUBROUTINE
                 162
                 163  ;*********************************************************
002B  210010     164  PWRUP: LXI    H,CBBEG ;START OF RAM
002E  E5         165       PUSH    H
002F  010803     166       LXI     B,(EOC-CBBEG) ;COUNT TO CLEAR
0032  AF         167  PW1: XRA    A
0033  77         168       MOV     M,A     ;CLEAR RAM
0034  23         169       INX     H
0035  0B         170       DCX     B
0036  78         171       MOV     A,B
0037  B1         172       ORA     C
0038  C23200     173       JNZ     PW1
003B  E1         174       POP     H
003C  22E011     175       SHLD    BWPTR   ;INIT DISPLAY CONTROL BLOCK
003F  22E211     176       SHLD    BRPTR
0042  219512     177       LXI     H,PRNTQ ;INIT PRINT QUEUE
0045  229A12     178       SHLD    PBPTR   ;POINTER
0048  2142F      179       LXI     H,LT4B0
004B  228B12     180       SHLD    PLTAB   ;IDLE INPUT TABLE
004E  214A0D     181       LXI     H,OTAB5
0051  228D12     182       SHLD    OPTAB   ;IDLE OUTPUT
                 183  ;SET ALL TERMINALS IN RESET MODE
0054  21AF2F     184       LXI     H,KTAB3
0057  22FB12     185       SHLD    CKTAB
005A  210100     186       LXI     H,1
005D  22ED12     187       SHLD    CIMAX   ;CURSOR SET TO TOP
0060  22EF12     188       SHLD    CKCRS
0063  22F112     189       SHLD    CCMIN
0066  210400     190       LXI     H,4
0069  22F312     191       SHLD    CCMAX
006C  21F712     192       LXI     H,CKNAM
006F  22F512     193       SHLD    CKPTR
0072  212020     194       LXI     H,'  '
0075  22F712     195       SHLD    CKNAM
0078  22F912     196       SHLD    CKNAM+2
007B  C30A01     197       JMP     PW4     ;GO FOR MORE ROOM
                 198  $EJECT
                 199  ;*********************************************************
                 200  ; INTERRUPT VECTOR LOCATIONS
                 201  ;*********************************************************
0080             202       ORG     80H
                 203
                 204  ;STA START INTERRUPT
0080  C3730A     205       JMP     DSPLA   ;PROCESS DISPLAY
0083  00         206       DB      0
                 207
                 208  ;STA END INTERRUPT
0084  C3760C     209       JMP     DSEOR
0087  00         210       DB      0
                 211
                 212  ;LINE RECEIVER INTERRUPT
0088  C3DA01     213       JMP     LINEI   ;GO PROCESS IT
008B  00         214       DB      0
                 215
                 216  ;LINE TXMITTER EMPTY INTERRUPT
008C  C31B0D     217       JMP     TXEND
008F  00         218       DB      0
                 219
                 220  ;LINE TXMIT INTERRUPT
0090  C30301     221       JMP     LXMIT
0093  00         222       DB      0
                 223
                 224  ;PRINTER TXMIT INTERRUPT
0094  C34209     225       JMP     PRINT
0097  00         226       DB      0
                 227
                 228  ;KEYBOARD #1
0098  C3DB00     229       JMP     SKBD1   ;READ KEY AND PROCESS IT
009B  00         230       DB      0
                 231
                 232  ;UNUSED INTERRUPT
009C  00         233       DB      0,0
009D  00
009E  FB         234       EI
009F  C9         235       RET
                 236
                 237  ;KEYBOARD #2
00A0  C3E500     238       JMP     SKBD2
00A3  00         239       DB      0
                 240
                 241  ;KEYBOARD #3
```

```
LOC  OBJ         LINE         SOURCE STATEMENT

00A4 C3EF00      242              JMP     SKBD3
00A7 00          243              DB      0
                 244
                 245   ;KEYBOARD #4
00A8 C3F900      246              JMP     SKBD4
00AB 00          247              DB      0
                 248
                 249   ;KEYBOARD #5
00AC C3C000      250              JMP     VSKIP   ;JUMP PAST OTHER INTERRUPTS
00AF 00          251              DB      0
                 252
                 253   ;UNUSED INTERRUPTS
00B0 00          254              DB      0,0
00B1 00
00B2 FB          255              EI
00B3 C9          256              RET
                 257   ;
00B4 00          258              DB      0,0
00B5 00
00B6 FB          259              EI
00B7 C9          260              RET
                 261   ;
00B8 00          262              DB      0,0
00B9 00
00BA FB          263              EI
00BB C9          264              RET
                 265   ;
00BC 00          266              DB      0,0
00BD 00
00BE FB          267              EI
00BF C9          268              RET
                 269   ; END OF INTERRUPT VECTOR AREA FOR THE TWO 8259'S
                 270   ;****************************************************
                 271
                 272   ; PROCESS KEYBOARD #5 INTERRUPT
00C0 CDEA01      273   VSKIP:   CALL    SAVES    ;KEYBOARD #5
00C3 DBC2        274              IN      STRAPS  ;LOOK AT THE CONFIGURATION STRAPS
00C5 E620        275              ANI     20H     ;TEST THE 300/312 MODE SWITCH
00C7 C23604      276              JNZ     KBEX1   ;IF 1, THIS IS AN MES312 TERMINAL - IGNORE KEYBOARD
00CA DBC0        277              IN      KBD5    ;ELSE, READ IN THE KEYBOARD CHARACTER
00CC 0610        278              MVI     B,10H   ;TERM # 5
                 279
                 280   ;COMMON KEYBOARD CODE
00CE F5          281   KBCOM:   PUSH    PSW      ;SAVE CHAR
00CF 78          282              MOV     A,B      ;KBD #
                 283              UNPACK
00D1 F1          285              POP     PSW
00D2 E67F        286              ANI     7FH      ;7 BITS FROM KEYBOARD
00D4 4F          287              MOV     C,A
00D5 2AFB12      288              LHLD    CKTAB
00D8 C3BF03      289              JMP     VECT     ;GO TO ROUTINES IN KBD TABLE
                 290
                 291   ; PROCESS KEYBOARD #1 INTERRUPT
00DB CDEA01      292   SKBD1:   CALL    SAVES
00DE DBA0        293              IN      KBD1
00E0 0601        294              MVI     B,1     ;TERM #1
00E2 C3CE00      295              JMP     KBCOM
                 296
                 297   ; PROCESS KEYBOARD #2 INTERRUPT
00E5 CDEA01      298   SKBD2:   CALL    SAVES
00E8 DBA1        299              IN      KBD2
00EA 0602        300              MVI     B,2     ;TERM #2
00EC C3CE00      301              JMP     KBCOM
                 302
                 303   ; PROCESS KEYBOARD #3 INTERRUPT
00EF CDEA01      304   SKBD3:   CALL    SAVES
00F2 DBB0        305              IN      KBD3
00F4 0604        306              MVI     B,4     ;TERM #3
00F6 C3CE00      307              JMP     KBCOM
                 308
                 309   ; PROCESS KEYBOARD #4 INTERRUPT
00F9 CDEA01      310   SKBD4:   CALL    SAVES
00FC DBB1        311              IN      KBD4
00FE 0608        312              MVI     B,8     ;TERM #4
0100 C3CE00      313              JMP     KBCOM
                 314
                 315
                 316   ;****************************************************
                 317   ;LINE TRANSMIT INTERRUPT DRIVER
0103 CDEA01      318   LXMIT    CALL    SAVES
0106 2A8D12      319              LHLD    OPTAB   ;GET VECTOR
0109 E9          320              PCHL             ;GO THERE
                 321
                 322   ;****************************************************
                 323   ;POWERUP CONTINUED
010A 3E21        324   PW4      MVI     A,21H
010C 32EC12      325              STA     CTSTA   ;SET RETRIEVE STATUS
010F 3E01        326              MVI     A,1
0111 32EB12      327   PW2      STA     CTNO    ;SET UP TERMINAL BLOCKS
0114 F5          328              PUSH    PSW
                 329              PACK
0116 F1          331              POP     PSW
```

| LOC OBJ | LINE | | SOURCE STATEMENT | | |
|---|---|---|---|---|---|
| 0117 07 | 332 | | RLC | | ;NEXT ONE |
| 0118 FE20 | 333 | | CPI | ATMSK+1 | |
| 011A DA1101 | 334 | | JC | PW2 | |
| 011D DBA0 | 335 | | IN | KBI1 | ;READ KEYBOARD #1 |
| 011F FE44 | 336 | | CPI | TSTKEY | ;CHECK FOR KEY DEPRESSED |
| 0121 C22C01 | 337 | | JNZ | PW5 | ;NOT DIAGNOSTICS KEY, GO ON NORMALLY |
| 0124 3A0030 | 338 | | LDA | DIAGST | ;CORRECT KEY DEPRESSED |
| 0127 FEC3 | 339 | | CPI | 0C3H | ;DIAGNOSTIC PROM IN? |
| 0129 CA0030 | 340 | | JZ | DIAGST | ;YES, JUMP TO IT |
| 012C 3E93 | 341 | PW5 | MVI | A,93H | ;CONFIGURE PASS 5 |
| 012E D3A3 | 342 | | OUT | CH1 | |
| 0130 D3B3 | 343 | | OUT | CH2 | |
| 0132 3E9B | 344 | | MVI | A,9BH | |
| 0134 D3C3 | 345 | | OUT | CH3 | ;LINK # INPUT |
| 0136 AF | 346 | | XRA | A | ;CLEAR A |
| 0137 D3D1 | 347 | | OUT | USR1C | ;RESET LINE USART |
| 0139 D3D1 | 348 | | OUT | USR1C | ;BY |
| 013B D3D1 | 349 | | OUT | USR1C | ;ISSUING 3 ZEROS |
| 013D D3E1 | 350 | | OUT | USR2C | ;RESET PRINT USART |
| 013F D3E1 | 351 | | OUT | USR2C | ;BY |
| 0141 D3E1 | 352 | | OUT | USR2C | ;ISSUING 3 ZEROS |
| 0143 3E40 | 353 | | MVI | A,40H | ;ISSUE RESET |
| 0145 D3D1 | 354 | | OUT | USR1C | ;TO LINE USART |
| 0147 D3E1 | 355 | | OUT | USR2C | ;AND PRINT USART |
| 0149 3E4E | 356 | | MVI | A,4EH | |
| 014B D3D1 | 357 | | OUT | USR1C | ;LINE USART MODE INST |
| 014D 3E16 | 358 | | MVI | A,16H | |
| 014F D3D1 | 359 | | OUT | USR1C | ;COMMAND INST |
| 0151 3ECF | 360 | | MVI | A,0CFH | ;BAUD RATE IS SET TO 300 BAUD |
| 0153 D3E1 | 361 | | OUT | USR2C | ;PRINTER MODE SET |
| 0155 3E94 | 362 | | MVI | A,94H | ;CONFIGURE 8259'S |
| 0157 D390 | 363 | | OUT | INT1C | ;SEND ICW1 TO MASTER |
| 0159 AF | 364 | | XRA | A | |
| 015A D391 | 365 | | OUT | INT1I | ;ICW2 |
| 015C 3E80 | 366 | | MVI | A,80H | |
| 015E D391 | 367 | | OUT | INT1I | |
| 0160 3EB4 | 368 | | MVI | A,0B4H | ;ICW1 TO SLAVE |
| 0162 D380 | 369 | | OUT | INT2C | |
| 0164 AF | 370 | | XRA | A | |
| 0165 D381 | 371 | | OUT | INT2I | ;ICW2 |
| 0167 3E07 | 372 | | MVI | A,7 | |
| 0169 D381 | 373 | | OUT | INT2I | ;ICW3 |
| 016B DBD0 | 374 | | IN | USR1D | ;CLEAR JUNK FROM LINE IN |
| 016D 061F | 375 | | MVI | B,ATMSK | ;SET ALL SCREENS |
| 016F 0E8A | 376 | | MVI | C,DFSCLR | ;SCREEN CLEAR |
| 0171 110000 | 377 | | LXI | D,0 | |
| | 378 | | DGADD | | ;QUEUE THE SCREEN CLEAR |
| 0175 3E01 | 380 | | MVI | A,1 | |
| 0177 32D112 | 381 | | STA | KBPRI | ;SET TOP PRIORITY KBD = #1 |
| 017A DBC2 | 382 | | IN | STRAPS | ;LOAD THE OLD SWITCHES |
| 017C 4F | 383 | | MOV | C,A | ;SAVE THE INPUT |
| 017D E610 | 384 | | ANI | 10H | ;TEST THE BIT THAT SELECTS DEFAULT FLASH MODE |
| 017F CA8401 | 385 | | JZ | PW3 | ;IF 0, (SWITCH CLOSED) DEFAULT TO NO BLINK ON POWER ON |
| 0182 3EFF | 386 | | MVI | A,-1 | ;ELSE, SET BLINK FLAG TO TURN ON BLINK |
| 0184 32D712 | 387 | PW3 | STA | UDFLSH | ;STORE DEFAULT BLINK CONDITION |
| 0187 79 | 388 | | MOV | A,C | ;GET BACK THE SWITCHES |
| 0188 E640 | 389 | | ANI | 40H | ;TEST SWITCH FOR OLD/NEW HARDWARE |
| 018A C29601 | 390 | | JNZ | PWOLDH | ;IF OLD HARDWARE, SKIP THE LINK # READ |
| 018D DBC1 | 391 | | IN | LNKSW | ;READ THE NEW LINK SWITCHES |
| 018F E63F | 392 | | ANI | 3FH | ;MASK LINK # TO 6 BITS |
| 0191 F640 | 393 | | ORI | 40H | ;AND TURN ON BIT #6 |
| 0193 32D212 | 394 | | STA | LINKC | ;TO GENERATE THE LINK CHARACTER TO USE |
| 0196 79 | 395 | PWOLDH | MOV | A,C | ;GET THE CONFIGURATION STRAPS |
| 0197 E620 | 396 | | ANI | 20H | ;TEST BIT #5 OF STRAPS |
| 0199 CAC401 | 397 | | JZ | PW312A | ;IF 0, THIS IS AN MES300 TERMINAL |
| | 398 | | | | |
| | 399 | ;ELSE | DO INITIALIZATION THAT IS UNIQUE TO THE MES312 CONTROLLER | | |
| 019C 219013 | 400 | | LXI | H,TT4-CMBLK+ITNAM | ;HL => NAME FOR SCREEN #5 BLOCK |
| 019F 364C | 401 | | MVI | M,'L' | ;SET PAGE NAME = 'LSTn' |
| 01A1 23 | 402 | | INX | H | |
| 01A2 3653 | 403 | | MVI | M,'S' | |
| 01A4 23 | 404 | | INX | H | |
| 01A5 3654 | 405 | | MVI | M,'T' | |
| 01A7 23 | 406 | | INX | H | |
| 01A8 DBC2 | 407 | | IN | STRAPS | ;GET LAST DIGIT OF NAME FROM STRAPS |
| 01AA E607 | 408 | | ANI | 7H | ;JUST THE BOTTOM 3 BITS, THAT IS |
| 01AC C641 | 409 | | ADI | 'A' | ;TO GENERATE 'A' - 'H' |
| 01AE 77 | 410 | | MOV | M,A | ;SAVE n = STRAPPED IN CHARACTER |
| 01AF 217D13 | 411 | | LXI | H,TT4-CMBLK+ITSTA | ;HL=> TERM #5 STATUS BYTE |
| 01B2 3600 | 412 | | MVI | M,0 | ;CLEAR THE STATUS |
| 01B4 0610 | 413 | | MVI | B,10H | ;SET THE TERMINAL #5 ID BIT |
| 01B6 0E8B | 414 | | MVI | C,DFALST | ;SET C = DISPLAY ALERT LIST HEADING |
| 01B8 1113C0 | 415 | | LXI | D,AHPOS | ;CENTERING IT ON LINE #1 |
| | 416 | | DGADD | | ;PUT INTO DISPLAY QUEUE |
| 01BC 0ED7 | 418 | | MVI | C,0BFH+24 | ;STORE 24 BLANKS INTO |
| 01BE 11E703 | 419 | | LXI | D,3E7H | ;THE SYSTEM STATUS AREA |
| | 420 | | DGADD | | |
| 01C2 060F | 422 | | MVI | B,ATMSK-10H | ;SET ALL TERMINALS BUT #5 |
| | 423 | | | | |
| | 424 | ;FINISH UP INITIALIZATION COMMON TO BOTH MES300 AND MES312 TERMINALS | | | |
| | 425 | ;NOTE THAT REGISTER B = TERMINAL DESTINATION BITS FOR STATUS RESTORE, | | | |
| | 426 | ;'C' AND CURSOR | | | |

```
LOC  OBJ        LINE       SOURCE STATEMENT

01C4 11162F     427 PW312A  LXI    D,PROGID  ;DE= SIGN-ON ID MESSAGE TEXT
01C7 CDDC0C     428         CALL   MOKSTA    ;INSTALL THE MOCK STATUS MESSAGE
01CA 0E1B       429         MVI    C,'C' AND 3FH ;C TO TOP OF PAGE
01CC 110000     430         LXI    D,0
                431         DGADD
01D0 0E89       433         MVI    C,DFCFWD ;INSTALL CURSOR
01D2 110000     434         LXI    D,0
                435         DGADD
01D6 FB         437         EI
01D7 C3D701     438         JMP    $         ;VERY SHORT IDLE LOOP
                439
                440
                441 ;***************************************************************
                442 ;LINE INPUT INTERRUPT ROUTINE
01DA CDEA01     443 LINEI:  CALL   SAVES
01DD DBD0       444         IN     USR1D     ;READ CHAR
01DF A7         445         ANA    A
01E0 CA080E     446         JZ     LIEX      ;EXIT IF NULL CHAR
01E3 4F         447         MOV    C,A       ;CHAR IN C
01E4 2A8B12     448         LHLD   PLTAB     ;LINE TABLE POINTER
01E7 C3BF03     449         JMP    VECT      ;GO DO IT
                450
                451
                452 ;***************************************************************
                453 ;SUBROUTINE TO SAVE MACHINE STATUS (ALL REGISTERS) ON STACK
01EA E3         454 SAVES:  XTHL             ;SWAP RETURN AND HL
01EB D5         455         PUSH   D
01EC C5         456         PUSH   B
01ED F5         457         PUSH   PSW
01EE E9         458         PCHL             ;RETURN TO CALLER
                459
                460 ;***************************************************************
                461 ;S/R TO SET UP STORE BLOCK FOR 1 CHARACTER OF
                462 ;LINE TEXT ON SCREEN(S) SPECIFIED
                463 ;BY VDUP AND AT SCREEN ADDRESS OF VDUAD +1
                464 ;CARRY=1 ON RETURN OF OVERRUN ERROR
                465 ;ALL REGISTERS ALTERED
                466
01EF 2A9012     467 LDSTR:  LHLD   VDUAD     ;ADDR + 1
01F2 E5         468         PUSH   H         ;SAVE (STARTING POINT)
01F3 23         469         INX    H
01F4 D1         470 CMST0:  POP    D         ;COMMON ENTRY-START IN DE
01F5 3E03       471         MVI    A,3       ;HL=LAST POSITION TO BE ACCESSED
01F7 BA         472         CMP    D
01F8 D8         473         RC               ;IF O,ERRUN
01F9 229012     474         SHLD   VDUAD     ;SAVE POSITION NEXT
01FC 3A8F12     475         LDA    VDUP      ;PAGE # TO BE ACCESSED
01FF A7         476         ANA    A
0200 C8         477         RZ               ;IF NO STORE DESTINATIONS
0201 47         478         MOV    B,A       ;IN B
                479 ;STORE THE REGISTERS IN THE CRT CONTROL TABLE
0202 2AE011     480 CMST1:  LHLD   BWPTR     ;BUFFER STUFF POINTER
0205 73         481         MOV    M,E       ;STORE START ADDR
0206 23         482         INX    H
0207 72         483         MOV    M,D
0208 23         484         INX    H
0209 70         485         MOV    M,B       ;STORE PAGE #
020A 23         486         INX    H
020B 71         487         MOV    M,C       ;STORE CHARACTER OR FUNCTION
020C 23         488         INX    H
020D 11DF11     489         LXI    D,CBEND   ;END OF BUFFER
                490         COMPDH           ;(HL):(DE)
0211 DA1702     492         JC     LDST1     ;IF NOT
0214 210010     493         LXI    H,CBBEG   ;ELSE RESET TO TOP
0217 22E011     494 LDST1:  SHLD   BWPTR
021A AF         495         XRA    A         ;CLEAR CARRY
021B C9         496         RET
                497
                498
                499 ;***************************************************************
                500 ;PROCESS A HIGH PRIORITY SERVICE REQUEST FOR TRANSFER
                501 ;OF DATA FROM CRT MEMORIES
                502 ;PUTS TCB AT TOP OF 'STACK' FOR IMMEDIATE PROCESSING
021C 2AE211     503 HPSR:   LHLD   BRPTR     ;TOP OF BLOCK
021F D5         504         PUSH   D
0220 110010     505         LXI    D,CBBEG
                506         COMPDH           ;LOOK FOR WRAP AROUND
0224 2B         508         DCX    H
0225 C22B02     509         JNZ    HPSR1     ;IF NOT
0228 21DF11     510         LXI    H,CBEND   ;ELSE WRAP IT AROUND
022B D1         511 HPSR1:  POP    D
022C 71         512         MOV    M,C       ;STORE CHAR
022D 2B         513         DCX    H
022E 70         514         MOV    M,B       ;STORE PAGE #(S)
022F 2B         515         DCX    H
0230 72         516         MOV    M,D       ;AND ADDRESS ON PAGE
0231 2B         517         DCX    H
0232 73         518         MOV    M,E
0233 22E211     519         SHLD   BRPTR     ;SAVE NEW POINTER
0236 C9         520         RET              ;DATA ALL
                521
                522
```

```
 LOC  OBJ         LINE       SOURCE STATEMENT

523 ;********************************************************************
                  524 ;STORE CHARACTER IN C TO POS #1 OF INPUT LINE OF
                  525 ;CURRENT TERMINAL
0237 2AF112       526 IP1ST    LHLD    CCMIN       ;GET POINTER TO START OF INPUT LINE
023A 2B           527          DCX     H           ;HL=1st CHAR POSITION OF INPUT LINE
023B EB           528          XCHG                ;POINTER IN DE
023C 3AEB12       529          LDA     CTNO
023F 47           530          MOV     B,A
                  531          DGADD               ;QUICK DISPLAY OF CHARACTER IN C
0241 C9           533          RET                 ;AND RETURN TO CALLER
                  534
                  535
                  536 ;********************************************************************
                  537 ;STORE KEYBOARD CHARACTER AT CURRENT CURSOR
                  538 ;LOCATION. CHARACTER PASSED IN C
                  539 ;IF IN RETRIEVE MODE, THE CHARACTER IS ALSO STORE IN
                  540 ;RAM ADDRESS BY CKPTR
                  541 ;ONLY PRINTABLE CHARS ARE ALLOWED
                  542 ;EXIT IS TO THE CURSOR FORWARD ROUTINE
0242 CDBC03       543 KBCST:   CALL    RREST       ;RESET RESET TO RE-ALLOW IT
0245 CD2D03       544          CALL    TFRAC       ;SEE IF FRACTION
0248 DA7302       545          JC      KBCS5       ;IF IT IS
024B 79           546          MOV     A,C
024C FE20         547          CPI     20H         ;SEE IF DISPLAYABLE
024E DA3604       548          JC      KBEX1       ;IF NOT
0251 CAA902       549          JZ      KBCS2       ;GO PROCESS IT
0254 FE2A         550          CPI     2AH
0256 DA3604       551          JC      KBEX1       ;IF <2A, IGNORE
0259 FE3A         552          CPI     3AH
025B DAA902       553          JC      KBCS2       ;IF 2A - 39
025E CA3604       554          JZ      KBEX1       ;IGNORE 3A
0261 FE3B         555          CPI     3BH
0263 CAA902       556          JZ      KBCS2       ;IF 3B, OK
0266 FE41         557          CPI     41H
0268 DA3604       558          JC      KBEX1       ;IGNORE 3C - 40
026B FE5B         559          CPI     5BH
026D DAA902       560          JC      KBCS2       ;IF 41 - 5A OK
0270 C33604       561          JMP     KBEX1       ;ALL ELSE IS IGNORED
0273 3AEC12       562 KBCS5:   LDA     CTSTA
0276 E610         563          ANI     10H
0278 CA3604       564          JZ      KBEX1       ;IGNORE FRACTION IF NOT INSERT
                  565 ;FRACTION HIT IN INSERT MODE
027B E5           566          PUSH    H           ;SAVE NUM/DENOM
027C 2AEF12       567          LHLD    CKCRS
027F EB           568          XCHG
0280 2AF312       569          LHLD    CCMAX       ;HL=MAX ALLOWED
0283 13           570          INX     D
0284 13           571          INX     D
0285 13           572          INX     D           ;DE=CURS AFTER EXPANSION
                  573          COMPDH              ;COMPARE TO MAX
0287 E1           575          POP     H
0288 DA3604       576          JC      KBEX1       ;IF NOT ENUF ROOM
028B E5           577          PUSH    H
028C 2AEF12       578          LHLD    CKCRS
028F EB           579          XCHG
0290 22EF12       580          SHLD    CKCRS       ;SAVE CURS +3
0293 D5           581          PUSH    D           ;DSAVE STARTING ADDRESS
0294 0E20         582          MVI     C,' '
0296 3AEB12       583          LDA     CTNO
0299 47           584          MOV     B,A
                  585          DGADD               ;STORE A SPACE
029B D1           587          POP     D
029C 13           588          INX     D
029D E1           589          POP     H
029E 4C           590          MOV     C,H         ;NUMERATOR
029F E5           591          PUSH    H
02A0 D5           592          PUSH    D
                  593          DGADD               ;STORE IT
02A2 D1           595          POP     D
02A3 13           596          INX     D
02A4 0E2F         597          MVI     C,'/' AND 3FH ;SLASH
                  598          DGADD
02A7 E1           600          POP     H
02A8 4D           601          MOV     C,L         ;LAST CHAR IN C
02A9 2AEF12       602 KBCS2:   LHLD    CKCRS
02AC EB           603          XCHG
02AD 2AF312       604          LHLD    CCMAX
                  605          COMPDH
02B1 DA3604       607          JC      KBEX1       ;IF CURRENT > MAX
02B4 CD8503       608          CALL    CHOO        ;CHANGE ZERO TO OH
02B7 79           609          MOV     A,C         ;CHAR IN A
02B8 C5           610          PUSH    B           ;SAVE 7BIT VERSION
02B9 E63F         611          ANI     3FH         ;6 BITS FOR DISPLAY
02BB 4F           612          MOV     C,A
02BC 2AED12       613          LHLD    CIMAX       ;CURRENT MAX CHAR PTR
02BF EB           614          XCHG                ;IN DE
02C0 2AEF12       615          LHLD    CKCRS       ;CURRENT CURSOR
                  616          COMPDH              ;COMPARE EM
02C4 DACA02       618          JC      KBCS1       ;IF C.MAX ALREADY BIGGER
02C7 22ED12       619          SHLD    CIMAX       ;ELSE BUMP IT
02CA EB           620 KBCS1:   XCHG                ;CKCRS IN DE
02CB 3AEB12       621          LDA     CTNO        ;TERMINAL #
```

```
LOC  OBJ          LINE    SOURCE STATEMENT

02CE 47           622         MOV    B,A           ;IN B
                  623         DGADD                ;STORE ON CRT
02D0 3AEC12       625         LDA    CTSTA
02D3 E620         626         ANI    20H           ;RETRIEVE?
02D5 C1           627         POP    B             ;RESTORE CHARACTER
02D6 CADD02       628         JZ     CRSFD         ;IF NOT RETRIEVE
02D9 2AF512       629         LHLD   CKPTR
02DC 71           630         MOV    M,C           ;SAVE CHARACTER
                  631
                  632 ;**********************************************************
                  633 ;MOVE THE CURSOR FORWARD ONE POSITION IF POSSIBLE
                  634 ;WORKS ON KEYBOARD IN COMMON AREA
02DD CD8C03       635 CRSFD:  CALL   RREST         ;REALLOW RESET
02E0 2AF312       636 CRFD0:  LHLD   CCMAX         ;LOADMAX CURSOR
02E3 EB           637         XCHG
02E4 2AEF12       638         LHLD   CKCRS         ;LOAD CURRENT CURSOR
                  639         COMPDH               ;COMPARE THEM
02E8 CAEE02       641         JZ     CRFD2         ;IF AT END OF LINE
02EB D23504       642         JNC    KBIEX         ;EXIT IF > END OF LINE
02EE F5           643 CRFD2:  PUSH   PSW           ;SAVE STATUS
02EF 23           644         INX    H
02F0 22EF12       645         SHLD   CKCRS
02F3 2B           646         DCX    H
02F4 EB           647         XCHG                 ;D+E=ON PAGE ADDRESS
02F5 3AEB12       648         LDA    CTNO          ;PAGE # TO B
02F8 47           649         MOV    B,A
02F9 0E89         650         MVI    C,DFCFWD      ;CURSOR FWD COMMAND
                  651         DGADD                ;STORE CONTROL BLOCK
02FC 2AF512       653         LHLD   CKPTR
02FF 23           654         INX    H
0300 22F512       655         SHLD   CKPTR
0303 F1           656         POP    PSW
0304 C33504       657         JMP    KBIEX         ;THATS ALL
                  658
                  659 ;**********************************************************
                  660 ;MOVE THE CURSOR BACK ONE POSITION IF POSSIBLE
                  661 ;IF NOT, EXIT THROUGH KEYBOARD EXIT ROUTINE
0307 CD8C03       662 CRSBK:  CALL   RREST         ;ALLOW RESET
030A 2AEF12       663         LHLD   CKCRS         ;CURRENT POSITION
030D EB           664         XCHG                 ;IN D + E
030E 2AF112       665         LHLD   CCMIN         ;START OF LINE ADDRESS
                  666         COMPDH               ;COMPARE THEM
0312 D23504       668         JNC    KBIEX         ;IF CURRENT<=MINIMUM
0315 EB           669         XCHG
0316 2B           670         DCX    H
0317 22EF12       671         SHLD   CKCRS
031A 23           672         INX    H
031B EB           673         XCHG
031C 3AEB12       674         LDA    CTNO
031F 47           675         MOV    B,A
0320 0E88         676         MVI    C,DFCBKW
                  677         DGADD
0323 2AF512       679         LHLD   CKPTR
0326 2B           680         DCX    H
0327 22F512       681         SHLD   CKPTR
032A C33504       682         JMP    KBIEX
                  683
                  684 ;**********************************************************
                  685 ;SUBROUTINE TO TEST IF CHAR IN C IS A FRACTION
                  686 ;KEY,
                  687 ;IF IT IS, CARRY IS SET AND THE NUMERATOR AND
                  688 ;DENOMINATOR RETURN IN H AND L RESPECTIVELY
                  689 ;A,H,L ALTERED
032D 214A03       690 TFRAC   LXI    H,FRTAB       ;POINT TO TABLE
0330 C5           691         PUSH   B             ;SAVE CHAR
0331 0607         692         MVI    B,7           ;COUNT
0333 79           693         MOV    A,C
0334 BE           694 TFRA1:  CMP    M             ;MATCH??
0335 CA4203       695         JZ     TFRA2         ;IF YES
0338 23           696         INX    H
0339 23           697         INX    H
033A 23           698         INX    H
033B 05           699         DCR    B
033C C23403       700         JNZ    TFRA1         ;TRY NEXT ONE
033F C1           701         POP    B             ;NOT A FRACTION
0340 A7           702         ANA    A             ;CLEAR CARRY
0341 C9           703         RET
0342 23           704 TFRA2:  INX    H
0343 46           705         MOV    B,M
0344 23           706         INX    H
0345 6E           707         MOV    L,M           ;FRACTION IN HL
0346 60           708         MOV    H,B
0347 C1           709         POP    B
0348 37           710         STC
0349 C9           711         RET
                  712
034A 11           713 FRTAB:  DB     11H,'1B'      ;1/8
034B 3138
034D 12           714         DB     12H,'14'      ;1/4
034E 3134
0350 13           715         DB     13H,'38'      ;3/8
0351 3338
```

| LOC OBJ | LINE | SOURCE STATEMENT | | | |
|---|---|---|---|---|---|
| 0353 14 | 716 | | DB | 14H,'12' | ;1/2 |
| 0354 3132 | | | | | |
| 0356 15 | 717 | | DB | 15H,'58' | ;5/8 |
| 0357 3538 | | | | | |
| 0359 16 | 718 | | DB | 16H,'34' | ;3/4 |
| 035A 3334 | | | | | |
| 035C 17 | 719 | | DB | 17H,'78' | ;7/8 |
| 035D 3738 | | | | | |

```
720
721 ;************************************************************
722 ;SUBROUTINE TO PROCESS UNPACK SPACES COUNT
723 ;
724 ;C=ASCII SPACE COUNT
725 ;EXIT CONDITIONS ARE SAME AS IN LDSTR
```

| 035F 79 | 726 SPUNP: | MOV | A,C | |
|---|---|---|---|---|
| 0360 D640 | 727 | SUI | 40H | ;A=# OF SPACES -1 |
| 0362 4F | 728 | MOV | C,A | ;INTO C |
| 0363 2A9012 | 729 | LHLD | VDUAD | |
| 0366 E5 | 730 | PUSH | H | |
| 0367 23 | 731 | INX | H | |
| 0368 0600 | 732 | MVI | B,0 | |
| 036A 09 | 733 | DAD | B | |
| 036B F6C0 | 734 | ORI | 0C0H | |
| 036D 4F | 735 | MOV | C,A | |
| 036E C3F401 | 736 | JMP | CMSTO | |

```
737
738 ;************************************************************
739 ;SUBROUTINE TO STORE CHAR IN C IN LINE L15
740 ;POS 1 OF CURRENT TERMINAL (TERMINAL DATA IN COMMON
741 ;AREAS)
```

| 0371 3AEB12 | 742 TPSTR: | LDA | CTNO | ;CURRENT TERMINAL NUMBER |
|---|---|---|---|---|
| 0374 47 | 743 | MOV | B,A | |
| 0375 118003 | 744 | LXI | D,380H | ;START OF LINE 15 |
| | 745 | DGADD | | ;GO TO COMMON ROUTINE |
| 0379 C9 | 747 | RET | | ;AND RETURN TO CALLER |

```
748
749 ;************************************************************
750 ;CLEAR THE ERROR LINE OF THE CURRENT TERMINAL
751 ;CLEARS 24 CHARACTERS OF LINE # 16
```

| 037A 3AEB12 | 752 ELCLR: | LDA | CTNO | |
|---|---|---|---|---|
| 037D 47 | 753 | MOV | B,A | |
| 037E 11C003 | 754 | LXI | D,3C0H | ;POINT TO START OF LINE #16 |
| 0381 0ED7 | 755 | MVI | C,0BFH+24 | ;STORE 24 BLANKS |
| | 756 | DGADD | | |
| 0384 C9 | 758 | RET | | |

```
759
760
761 ;************************************************************
762 ;CHANGE ZERO'S TO OH'S TO KEEP MARKETING HAPPY
763 ;A IS ALTERED, AND OF COURSE C IF IT WAS A ZERO
```

| 0385 79 | 764 CHOO: | MOV | A,C | ;GET CHAR. |
|---|---|---|---|---|
| 0386 FE30 | 765 | CPI | '0' | |
| 0388 C0 | 766 | RNZ | | ;IF NOT A ZERO |
| 0389 0E4F | 767 | MVI | C,'O' | |
| 038B C9 | 768 | RET | | |

```
769
770 ;************************************************************
771 ;RESET THE RESET INHIBIT FLAG IN THE STATUS WORD
772 ;OF THE CURRENT TERMINAL.
```

| 038C F5 | 773 RREST: | PUSH | PSW | ;SAVE A |
|---|---|---|---|---|
| 038D 3AEC12 | 774 | LDA | CTSTA | |
| 0390 E6FE | 775 | ANI | 0FEH | ;STRIP OFF FLAG |
| 0392 32EC12 | 776 | STA | CTSTA | |
| 0395 F1 | 777 | POP | PSW | |
| 0396 C9 | 778 | RET | | ;BYE GYE |

```
779
780 ;************************************************************
781 ;CALCULATE TERMINAL STORAGE AREA FOR TERMINAL SPECIFIED IN
782 ;A REG. (HL) POINTS TO RESULT AND LENGTH OF BLOCK IS RETURNED
783 ;IN C. (DE) POINTS TO COMMON AREA
```

| 0397 210813 | 784 TDADR: | LXI | H,1TO | ;FIRST BLOCK |
|---|---|---|---|---|
| 039A 111D00 | 785 | LXI | D,TTCNT | ;LENGTH OF BLOCK |
| 039D 4B | 786 | MOV | C,E | ;LENGTH IN C TOO |
| 039E 1F | 787 TDA1: | RAR | | ;CHECK BIT |
| 039F DAA603 | 788 | JC | TDA2 | ;IF FOUND |
| 03A2 19 | 789 | DAD | D | ;BUMP TO NEXT BLOCK |
| 03A3 C39E03 | 790 | JMP | TDA1 | ;TRY AGAIN |
| 03A6 11EB12 | 791 TDA2: | LXI | D,CMBLK | ;DE POINT TO COMMON AREA |
| 03A9 C9 | 792 | RET | | |

```
793
794 ;************************************************************
795 ;SUBROUTINE TO UNPACK TERMINAL DATA TO A COMMON AREA
796 ;CAL WITH THE TERMINAL NUMBER SPECIFIED IN A
797 ;BIT POSITION IS TERMINAL #
798 ;ALTERS C,D,E,H,L,A
```

| 03AA CD9703 | 799 UPTRM: | CALL | TDADR | ;CALC POINTERS |
|---|---|---|---|---|
| 03AD EB | 800 | XCHG | | ;SWAP THEM |

```
801
802 ;************************************************************
803 ; MOVE MEMORY CONTENTS FROM (DE) TO (HL) FOR THE NUMBER OF BYTES
804 ; SPECIFIED IN C
805 ;************************************************************
```

```
LOC   OBJ        LINE         SOURCE STATEMENT
                 806  MOVE:   LDAX   D
03AE  1A         807          MOV    M,A
03AF  77         808          INX    H
03B0  23         809          INX    D
03B1  13         810          DCR    C
03B2  0D         811          JNZ    MOVE      ;UNTIL BLOCK DONE
03B3  C2AE03     812          RET
03B6  C9         813
                 814  ;***************************************************************
                 815  ;PACK TERMINAL DATA BACK FROM COMMON AREA
03B7  3AEB12     816  PKTRM:  LDA    CTNO      ;GET BLOCK #
03BA  CD9703     817          CALL   TDADR     ;GET POINTERS
                 818          GOMOVE           ;DO IT
03BE  C9         820          RET
                 821
                 822
                 823
                 824  ;***************************************************************
                 825  ;ROUTINE TO VECTOR PROGRAM CONTROL AS SPECIFIED
                 826  ;BY A CONTROL TABLE. THE CONTROL TABLE USED IS SPECIFID
                 827  ;IN H AND L AND THE CHARACTER SEARCHED FOR IN C
                 828  ;0 IN THE TABLE = END OF TABLE AND DEFAULT PROCESSING
                 829  ;ADDRESS TO TRANSFER TO.
03BF  7E         830  VECT:   MOV    A,M       ;GET TABLE CHARACTER
03C0  23         831          INX    H         ;POINT TO ADDRESS
03C1  A7         832          ANA    A         ;ZERO?
03C2  CACE03     833          JZ     VFND      ;IF YES
03C5  B9         834          CMP    C         ;MATCH?
03C6  CACE03     835          JZ     VFND
03C9  23         836          INX    H
03CA  23         837          INX    H         ;POINT TO NEXT ENTRY.
03CB  C3BF03     838          JMP    VECT
03CE  5E         839  VFND:   MOV    E,M       ;VECTOR FOUND
03CF  23         840          INX    H
03D0  66         841          MOV    H,M
03D1  6B         842          MOV    L,E
03D2  E9         843          PCHL
                 844
                 845
                 846  ;***************************************************************
                 847  ;PROCESS TRANSMIT KEY
03D3  3AEC12     848  KBTXM:  LDA    CTSTA     ;CHECK THE KEYSTATION MODE
03D6  E610       849          ANI    10H
03D8  C20704     850          JNZ    KBTX0     ;IF INSERT MODE
                 851  ; TEST FOR KEYSTATION # 1 CONTROL OF FLASHING UPDATES
03DB  3AEB12     852          LDA    CTNO      ;GET KS #
03DE  3D         853          DCR    A
03DF  C21104     854          JNZ    KBTX1     ;IF NOT KS #1, CAN'T BE A CONTROL FUNCTION.
03E2  2AF912     855          LHLD   CKNAM+2   ;ELSE, CHECK FOR 'FL' AS LAST 2 CHARACTERS OF NAME
03E5  11464C     856          LXI    D,'LF'    ;JUST TYPED IN.
                 857          COMPDH           ;COMPARE HL AND DE
03E9  C21104     859          JNZ    KBTX1     ;IF NOT 'FL', PROCESS TXMIT NORMALLY
03EC  112B2B     860          LXI    D,'++'    ;ELSE IF IT IS, SEE IF '++FL'
03EF  2AF712     861          LHLD   CKNAM
                 862          COMPDH
03F3  3EFF       864          MVI    A,-1      ;SET UP FOR YES ANSWER
03F5  CA0104     865          JZ     FLSHST    ;IF YES, GO TURN ON FLASH UPDATES MODE
03F8  112D2D     866          LXI    D,'--'    ;ELSE SEE IF '--FL'
                 867          COMPDH
03FC  3E00       869          MVI    A,0
03FE  C21104     870          JNZ    KBTX1     ;AND IF NEITHER, DO A NORMAL TXMIT
0401  32D712     871  FLSHST  STA    UDFLSH    ;ELSE SET NEW VALUE OF UPDATE FLASH FLAG
0404  C35005     872          JMP    RSET0     ;AND GO RESET THE SCREEN
                 873
                 874  ; TRANSMIT KEY IN INSERT MODE
0407  2AED12     875  KBTX0:  LHLD   CIMAX     ;MAX. INPUT ADDRESS
040A  118103     876          LXI    D,381H    ;START OF INSERT TEXT
                 877          COMPDH           ;TEST
040E  DA3604     879          JC     KBEX1     ;IGNORE IF NO INPUT TYPED IN
0411  CDBC03     880  KBTX1:  CALL   RREST     ;RE-ALLOW RESET
0414  0E57       881          MVI    C,'W'     ;BLINKING W
0416  CD3702     882          CALL   IP1ST     ;STORE IT IN POS. 1 OF INPUT LINE
0419  3AEC12     883          LDA    CTSTA
041C  F680       884          ORI    80H       ;SET POLL REQUEST
041E  32EC12     885          STA    CTSTA     ;AUTO REQUEST IN ORIG.
0421  2AFB12     886          LHLD   CKTAB
0424  22FD12     887          SHLD   CLKTB     ;SAVE KBD TABLE FOR
                 888                           ;POSSIBLE ERROR RESPONSE
0427  21D32F     889          LXI    H,KTAB8   ;ALLOW ONLY RESET
042A  E610       890          ANI    10H       ;IF IN INSERT MODE
042C  C23204     891          JNZ    KBXIT
042F  21C72F     892          LXI    H,KTAB5   ;ALLOW RESET AND FWD/BAK
                 893                           ;AND FALL INTO EXIT FROM INTERRUPT
                 894
                 895  ;***************************************************************
                 896  ;EXIT FROM KEYBOARD INTERRUPT
0432  22FB12     897  KBXIT:  SHLD   CKTAB     ;STORE KEYBOARD TABLE
                 898  KBIEX:  PACK             ;PACK TERMINAL DATA
0436  3E20       900  KBEX1:  MVI    A,20H     ;EOI INSTRUCTION
0438  D380       901          OUT    INT2C
043A  C3A00E     902          JMP    LEXT1     ;TO SLAVE AND GO DO MASTER
                 903
                 904
```

| LOC OBJ | LINE | | SOURCE STATEMENT | | |
|---|---|---|---|---|---|
| | 905 | ;****************************************************************** | | | |
| | 906 | ;PROCESS PRINT KEY | | | |
| | 907 | ;****************************************************************** | | | |
| 043D 3AD612 | 908 | KPRNT: | LDA | PRMODE | ;CHECK PRINTER MODE |
| 0440 A7 | 909 | | ANA | A | ;TO MAKE SURE NOT IN ALERTS PRINT MODE |
| 0441 C23604 | 910 | | JNZ | KBEX1 | ;IF ALERTS PRINT, IGNORE THE PRINT KEY |
| 0444 3AFF12 | 911 | | LDA | CTNAM | ;PAGE ON DISPLAY? |
| 0447 A7 | 912 | | ANA | A | |
| 0448 CA3604 | 913 | | JZ | KBEX1 | ;IF NOT, IGNORE IT |
| 044B 3AEC12 | 914 | | LDA | CTSTA | |
| 044E E640 | 915 | | ANI | 40H | ;MAKE SURE NOT IN AUTO REQ |
| 0450 C23604 | 916 | | JNZ | KBEX1 | |
| 0453 219512 | 917 | | LXI | H,PRNTG | ;POINT TO TOP OF QUEUE |
| 0456 7E | 918 | | MOV | A,M | ;SEE IF EMPTY |
| 0457 A7 | 919 | | ANA | A | |
| 0458 C26804 | 920 | | JNZ | KPRN1 | ;NOT EMPTY-PRINT IN PROGRESS |
| 045B 32EF11 | 921 | | STA | PBRDY | ;RESET PRINTER VARIABLES |
| 045E 229A12 | 922 | | SHLD | PBPTR | |
| 0461 3E33 | 923 | | MVI | A,33H | |
| 0463 D3E1 | 924 | | OUT | USR2C | ;TURN ON TRANSMITTER |
| 0465 32ED11 | 925 | | STA | PCNFG | ;CLEAR CANCEL |
| 0468 3AEB12 | 926 | KPRN1: | LDA | CTNO | ;PAGE TO PRINT |
| 046B F680 | 927 | | ORI | 80H | ;NEW PAGE FLAG |
| 046D 2A9A12 | 928 | | LHLD | PBPTR | |
| 0470 77 | 929 | | MOV | M,A | |
| 0471 23 | 930 | | INX | H | ;G PRINT AND BUMP POINTER |
| 0472 229A12 | 931 | | SHLD | PBPTR | |
| 0475 11FF12 | 932 | | LXI | D,CTNAM | |
| 0478 D5 | 933 | | PUSH | D | |
| 0479 21F712 | 934 | | LXI | H,CKNAM | ;NAME OF PAGE BEING PRINTED |
| 047C 0E04 | 935 | | MVI | C,4 | ;SAVE FOR AUTO REQUEST |
| | 936 | | QOMOVE | | |
| 047F E1 | 938 | | POP | H | |
| 0480 3600 | 939 | | MVI | M,0 | ;CLEAR NAME FROM PAGE |
| 0482 0E50 | 940 | | MVI | C,'P' | ;FLASHING P |
| 0484 CD7103 | 941 | | CALL | TPSTR | ;TO LINE 15, POS 1 |
| 0487 2AFB12 | 942 | | LHLD | CKTAB | |
| 048A 22FD12 | 943 | | SHLD | CLKTB | ;SAVE KBD TABLE |
| 048D 219D2F | 944 | | LXI | H,KTAB1 | ;ONLY RESET PRINT ALOWED |
| 0490 C33204 | 945 | | JMP | KBXIT | ;EXIT THROUGH KBD EXIT |
| | 946 | | | | |
| | 947 | ;****************************************************************** | | | |
| | 948 | ;CANCEL PRINT ROUTINE | | | |
| 0493 3AEB12 | 949 | PCNCL: | LDA | CTNO | ;TERM # TO CANCEL |
| 0496 E61F | 950 | PCAN1: | ANI | ATMSK | |
| 0498 F5 | 951 | | PUSH | PSW | ;SAVE TERMINAL # TO CANCEL |
| 0499 219512 | 952 | | LXI | H,PRNTG | ;POINTER TO QUEUE |
| 049C 57 | 953 | | MOV | D,A | |
| 049D 0E05 | 954 | | MVI | C,5 | ;COUNT |
| 049F 7E | 955 | PCNLP: | MOV | A,M | ;CHECK G |
| 04A0 E61F | 956 | | ANI | ATMSK | ;STRIP OFF BIT 7 |
| 04A2 BA | 957 | | CMP | D | ;THIS IT?? |
| 04A3 CAAE04 | 958 | | JZ | PCNPK | ;IF YES |
| 04A6 0D | 959 | | DCR | C | ;ELSE, SEE IF DONE |
| 04A7 CABF04 | 960 | | JZ | PCPK1 | |
| 04AA 23 | 961 | | INX | H | ;NEXT |
| 04AB C39F04 | 962 | | JMP | PCNLP | ;TIL CANCEL FOUND |
| | 963 | | | | |
| 04AE E5 | 964 | PCNPK: | PUSH | H | ;SAVE TO ADDRESS |
| 04AF 23 | 965 | | INX | H | ;MAKE FROM ADDR |
| 04B0 D1 | 966 | | POP | D | |
| 04B1 EB | 967 | | XCHG | | ;IN PROPER PLACES |
| 04B2 0D | 968 | | DCR | C | |
| 04B3 C4AE03 | 969 | | CNZ | MOVE | ;PACK THE QUEUE |
| 04B6 AF | 970 | | XRA | A | ;ZERO AT END |
| 04B7 77 | 971 | | MOV | M,A | |
| 04B8 2A9A12 | 972 | | LHLD | PBPTR | ;UPDATE POINTER |
| 04BB 2B | 973 | | DCX | H | |
| 04BC 229A12 | 974 | | SHLD | PBPTR | |
| 04BF 3A9512 | 975 | PCPK1: | LDA | PPNTG | ;POINT TO NEXT UP |
| 04C2 A7 | 976 | | ANA | A | ;DONE?? |
| 04C3 32ED11 | 977 | | STA | PCNFG | ;TO GET RID OF FLAG |
| 04C6 C2CE04 | 978 | | JNZ | PCPK2 | ;IF STILL PRINTING |
| 04C9 D3E1 | 979 | | OUT | USR2C | ;ELSE TURN OFF TRANSMITTER |
| 04CB C3D104 | 980 | | JMP | PCPK3 | |
| 04CE AF | 981 | PCPK2: | XRA | A | |
| 04CF D3E0 | 982 | | OUT | USR2D | ;TO KEEP INTERRUPTS GOING |
| 04D1 F1 | 983 | PCPK3: | POP | PSW | ;RESTORE TERMINAL # |
| | 984 | | UNPACK | | ;UNPACK TERM DATA IN CASE |
| 04D3 3AEC12 | 986 | | LDA | CTSTA | |
| 04D6 0E20 | 987 | | MVI | C,' ' | |
| 04D8 E610 | 988 | | ANI | 10H | ;SEE IF IN INSERT MODE |
| 04DA CADF04 | 989 | | JZ | PCPK4 | ;IF NOT |
| 04DD 0E1B | 990 | | MVI | C,'[' | AND 3FH |
| 04DF CD7103 | 991 | PCPK4: | CALL | TPSTR | ;RESTORE LINE 15, CHAR #1 |
| 04E2 3AEC12 | 992 | | LDA | CTSTA | |
| 04E5 F640 | 993 | | ORI | 40H | ;SET AUTO REQ |
| 04E7 32EC12 | 994 | | STA | CTSTA | |
| 04EA 2AFD12 | 995 | | LHLD | CLKTB | ;RESTORE KBD TABLE |
| 04ED C33204 | 996 | | JMP | KBXIT | ;AND FINISH UP |

```
LOC   OBJ         LINE    SOURCE STATEMENT

999  ;****************************************************************
             1000  ;PROCESS THE INSERT KEY
04F0  3AFF12  1001  INSRT: LDA   CTNAM    ;PAGE ON DISPLAY?
04F3  A7      1002         ANA   A
04F4  CA3604  1003         JZ    KBEX1    ;IF NOT, GET OUT
04F7  3E40    1004         MVI   A,40H    ;SET MASK FOR AUTO REQUEST
04F9  21EC12  1005         LXI   H,CTSTA  ;POINT TO STATUS
04FC  A6      1006         ANA   M        ;PRESERVE AUTO REQUEST
04FD  F610    1007         ORI   10H      ;AND SET INSERT STATUS BIT
04FF  77      1008         MOV   M,A      ;IN THE STATUS BYTE
0500  0EFF    1009         MVI   C,OFFH   ;PAD IN 64 SPACES
0502  CD7103  1010         CALL  TPSTR    ;TO CLEAR INPUT LINE
0505  CD7A03  1011         CALL  ELCLR    ;CLEAR ERROR LINE
0508  218103  1012         LXI   H,381H   ;START O LINE 15
050B  11BF03  1013         LXI   D,3BFH   ;END OF LINE
050E  22F112  1014         SHLD  CCMIN
0511  2B      1015         DCX   H        ;SET CURSOR TO MIN-1
0512  22EF12  1016         SHLD  CKCRS
0515  22ED12  1017         SHLD  CIMAX    ;INIT MAX CHAR. POS
0518  EB      1018         XCHG
0519  22F312  1019         SHLD  CCMAX    ;SET MAX CURSOR
051C  0E1B    1020         MVI   C,'[' AND 3FH  ;BRACKET CHAR.
051E  CD3702  1021         CALL  IP1ST    ;STORE IT
0521  21A32F  1022         LXI   H,KTAB6  ;NEXT INPUT TABLE
0524  22FB12  1023         SHLD  CKTAB
0527  C3E002  1024         JMP   CRFDO    ;INSTALL CURSOR
             1025
             1026 ;****************************************************************
             1027 ;PROCESS RESET KEY
052A  3AEB12  1028  RESET: LDA   CTNO     ;GET CURRENT KS BIT
052D  47      1029         MOV   B,A      ;INTO B
052E  219C12  1030         LXI   H,ALERT  ;AND CHECK IF ANY ALERT IS ON THIS KEYSTATION
0531  11B512  1031         LXI   D,ALR14  ;LINE 14 OR LINE 16
0534  1A      1032         LDAX  D        ;FIRST GET LINE 14 FLAGS
0535  B6      1033         ORA   M        ;AND OR WITH LINE 16 FLAGS
0536  A0      1034         ANA   B        ;TEST JUST THE BIT FOR THIS KEYSTATION.
0537  CA5005  1035         JZ    RSET0    ;IF NO ALERT PRESENT, GO DO RESET
             1036 ; ELSE, CLEAR THE ALERT MESSAGE AREAS BY STORING 24 BLANKS TO LINE 14 ALERT
             1037 ; AREA AND BY RESTORING THE LINE 16 SYSTEM STATUS MESSAGE FROM ITS RAM BUFFER.
             1038 ; BUT FIRST, CLEAR THE ALERT FLAG BIT FOR THE KS IN BOTH FLAG BYTES.
053A  2F      1039         CMA            ;MASK ALL BUT THIS KEYSTATION
053B  4F      1040         MOV   C,A      ;( SAVE THE MASK )
053C  A6      1041         ANA   M        ;TO CLEAR LINE 16 ALERT FROM THIS KS
053D  77      1042         MOV   M,A      ;IN THE LINE 16 ALERT FLAGS BYTE
053E  1A      1043         LDAX  D        ;GET LINE #14 FLAGS
053F  A1      1044         ANA   C        ;AND MASK OFF THE FLAG BIT FOR THIS KS
0540  12      1045         STAX  D        ;IN THE LINE 14 ALERT FLAGS BYTE
0541  0ED7    1046         MVI   C,0BFH+24  ;UNPACK 24 BLANKS INTO THE
0543  116803  1047         LXI   D,368H   ;LINE 14 ALERT AREA
             1048         DGADD
0547  0E80    1050         MVI   C,DFSS16 ;RESTORE STATUS CODE
0549  11E703  1051         LXI   D,3E7H   ;LINE 16 SYS STATUS AREA
             1052         DGADD
054D  C33604  1054         JMP   KBEX1    ;SCRAM
             1055
0550  3AEC12  1056  RSET0: LDA   CTSTA
0553  1F      1057         RAR
0554  DA3604  1058         JC    KBEX1    ;F INHIBITED
0557  CD5D05  1059         CALL  REEST    ;DO RESET FUNCTION
055A  C3E002  1060         JMP   CRFDO    ;INSTALL CURSOR
             1061
             1062
             1063 ;****************************************************************
             1064 ;SUBROUTINE TO SET CURRENT TERMINAL IN RESET MODE
             1065 ;NOTE!! DOES NOT INSTALL CURSOR
055D  11FF12  1066  REEST: LXI   D,CTNAM
0560  210313  1067         LXI   H,CRNAM
0563  0E04    1068         MVI   C,4
             1069         GOMOVE         ;SAVE NAME TO CLEAR
0566  AF      1071         XRA   A
0567  32FF12  1072         STA   CTNAM    ;ZERO TERMINAL NAME
056A  212020  1073         LXI   H,2020H  ;BLANKS TO CKNAME
056D  22F712  1074         SHLD  CKNAM
0570  22F912  1075         SHLD  CKNAM+2
0573  3E21    1076         MVI   A,21H    ;RETRIEVE STATUS W. INHIBIT
0575  32EC12  1077         STA   CTSTA
0578  210713  1078         LXI   H,CSPFG  ;LOOK AT SPECIAL PROCESSING FLAG
057B  7E      1079         MOV   A,M
057C  A7      1080         ANA   A
057D  C28A05  1081         JNZ   REES1    ;GO DO SPECIAL PROCESSING IF FLAG IS SET
0580  3AD812  1082         LDA   UNUPD    ;ELSE, SEE IF RECEIVING AN UNSOLICITED UPDATE
0583  A7      1083         ANA   A
0584  CA9F05  1084         JZ    REES2    ;IF NOT, SKIP CLEARING OF VDUP BIT
0587  C39605  1085         JMP   REES3    ;ELSE, GO CLEAR BIT TO PREVENT FURTHUR TEXT STORES
             1086
058A  3600    1087  REES1: MVI   M,0      ;ELSE, CLEAR THE S. P. FLAG
058C  F4040D  1088         CP    TXABT    ;SEND AN ABORT IF IT WAS POSITIVE, AS
             1089                         ;THIS TERMINAL, ALONE, WAS RECEIVING A RESPONSE TO
             1090                         ;A REQUEST IT HAD ORIGINATED
             1091                         ;OTHERWISE, IF NEGATIVE, JUST CLEAR THE LINE INPUT
058F  AF      1091         XRA   A        ;STORAGE PARAMETERS TO STOP STORING LINE DATA TO
0590  328612  1092         STA   LTERM    ;THIS CRT -- PROBABLY DUE TO DATA REQUESTED BUT
0593  328A12  1093         STA   LERSP
```

```
LOC   OBJ         LINE          SOURCE STATEMENT 0596  3AEB12      1094 REES3    LDA    CTNO      ; RESPONSE NOT YET RECEIVED ( SEE LINE NAME DECODE)
0599  218F12      1095          LXI    H,VDUP    ; S F  FLAG COULD ALSO REMAIN SET NEGATIVE IF A
059C  2F          1096          CMA              ; TERMINAL ORIGINATES AN INSERT FROM A PAGE THAT
059D  A6          1097          ANA    M         ; IS ALSO ON DISPLAY ON ANOTHER SCREEN.
059E  77          1098          MOV    M,A       ; (TURNS RESPONSE INTO AN UNSOLIC. UPDATE)
059F  21F612      1099 REES2    LXI    H,CKNAM-1 ; CKNAME
05A2  22F512      1100          SHLD   CKPTR
05A5  3AEB12      1101          LDA    CTNO
05A8  47          1102          MOV    B,A
05A9  CDCB05      1103          CALL   SCLER     ; CLEAR THE SCREEN
05AC  210100      1104          LXI    H,1
05AF  22F112      1105          SHLD   CCMIN
05B2  2B          1106          DCX    H
05B3  22EF12      1107          SHLD   CKCRS
05B6  22ED12      1108          SHLD   CIMAX
05B9  210400      1109          LXI    H,4
05BC  22F312      1110          SHLD   CCMAX     ; SET MAX CURS ALLOWED
05BF  0E1B        1111          MVI    C,'[' AND 3FH
05C1  CD3702      1112          CALL   IP1ST     ; INSTALL BRACKET
05C4  21AF2F      1113          LXI    H,KTAB3   ; STORE TEXT OR RESET
05C7  22FB12      1114          SHLD   CKTAB
05CA  C9          1115          RET
                  1116
                  1117 ;****************************************************************
                  1118 ; STORE PAGE CLEAR TO CRT SPECIFIED IN B REG.
                  1119 ; ELIMINATES ALL PREVIOUSLY UNPROCESSED STORES TO
                  1120 ; THE SAME DISPLAY PRESENT AT THE TIME OF THE CLEAR
                  1121 ; CALL ONLY WHEN INTERRUPTS ARE DISABLED!!
                  1122 ; ALL REGISTERS EXCEPT B ALTERED
05CB  2AE211      1123 SCLER    LHLD   BRPTR     ; TEST CURRENT ENTRIES
05CE  EB          1124 SCLE1    XCHG
05CF  2AE011      1125          LHLD   BWPTR
05D2  EB          1126          XCHG
                  1127          COMPDH
05D4  CAEF05      1129          JZ     SCLE2     ; IF ALL DONE
05D7  23          1130          INX    H
05D8  23          1131          INX    H         ; POINT TO PAGE #
05D9  7E          1132          MOV    A,M
05DA  B8          1133          CMP    B         ; SAME DISP AS NEW CLEAR??
05DB  C2E005      1134          JNZ    SCLE3     ; IF NOT
05DE  3680        1135          MVI    M,80H     ; CLEAR PAGE IF YES
                  1136                           ; SO NO ACTION BY DISPLAY ROUTINE
05E0  23          1137 SCLE3    INX    H
05E1  23          1138          INX    H
05E2  11DF11      1139          LXI    D,CBEND
                  1140          COMPDH
05E6  DACE05      1142          JC     SCLE1
05E9  210010      1143          LXI    H,CBBEG
05EC  C3CE05      1144          JMP    SCLE1
05EF  110000      1145 SCLE2    LXI    D,0
05F2  0E8A        1146          MVI    C,DFSCLR  ; INSTALL PAGE ERASE
                  1147          DGADD
05F5  3AB512      1149 SCLE4    LDA    ALR14     ; ALERT 14 UP??
05F8  A0          1150          ANA    B
05F9  C8          1151          RZ               ; IF NOT, ALL DONE
05FA  116803      1152          LXI    D,368H    ; ELSE RESTORE TO SCREEN
05FD  0E83        1153          MVI    C,DFAL14  ; RESTORE CODE
                  1154          DGADD            ; DO IT AND LEAVE
0600  C9          1156          RET
                  1157
                  1158
                  1159 ;****************************************************************
                  1160 ; COMPARE CHAR. IN C TO POLL. CHAR. FOR UNIT
                  1161 ; PROCESS POLL IF RECEIVED OR ELSE EXIT TO LINE INT. XIT
0601  DBA2        1162 POLCK    IN     SLCT      ; READ POLL STRAPPING
0603  E607        1163          ANI    7         ; 3 BITS ONLY
0605  C608        1164          ADI    8         ; ADD OFFSET
0607  EA0C06      1165          JPE    POLC1     ; IF PARITY OK
060A  F680        1166          ORI    80H       ; MAKE IT EVEN
060C  B9          1167 POLC1    CMP    C
060D  CA2606      1168          JZ     POLOK     ; GO PROCESS A GOOD POLL TO THIS CONTROLLER
                  1169 ; ELSE, CHECK TO SEE IF THIS IS A VALID POLL TO ANY CONTROLLER
0610  79          1170          MOV    A,C       ; GET BACK THE CHARACTER
0611  E67F        1171          ANI    7FH       ; STRIP OFF THE PARITY BIT
0613  FE10        1172          CPI    10H       ; SEE IF ABOVE POLL CHARACTER RANGE
0615  D2B12C      1173          JNC    NCTRL     ; IF IT IS, IGNORE IT
0618  FE08        1174          CPI    8H        ; SEE IF BELOW RANGE
061A  DA890E      1175          JC     LIDL1     ; IF TOO SMALL, GO SET LINE IDLE
061D  216009      1176          LXI    H,TIME    ; ELSE, INIT. TIMEOUT TIMER
0620  22D412      1177          SHLD   LINTIM    ; ON INTERCEPTION OF ANY POLL CODE
0623  C3890E      1178          JMP    LIDL1     ; AND GO SET LINE IDLE ONCE AGAIN
                  1179
                  1180 ; GOOD POLL RECEIVED!
                  1181 ; FIRST RE-INITIALIZE THE TIMEOUT TIMER
0626  216009      1182 POLOK    LXI    H,TIME
0629  22D412      1183          SHLD   LINTIM    ; STORE THE TIME VALUE (# OF 60 CYCLE INTERRUPTS)
062C  CD2E0E      1184          CALL   CHKOPR    ; CHECK FOR ABORTED OPR OR OTHER REQUEST
062F  213E12      1185          LXI    H,TXBUF   ; CLEAR TRANSMIT BUFFER
0632  0E40        1186          MVI    C,64
0634  3E03        1187          MVI    A,ETX     ; FILL WITH ETX
0636  77          1188 POL1     MOV    M,A
0637  23          1189          INX    H
```

| LOC OBJ | LINE | SOURCE STATEMENT | | | |
|---|---|---|---|---|---|
| 0638 0D | 1190 | | DCR | C | |
| 0639 C23606 | 1191 | | JNZ | POL1 | |
| 063C AF | 1192 | | XRA | A | |
| 063D 32D012 | 1193 | | STA | LIMAX | ;CLEAR INSERT FLAG |
| 0640 32D812 | 1194 | | STA | UNUPD | ; AND THE UNSOLICITED UPDATE FLAG |
| 0643 118212 | 1195 | | LXI | D,LESCNM | ;DE -> ESCAPE NAME BUFFER |
| 0646 1A | 1196 | | LDAX | D | ; GET 1ST CHARACTER TO SEE IF BUFFER IN USE |
| 0647 A7 | 1197 | | ANA | A | |
| 0648 CA5306 | 1198 | | JZ | POL20 | ; NOT IN USE, DON'T GENERATE A LINE ESCAPE |
| 064B CDFD07 | 1199 | | CALL | NRTST | ; ELSE, SEE IF ESCAPE ALREADY SCHEDULED FROM A K/S |
| 064E CA5A07 | 1200 | | JZ | POL5 | ; NOPE, OK TO ESCAPE IT FROM HERE |
| 0651 AF | 1201 | | XRA | A | ; ELSE, WE SAFELY ASSUME IT WILL BE DONE FROM THE K/S |
| 0652 12 | 1202 | | STAX | D | ; SO WE CAN FREE THE ESCAPE NAME BUFFER |
| 0653 CDC907 | 1203 | POL20 | CALL | ARSRC | ;SEARCH FOR AUTO REQ. |
| 0656 D27A06 | 1204 | | JNC | POL22 | ;IF NONE FOUND |
| 0659 CD7607 | 1205 | | CALL | PRSET | ;SET UP PAGE REQ |
| 065C DA5306 | 1206 | | JC | POL20 | ;IF SATISFIED INTERNALLY |
| 065F 213A12 | 1207 | | LXI | H,TXNAM | |
| 0662 0E04 | 1208 | | MVI | C,4 | |
| | 1209 | | GOMOVE | | ;SET UP REG. NAME |
| 0665 3EFF | 1211 | | MVI | A,-1 | |
| 0667 323912 | 1212 | | STA | TBRDY | ;SET BUFFER READY FLAG |
| 066A 320713 | 1213 | | STA | CSPFG | ;SET SPEC. PROC. FLAG |
| 066D 3AEB12 | 1214 | | LDA | CTNO | |
| 0670 328612 | 1215 | | STA | LTERM | |
| 0673 CDEF07 | 1216 | | CALL | LKKBD | |
| | 1217 | | PACK | | |
| 0677 C30807 | 1219 | | JMP | POL6 | ;GO DO TRANSMIT |
| | 1220 | | | | |
| | 1221 | ;NO AUTO REQUEST OR CONTROLLER PAGE CLEAR | | | |
| 067A 21D112 | 1222 | POL22: | LXI | H,KBPRI | ;GET TOP PRIORITY TERM |
| 067D 7E | 1223 | | MOV | A,M | |
| 067E C38A06 | 1224 | | JMP | POL23 | |
| 0681 F1 | 1225 | POL2: | POP | PSW | |
| 0682 E1 | 1226 | | POP | H | |
| 0683 CD8B07 | 1227 | | CALL | RLTBIT | ;GET NEXT TERM # |
| 0686 BE | 1228 | | CMP | M | ;DONE? |
| 0687 CA4E07 | 1229 | | JZ | DONAK | ;IF YES, GO SEND NAK |
| 068A E5 | 1230 | POL23: | PUSH | H | |
| 068B F5 | 1231 | | PUSH | PSW | ;SAVE TERM # |
| | 1232 | | UNPACK | | ;UNPACK TERM DATA |
| 068D 110313 | 1234 | | LXI | D,CRNAM | ;PAGE TO ESCAPE? |
| 0690 1A | 1235 | | LDAX | D | |
| 0691 A7 | 1236 | | ANA | A | |
| 0692 CAA806 | 1237 | | JZ | POL10 | ;IF NOT |
| 0695 CD0308 | 1238 | | CALL | NMTST | ;PAGE ON DISPLAY AT CONTROLLER? |
| 0698 C2A506 | 1239 | | JNZ | POLRSS | ; IF YES, DON'T ISSUE PAGE ESCAPE |
| 069B CDFD07 | 1240 | | CALL | NRTST | ; ELSE, SEE IF SAME ESCAPE SCHEDULED FROM ANOTHER K/S |
| 069E 21EB12 | 1241 | | LXI | H,CTNO | ; POINT TO CURRENT K/S ID BIT |
| 06A1 BE | 1242 | | CMP | M | ; SEE IF ESCAPE REQUEST IS UNIQUE TO THIS K/S |
| 06A2 CAC706 | 1243 | | JZ | POL11 | ; YUP, GO ESCAPE THE PAGE |
| 06A5 AF | 1244 | POLRSS: | XRA | A | ; ELSE, CLEAR THE ESCAPE NAME BUFFER |
| 06A6 12 | 1245 | | STAX | D | |
| | 1246 | | PACK | | ;PACK TERM. DATA |
| 06A8 21EC12 | 1248 | POL10: | LXI | H,CTSTA | ;HERE IF NO PAGE CLEAR |
| 06AB 7E | 1249 | | MOV | A,M | |
| 06AC 17 | 1250 | | RAL | | |
| 06AD D28106 | 1251 | | JNC | POL2 | ;IF NO POLL REQ EITHER |
| 06B0 7E | 1252 | | MOV | A,M | |
| 06B1 E610 | 1253 | | ANI | 10H | ;INSERT? |
| 06B3 C22A07 | 1254 | | JNZ | POL4 | ;IF YES, GO DO IT |
| 06B6 CD7607 | 1255 | | CALL | PRSET | ;SET UP PAGE REQ |
| 06B9 DA8106 | 1256 | | JC | POL2 | ;IF SATISFIED INTERNALLY |
| 06BC 213A12 | 1257 | | LXI | H,TXNAM | ;SET UP FROM LINE |
| 06BF 3EFF | 1258 | | MVI | A,-1 | |
| 06C1 323912 | 1259 | | STA | TBRDY | |
| 06C4 C3EE06 | 1260 | | JMP | POL15 | |
| | 1261 | | | | |
| | 1262 | ;CLEAR A PAGE | | | |
| 06C7 213A12 | 1263 | POL11: | LXI | H,TXNAM | |
| 06CA 0E04 | 1264 | | MVI | C,4 | |
| 06CC D5 | 1265 | | PUSH | D | |
| | 1266 | | GOMOVE | | ;NAME TO TX BUFFER |
| 06CE 361B | 1268 | | MVI | M,1BH | ;AND ESCAPE CODE |
| 06D0 E1 | 1269 | | POP | H | ;POINT TO RESET NAME |
| 06D1 71 | 1270 | | MOV | M,C | ;ZERO IT |
| 06D2 3EFF | 1271 | | MVI | A,-1 | |
| 06D4 323912 | 1272 | | STA | TBRDY | ;SET XMIT BUFFER READY |
| 06D7 21EC12 | 1273 | | LXI | H,CTSTA | |
| 06DA 7E | 1274 | | MOV | A,M | |
| 06DB 17 | 1275 | | RAL | | ;POLL REQ.? |
| 06DC D22307 | 1276 | | JNC | POL12 | ;IF NOT, GO SENDCLEAR |
| 06DF 7E | 1277 | | MOV | A,M | |
| 06E0 E610 | 1278 | | ANI | 10H | ;INSERT? |
| 06E2 C22307 | 1279 | | JNZ | POL12 | ;IF YES, SAVE FOR LATER |
| 06E5 CD7607 | 1280 | | CALL | PRSET | ;SET UP FOR PAGE REQUEST |
| 06E8 DA2307 | 1281 | | JC | POL12 | ;IF SATISFIED INTERNALLY |
| 06EB 213F12 | 1282 | | LXI | H,TXBUF+1 | ;ELSE GET FROM LINE |
| 06EE 0E04 | 1283 | POL15: | MVI | C,4 | |
| | 1284 | | GOMOVE | | |
| 06F1 3AEB12 | 1286 | | LDA | CTNO | ;SET UP LTERM |
| 06F4 328612 | 1287 | | STA | LTERM | |

| LOC OBJ | LINE | SOURCE STATEMENT | | | |
|---|---|---|---|---|---|
| 06F7 CDEF07 | 1288 | | CALL | LKKBD | ;MASK KBD INTERRUPT |
| 06FA 0E54 | 1289 | | MVI | C,'T' | |
| 06FC CD3702 | 1290 | | CALL | IP1ST | ;FLASHING T |
| 06FF 3EFF | 1291 | | MVI | A,-1 | |
| 0701 320713 | 1292 | | STA | CSPFG | ;SET SPECIAL PROC. = - |
| | 1293 | POL14: | PACK | | |
| 0705 F1 | 1295 | | POP | PSW | ;CLEAN UP STACK |
| 0706 E1 | 1296 | | POP | H | |
| 0707 CD8807 | 1297 | | CALL | RLTBIT | ;TOP PRIOR TERM FOR NEXT POLL |
| 070A 77 | 1298 | | MOV | M,A | ;SAVE IT |
| | 1299 | ;FALL THROUGH TO START TRANSMISSION | | | |
| 070B 21462F | 1300 | POL6: | LXI | H,LTAB3 | ;MONITOR LINE FOR NAK |
| 070E 228B12 | 1301 | | SHLD | PLTAB | |
| 0711 213A12 | 1302 | | LXI | H,TXNAM | ;BUFFER START |
| 0714 223712 | 1303 | | SHLD | TXPTR | ;SET UP POINTER |
| 0717 21830D | 1304 | | LXI | H,OTAB1 | |
| 071A 228D12 | 1305 | POL7: | SHLD | OPTAB | ;SET UP OUTPUT STX |
| 071D CDE80C | 1306 | | CALL | TXINIT | ;INIT TRANSMISSION |
| 0720 C3080E | 1307 | | JMP | LIEX | ;AND BYE |
| | 1308 | | | | |
| | 1309 | | | | |
| 0723 AF | 1310 | POL12: | XRA | A | |
| 0724 328612 | 1311 | | STA | LTERM | ;SET NO RESPONSE FLAG |
| 0727 C30407 | 1312 | | JMP | POL14 | ;GO XMIT CLEAR MSG |
| | 1313 | | | | |
| | 1314 | ;DO AN INSERT | | | |
| 072A 3AEB12 | 1315 | POL4: | LDA | CTNO | |
| 072D 47 | 1316 | | MOV | B,A | |
| 072E 118103 | 1317 | | LXI | D,381H | ;INPUT LINE |
| 0731 0E84 | 1318 | | MVI | C,DFXMIT | ;XFER IT TO XMIT BUFFER |
| 0733 CD1C02 | 1319 | | CALL | HPSR | |
| 0736 AF | 1320 | | XRA | A | |
| 0737 323912 | 1321 | | STA | TBRDY | |
| | 1322 | ;SET UP END OF TYPED INSERT | | | |
| 073A 3AED12 | 1323 | | LDA | CIMAX | ;BOTTOM 8 BITS OF MAX. |
| 073D D680 | 1324 | | SUI | 80H | |
| 073F FA4507 | 1325 | | JM | POL41 | ;IF - |
| 0742 32D012 | 1326 | | STA | LIMAX | ;SET DISPLACEMENT TO ETX |
| 0745 11FF12 | 1327 | POL41: | LXI | D,CTNAM | ;MOVE PAGE NAME |
| 0748 213A12 | 1328 | | LXI | H,TXNAM | ;TO XMIT BUFFER |
| 074B C3EE06 | 1329 | | JMP | POL15 | |
| | 1330 | | | | |
| | 1331 | ;SEND NAK IN RESPONSE TO POLL | | | |
| 074E 214C2F | 1332 | DONAK: | LXI | H,LTAB0 | ;SET IDLE INPUT |
| 0751 228B12 | 1333 | DONK1: | SHLD | PLTAB | |
| 0754 21400D | 1334 | | LXI | H,OTAB6 | ;SET OUTPUT A NAK |
| 0757 C31A07 | 1335 | | JMP | POL7 | |
| | 1336 | ;HERE TO SEND PAGE CLEAR MSG. (ESCAPE THE PAGE) | | | |
| 075A 118212 | 1337 | POL5: | LXI | D,LESCNM | ;POINT TO NAME OF PAGE TO ESCAPE |
| 075D 213A12 | 1338 | | LXI | H,TXNAM | |
| 0760 0E04 | 1339 | | MVI | C,4 | |
| | 1340 | | GOMOVE | | |
| 0763 3E1B | 1342 | | MVI | A,1BH | ;ESCAPE CHAR. |
| 0765 323E12 | 1343 | | STA | TXBUF | ;INTO TXBUF |
| 0768 AF | 1344 | | XRA | A | |
| 0769 328612 | 1345 | | STA | LTERM | ;LINE TERM #=0 |
| 076C 328212 | 1346 | | STA | LESCNM | ;CLEAR LINE ESCAPE BUFFER |
| 076F 3D | 1347 | | DCR | A | |
| 0770 323912 | 1348 | | STA | TBRDY | ;SET BUFFER READY |
| 0773 C30B07 | 1349 | | JMP | POL6 | ;GO FINISH UP |
| | 1350 | | | | |
| | 1351 | | | | |
| | 1352 | ;**************************************************************** | | | |
| | 1353 | ;SUBROUTINE TO SET UP FOR A PAGE REQUEST | | | |
| 0776 11F712 | 1354 | PRSET: | LXI | D,CKNAM | |
| 0779 21FF12 | 1355 | | LXI | H,CTNAM | |
| 077C D5 | 1356 | | PUSH | D | |
| 077D 0E04 | 1357 | | MVI | C,4 | |
| | 1358 | | GOMOVE | | |
| 0780 D1 | 1360 | | POP | D | |
| 0781 CD0308 | 1361 | | CALL | NMTST | ;(RETURNS CARRY=0) |
| 0784 C8 | 1362 | | RZ | | ;IF LINE REQUEST NECESSARY |
| 0785 CD9207 | 1363 | | CALL | PTOP | ;ELSE, SET UP INTERNAL XFER |
| | 1364 | | PACK | | |
| 0789 37 | 1366 | | STC | | |
| 078A C9 | 1367 | | RET | | ;RETURN WITH CARRY SET |
| | 1368 | | | | |
| | 1369 | | | | |
| | 1370 | ;**************************************************************** | | | |
| | 1371 | ;ROTATE TERMINAL # BIT LEFT | | | |
| 078B 07 | 1372 | RLTBIT: | RLC | | |
| 078C E61F | 1373 | | ANI | ATMSK | |
| 078E C0 | 1374 | | RNZ | | |
| 078F 3E01 | 1375 | | MVI | A,1 | |
| 0791 C9 | 1376 | | RET | | |
| | 1377 | | | | |
| | 1378 | ;**************************************************************** | | | |
| | 1379 | ;SUBROUTINE TO SET UP A PAGE TO PAGE XFER | | | |
| | 1380 | ;CALL WITH A=SOURCE TERMINAL(S) | | | |
| | 1381 | ;CLEARS INPUT AND ERROR LINES AND SETS KBD IDLE | | | |
| 0792 57 | 1382 | PTOP: | MOV | D,A | ;SOURCE(S) |
| 0793 1E0E | 1383 | | MVI | E,14 | ;14 LINE XFER |

```
LOC  OBJ         LINE      SOURCE STATEMENT 0795 3AEB12      1384           LDA    CTNO
0798 47          1385           MOV    B,A         ;DESTINATION
0799 A2          1386           ANA    D           ;CHECK IF ONE OF THE SOURCES = DESTINATION. IF NOT,
079A CAA407      1387           JZ     PTOP1       ;GO DO PAGE TO PAGE XFER. ELSE, SOURCE = DESTINATION.
                 1388   .                          ;DON'T CAUSE XFER AND DON'T ISSUE PAGE ESCAPE, AS THIS
                 1389   .                          ;PROBABLY WAS CAUSED BY A OPR
079D AF          1390           XRA    A
079E 320313      1391           STA    CRNAM       ;DONT RESET IF ON DISP. HERE ALREADY
07A1 C3B607      1392           JMP    PTOP2
07A4 0E81        1393  PTOP1:   MVI    C,DFPTOP    ;PTOP CODE
                 1394           DGADD              ;STORE IT
07A7 3AEC12      1396           LDA    CTSTA
07AA 47          1397           MOV    B,A
07AB E640        1398           ANI    40H         ;AUTO REQ. ON?
07AD CAB607      1399           JZ     PTOP2       ;IF NOT
07B0 2F          1400           CMA
07B1 A0          1401           ANA    B           ;REMOVE AUTO REG
07B2 32EC12      1402           STA    CTSTA       ;FROM STATUS
07B5 C9          1403           RET                ;ALL ELSE THE SAME
                 1404
07B6 CD7A03      1405  PTOP2:   CALL   ELCLR       ;CLEAR ERROR LINE
07B9 0EFF        1406           MVI    C,0BFH+64   ;STORE 64 BLANKS
07BB CD7103      1407           CALL   TPSTR       ;TO CLEAR INPUT LINE
07BE AF          1408           XRA    A
07BF 32EC12      1409           STA    CTSTA       ;SET IDLE STATUS
07C2 21C12F      1410           LXI    H,KTAB4     ;SET KBD IDLE
07C5 22FB12      1411           SHLD   CKTAB
07C8 C9          1412           RET
                 1413
                 1414
                 1415  ;*********************************************************
                 1416  ;SEARCH TERMINAL TABLES FOR AUTO REQUEST
                 1417  ;IF AN AUTO REG. IS FOUND, TERMINAL DATA IS
                 1418  ;UNPACKED INTO COMMON AREA AND CARRY IS SET
07C9 111D00      1419  ARSRC:   LXI    D,EOC-CMBLK
07CC 210913      1420           LXI    H,TTO+1     ;1ST STATUS WORD
07CF 0601        1421           MVI    B,1         ;STARTING TERMINAL #
07D1 7E          1422  ARSR1:   MOV    A,M         ;GET STATUS
07D2 E640        1423           ANI    40H         ;AUTO REQ?
07D4 C2E107      1424           JNZ    ARSR2       ;IF YES
07D7 19          1425           DAD    D           ;BUMP TO NEXT BLOCK
07D8 78          1426           MOV    A,B
07D9 07          1427           RLC
07DA 47          1428           MOV    B,A
07DB E61F        1429           ANI    ATMSK
07DD C2D107      1430           JNZ    ARSR1       ;IF MORE TO TRY
07E0 C9          1431           RET                ;RETURN WITH CARRY=0 IF NONE FOUND
07E1 78          1432  ARSR2:   MOV    A,B         ;UNPACK TERM
                 1433           UNPACK
07E3 110000      1435           LXI    D,0
07E6 3AEB12      1436           LDA    CTNO
07E9 47          1437           MOV    B,A
07EA 0E54        1438           MVI    C,'T'       ;SET FLASHING T AT TOP OF PAGE
                 1439           DGADD
07ED 37          1441           STC
07EE C9          1442           RET                ;RETURN WITH CARRY ON
                 1443
                 1444
                 1445  ;*********************************************************
                 1446  ;SUBROUTINE TO LOCK KBD OF TERMINAL
                 1447  ;SPECIFIED IN THE A REG. SETS INTERRUPT MASK
                 1448  ;FOR THAT KBD. UNLOCKED WHEN BCC TMITTED
07EF FE01        1449  LKKBD:   CPI    1
07F1 C2F907      1450           JNZ    LKKB1
07F4 3E40        1451           MVI    A,40H
07F6 D391        1452           OUT    INT1I       ;SET MASK ON KBD#1
07F8 C9          1453           RET
07F9 0F          1454  LKKB1:   RRC                ;BIT TO CORRECT POS.
07FA D381        1455           OUT    INT2I       ;MASK KBD
07FC C9          1456           RET
                 1457
                 1458
                 1459  ;*********************************************************
                 1460  ;COMPARE NAME @DE TO ESCAPE NAME FIELDS IN EACH TERMINAL DATA BLOCK
                 1461  ;
                 1462  ;CALL WITH     DE -> NAME TO TEST
                 1463  ;
                 1464  ;RETURNS       A => I.D. BITS OF TERMINALS THAT MATCH
                 1465  .              FLAGS SET ON A
                 1466  ;              A,B,C,H,L MODIFIED
                 1467  ;              DE PRESERVED
                 1468
07FD 212013      1469  NRTST:   LXI    H,TTO+CRNAM-CMBLK   ;POINT TO ESCAPE NAME IN 1ST BLOCK
0800 C30608      1470           JMP    NMTSTO              ;AND CONTINUE USING COMMON CODE
                 1471  ;*********************************************************
                 1472  ;SUBROUTINE TO COMPARE NAME POINTED TO BY
                 1473  ;DE TO NAME OF EACH TERMINAL PAGE
                 1474  ;ON RETURN, A=PAGE BIT(S) WHICH MATCH
                 1475  ;IF ANY, AND ZERO FLAG SET IF NONE FOUND
                 1476  ;NOTE: DOES NOT DESTROY COMMON BLOCK
0803 211C13      1477  NMTST:   LXI    H,TTO+CTNAM-CMBLK   ;POINT TO FIRST NAME
0806 AF          1478  NMTSTO:  XRA    A
```

| LOC OBJ | LINE | | SOURCE STATEMENT | | |
|---|---|---|---|---|---|
| 0807 47 | 1479 | | MOV | B,A | ; B = MATCHING PAGE BITS (INITIALIZED = 0) |
| 0808 3C | 1480 | | INR | A | ;START AT TERM NO. 1 |
| 0809 D5 | 1481 | NMTO: | PUSH | D | ;SAVE POINTER TO SOURCE NAME |
| 080A E5 | 1482 | | PUSH | H | |
| 080B F5 | 1483 | | PUSH | PSW | |
| 080C 0E04 | 1484 | | MVI | C,4 | ;CHAR COUNT |
| 080E 1A | 1485 | NMT1: | LDAX | D | |
| 080F A7 | 1486 | | ANA | A | |
| 0810 CA2108 | 1487 | | JZ | NMT3 | ;IF NULL IN NAME |
| 0813 BE | 1488 | | CMP | M | ;MATCH? |
| 0814 C22108 | 1489 | | JNZ | NMT3 | ;IF NOT, GET OUT |
| 0817 23 | 1490 | | INX | H | |
| 0818 13 | 1491 | | INX | D | |
| 0819 0D | 1492 | | DCR | C | |
| 081A C20E08 | 1493 | | JNZ | NMT1 | ;UNTIL ALL 4 DONE |
| 081D F1 | 1494 | | POP | PSW | ;MATCH FOUND |
| 081E F5 | 1495 | | PUSH | PSW | |
| 081F B0 | 1496 | | ORA | B | ;TURN ON CRT # BIT |
| 0820 47 | 1497 | | MOV | B,A | |
| 0821 F1 | 1498 | NMT3: | POP | PSW | ;GET TERM # |
| 0822 E1 | 1499 | | POP | H | |
| 0823 111D00 | 1500 | | LXI | D,EOC-CMBLK | ;BLOCK LENGTH |
| 0826 19 | 1501 | | DAD | D | ;POINT TO NEXT BLOCK |
| 0827 D1 | 1502 | | POP | D | |
| 0828 07 | 1503 | | RLC | | ;NEXT TERM |
| 0829 E61F | 1504 | | ANI | ATMSK | |
| 082B C20908 | 1505 | | JNZ | NMTO | ;UNTIL ALL 5 DONE |
| 082E 78 | 1506 | | MOV | A,B | |
| 082F B0 | 1507 | | ORA | B | ;RESULT IN A, FLAGS SET ON RESULT |
| 0830 C9 | 1508 | | RET | | |
| | 1509 | | | | |
| | 1510 | | | | |
| | 1511 | ;*********************************************************** | | | |
| | 1512 | ;CHECK IF A-Z TYPED. IF NOT,EXIT IGNORING KEY | | | |
| | 1513 | ;ELSE,RESET SCREEN AND PUT CHAR AT TOP OF PAGE | | | |
| 0831 79 | 1514 | ALFA: | MOV | A,C | |
| 0832 FE41 | 1515 | | CPI | 'A' | |
| 0834 DA3604 | 1516 | | JC | KBEX1 | ;IF < A |
| 0837 FE5B | 1517 | | CPI | 'Z'+1 | |
| 0839 D23604 | 1518 | | JNC | KBEX1 | ;IF > Z |
| 083C C5 | 1519 | | PUSH | B | |
| 083D CD5D05 | 1520 | | CALL | REEST | ;RESET PAGE |
| 0840 C1 | 1521 | | POP | B | |
| 0841 21F712 | 1522 | | LXI | H,CKNAM | ;SET POINTERS TO |
| 0844 22F512 | 1523 | | SHLD | CKPTR | ;FIRST CHAR POSITION |
| 0847 210100 | 1524 | | LXI | H,1 | |
| 084A 22EF12 | 1525 | | SHLD | CKCRS | |
| 084D C34202 | 1526 | | JMP | KBCST | ;STORE CHAR AND GET OUT |
| | 1527 | | | | |
| | 1528 | | | | |
| | 1529 | ;*********************************************************** | | | |
| | 1530 | ;PAGE FORWARD ROUTINE | | | |
| | 1531 | ;VALID ONLY IF PAGE ON DISPLAY OR IF IT HAS BEEN | | | |
| | 1532 | ;REQUESTED FROM THE PDP-11 | | | |
| 0850 CDB608 | 1533 | FORWD: | CALL | FWBKT | ;SET UP NAME TO WORK ON |
| 0853 DA3604 | 1534 | | JC | KBEX1 | ;IF NOT POSSIBLE |
| 0856 21FB12 | 1535 | | LXI | H,CKNAM+4 | |
| 0859 0E04 | 1536 | | MVI | C,4 | |
| 085B 2B | 1537 | FORWO: | DCX | H | ;POINT TO LAST CHAR |
| 085C 7E | 1538 | | MOV | A,M | |
| 085D 3C | 1539 | | INR | A | ;BUMP BY 1 |
| 085E FE5B | 1540 | | CPI | 'Z'+1 | |
| 0860 DA6508 | 1541 | | JC | FORW1 | ;IF STILL IN RANGE |
| 0863 3E41 | 1542 | | MVI | A,'A' | |
| 0865 77 | 1543 | FORW1: | MOV | M,A | |
| 0866 DA6D08 | 1544 | | JC | FORW2 | ;IF NO WRAPAROUND |
| 0869 0D | 1545 | | DCR | C | |
| 086A C25B08 | 1546 | | JNZ | FORWO | ;IF MORE DIGITS |
| 086D 21F712 | 1547 | FORW2: | LXI | H,CKNAM | |
| 0870 22F512 | 1548 | | SHLD | CKPTR | ;IN CASE OF ERROR |
| 0873 110100 | 1549 | | LXI | D,1 | |
| 0876 3AEB12 | 1550 | | LDA | CTNO | |
| 0879 47 | 1551 | | MOV | B,A | |
| 087A 3E04 | 1552 | | MVI | A,4 | |
| 087C F5 | 1553 | FORW3: | PUSH | PSW | |
| 087D E5 | 1554 | | PUSH | H | ;MOVE NAME TO DISPLAY |
| 087E D5 | 1555 | | PUSH | D | |
| 087F 7E | 1556 | | MOV | A,M | |
| 0880 E63F | 1557 | | ANI | 3FH | ;STRIP TO 6 BITS |
| 0882 4F | 1558 | | MOV | C,A | |
| | 1559 | | DGADD | | |
| 0884 D1 | 1561 | | POP | D | |
| 0885 E1 | 1562 | | POP | H | |
| 0886 13 | 1563 | | INX | D | |
| 0887 23 | 1564 | | INX | H | |
| 0888 F1 | 1565 | | POP | PSW | |
| 0889 3D | 1566 | | DCR | A | |
| 088A C27C08 | 1567 | | JNZ | FORW3 | ;UNTIL ALL 4 MOVED |
| 088D 210100 | 1568 | | LXI | H,1 | |
| 0890 22EF12 | 1569 | | SHLD | CKCRS | ;SET CURSOR TO 1 |
| 0893 C31104 | 1570 | | JMP | KBTX1 | ;GO DO THE TXMIT |
| | 1571 | | | | |
| | 1572 | | | | |

```
LOC  OBJ        LINE           SOURCE STATEMENT
                1573 ;***********************************************************************
                1574 ;PAGE BACKWARD ROUTINE
0896 CDB608     1575 BAKWD:   CALL     FWBKT     ;SET UP NAME
0899 DA3604     1576          JC       KBEX1     ;IF NO GOOD
089C 21FB12     1577          LXI      H,CKNAM+4
089F 0E04       1578          MVI      C,4
08A1 2B         1579 BAKWO:   DCX      H
08A2 7E         1580          MOV      A,M
08A3 3D         1581          DCR      A
08A4 FE41       1582          CPI      'A'
08A6 D2AB08     1583          JNC      BAKW1
08A9 3E5A       1584          MVI      A,'Z'
08AB 77         1585 BAKW1:   MOV      M,A
08AC D26D08     1586          JNC      FORW2
08AF 0D         1587          DCR      C
08B0 C2A108     1588          JNZ      BAKWO
08B3 C36D08     1589          JMP      FORW2
                1590
                1591
                1592 ;***********************************************************************
                1593 ;SUBROUTINE TO FIND NAME TO INCR. OR DECR.
                1594 ;IF PAGE IS ON DISPLAY, WILL USE ITS NAME
                1595 ;OTHERWISE,IF CKNAM IS COMPLETE,WILL USE
                1596 ;THAT NAME. IF NEITHER IS OK, WILL RETURN WITH CARRY SET
                1597 ;PAGE IS CLEARED IF NAME IS GOOD AND NAME IS
                1598 ;RETURNED IN CKNAM
08B6 3AFF12     1599 FWBKT:   LDA      CTNAM
08B9 A7         1600          ANA      A         ;PAGE ON DISPLAY?
08BA C2DB08     1601          JNZ      FWBK3     ;IF YES, PROCESS NORMALLY
08BD 21F712     1602          LXI      H,CKNAM
08C0 0E04       1603          MVI      C,4       ;SEE IF CKNAM IS GOOD
08C2 7E         1604 FWBK1:   MOV      A,M
08C3 A7         1605          ANA      A
08C4 37         1606          STC
08C5 C8         1607          RZ                 ;IF NULL, NO GOOD
08C6 FE20       1608          CPI      20H       ;SPACE?
08C8 37         1609          STC
08C9 C8         1610          RZ                 ;IF YES, NO GOOD
08CA 23         1611          INX      H
08CB 0D         1612          DCR      C         ;COUNT 4 CHARS
08CC C2C208     1613          JNZ      FWBK1
08CF 3AEB12     1614          LDA      CTNO      ;WILL USE CKNAM
08D2 47         1615          MOV      B,A       ;CLEAR 20 SPACES ON LINE 2
08D3 0ED3       1616          MVI      C,0D3H
08D5 114000     1617          LXI      D,40H
                1618          DGADD
08D9 A7         1620          ANA      A         ;CLEAR CARRY
08DA C9         1621          RET
                1622
08DB CD5D05     1623 FWBK3:   CALL     REEST
08DE 110313     1624          LXI      D,CRNAM
08E1 21F712     1625          LXI      H,CKNAM
08E4 0E04       1626          MVI      C,4
                1627          GOMOVE
08E7 A7         1629          ANA      A         ;CLEAR CARRY
08E8 C9         1630          RET
                1631
                1632 ;***********************************************************************
                1633 ; "PRINT" KEY DEPRESSED IN RESET MODE -- CHECK IF PRINT MODE SWITCH
                1634 ;***********************************************************************
08E9 3AEB12     1635 ALPTST   LDA      CTNO      ;GET KEYSTATION BIT
08EC 3D         1636          DCR      A         ;TEST IF KEYBOARD #1
08ED C23604     1637          JNZ      KBEX1     ;IF NOT #1, JUST EXIT
08F0 DBC2       1638          IN       STRAPS    ;ELSE, CHECK CONFIGURATION STRAPS
08F2 E628       1639          ANI      28H       ;FOR MES312 SELECT AND PRINT ALERTS ENABLE
08F4 FE28       1640          CPI      28H       ;ARE BOTH ON ?
08F6 C23604     1641          JNZ      KBEX1     ;IF NOT, IGNORE THE COMMAND
08F9 3AEC12     1642          LDA      CTSTA     ;ELSE, ENSURE THAT THIS IS THE 1st KEY FOLLOWING RESET
08FC 1F         1643          RAR                ;BY CHECKING THE RESET INHIBIT BIT
08FD D23604     1644          JNC      KBEX1     ;IF NOT, IGNORE THE KEY.
                1645     ELSE, PRINT KEY IS VALID AT THIS TIME
0900 CD8C03     1646          CALL     RREST     ;RE-ALLOW THE RESET KEY
0903 21D92F     1647          LXI      H,KTAB9   ;AND SET KEYBOARD TABLE TO LOOK FOR REST OF SEQUENCE
0906 C33204     1648          JMP      KBXIT
                1649
                1650 ;***********************************************************************
                1651 ; "E" KEY DEPRESSED IN ALERTS PRINT ENABLE SEQUENCE
                1652 ;
                1653 ; ENABLE THE ALERTS LIST PRINT FACILITY IF THE PRINTER IS NOT BUSY
                1654 ;***********************************************************************
0909 3A9512     1655 ALENA:   LDA      PRNTQ     ;GET TOP OF PRINTER QUEUE
090C 21D612     1656          LXI      H,PRMODE  ;AND POINT TO PRINTER MODE BYTE
090F B6         1657          ORA      M         ;IF ALREADY PRINT ALERTS MODE OR PRINTER BUSY,
0910 C22209     1658          JNZ      SETRTR    ;THEN, TERMINATE THE ALERTS PRINT ENABLE SEQUENCE
0913 36FF       1659          MVI      M,-1      ;ELSE, SET THE PRINT ALERTS MODE.
0915 119013     1660 PASTAT:  LXI      D,TT4+CTNAM-CMBLK ;POINT TO ALERTS PAGE NAME
0918 CD0308     1661          CALL     NMTST     ;AND GET TERMINAL BITS THAT HAVE IT ON DISPLAY
091B 47         1662          MOV      B,A       ;PUT TERMINAL ID BITS IN B
091C 0EBB       1663          MVI      C,DFALST  ;SET DISPLAY ALERTS HEADER FUNCTION
091E 111300     1664          LXI      D,AHPOS   ;ADDRESS OF MAIN TITLE ON LINE #1
                1665          DGADD              ;UPDATE THE ALERTS HEADER AND 'PE' STATUS FIELDS
0922 21AF2F     1667 SETRTR:  LXI      H,KTAB3   ;RESTORE THE NORMAL RETRIEVE MODE TABLE
0925 C33204     1668          JMP      KBXIT     ;AND EXIT FROM INTERRUPT
```

| LOC OBJ | LINE | SOURCE STATEMENT | | |
|---|---|---|---|---|
| | 1669 | | | |
| | 1670 | ;************************************************************ | | |
| | 1671 | ; "D" KEY DEPRESSED IN ALERTS PRINT DISABLE SEQUENCE | | |
| | 1672 | ; | | |
| | 1673 | ; DISABLE THE FURTHUR PRINTING OF ALERTS MESSAGES AND REVERT BACK TO | | |
| | 1674 | ; NORMAL PRINT MODE | | |
| | 1675 | ;************************************************************ | | |
| 0928 21D612 | 1676 ALDIS: | LXI | H,PRMODE; | POINT TO CURRENT MODE |
| 092B 7E | 1677 | MOV | A,M | |
| 092C A7 | 1678 | ANA | A | ; TEST IT |
| 092D CA2209 | 1679 | JZ | SETRTR | ; IF ALREADY IN NORMAL MODE, IGNORE THE SEQUENCE. |
| 0930 3A9512 | 1680 | LDA | PRNTQ | ; ELSE, SEE IF BUSY PRINTING AN ALERT |
| 0933 E6F0 | 1681 | ANI | 0F0H | ; TEST THE IN PROGRESS MODE BITS |
| 0935 3EFE | 1682 | MVI | A,-2 | ; SET A FOR DEFER MODE |
| 0937 C23E09 | 1683 | JNZ | ALDIS2 | ; AND DEFER SHUTOFF IF BUSY PRINTING |
| 093A AF | 1684 | XRA | A | ; ELSE SET A = NORMAL MODE |
| 093B 329512 | 1685 | STA | PRNTQ | ; AND ALSO CLEAR THE PRINTER QUEUE |
| 093E 77 | 1686 ALDIS2: | MOV | M,A | ; STORE THE NEW PRINTER STATE |
| 093F C31509 | 1687 | JMP | PASTAT | ; AND GO DISPLAY IT |
| | 1688 | | | |
| | 1689 | ;************************************************************ | | |
| | 1690 | ;PRINTER INTERRUPT DRIVER | | |
| | 1691 | ;************************************************************ | | |
| 0942 CDEA01 | 1692 PRINT: | CALL | SAVES | ;SAVE MACH. STATUS |
| 0945 3AD612 | 1693 | LDA | PRMODE | ; CHECK PRINTER MODE |
| 0948 A7 | 1694 | ANA | A | ; ALERTS PRINT OR NORMAL PRINT |
| 0949 C2F709 | 1695 | JNZ | ALTPRT | ; GO TO ALERT PRINT ROUTINE IF MODE IS SET |
| | 1696 | | | |
| | 1697 | ; ELSE, PROCESS PRINTER INTERRUPT FOR NORMAL PAGE PRINT MODE | | |
| 094C 01EF11 | 1698 | LXI | B,PBRDY | ;GET RDY FLAG ADDR |
| 094F 113511 | 1699 | LXI | D,UDPRB | ;GET UPDATE STARTED FLAG ADDR |
| 0952 219512 | 1700 | LXI | H,PRNTQ | ;POINT TO TOP OF Q |
| 0955 3AED11 | 1701 | LDA | PCNFG | ;SEE IF LOCAL CANCEL |
| 0958 A7 | 1702 | ANA | A | |
| 0959 7E | 1703 | MOV | A,M | ;CURRENT TERM |
| 095A CA9604 | 1704 | JZ | PCAN1 | ;IF END OF PAGE |
| 095D A7 | 1705 | ANA | A | ;ELSE SEE IF ANOTHER PAGE |
| 095E FAB309 | 1706 | JM | PRNT1 | ;IF BRAND NEW PAGE |
| 0961 0A | 1707 | LDAX | B | ;CHECK BUFFER RDY |
| 0962 A7 | 1708 | ANA | A | |
| 0963 FA7409 | 1709 | JM | PSCAN | ;SCAN NEW LINE |
| 0966 C27909 | 1710 | JNZ | PCHAR | ;PRINT A CHAR |
| 0969 1A | 1711 | LDAX | D | ;ELSE, HAVE WE BEGUN YET? |
| 096A A7 | 1712 | ANA | A | |
| 096B CA8609 | 1713 | JZ | PLCHK | ;CHECK LINE COUNT IF NOT |
| 096E AF | 1714 FRNUL: | XRA | A | ; SET A = NULL TO OUTPUT AS FILLER |
| 096F D3E0 | 1715 PREND: | OUT | USR2D | ; OUTPUT THE CHARACTER IN A |
| 0971 C3080E | 1716 | JMP | LIEX | ; AND EXIT FROM THE INTERRUPT ROUTINE |
| | 1717 | | | |
| 0974 C5 | 1718 FSCAN: | PUSH | B | ;SAVE PTR TO READY FLAG |
| 0975 CDDD09 | 1719 | CALL | PBSCAN | ; SCAN PRINT BUFFER FOR TRAILING SPACES |
| 0978 C1 | 1720 | POP | B | |
| 0979 2AE911 | 1721 PCHAR: | LHLD | PRPTR | ;GET ADDRESS OF CURENT CHARACTER |
| 097C 7E | 1722 | MOV | A,M | ;GET CHARACTER POINTED AT |
| 097D 23 | 1723 | INX | H | ;BUMP CHAR. PTR |
| 097E 22E911 | 1724 | SHLD | PRPTR | ;RESTORE UPDATED POINTER |
| 0981 12 | 1725 | STAX | D | ;UPDATE STARTED FLAG |
| 0982 02 | 1726 | STAX | B | ;PRINTER BUFFER READY FLAG |
| 0983 C36F09 | 1727 | JMP | PREND | ;SEND THE CHARACTER, LEAVE |
| | 1728 | | | |
| 0986 3AEE11 | 1729 PLCHK: | LDA | PLCNT | ;GET LINE COUNT |
| 0989 3D | 1730 | DCR | A | ;DROP IT ONE |
| 098A 32EE11 | 1731 | STA | PLCNT | ;RESTORE UPDATED LINE COUNT |
| 098D 32ED11 | 1732 | STA | PCNFG | ;SET CANCELLED FLAG IF 0 |
| 0990 CA6F09 | 1733 | JZ | PREND | ;DO NULL OUTPUT AND LEAVE IF 0 |
| 0993 12 | 1734 | STAX | D | ;ELSE, SET UDPRB<>0 |
| 0994 AF | 1735 | XRA | A | ;ZERO IT |
| 0995 02 | 1736 | STAX | B | ;AND CLEAR PBRDY FLAG |
| 0996 2AEB11 | 1737 | LHLD | PRADD | ;GET CURRENT PAGEADDRESS |
| 0999 EB | 1738 | XCHG | | ;MOVE TO D-E |
| 099A 214000 | 1739 | LXI | H,64 | ;LINE LENGTH |
| 099D 19 | 1740 | DAD | D | |
| 099E 22EB11 | 1741 | SHLD | PRADD | ;FOR NEXT TIME |
| 09A1 3A9512 | 1742 | LDA | PRNTQ | ;GET PAGE TO PRINT |
| 09A4 47 | 1743 | MOV | B,A | ;INTO B |
| 09A5 0E82 | 1744 | MVI | C,DFXPRT; | FUNCTION CODE IN C |
| 09A7 CD1C02 | 1745 | CALL | HPSR | ; QUEUE HIGH PRIORITY FILL OF PRINT BUFFER |
| 09AA 21F211 | 1746 | LXI | H,PRBUF | ;START OF BUFFER |
| 09AD 22E911 | 1747 | SHLD | PRPTR | ;SET PTR TO START |
| 09B0 C36E09 | 1748 | JMP | PRNUL | ;NULL AND GO |
| | 1749 | | | |
| 09B3 E61F | 1750 PRNT1: | ANI | ATMSK | ;STRIP OFF NEW PAGE BIT |
| 09B5 77 | 1751 | MOV | M,A | |
| 09B6 210000 | 1752 | LXI | H,0 | ;POINT TO TOP OF PAGE |
| 09B9 22EB11 | 1753 | SHLD | PRADD | |
| 09BC 21F211 | 1754 | LXI | H,PRBUF | |
| 09BF 22E911 | 1755 | SHLD | PRPTR | |
| 09C2 360D | 1756 | MVI | M,0DH | ;CR |
| 09C4 23 | 1757 | INX | H | |
| 09C5 3E0A | 1758 | MVI | A,0AH | ;3 LF'S |
| 09C7 77 | 1759 | MOV | M,A | |
| 09C8 23 | 1760 | INX | H | |

```
LOC   OBJ         LINE            SOURCE STATEMENT

09C9  77          1761            MOV     M,A
09CA  23          1762            INX     H
09CB  77          1763            MOV     M,A
09CC  23          1764            INX     H
09CD  3600        1765            MVI     M,O       ;NULL
09CF  3E11        1766            MVI     A,17      ;17 LINES
09D1  32EE11      1767            STA     PLCNT     ;SET LINE COUNT
09D4  32ED11      1768            STA     PCNFG     ;CLEAR CANCEL FLAG
09D7  32EF11      1769            STA     PBRDY     ;SET READY FLAG
09DA  C36E09      1770            JMP     PRNUL     ;SEND NULL AND GO
                  1771
                  1772
                  1773  ;***********************************************************************
                  1774  ; SCAN PRINTER LINE BUFFER TO ELIMINATE TRAILING SPACES
                  1775  ;
                  1776  ; SCANS THE BUFFER FROM THE TAIL END AND INSERTS A CR,LF,NULL WHERE
                  1777  ; APPROPRIATE TO DELETE TRAILING SPACES.
                  1778  ;
                  1779  ; CALL WITH:     DON'T CARE
                  1780  ;
                  1781  ; RETURNS        B,H,L,A MODIFIED
                  1782  ;                HL => NULL CHARACTER JUST INSTALLED
                  1783  ;***********************************************************************
09DD  213112      1784  PBSCAN:  LXI     H,PBFEND-1  ;END OF PRBUF
09E0  0640        1785           MVI     B,64        ;64 CHARS MAX
09E2  7E          1786  PSCA1:   MOV     A,M
09E3  FE20        1787           CPI     ' '         ;SPACE?
09E5  C2ED09      1788           JNZ     PSCA2       ;IF NOT
09E8  2B          1789           DCX     H
09E9  05          1790           DCR     B           ;COUNT
09EA  C2E209      1791           JNZ     PSCA1       ;IF MORE
09ED  23          1792  PSCA2:   INX     H
09EE  360D        1793           MVI     M,0DH       ;CR
09F0  23          1794           INX     H
09F1  360A        1795           MVI     M,0AH       ;LF
09F3  23          1796           INX     H
09F4  3600        1797           MVI     M,0         ;NULL
09F6  C9          1798           RET                 ;RETURN TO CALLER
                  1799
                  1800  ;***********************************************************************
                  1801  ; ALERTS MODE PRINTER INTERRUPT ROUTINE
                  1802  ;***********************************************************************
09F7  219512      1803  ALTPRT:  LXI     H,PRNTQ     ;POINT TO PRINTER QUEUE BYTE
09FA  7E          1804           MOV     A,M
09FB  E6CF        1805           ANI     0CFH        ;AND SEE IF ANYTHING IS SCHEDULED
09FD  CA630A      1806           JZ      ALTPOF      ;IF NOT, GO TURN OFF PRINTER UART
0A00  FA490A      1807           JM      ALTPNX      ;ELSE, IF PRINTING (BIT #7), GO SEND NEXT CHARACTER
0A03  AF          1808           XRA     A           ;ELSE, OUTPUT A NULL AS FILLER
0A04  D3E0        1809           OUT     USR2D       ;TO THE PRINTER DATA PORT
0A06  7E          1810           MOV     A,M         ;RE- LOAD THE QUEUE BYTE
0A07  17          1811           RAL                 ;AND PUT BIT #6 INTO CARRY
0A08  17          1812           RAL
0A09  DA2B0A      1813           JC      ALTPWT      ;IF BIT #6 SET, GO WAIT TIL PRINT BUFFER FILLED
0A0C  7E          1814           MOV     A,M         ;ELSE, IT MUST BE TIME TO START A NEW ALERT LINE
0A0D  E60F        1815           ANI     0FH         ;GET ALERT LINE #
0A0F  5F          1816           MOV     E,A         ;AND SAVE IN E
0A10  3D          1817           DCR     A           ;UPDATE THE PRINT QUEUE
0A11  F640        1818           ORI     40H         ;WITH BIT 6 SET TO FLAG WAIT FOR BUFFER FILL
0A13  77          1819           MOV     M,A
0A14  AF          1820           XRA     A
0A15  32EF11      1821           STA     PBRDY       ;SET BUFFER READY = FALSE
0A18  57          1822           MOV     D,A         ;AND DE = ALERT # TO PRINT
0A19  EB          1823           XCHG                ;SET HL = ALERT #
0A1A  2C          1824           INR     L
0A1B  2C          1825           INR     L           ;HL = ALERT # + 2
0A1C  29          1826           DAD     H           ;*2
0A1D  29          1827           DAD     H           ;*4
0A1E  29          1828           DAD     H           ;*8
0A1F  29          1829           DAD     H           ;*16
0A20  29          1830           DAD     H           ;*32
0A21  29          1831           DAD     H           ;*64 = SOURCE ADDRESS OF TEXT
0A22  EB          1832           XCHG                ;DE = SOURCE ADDRESS
0A23  0610        1833           MVI     B,10H       ;B = TERMINAL #5 = SOURCE
0A25  0E82        1834           MVI     C,DFXPRT    ;C = FILL PRINT BUFFER FUNCTION
                  1835                   QGADD       ;QUEUE THE BUFFER FILL
0A28  C3080E      1837           JMP     LIEX        ;AND EXIT FROM THE INTERRUPT
                  1838
                  1839  ; WAITING FOR PRINT BUFFER TO BE FILLED UP ( BY DISPLAY ROUTINE)
0A2B  3AEF11      1840  ALTPWT:  LDA     PBRDY       ;CHECK IF PRINT BUFFER READY YET
0A2E  A7          1841           ANA     A
0A2F  CA080E      1842           JZ      LIEX        ;IF NOT, EXIT AND TRY AGAIN LATER
0A32  7E          1843           MOV     A,M         ;ELSE, UPDATE FUNCTION Q BY
0A33  E60F        1844           ANI     0FH
0A35  F680        1845           ORI     80H         ;SETTING BIT #7 (OUTPUT IN PROGRESS)
0A37  77          1846           MOV     M,A
0A38  CDDD09      1847           CALL    PBSCAN      ;ELSE, SCAN LINE BUFFER FOR TRAILING SPACES
0A3B  21F011      1848           LXI     H,PBFSTR    ;POINT TO START OF PRINT BUFFER -2
0A3E  22E911      1849           SHLD    PRPTR       ;INIT POINTER INTO THE BUFFER
0A41  360D        1850           MVI     M,0DH       ;STORE A CARRIAGE RETURN
0A43  23          1851           INX     H
0A44  360A        1852           MVI     M,0AH       ;AND A LINE FEED AT THE START OF THE LINE
0A46  C3080E      1853           JMP     LIEX        ;AND EXIT FROM INTERRUPT
                  1854
```

| LOC OBJ | LINE | SOURCE STATEMENT | | | |
|---|---|---|---|---|---|
| | 1855 | ; PRINTING FROM THE PRINT BUFFER | | | |
| 0A49 2AE911 | 1856 ALTPNX: | LHLD | PRPTR | ; GET POINTER INTO PRINT BUFFER | |
| 0A4C 7E | 1857 | MOV | A,M | ; AND LOAD THE NEXT CHARACTER | |
| 0A4D 23 | 1858 | INX | H | | |
| 0A4E 22E911 | 1859 | SHLD | PRPTR | ; AND UPDATE THE BUFFER POINTER | |
| 0A51 D3E0 | 1860 | OUT | USR2D | ; SEND THE CHARACTER TO THE PRINTER | |
| 0A53 A7 | 1861 | ANA | A | ; AND TEST IF IT WAS A NULL | |
| 0A54 C2080E | 1862 | JNZ | LIEX | ; IF NOT, JUST EXIT FROM THE INTERRUPT | |
| 0A57 219512 | 1863 | LXI | H,PRNTQ | ; ELSE, UPDATE THE PRINT Q | |
| 0A5A 7E | 1864 | MOV | A,M | | |
| 0A5B E60F | 1865 | ANI | 0FH | ; TO CLEAR BIT #7 | |
| 0A5D F620 | 1866 | ORI | 20H | ; AND SET BIT #5 TO PREVENT PREMATURE TURNOFF OF UART | |
| 0A5F 77 | 1867 | MOV | M,A | | |
| 0A60 C3080E | 1868 | JMP | LIEX | ; AND EXIT FROM INTERRUPT | |
| | 1869 | | | | |
| | 1870 | ; TURN OFF THE PRINTER UART AND CLEAR THE PRINT QUEUE BYTE | | | |
| 0A63 D3E1 | 1871 ALTPOF: | OUT | USR2C | ; SET PRINTER UART = OFF | |
| 0A65 77 | 1872 | MOV | M,A | ; SET PRINT QUEUE BYTE = 0 | |
| 0A66 21D612 | 1873 | LXI | H,PRMODE | ; POINT TO MODE | |
| 0A69 7E | 1874 | MOV | A,M | ; AND LOAD IT | |
| 0A6A 3C | 1875 | INR | A | ; SEE IF IT WAS -1 | |
| 0A6B CA080E | 1876 | JZ | LIEX | ; IF YES, JUST EXIT FROM INTERRUPT | |
| 0A6E 3600 | 1877 | MVI | M,0 | ; ELSE, IT MUST BE A DEFERRED TURN OFF OF ALERTS | |
| | 1878 | | | ; PRINT MODE. -- CAN NOW DO IT | |
| 0A70 C3080E | 1879 | JMP | LIEX | ; AND EXIT FROM THE INTERRUPT | |
| | 1880 | | | | |
| | 1881 | ;************************************************************** | | | |
| | 1882 | ; DISPLAY MEMORY AVAILABLE INTERRUPT ROUTINE (STA START) | | | |
| | 1883 | ;************************************************************** | | | |
| 0A73 CDEA01 | 1884 DSPLA: | CALL | SAVES | ; SAVE STATUS | |
| 0A76 CD560D | 1885 | CALL | TURNOF | ; CHECK MODEM TURNOFF | |
| 0A79 3E20 | 1886 | MVI | A,20H | | |
| 0A7B D390 | 1887 | OUT | INT1C | ; CLEAR INTERRUPT | |
| 0A7D 3AE611 | 1888 | LDA | DSPND | ; CHECK SUSPEND FLAG | |
| 0A80 A7 | 1889 | ANA | A | ; SET FLAGS | |
| 0A81 CA8B0A | 1890 | JZ | DSCK1 | ; CAN START INTERRUPT ROUTINE IF ITS NOT SUSPENDED | |
| 0A84 AF | 1891 | XRA | A | ; ELSE, CLEAR THE SUSPEND AND EXIT | |
| 0A85 32E611 | 1892 | STA | DSPND | ; CLEAR SUSPEND FLAG | |
| 0A88 C30C0E | 1893 | JMP | LEXT2 | ; RESTORE ALL AND GO | |
| | 1894 | | | | |
| 0A8B F3 | 1895 DSCK1: | DI | | | |
| 0A8C 2AE211 | 1896 | LHLD | BRPTR | ; GET BUFFER POINTER | |
| 0A8F EB | 1897 | XCHG | | ; QUICK WAY TO BE | |
| 0A90 21DF11 | 1898 | LXI | H,CBEND | ; GET EOB POINTER | |
| | 1899 | COMPDH | | ; COMPARE THEM | |
| 0A94 2AE011 | 1901 | LHLD | BWPTR | ; MEANTIME, GET SOB POINTER | |
| | 1902 | | | ; (START OF BUFFER) | |
| 0A97 D29D0A | 1903 | JNC | DSCK2 | ; NC=NOT EOB, DONT INIT | |
| 0A9A 110010 | 1904 | LXI | D,CBBEG | ; ELSE RPTR=SOB POINTER | |
| | 1905 DSCK2: | COMPDH | | ; ANYTHING TO DO? | |
| 0A9E C2A80A | 1907 | JNZ | DSBLK | ; YUP, GO DO A BLOCK | |
| 0AA1 AF | 1908 | XRA | A | ; ZAR | |
| 0AA2 32E711 | 1909 | STA | DSPFG | ; CLEAR OUTPUT FLAG | |
| 0AA5 C30C0E | 1910 | JMP | LEXT2 | ; EXIT FROM THE INTERRUPT ROUTINE | |
| | 1911 | | | | |
| | 1912 | ; PROCESS THE NEXT BLOCK IN THE CONTROL BUFFER | | | |
| 0AA8 EB | 1913 DSBLK: | XCHG | | | |
| 0AA9 4E | 1914 | MOV | C,M | ; GET LO-ORDER BYTE IN C | |
| 0AAA 23 | 1915 | INX | H | | |
| 0AAB 46 | 1916 | MOV | B,M | ; GET HI-ORDER 25 CENTS IN B | |
| 0AAC 23 | 1917 | INX | H | | |
| 0AAD 7E | 1918 | MOV | A,M | ; PAGES REQUESTED INTO A | |
| 0AAE 32E711 | 1919 | STA | DSPFG | ; SET BUSY FLAG | |
| 0AB1 23 | 1920 | INX | H | | |
| 0AB2 7E | 1921 | MOV | A,M | ; CHAR OR FUNCTION | |
| 0AB3 32E811 | 1922 | STA | DSCHR | ; SAVE IT TOO | |
| 0AB6 23 | 1923 | INX | H | ; BUMP H-L TO NEXT BLOCK | |
| 0AB7 22E211 | 1924 | SHLD | BRPTR | ; AND SAVE IT | |
| 0ABA FB | 1925 | EI | | ; TURN ON INTERRUPTS | |
| 0ABB 110010 | 1926 | LXI | D,1000H | ; START WITH CRT #1 | |
| | 1927 | ; CRT PAGE # OFFSET GENERATOR | | | |
| | 1928 | ; B-C CONTAINS 10 LS BITS OF ADDRESS | | | |
| | 1929 | ; D-E CONTAINS CURRENT PAGE OFFSET | | | |
| | 1930 | ; H-L CONTAINS INSTANTANEOUS ADDRESS POINTER | | | |
| 0ABE 3E04 | 1931 DSLP1: | MVI | A,04H | ; BUMP TO NEXT PAGE | |
| 0AC0 82 | 1932 | ADD | D | ; OFFSET BIAS IN A&E | |
| 0AC1 57 | 1933 | MOV | D,A | ; RESTORE TO D AND E | |
| 0AC2 3AE711 | 1934 | LDA | DSPFG | ; GET REMAINING PAGES | |
| 0AC5 E61F | 1935 | ANI | ATMSK | ; MASK ALL TERMS | |
| 0AC7 CA8B0A | 1936 | JZ | DSCK1 | ; GO CHECK IF MORE BLOCKS IF 0 | |
| 0ACA 0F | 1937 | RRC | | ; ELSE CHECK IF MORE PAGES | |
| 0ACB 32E711 | 1938 | STA | DSPFG | ; FLAG STILL NON-ZERO, CHECKPAGE | |
| 0ACE D2BE0A | 1939 | JNC | DSLP1 | ; CHECK NEXT CRT IF NOT THIS ONE | |
| | 1940 | ; ELSE, GENERATE PAGE AND LOCATION IN PAGE ADDRESS | | | |
| 0AD1 60 | 1941 | MOV | H,B | | |
| 0AD2 69 | 1942 | MOV | L,C | ; SET HL = 10 BIT ADDRESS (POS. ON SCREEN) | |
| 0AD3 19 | 1943 | DAD | D | ; ADD PAGE STARTING ADDRESS | |
| 0AD4 3AE811 | 1944 | LDA | DSCHR | ; CHECK FUNCTION OR CHAR | |
| 0AD7 A7 | 1945 | ANA | A | ; SET FLAGS ON FUNCTION | |
| 0AD8 FAE20A | 1946 | JM | DSFC0 | ; CHECK FUNCTION IF NEGATIVE | |
| 0ADB CC620B | 1947 | CZ | DSTRP | ; STRIP CURSOR IF FUNC. 0 | |
| 0ADE 77 | 1948 | MOV | M,A | ; ELSE OUTPUT CHAR | |
| 0ADF C3BE0A | 1949 | JMP | DSLP1 | ; REPEAT FOR OTHER CRT'S | |

```
LOC  OBJ        LINE       SOURCE STATEMENT 1950
                1951 ;************************************************************************
                1952 ; DECODE A FUNCTION CODE IN A (OTHER THAN FUNCTION 0)
                1953 ;************************************************************************
OAE2 D5         1954 DSFCO:  PUSH    D         ; SAVE DE
OAE3 C5         1955          PUSH    B         ; AND BC ON THE STACK
OAE4 FECO       1956          CPI     OCOH      ; CHECK THE FUNCTION CODE
OAE6 D21COB     1957          JNC     DSFUNP    ; GO UNPACK SPACES IF IN RANGE OCOH - OFFH
                1958
                1959 ; IF NOT UNPACK SPACE CODE, THIS IS A DISPLAY FUNCTION.
                1960 ; CONTROL IS TRANSFERRED TO THE APPROPRIATE PROCESSING BASED ON THE LS NIBBLE
                1961 ; IN A AND THE JUMP TABLE 'JTAB8'.
                1962 ; NOTE: FUNCTION CODES CAN BE EXPANDED HERE FOR FUTURE USE.
                1963 ; NOTE: FUNCTIONS WILL BE ENTERED WITH BC, DE, HL INTACT AND BC AND DE ALSO
                1964 ;       ON THE STACK.
                1965
OAE9 E5         1966          PUSH    H         ; SAVE HL TEMPORARILY
OAEA 21FCOA     1967          LXI     H,JTAB8   ; POINT TO START OF JUMP TABLE
OAED E60F       1968          ANI     OFH       ; USE LS NIBBLE OF FUNCTION CODE
OAEF 17         1969          RAL               ; TO CALCULATE WORD DISPLACEMENT INTO TABLE
OAF0 85         1970          ADD     L
OAF1 6F         1971          MOV     L,A
OAF2 7C         1972          MOV     A,H
OAF3 CE00       1973          ACI     0
OAF5 67         1974          MOV     H,A       ; HL -> VECTOR TO THE SELECTED FUNCTION
OAF6 7E         1975          MOV     A,M       ; LOAD THE VECTOR
OAF7 23         1976          INX     H
OAF8 66         1977          MOV     H,M
OAF9 6F         1978          MOV     L,A       ; HL = PROCESSING ADDRESS
OAFA E3         1979          XTHL              ; PUT ADDRESS ON STACK AND SWAP BACK HL CONTENTS
OAFB C9         1980          RET               ; GO THERE WITH A RETURN INSTRUCTION
                1981
                1982 ;************************************************************************
                1983 ; JUMP TABLE FOR FUNCTIONS 80H - 8FH
                1984 ;************************************************************************
OAFC AB0B       1985 JTAB8:  DW      DSFRS     ; 80H -- RESTORE SYSTEM STATUS MESSAGE
OAFE 080C       1986          DW      DSFPP     ; 81H -- PAGE TO PAGE TRANSFER
OB00 930B       1987          DW      DSFCG     ; 82H -- FILL PRINTER LINE BUFFER
OB02 A20B       1988          DW      DSFRA     ; 83H -- LINE 14 ALERT RESTORE
OB04 6A0B       1989          DW      DSFRX     ; 84H -- FILL TXMITTER LINE BUFFER
OB06 280C       1990          DW      DSBLRP    ; 85H -- REPLACE BLINKING UPDATE FIELD WITH NEW ONE
OB08 410B       1991          DW      DSPPB     ; 86H -- NOP, RESERVED
OB0A 410B       1992          DW      DSPPB     ; 87H -- NOP, RESERVED
OB0C 460B       1993          DW      DSFBKS    ; 88H -- CURSOR BACK ONE POSITION
OB0E 4E0B       1994          DW      DSFFWS    ; 89H -- CURSOR FORWARD ONE POSITION
OB10 290B       1995          DW      DSFC2     ; 8AH -- SCREEN CLEAR
OB12 B30B       1996          DW      DSAHDR    ; 8BH -- INSTALL ALERTS LIST HEADER
OB14 F00B       1997          DW      DSFROL    ; 8CH -- ROLL DOWN THE PAGE
OB16 410B       1998          DW      DSPPB     ; 8DH -- SPARE
OB1B 410B       1999          DW      DSPPB     ; 8EH -- SPARE
OB1A 410B       2000          DW      DSPPB     ; 8FH -- SPARE
                2001
                2002 ;************************************************************************
                2003 ; PROCESS CODE OCOH - OFFH. THE UNPACK SPACES FUNCTION
OB1C 1620       2004 DSFUNP: MVI     D,        ; SET D = ASCII SPACE
OB1E D6BF       2005          SUI     OBFH      ; CALCULATE SPACE COUNT TO UNPACK
OB20 72         2006 DSFC1:  MOV     M,D       ; STORE A SPACE
OB21 23         2007          INX     H         ; POINT TO NEXT LOC.
OB22 3D         2008          DCR     A         ; COUNT DOWN
OB23 C2209B     2009          JNZ     DSFC1     ; LOOP TIL DONE
OB26 C3410B     2010          JMP     DSPPB     ; GO RESTORE REGISTERS AND LOOK FOR MORE TO DO
                2011
                2012 ;************************************************************************
                2013 ; PROCESS CODE 8AH -- DO A SCREEN CLEAR (999 CHARACTERS + LAST POS.)
                2014 ;                     (TOP OF SCREEN THRU LINE 16 ERROR FIELD)
OB29 D5         2015 DSFC2:  PUSH    D         ; SAVE ADDRESS OF SCREEN BASE
OB2A 1620       2016          MVI     D,        ; SET D = ASCII SPACE
OB2C 01E703     2017          LXI     B,999     ; SET BC = FULL SCREEN CLEAR COUNT (999 CHARACTERS)
OB2F 72         2018 DSF2L:  MOV     M,D       ; STORE A BLANK
OB30 23         2019          INX     H
OB31 0B         2020          DCX     B         ; COUNT IT
OB32 78         2021          MOV     A,B
OB33 B1         2022          ORA     C         ; DONE?
OB34 C22F0B     2023          JNZ     DSF2L     ; IF NOT
OB37 2EFF       2024          MVI     L,-1      ; ADDRESS THE LAST LOCATION ON THE SCREEN
OB39 72         2025          MOV     M,D       ; AND CLEAR IT TOO
                2026 ; NOW, CLEAR OUT THE BLINK TABLE ENTRY FOR THIS KEYSTATION
OB3A D1         2027          POP     D         ; RESTORE ADDRESS OF SCREEN BASE
OB3B CD6A0C     2028          CALL    BKTADR    ; AND COMPUTE ADDRESS OF BLINK TABLE ENTRY
OB3E 73         2029          MOV     M,E       ; NOW ZERO THE ENTRY FOR THIS KEYSTATION
OB3F 23         2030          INX     H         ; NOTE THAT E = 0 AT THIS POINT
OB40 73         2031          MOV     M,E
                2032 ;************************************************************************
                2033 ; EXIT FROM PROCESSING A DISPLAY FUNCTION FOR ONE SCREEN
                2034 ;************************************************************************
OB41 C1         2035 DSPPB:  POP     B         ; RESTORE REGISTERS BC
OB42 D1         2036 DSFND:  POP     D         ; RESTORE REGISTERS DE
OB43 C3BE0A     2037          JMP     DSLP1     ; GO CHECK FOR MORE TO DO
                2038
                2039 ;************************************************************************
                2040 ; PROCESS CODE 88H -- MOVE CURSOR BACK ONE POSITION
OB46 CD620B     2041 DSFBKS: CALL    DSTRP     ; STRIP CURSOR OFF CURRENT CHARACTER POSITION
```

| LOC | OBJ | LINE | | | SOURCE STATEMENT | |
|---|---|---|---|---|---|---|
| 0B49 | 77 | 2042 | | MOV | M,A | ; STORE IT BACK |
| 0B4A | 2B | 2043 | | DCX | H | ; PREPARE FOR BACK ARROW |
| 0B4B | C3530B | 2044 | | JMP | DSFC4 | ; GO TO COMMON CURSOR MOVE CODE |
| | | 2045 | | | | |
| | | 2046 | ;*********************************************************************** | | | |
| | | 2047 | ; PROCESS CODE 89H -- MOVE CURSOR FORWARD ONE POSITION | | | |
| 0B4E | CD620B | 2048 | DSFFWS | CALL | DSTRP | ; STRIP CURSOR FROM CURRENT POSITION |
| 0B51 | 77 | 2049 | | MOV | M,A | ; STORE IT ON SCREEN |
| 0B52 | 23 | 2050 | | INX | H | ; BUMP ADDRESS FORWARD |
| | | 2051 | | | | ; AND FALL THRU TO COMMON CURSOR MOVE CODE |
| | | 2052 | ; COMMON CURSOR MOVE CODE | | | |
| 0B53 | 7E | 2053 | DSFC4: | MOV | A,M | ; GET CHAR |
| 0B54 | E63F | 2054 | | ANI | 3FH | ; STRIP OFF JUNK |
| 0B56 | FE20 | 2055 | | CPI | ' ' | ; BLANK?? |
| 0B58 | C25C0B | 2056 | | JNZ | DSF98 | ; IF NOT |
| 0B5B | 3D | 2057 | | DCR | A | ; ELSE, TURN SPACE INTO UNDERLINE (1FH) |
| 0B5C | F640 | 2058 | DSF98: | ORI | 40H | ; TURN ON BLINK BIT |
| 0B5E | 77 | 2059 | | MOV | M,A | ; RE-STORE |
| 0B5F | C3410B | 2060 | | JMP | DSPPB | ; EXIT TO CHECK OTHER PAGES |
| | | 2061 | | | | |
| | | 2062 | ;*********************************************************************** | | | |
| | | 2063 | ; PROCESS CODE 0 -- REMOVE CURSOR FROM MEMORY @(HL) | | | |
| | | 2064 | ; NOTE: THIS IS NOT ENTERED FROM THE FUNCTION VECTORING CODE -- | | | |
| | | 2065 | ; IT IS CALLED AS A SUBROUTINE ! | | | |
| 0B62 | 7E | 2066 | DSTRP: | MOV | A,M | |
| 0B63 | E63F | 2067 | | ANI | 3FH | ; STRIP OFF BLINK |
| 0B65 | FE1F | 2068 | | CPI | 1FH | ; UNDERLINE?? |
| 0B67 | C0 | 2069 | | RNZ | | ; DONE IF NOT |
| 0B68 | 3C | 2070 | | INR | A | ; ELSE, TURN UNDERLINE INTO SPACE (20H) |
| 0B69 | C9 | 2071 | | RET | | |
| | | 2072 | | | | |
| | | 2073 | ;*********************************************************************** | | | |
| | | 2074 | ; PROCESS CODE 84H -- TRANSFER DATA TO THE TXMIT BUFFER (63 BYTES) | | | |
| 0B6A | 063F | 2075 | DSFRX: | MVI | B,63 | ; SET B = BYTE COUNT |
| 0B6C | 113912 | 2076 | | LXI | D,TBRDY | ; SET DE = FLAG ADDR |
| 0B6F | EB | 2077 | | XCHG | | ; SWAP PAGE AND OFFSET INTO DE |
| 0B70 | 22E411 | 2078 | | SHLD | DSRDY | ; AND SAVE BUFFER RDY FLAG ADDRESS |
| 0B73 | 213E12 | 2079 | | LXI | H,TXBUF | ; GET BUFFER ADDR |
| | | 2080 | | | | ; AND FALL INTO COMMON TRANSFER CODE |
| | | 2081 | ; CODE COMMON TO PRINTER AND LINE BUFFER FILL FUNCTIONS | | | |
| 0B76 | 1A | 2082 | DSF56: | LDAX | D | ; GET PAGE CONTENTS |
| 0B77 | E63F | 2083 | | ANI | 03FH | |
| 0B79 | FE1F | 2084 | | CPI | 1FH | |
| 0B7B | C27F0B | 2085 | | JNZ | DSF97 | ; IF NOT CURSOR |
| 0B7E | 3C | 2086 | | INR | A | ; ELSE TURN INTO SPACE |
| 0B7F | D2840B | 2087 | DSF97: | JNC | DSF57 | |
| 0B82 | F640 | 2088 | | ORI | 40H | |
| 0B84 | 77 | 2089 | DSF57: | MOV | M,A | ; STORE IN BUFFER |
| 0B85 | 13 | 2090 | | INX | D | ; BUMP "FROM" |
| 0B86 | 23 | 2091 | | INX | H | ; BUMP "TO" |
| 0B87 | 05 | 2092 | | DCR | B | ; CHECK COUNT |
| 0B88 | C2760B | 2093 | | JNZ | DSF56 | ; LOOP IF NOT ZERO |
| 0B8B | 2AE411 | 2094 | | LHLD | DSRDY | ; GET FLAG ADDRESS |
| 0B8E | 36FF | 2095 | | MVI | M,-1 | ; SET FLAG |
| 0B90 | C3410B | 2096 | | JMP | DSPPB | ; GO RESTORE REGISTERS AND TRY FOR MORE TO DO |
| | | 2097 | | | | |
| | | 2098 | ;*********************************************************************** | | | |
| | | 2099 | ; PROCESS CODE 82H -- TRANSFER DATA TO PRINTER LINE BUFFER (64 BYTES) | | | |
| 0B93 | 0640 | 2100 | DSFCQ: | MVI | B,64 | ; SET B = TRANSFER COUNT |
| 0B95 | 11EF11 | 2101 | | LXI | D,PBRDY | ; GET READY FLAG ADDRESS |
| 0B98 | EB | 2102 | | XCHG | | ; SWAP DE, HL |
| 0B99 | 22E411 | 2103 | | SHLD | DSRDY | ; SAVE FLAG ADDRESS |
| 0B9C | 21F211 | 2104 | | LXI | H,PRBUF | ; AND GET BUFFER ADDRESS |
| 0B9F | C3760B | 2105 | | JMP | DSF56 | ; AND DO THE TRANSFER |
| | | 2106 | | | | |
| | | 2107 | ;*********************************************************************** | | | |
| | | 2108 | ; PROCESS CODE 83 -- LINE 14 ALERT RESTORE FUNCTION | | | |
| 0BA2 | 0E17 | 2109 | DSFRA: | MVI | C,23 | ; DO ALERT14 RESTORE |
| 0BA4 | 11B612 | 2110 | | LXI | D,ALRTM | |
| | | 2111 | DSFRB: | GOMOVE | | ; MOVE THE TEXT |
| 0BA8 | C3410B | 2113 | | JMP | DSPPB | ; RESTORE REGISTERS AND LOOK FOR MORE TO DO |
| | | 2114 | | | | |
| | | 2115 | ;*********************************************************************** | | | |
| | | 2116 | ; PROCESS CODE 80 -- SYSTEM STATUS RESTORE | | | |
| 0BAB | 0E18 | 2117 | DSFRS: | MVI | C,24 | ; COUNT IN C |
| 0BAD | 119D12 | 2118 | | LXI | D,SYSTAT | ; POINT TO STATUS |
| 0BB0 | C3A70B | 2119 | | JMP | DSFRB | |
| | | 2120 | | | | |
| | | 2121 | ;*********************************************************************** | | | |
| | | 2122 | ; PROCESS CODE 8BH -- INSTALL ALERTS LIST HEADER INCLUDING ALERTS PRINT MODE | | | |
| 0BB3 | 0E1A | 2123 | DSAHDR: | MVI | C,AHTND-AHTXT | ; C = MESSAGE LENGTH |
| 0BB5 | 11D60B | 2124 | | LXI | D,AHTXT | ; POINT TO TEXT TO MOVE |
| | | 2125 | | GOMOVE | | ; DO THE MOVE |
| 0BB9 | 2E04 | 2127 | | MVI | L,4 | ; ADDRESS 1ST LINE, COLUMN 4 |
| 0BBB | 3AD612 | 2128 | | LDA | PRMODE | ; AND GET PRINT MODE FLAG |
| 0BBE | 012020 | 2129 | | LXI | B,'  ' | ; SET BC = SPACES IN CASE MODE = NORMAL PRINT |
| 0BC1 | 3C | 2130 | | INR | A | ; TEST FOR ALERTS PRINT |
| 0BC2 | C2C80B | 2131 | | JNZ | DSAHD1 | ; AND JUMP IF NORMAL PRINT MODE |
| 0BC5 | 011005 | 2132 | | LXI | B,(('E' AND 3FH)*256)+('P' AND 3FH) | |
| 0BC8 | 71 | 2133 | DSAHD1: | MOV | M,C | ; STORE PRINT ALERTS STATUS |
| 0BC9 | 23 | 2134 | | INX | H | |
| 0BCA | 70 | 2135 | | MOV | M,B | |

| LOC OBJ | LINE | SOURCE STATEMENT | | | |
|---|---|---|---|---|---|
| OBCB 2E3C | 2136 | | MVI | L,3CH | ; ADDRESS 1ST LINE, COLM60 |
| OBCD 119013 | 2137 | | LXI | D,TT4-CMBLK+CTNAM | ;CALC. ADDRESS OF PAGE NAME ON SCREEN #5 |
| OBD0 010400 | 2138 | | LXI | B,4 | ; MOVE 4 CHARACTERS TO THE SCREEN |
| OBD3 C3190C | 2139 | | JMP | DSFTR | ; MASKING TO 6 BITS |
| | 2140 | | | | |
| | 2141 | AHTXT: | TEXT | <<REUTER MONITOR ALERTS PAGE>> | |
| OBF0 | 2171 | AHTND | EQU | $ | |
| 0013 | 2172 | AHPOS | EQU | 32 - ((AHTND - AHTXT)/2) | ; COLUMN # TO CENTER TITLE |
| | 2173 | | | | |
| | 2174 | ;******************************************************************** | | | |
| | 2175 | ; PROCESS CODE 8CH -- ROLL DOWN 11 LINES OF DISPLAY. | | | |
| | 2176 | ; ( DEST POINTER IN HL) | | | |
| OBF0 11C0FF | 2177 | DSFROL | LXI | D,-64 | ; SET UP DISPLACEMENT FOR SOURCE POINTER |
| OBF3 EB | 2178 | | XCHG | | |
| OBF4 19 | 2179 | | DAD | D | |
| OBF5 EB | 2180 | | XCHG | | ; DE => SOURCE, HL=> DESTINATION |
| OBF6 01C002 | 2181 | | LXI | B, 11*64 | ; COUNT = 11 LINES OF DATA |
| OBF9 1A | 2182 | DSFRLL | LDAX | D | ; DO THE BACKWARDS MOVE |
| OBFA E63F | 2183 | | ANI | 3FH | ; MASK TO 6 BITS |
| OBFC 77 | 2184 | | MOV | M,A | |
| OBFD 1B | 2185 | | DCX | D | |
| OBFE 2B | 2186 | | DCX | H | |
| OBFF 0B | 2187 | | DCX | B | |
| 0C00 78 | 2188 | | MOV | A,B | |
| 0C01 B1 | 2189 | | ORA | C | ; TEST IF COUNTS ARE 0 |
| 0C02 C2F90B | 2190 | | JNZ | DSFRLL | ; IF NOT, MOVE SOME MORE |
| 0C05 C3410B | 2191 | | JMP | DSPPB | ; ELSE, EXIT |
| | 2192 | | | | |
| | 2193 | ;******************************************************************** | | | |
| | 2194 | ; PROCESS CODE 81 -- PAGE TO PAGE TRANSFER | | | |
| 0C08 EB | 2195 | DSFPP: | XCHG | | |
| 0C09 110010 | 2196 | | LXI | D,1000H | ; CALC. SOURCE PAGE ADDRESS |
| 0C0C 3E04 | 2197 | DSFPL: | MVI | A,4 | ;TO BUMP PAGE |
| 0C0E 82 | 2198 | | ADD | D | |
| 0C0F 57 | 2199 | | MOV | D,A | |
| 0C10 78 | 2200 | | MOV | A,B | ;GET TERM #(S) |
| 0C11 0F | 2201 | | RRC | | ;LOOK FOR FIRST ONE |
| 0C12 47 | 2202 | | MOV | B,A | |
| 0C13 D20C0C | 2203 | | JNC | DSFPL | ;WAIT FOR MATCH |
| 0C16 016803 | 2204 | | LXI | B,368H | ;COUNT TO XFER |
| | 2205 | ;TRANSFER FROM DE TO HL MASKING TO 6 BITS | | | |
| 0C19 1A | 2206 | DSFTR: | LDAX | D | |
| 0C1A E63F | 2207 | | ANI | 3FH | |
| 0C1C 77 | 2208 | | MOV | M,A | |
| 0C1D 13 | 2209 | | INX | D | |
| 0C1E 23 | 2210 | | INX | H | |
| 0C1F 0B | 2211 | | DCX | B | |
| 0C20 78 | 2212 | | MOV | A,B | |
| 0C21 B1 | 2213 | | ORA | C | |
| 0C22 C2190C | 2214 | | JNZ | DSFTR | |
| 0C25 C3410B | 2215 | | JMP | DSPPB | ;GET OUT |
| | 2216 | ;******************************************************************** | | | |
| | 2217 | ; PROCESS CODE 85 -- REMOVE AND REPLACE BLINK FIELD WITH NEW FIELD DATA | | | |
| | 2218 | ; REPLACE THE 'BLINK' FIELD ON THE DISPLAY WITH THE NEW BLINK FIELD DATA | | | |
| | 2219 | ; THIS IS DONE BY REPLACING THE ENTRY FOR THIS KS IN THE BLINK TABLE AND | | | |
| | 2220 | ; UN-BLINKING THE OLD FIELD AND BLINKING THE NEW. | | | |
| | 2221 | ; ON ENTRY: DE => BASE ADDRESS OF DISPLAY MEMORY FOR THE KS | | | |
| | 2222 | ; BC = NEW PACKED COUNT AND ADDRESS DATA OF NEW BLINK ENTRY | | | |
| | 2223 | ;******************************************************************** | | | |
| 0C28 C5 | 2224 | DSBLRP: | PUSH | B | ; SAVE NEW FIELD LOCATION AND COUNT |
| 0C29 CD6A0C | 2225 | | CALL | BKTADR | ; COMPUTE ADDRESS OF ENTRY FOR KS IN BLINK TABLE |
| 0C2C E5 | 2226 | | PUSH | H | ; SAVE IT TOO |
| 0C2D 4E | 2227 | | MOV | C,M | ; LOAD THE OLD ENTRY INTO BC |
| 0C2E 23 | 2228 | | INX | H | |
| 0C2F 46 | 2229 | | MOV | B,M | |
| 0C30 78 | 2230 | | MOV | A,B | ; NOW CHECK IF ANYTHING WAS BLINKING |
| 0C31 B1 | 2231 | | ORA | C | ; IF NOT, B AND C WILL BE 0 |
| 0C32 CA410C | 2232 | | JZ | DSBLR1 | ; AND WILL SKIP RESET OF BLINK |
| 0C35 CD5C0C | 2233 | | CALL | UNPKBL | ; ELSE, UNPACK THE FIELD LENGTH AND ADDRESS OF FIELD |
| 0C38 7E | 2234 | DSBLR3 | MOV | A,M | ; NOW, RESET THE BLINK BIT IN THE FIELD |
| 0C39 E63F | 2235 | | ANI | 3FH | |
| 0C3B 77 | 2236 | | MOV | M,A | |
| 0C3C 23 | 2237 | | INX | H | |
| 0C3D 0D | 2238 | | DCR | C | ; FOR THE COUNT IN C |
| 0C3E C2380C | 2239 | | JNZ | DSBLR3 | |
| 0C41 E1 | 2240 | DSBLR1 | POP | H | ; RESTORE POINTER INTO BLINK TABLE ENTRY |
| 0C42 C1 | 2241 | | POP | B | ; AND NEW BLINK FIELD ENTRY |
| 0C43 71 | 2242 | | MOV | M,C | ; STORE IN TABLE |
| 0C44 23 | 2243 | | INX | H | |
| 0C45 70 | 2244 | | MOV | M,B | |
| 0C46 78 | 2245 | | MOV | A,B | ; NOW CHECK IF NULL FIELD |
| 0C47 B1 | 2246 | | ORA | C | |
| 0C48 CA410B | 2247 | | JZ | DSPPB | ; IF 0, ALL DONE WITH THIS KS. |
| 0C4B CD5C0C | 2248 | | CALL | UNPKBL | ; ELSE, UNPACK ADDRESS AND COUNT |
| 0C4E 7E | 2249 | DSBLR2 | MOV | A,M | ; AND NOW, SET BLINK OVER THE FIELD |
| 0C4F E63F | 2250 | | ANI | 3FH | |
| 0C51 F640 | 2251 | | ORI | 40H | |
| 0C53 77 | 2252 | | MOV | M,A | |
| 0C54 23 | 2253 | | INX | H | |
| 0C55 0D | 2254 | | DCR | C | |
| 0C56 C24E0C | 2255 | | JNZ | DSBLR2 | ; UNTIL ALL FIELD IS BLINKED |

```
LOC  OBJ         LINE         SOURCE STATEMENT

0C59 C3410B      2256              JMP      DSPPB       ; THEN GO CHECK FOR MORE KEYSTATIONS/FUNCTIONS
                 2257
                 2258 ;**********************************************************************
                 2259 ; UNPKBL -- UNPACK BLINK TABLE ENTRY INTO COUNT AND ABSOLUTE ADDRESS
                 2260 ;
                 2261 ; CALL WITH:   BC = PACKED ENTRY
                 2262 ;              DE = BASE ADDRESS OF CRT MEMORY
                 2263 ;
                 2264 ; RETURNS:     HL => ABSOLUTE ADDRESS OF START OF FIELD
                 2265 ;              C = COUNT ( PACKED COUNT + 1 )
                 2266 ;       ALTERS A, FLAGS
                 2267 ;**********************************************************************
0C5C 69          2268 UNPKBL: MOV    L,C         ; LS BYTE OF DISPLACEMENT IN L
0C5D 78          2269         MOV    A,B
0C5E E603        2270         ANI    3           ; GET MS BYTE OF 10 BIT DISPLACEMENT
0C60 67          2271         MOV    H,A
0C61 78          2272         MOV    A,B
0C62 E6FC        2273         ANI    0FCH        ; NOW, MASK JUST THE COUNT FIELD
0C64 1F          2274         RAR
0C65 1F          2275         RAR
0C66 4F          2276         MOV    C,A
0C67 0C          2277         INR    C           ; C = UNPACKED COUNT
0C68 19          2278         DAD    D           ; HL = ABSOLUTE ADDRESS OF FIELD
0C69 C9          2279         RET
                 2280
                 2281 ;**********************************************************************
                 2282 ; BKTADR -- COMPUTE BLINK TABLE ADDRESS FOR KEYSTATION
                 2283 ;
                 2284 ; CALL WITH    DE => BASE OF DISPLAY MEMORY FOR KEYSTATION
                 2285 ;
                 2286 ; RETURNS:     HL => ENTRY FOR KEYSTATION IN BLINK TABLE
                 2287 ;
                 2288 ;       ALTERS BC,HL,A
                 2289 ;**********************************************************************
0C6A 7A          2290 BKTADR: MOV    A,D
0C6B D614        2291         SUI    14H         ; BIAS HIGH BYTE OF ADDRESS TO KS #1
0C6D 1F          2292         RAR                ; A= +S# * 2
0C6E 6F          2293         MOV    L,A
0C6F 2600        2294         MVI    H,0
0C71 01DC12      2295         LXI    B,BLKTAB
0C74 09          2296         DAD    B           ; HL => ENTRY FOR KS
0C75 C9          2297         RET
                 2298
                 2299 ;**********************************************************************
                 2300 ; CRT MEMORY NOT AVAILABLE INTERRUPT (STA END)
                 2301 ;
                 2302 ; SUSPEND OPERATION OF DISPLAY ACCESS UNTIL
                 2303 ; NEXT STA START INTERRUPT
                 2304 ;**********************************************************************
0C76 CDEA01      2305 DSEOR:  CALL   SAVES       ; SAVE PROCESSOR STATUS
0C79 21D312      2306         LXI    H,LINSTA    ; CHECK ON-LINE STATUS BYTE
0C7C 7E          2307         MOV    A,M
0C7D 3C          2308         INR    A           ; TEST IF ON-LINE (LINSTA = -1)
0C7E C2920C      2309         JNZ    DSE01       ; IF NOT, BYPASS THE LINE TIMER FUNCTION
0C81 2AD412      2310         LHLD   LINTIM      ; ELSE, GET THE TIMER VALUE
0C84 2B          2311         DCX    H           ; AND COUNT IT DOWN BY ONE
0C85 22D412      2312         SHLD   LINTIM
0C88 7C          2313         MOV    A,H         ; TEST TO SEE IF IT'S GONE TO 0
0C89 B5          2314         ORA    L
0C8A C2920C      2315         JNZ    DSE01       ; JUMP IF IT HASN'T EXPRIRED
0C8D 3E2A        2316         MVI    A,'*'       ; ELSE, SET '*' STATUS (LINE TIMEOUT)
0C8F CDD20C      2317         CALL   DISSTA      ; AND DISPLAY THE COMMS FAULT ERROR MESSAGE
0C92 21EB12      2318 DSE01:  LXI    H,BLKTMR+5  ; POINT TO BLINK TIMER TABLE END + 1
0C95 012000      2319         LXI    B,ATMSK+1   ; AND SET C = LAST KS BIT +1, B = 0
0C98 A7          2320         ANA    A           ; CLEAR CARRY
0C99 79          2321 DSE02:  MOV    A,C         ; TEST FOR LOOP DONE
0C9A 1F          2322         RAR
0C9B 4F          2323         MOV    C,A
0C9C 2B          2324         DCX    H           ; POINT TO CORRESPONDING TIMER BYTE
0C9D DAAF0C      2325         JC     DSE03       ; IF DONE WITH MASK GENERATION
0CA0 7E          2326         MOV    A,M         ; TEST THE TIMER FOR THIS KS
0CA1 A7          2327         ANA    A           ; IS IT 0?
0CA2 CA990C      2328         JZ     DSE02       ; IF YES, STEP TO THE NEXT ONE
0CA5 35          2329         DCR    M           ; ELSE, COUNT IT DOWN
0CA6 C2990C      2330         JNZ    DSE02       ; AND JUMP IF IT DIDN'T EXPIRE THIS TIME
0CA9 78          2331         MOV    A,B
0CAA B1          2332         ORA    C
0CAB 47          2333         MOV    B,A         ; ELSE, PUT TERMINAL BIT IN MASK OF FLASHERS TO CLEAR
0CAC C3990C      2334         JMP    DSE02       ; AND LOOP AROUND TIL DONE
                 2335
                 2336 ; SEE IF ANY TIMERS EXPIRED
0CAF 78          2337 DSE03:  MOV    A,B
0CB0 A7          2338         ANA    A
0CB1 CABA0C      2339         JZ     DSE04       ; IF NOT
0CB4 0E85        2340         MVI    C,DFRPBL    ; ELSE SET UP REPLACE BLINK FUNCTION
0CB6 110000      2341         LXI    D,0         ; WITH NO NEW BLINK
                 2342         DGADD              ; AND PUT ON DISPLAY QUEUE
0CBA CD560D      2344 DSE04:  CALL   TURNOF      ; CHECK FOR MODEM TURNOFF
0CBD 3AE711      2345         LDA    DSPFG       ; GET FLAG
0CC0 32E611      2346         STA    DSPND       ; TO SUSPEND FLAG
0CC3 3E20        2347         MVI    A,20H
0CC5 D390        2348         OUT    INT1C       ; ENABLE 8259
```

```
LOC  OBJ            LINE        SOURCE STATEMENT
OCC7 FB             2349              EI                  ;ALLOW INTS
OCC8 3AE611         2350 DSELP        LDA     DSPND       ;LOAD SUSPEND FLAG
OCCB A7             2351              ANA     A           ;SET FLAGS
OCCC C2C80C         2352              JNZ     DSELP       ;WAIT FOR OTHER INTERRUPT AGAIN
OCCF C30C0E         2353              JMP     LEXT2       ;RESTORE PROCESSOR STATUS AND EXIT FROM INTERRUPT
                    2354
                    2355
                    2356 ;************************************************************
                    2357 ; SET THE CURRENT LINE STATUS BYTE FOR COMMUNICATION FAULT AND DISPLAY
                    2358 ; THE ERROR MESSAGE
                    2359
                    2360
                    2361 ; CALL WITH    A = NEW LINE STATUS BYTE
                    2362
                    2363 ; STORES THE STATUS CHARACTER AND QUEUES THE DISPLAY OF THE ERROR MESSAGE
                    2364 ; TO ALL KEYSTATIONS
                    2365 ;************************************************************
OCD2 32D312         2366 DISSTA       STA     LINSTA      ;STORE THE STATUS CHARACTER
OCD5 CD350F         2367              CALL    TMASK       ;GET BITS OF ALL KEYSTATIONS
OCD8 47             2368              MOV     B,A         ;PUT IT INTO B
OCD9 112E2F         2369              LXI     D,COMTX     ;POINT TO COMMS FAULT TEXT
                    2370
                    2371 ; FALL THROUGH TO DISPLAY THE MESSAGE IN THE STATUS FIELD
                    2372
                    2373 ;************************************************************
                    2374 ; DISPLAY A MOCK STATUS MESSAGE
                    2375 ;
                    2376 ; CALL WITH:   DE => STATUS MESSAGE TEXT TO DISPLAY
                    2377 ;              B = TERMINALS TO GET THE MESSAGE
                    2378 ;************************************************************
OCDC 219D12         2379 MOKSTA       LXI     H,SYSTAT    ;PLACE TO PUT IT
OCDF 0E18           2380              MVI     C,24        ;STATUS MESSAGE IS ALWAYS 24 BYTES LONG
                    2381              GOMOVE              ;MOVE STATUS MESSAGE TO RAM BUFFER
OCE2 0E80           2383              MVI     C,DFSS16    ;STATUS RESTORE CMD
OCE4 11E703         2384              LXI     D,3E7H      ;SCREEN ADDR
                    2385              DGADD               ;PUT UP STATUS MSG TILL SS OVERWRITES
                    2386                                  ;AND RETURN TO CALLER
                    2387
                    2388
                    2389 ;************************************************************
                    2390 ;SUBROUTINE TO INITIALIZE THE TRANSMIT MODE
OCE8 3A3612         2391 TXINIT:      LDA     TXON        ;MODEM ON ALREADY??
OCEB A7             2392              ANA     A
OCEC C0             2393              RNZ                 ;IF IT IS, NOTHING TODO
OCED 3E06           2394              MVI     A,6         ;SEND TURN OFF
OCEF CD620D         2395              CALL    US1CO
OCF2 3E27           2396              MVI     A,27H       ;SET RTS,TXEN,DTR, AND RXE ON
OCF4 CD620D         2397              CALL    US1CO
OCF7 3EFF           2398              MVI     A,-1
OCF9 323612         2399              STA     TXON
OCFC AF             2400              XRA     A
OCFD 329312         2401              STA     TXEMP       ;CLEAR END FLAGS
OD00 329412         2402              STA     TXOCT
OD03 C9             2403              RET
                    2404
                    2405 ;************************************************************
                    2406 ;SUBROUTINE TO TXMIT AN ABORT CHARACTER AND SET THE INCOMING
                    2407 ;LINE IDLE
OD04 21270D         2408 TXABT:       LXI     H,OTAB8
OD07 228D12         2409              SHLD    OPTAB       ;SET SEND ABORT
OD0A CDE80C         2410              CALL    TXINIT      ;START TXMITTER
OD0D 214C2F         2411              LXI     H,LTAB0
OD10 228B12         2412              SHLD    PLTAB       ;INPUT IDLE
OD13 AF             2413              XRA     A
OD14 328612         2414              STA     LTERM       ;CLEAR LINE TERM #
OD17 328A12         2415              STA     LERSP       ;CLEAR ERROR RESP FLAG
OD1A C9             2416              RET
                    2417
                    2418 ;************************************************************
                    2419 ;TXMITTER EMPTY INTERRUPT
                    2420 ;TURN OFF TRANSMIT AND MODEM
OD1B CDEA01         2421 TXEND:       CALL    SAVES       ;SAVE MACH STATE
OD1E 3A9312         2422              LDA     TXEMP       ;FLAG SET
OD21 329412         2423              STA     TXOCT
OD24 C3080E         2424              JMP     LIEX        ;EXIT FROM INTERRUPT
                    2425
                    2426 ;************************************************************
                    2427 ;OUTPUT AN ABORT CHARACTER AND THATS ALL
OD27 3E05           2428 ABTO:        MVI     A,ABT
OD29 C33A0D         2429              JMP     LOCM1
                    2430
                    2431
                    2432 ;************************************************************
                    2433 ;CODE TO OUTPUT BCC CHAR. WITH ODD
                    2434 ;PARITY. SET UP FOR NEXT OUTPUT OF A NULL.
OD2C AF             2435 BCCO:        XRA     A
OD2D D391           2436              OUT     INT1I       ;CLEAR INTERRUPT MASKS
OD2F D381           2437              OUT     INT2I
OD31 3A9212         2438              LDA     CBCC        ;A
OD34 A7             2439              ANA     A
OD35 E23A0D         2440              JPO     LOCM1
OD38 EE80           2441              XRI     80H         ;SET PARITY ODD IF NECESSARY
OD3A 214A0D         2442 LOCM1        LXI     H,OTAB4
```

```
LOC  OBJ          LINE        SOURCE STATEMENT

0D3D C3030E  2443             JMP     LOCM2       ;GO SET OUT
                  2444
                  2445 ;********************************************************************
                  2446 ;SEND A NAK AND THATS ALL (EVEN PARITY)
     0D40 3E95    2447 NAKO:    MVI     A,NAK
     0D42 C33A0D  2448             JMP     LOCM1       ;GO SET UP TO TURN OFF MODEM
                  2449
                  2450 ;********************************************************************
                  2451 ;SEND ACK AND SET UP TO TURN LINE AROUND
     0D45 3E06    2452 ACKO:    MVI     A,ACK
     0D47 C33A0D  2453             JMP     LOCM1
                  2454
                  2455 ;********************************************************************
                  2456 ;HERE TO ENABLE TX EMPTY TO TURN OFF MODEM
     0D4A 3E02    2457 NULLO:   MVI     A,2
     0D4C 329312  2458             STA     TXEMP
     0D4F AF      2459             XRA     A
     0D50 323612  2460             STA     TXON        ;SET MODEM OFF FLAG
     0D53 C3080E  2461             JMP     LIEX        ;BYE
                  2462
                  2463 ;********************************************************************
                  2464 ;SUBROUTINE TO DELAY BEFORE TURNING OFF MODEM
                  2465 ;ONLY A IS ALTERED
     0D56 3A9412  2466 TURNOF:  LDA     TXOCT
     0D59 A7      2467             ANA     A
     0D5A C8      2468             RZ                  ;IF NO CONTROL NECC
     0D5B 3D      2469             DCR     A
     0D5C 329412  2470             STA     TXOCT
     0D5F C0      2471             RNZ                 ;IF NOT YET
     0D60 3E06    2472             MVI     A,6
                  2473
                  2474 ;********************************************************************
                  2475 ;SEND COMMAND TO USART #1
     0D62 F5      2476 US1CO:   PUSH    PSW         ;SAVE COMMAND
     0D63 DBD1    2477 US1C1:   IN      USR1C
     0D65 1F      2478             RAR
     0D66 D2630D  2479             JNC     US1C1
     0D69 F1      2480             POP     PSW
     0D6A D3D1    2481             OUT     USR1C
     0D6C C9      2482             RET
                  2483
                  2484 ;********************************************************************
                  2485 ;CODE TO OUTPUT TEXT FROM TRANSMIT BUFFER
                  2486 ;TXBUF - ASSUMES THAT DATA IN TXBUF IS
                  2487 ;VALID TO 7 BIT WIDTH - WILL OUTPUT DATA WITH
                  2488 ;EVEN PARITY. SETS CONTROL TO BCC OUTPUT WHEN
                  2489 ;AN ETX IS ENCOUNTERED.
     0D6D 2A3712  2490 TEXTO:   LHLD    TXPTR       ;POINTER TO NEXT CHAR
     0D70 7E      2491             MOV     A,M         ;IN A
     0D71 23      2492             INX     H
     0D72 223712  2493             SHLD    TXPTR       ;BUMP POINTER
     0D75 CD120E  2494             CALL    PARITY      ;UPDATE BCC AND MAKE EVEN PARITY
     0D78 FE03    2495             CPI     ETX         ;ETX?
     0D7A C2060E  2496             JNZ     LOCOM       ;IF NOT, GO SEND IT
     0D7D 212C0D  2497             LXI     H,OTAB3     ;SET BCC OUTPUT TABLE
     0D80 C3030E  2498             JMP     LOCM2       ;AND GO SEND THE ETX
                  2499
                  2500 ;********************************************************************
                  2501 ;CODE TO SEND AN STX CHAR AND OTHERWISE
                  2502 ;INITIALIZE THE TRANSMISSION OF TEXT
                  2503 ;ALSO, EXIT FROM TRANSMITTER READY INTERRUPT
     0D83 3A3912  2504 STXO:    LDA     TBRDY
     0D86 A7      2505             ANA     A           ;BUFFER READY??
     0D87 CA060E  2506             JZ      LOCOM       ;IF NOT, PAD IN A NULL CHARACTER
     0D8A 3A3E12  2507             LDA     TXBUF
     0D8D FE2F    2508             CPI     '/'
     0D8F C2E30D  2509             JNZ     STX03       ;GO START IF NOT
     0D92 0E3A    2510             MVI     C,58
     0D94 214312  2511             LXI     H,TXBUF+5
     0D97 3E20    2512             MVI     A,' '
     0D99 BE      2513 STX01:   CMP     M
     0D9A C2E30D  2514             JNZ     STX03       ;IF NOT SPACES, DO INSERT
     0D9D 23      2515             INX     H
     0D9E 0D      2516             DCR     C
     0D9F C2990D  2517             JNZ     STX01
     0DA2 AF      2518             XRA     A
     0DA3 32D012  2519             STA     LIMAX       ;ZERO INSERT DISPLACEMENT
     0DA6 3A8612  2520             LDA     LTERM       ;OPR FOUND
                  2521             UNPACK              ;GET TERM DATA
     0DAA 3E08    2523             MVI     A,8
     0DAC 32EC12  2524             STA     CTSTA       ;SET OPR STATUS
     0DAF 11FF12  2525             LXI     D,CTNAM
     0DB2 D5      2526             PUSH    D
     0DB3 210313  2527             LXI     H,CRNAM
     0DB6 0E04    2528             MVI     C,4
                  2529             GOMOVE              ;SAVE PAGE NAME IN RESET
     0DB9 E1      2531             POP     H
     0DBA 113F12  2532             LXI     D,TXBUF+1
     0DBD D5      2533             PUSH    D
     0DBE 0E04    2534             MVI     C,4         ;REG NAME TO TERM NAME
                  2535             GOMOVE
```

```
LOC  OBJ        LINE         SOURCE STATEMENT

ODC1 D1         2537              POP    D
ODC2 CD0308     2538              CALL   NMTST    ;PAGE ON DISPLAY??
ODC5 CAD70D     2539              JZ     STX02    ;IF NOT
ODC8 CD9207     2540              CALL   PTOP     ;SET UP XFER
                2541              PACK            ;PACK DATA BACK
ODCC AF         2543              XRA    A
ODCD 328612     2544              STA    LTERM
ODD0 D391       2545              OUT    INT1I    ;UNLOCK KBDS
ODD2 D381       2546              OUT    INT2I
ODD4 C3400D     2547              JMP    NAKO     ;GO SEND NAK
ODD7 11FF12     2548 STX02:       LXI    D,CTNAM
ODDA 213A12     2549              LXI    H,TXNAM
ODDD 0E04       2550              MVI    C,4
                2551              GOMOVE
ODE0 3603       2553              MVI    M,ETX    ;ETX AT END
                2554              PACK
                2556 ;SHORTEN TXMISSION TO CHARS TYPED IF INSERT
ODE3 3AD012     2557 STX03:       LDA    LIMAX    ;IS THERE A DISPLACEMENT?
ODE6 A7         2558              ANA    A
ODE7 CAFA0D     2559              JZ     STXGO    ;IF NOT, NOT AN INSERT
ODEA 213E12     2560              LXI    H,TXBUF
ODED 5F         2561              MOV    E,A
ODEE 1600       2562              MVI    D,0
ODF0 19         2563              DAD    D        ;ADD DISPL TO BUFFER START
ODF1 117E12     2564              LXI    D,TXBUF+64
                2565              COMPDH
ODF5 D2FA0D     2567              JNC    STXGO    ;IF OUT OF RANGE ERROR
ODF8 3603       2568              MVI    M,ETX    ;STORE ETX
ODFA AF         2569 STXGO:       XRA    A
ODFB 329212     2570              STA    CBCC     ;CLEAR BCC SUM
ODFE 3E82       2571              MVI    A,82H    ;STX IN A
0E00 216D0D     2572              LXI    H,OTAB2  ;SEND TEXT VECTOR
0E03 228D12     2573 LOCM2:       SHLD   OPTAB
0E06 D3D0       2574 LOCOM:       OUT    USR1D    ;SEND CHAR IN A
                2575
                2576 ;*************************************************************
                2577 ;RETURN FROM LINE OUT ;LINE IN; PRINT,
                2578 ;OR STA START INTERRUPT
                2579 ;*************************************************************
0E08 3E20       2580 LIEX:        MVI    A,20H    ;AND RETURN FROM
0E0A D390       2581 LEXT1:       OUT    INT1C    ;TRANSMIT INTERRUPT
0E0C F1         2582 LEXT2:       POP    PSW      ;RESTORE THE REGISTERS AS SAVED BY 'SAVES'
0E0D C1         2583              POP    B
0E0E D1         2584              POP    D
0E0F E1         2585              POP    H
0E10 FB         2586              EI
0E11 C9         2587              RET
                2588
                2589
                2590 ;*************************************************************
                2591 ;SUBROUTINE TO SET CHAR IN A TO EVEN PARITY AND
                2592 ;SUM THE CHAR INTO THE BCC SUM
                2593 ;ALTERS H AND L (A SET TO EVEN PARITY)
0E12 A7         2594 PARITY ANA   A
0E13 EA180E     2595              JPE    PART1
0E16 EE80       2596              XRI    80H      ;SET PARITY BIT IF IT WAS ODD
0E18 219212     2597 PART1:       LXI    H,CBCC   ;BCC SUM
0E1B F5         2598              PUSH   PSW
0E1C 86         2599              ADD    M
0E1D 77         2600              MOV    M,A
0E1E F1         2601              POP    PSW
0E1F C9         2602              RET             ;CHAR W. EVEN PARITY IN A
                2603
                2604
                2605 ;*************************************************************
                2606 ;SUBROUTINE TO ADD CHAR IN C TO THE
                2607 ;CHECKSUM BYTE - A IS ALTERED
                2608 ;PARITY FLAG SET ON RETURN
                2609 ;PARITY BIT STRIPPED OFF CHAR IN C
0E20 E5         2610 BCCAD:       PUSH   H
0E21 79         2611              MOV    A,C
0E22 A7         2612              ANA    A        ;SET FLAGS ON CHAR
0E23 CD180E     2613              CALL   PART1
0E26 E1         2614              POP    H
0E27 F5         2615              PUSH   PSW      ;SAVE PARITY STATUS
0E28 79         2616              MOV    A,C
0E29 E67F       2617              ANI    7FH      ;STRIP OFF PARITY
0E2B 4F         2618              MOV    C,A
0E2C F1         2619              POP    PSW      ;RESTORE OLD PARITY FLAG
0E2D C9         2620              RET
                2621
                2622 ;*************************************************************
                2623 ; CHKOPR - CHECK FOR ABORTED REQUEST-- ESPECIALLY OFF PAGE REQUEST
                2624 ;
                2625 ;       IF LTERM = 0, IT IS ASSUMED THAT A REQUEST ORIGINATED FROM A CERTAIN
                2626 ;       KEYSTATION WAS SOMEHOW ABORTED. THE KEYBOARD FOR THE TERMINAL IS SET
                2627 ;       TO KTAB4, AS A PAGE MUST HAVE BEEN ON DISPLAY, AND THE KEYSTATION
                2628 ;       STATUS IS CHECKED FOR AN ABORTED OFF-PAGE-REQUEST. IF OPR IS SET,
                2629 ;       INSERT STATUS IS RESTORED TO THE KEYSTATION.
                2630 ;*************************************************************
0E2E 3A8612     2631 CHKOPR  LDA   LTERM   ;CHECK IF RESPONSE
0E31 A7         2632              ANA    A
```

| LOC OBJ | LINE | SOURCE STATEMENT | | | |
|---|---|---|---|---|---|
| 0E32 C8 | 2633 | | RC | | ; IF NOT, RETURN TO CALLER |
| | 2634 | | UNPACK | | ; ELSE, UNPACK THE TERMINAL DATA |
| 0E34 21C12F | 2636 | | LXI | H,KTAB4 | |
| 0E37 22FB12 | 2637 | | SHLD | CKTAB | ; AND UNLOCK THE KEYBOARD IN CASE IT WAS LOCKED |
| 0E3A 21EC12 | 2638 | | LXI | H,CTSTA | ; POINT TO TERMINAL STATUS |
| 0E3D 7E | 2639 | | MOV | A,M | |
| 0E3E E608 | 2640 | | ANI | 8 | ; CHECK IF OPR BIT IS SET |
| 0E40 CA550E | 2641 | | JZ | CHKOP1 | ; IF NOT, PREPARE TO EXIT |
| 0E43 36D0 | 2642 | | MVI | M,ODOH | ; ELSE, SET POLL REQUEST, AUTO REQUEST, AND INSERT STATUS |
| 0E45 110313 | 2643 | | LXI | D,CRNAM | ; AND MOVE BACK THE PAGE NAME ORIGINALLY ON DISPLAY |
| 0E48 21F712 | 2644 | | LXI | H,CKNAM | ; TO BE RE-REQUESTED FROM THE LINE |
| 0E4B 0E04 | 2645 | | MVI | C,4 | |
| | 2646 | | GOMOVE | | |
| 0E4E AF | 2648 | | XRA | A | ; CLEAR |
| 0E4F 320313 | 2649 | | STA | CRNAM | ; THE PAGE ESCAPE NAME |
| 0E52 32FF12 | 2650 | | STA | CTNAM | ; AND THE TERMINAL NAME( AS THE PAGE ON DISPLAY IS INCOMPLETE) |
| 0E55 328612 | 2651 | CHKOP1 | STA | LTERM | ; CLEAR THE RESPONSE TERMINAL # |
| | 2652 | | PACK | | ; PACK TERMINAL DATA BACK INTO ITS BUFFER |
| 0E59 C9 | 2654 | | RET | | |
| | 2655 | | | | |
| | 2656 | | | | |
| | 2657 | ;************************************************************* | | | |
| | 2658 | ;SOH RECEIVED. SET UP TO PROCESS ADRESS CHAR. | | | |
| 0E5A 216009 | 2659 | LSOH: | LXI | H,TIME | ; FIRST, RE- INIT THE TIMEOUT TIMER |
| 0E5D 220412 | 2660 | | SHLD | LINTIM | |
| 0E60 CD2E0E | 2661 | | CALL | CHKOPR | ; CHECK FOR ABORTED OPR OR OTHER REQUEST |
| 0E63 21822F | 2662 | | LXI | H,LTABA | ; PROCESS ADR CHAR. |
| 0E66 228B12 | 2663 | LS1: | SHLD | PLTAB | ; STORE TABLE ADDRESS |
| 0E69 C3080E | 2664 | | JMP | LIEX | ; GET OUT |
| | 2665 | | | | |
| | 2666 | ;************************************************************* | | | |
| | 2667 | ;PROCESS ADDRESS CHARACTER JUST RECEIVED | | | |
| 0E6C DBA2 | 2668 | LADR: | IN | SLCT | ; COMPUTE THE ADDRESS CHARACTER FROM DIP SWITCHES |
| 0E6E E607 | 2669 | | ANI | 7 | ; MASK 3 BITS |
| 0E70 C641 | 2670 | | ADI | 'A' | ; TURN INTO ASCII 'A' - 'H' |
| 0E72 EA770E | 2671 | | JPE | LADR1 | ; IF EVEN PARITY |
| 0E75 F680 | 2672 | | ORI | 80H | ; ELSE, MAKE INTO EVEN PARITY |
| 0E77 B9 | 2673 | LADR1: | CMP | C | ; IS THIS SAME AS INPUT CHARACTER? |
| 0E78 3EFF | 2674 | | MVI | A,-1 | |
| 0E7A 32D812 | 2675 | | STA | UNUPD | ; SET UNSOLICITED UPDATE FLAG |
| 0E7D 21522F | 2676 | | LXI | H,LTAB1 | ; GET TABLE TO LOOK FOR STX |
| 0E80 CA660E | 2677 | | JZ | LS1 | ; IF MATCH |
| 0E83 214A0D | 2678 | | LXI | H,OTAB5 | ; ELSE SET LINE OUTPUT IDLE |
| 0E86 228D12 | 2679 | | SHLD | OFTAB | ; TURNE MODEM OFF IF ON |
| | 2680 | ; SET INCOMING LINE IDLE | | | |
| 0E89 3A8612 | 2681 | LIDL1: | LDA | LTERM | |
| 0E8C A7 | 2682 | | ANA | A | |
| 0E8D CA9A0E | 2683 | | JZ | LIDL2 | ; IF NOT RESPONSE |
| 0E90 CD2E0E | 2684 | | CALL | CHKOPR | ; CHECK FOR ABORTED OPR AND UNLOCK KBD |
| 0E93 AF | 2685 | LIDL3: | XRA | A | |
| 0E94 328612 | 2686 | | STA | LTERM | ; CLEAR LINE TERM # |
| 0E97 328A12 | 2687 | | STA | LERSP | ; & ERROR RESP FLAG |
| 0E9A 3AB512 | 2688 | LIDL2: | LDA | ALR14 | ; CLEAR OUT GS MESSAGE ALERT BIT |
| 0E9D E61F | 2689 | | ANI | ATMSK | ; IN CASE IT WAS LEFT ON DUE TO |
| 0E9F 32B512 | 2690 | | STA | ALR14 | ; A TRANSMISSION ERROR |
| 0EA2 3E1F | 2691 | | MVI | A,ATMSK | ; ALSO CLEAR OUT THE BITS THAT FLAG THE INCOMING |
| 0EA4 219C12 | 2692 | | LXI | H,ALERT | ; MESSAGE AS AN ALERT/SYSTAT MESSAGE |
| 0EA7 A6 | 2693 | | ANA | M | ; (BITS 6 AND 7) |
| 0EA8 77 | 2694 | | MOV | M,A | |
| 0EA9 AF | 2695 | | XRA | A | |
| 0EAA 32D812 | 2696 | | STA | UNUPD | ; AND CLEAR THE UNSOLICITED UPDATE FLAG |
| 0EAD 214C2F | 2697 | | LXI | H,LTAB0 | ; SET IDLE INPUT |
| 0EB0 C3660E | 2698 | | JMP | LS1 | |
| | 2699 | | | | |
| | 2700 | ;************************************************************* | | | |
| | 2701 | ;PROCESS STX CHAR -- PREPARE FOR THE INPUT OF THE NAME | | | |
| 0EB3 AF | 2702 | LSTX: | XRA | A | |
| 0EB4 329212 | 2703 | | STA | CBCC | ; CLEAR BCC SUM |
| 0EB7 3E04 | 2704 | | MVI | A,4 | |
| 0EB9 328712 | 2705 | | STA | LNMCT | ; SET UP FOR NAME |
| 0EBC 217E12 | 2706 | | LXI | H,LNAME | |
| 0EBF 228812 | 2707 | | SHLD | LNMPT | |
| 0EC2 215B2F | 2708 | | LXI | H,LTAB2 | ; LOOK FOR NAME OR SPEC. CHAR |
| 0EC5 C3660E | 2709 | | JMP | LS1 | |
| | 2710 | | | | |
| | 2711 | ;************************************************************* | | | |
| | 2712 | ;PROCESS INCOMING NAME CHARS | | | |
| 0EC8 2A8812 | 2713 | LNMP: | LHLD | LNMPT | ; POINTER INTO NAME |
| 0ECB CD200E | 2714 | | CALL | BCCAD | ; ADD TO BCC |
| 0ECE E2B12E | 2715 | | JPO | LERR | ; IF PARITY ERROR |
| 0ED1 71 | 2716 | | MOV | M,C | |
| 0ED2 3A8712 | 2717 | | LDA | LNMCT | ; STORE CHAR AND COUNT IT |
| 0ED5 3D | 2718 | | DCR | A | |
| 0ED6 328712 | 2719 | | STA | LNMCT | |
| 0ED9 CAE30E | 2720 | | JZ | MNAME | ; DECODE NAME IF DONE |
| 0EDC 23 | 2721 | | INX | H | ; ELSE, |
| 0EDD 228812 | 2722 | | SHLD | LNMPT | ; BUMP STORAGE POINTER |
| 0EE0 C3080E | 2723 | | JMP | LIEX | ; AND GO WAIT FOR MORE NAME CHARACTERS |
| | 2724 | ; DECODE THE PAGE NAME JUST RECEIVED | | | |
| 0EE3 117E12 | 2725 | MNAME: | LXI | D,LNAME | ; POINT TO LINE NAME |
| 0EE6 CD0308 | 2726 | | CALL | NMTST | ; SEE IF ON DISPLAY ON ANY SCREEN HERE |
| 0EE9 328F12 | 2727 | | STA | VDUP | ; SAVE PAGE BITS AS DESTINATION OF MESSAGE |

```
LOC  OBJ           LINE         SOURCE STATEMENT

OEEC 210000        2728              LXI    H,0          ; AND SET DISPLACEMENT TO START AT TOP OF THE PAGE
OEEF 229012        2729              SHLD   VDUAD
OEF2 22D912        2730              SHLD   TUDADR       ; INITIALIZE THE UPDATE FIELD ADDRESS
OEF5 47            2731              MOV    B,A          ; SAVE THE DESTINATION PAGE #S
OEF6 7C            2732              MOV    A,H          ; ZERO A
OEF7 32DB12        2733              STA    TUDCNT       ; AND ZERO THE UPDATE FIELD COUNT
OEFA C21D0F        2734              JNZ    MNAM2        ; IF PAGE IS ON DISPLAY LOCALLY
                   2735      ; ELSE, IF NOT ON DISPLAY, SEE IF ROOM TO SAVE PAGE NAME IN ORDER TO ESCAPE IT
                   2736      ; BUT FIRST, CLEAR THE UNSOLICITED UPDATE FLAG
OEFD 32D812        2737              STA    UNUPD
OF00 3A8212        2738              LDA    LESCNM       ; GET PAGE ESCAPE NAME
OF03 A7            2739              ANA    A            ; SEE IF PAGE ESCAPE NAME BUFFER OCCUPIED
                   2740      ; CHECK TO SEE IF SCHEDULED FOR ESCAPE FROM ANY K/S
                   2741      ; NOTE: DE -> LNAME
OF04 CDFD07        2742              CALL   NRTST        ; TEST AGAINST ALL K/S ESCAPE NAMES
OF07 C2100F        2743              JNZ    MNAM1        ; DON'T RE-SCHEDULE PAGE ESCAPE IF ALREADY THERE
OF0A 218212        2744              LXI    H,LESCNM     ; ELSE, MOVE THE PAGE NAME TO THE ESCAPE BUFFER
OF0D 0E04          2745              MVI    C,4
                   2746              GOMOVE
OF10 3A8612        2748 MNAM1:       LDA    LTERM        ; CHECK TO SEE IF UNSOLICITED UPDATE
OF13 A7            2749              ANA    A            ; (THIS MESSAGE NOT A RESPONSE)
OF14 CA2F0F        2750              JZ     SETTXA       ; IF IT IS, DONT SEND ABORT - LET MESSAGE GO TO END -
OF17 CD040D        2751              CALL   TXABT        ; ELSE, ABORT A RESPONSE THAT IS NO LONGER WANTED
OF1A C3080E        2752              JMP    LIEX         ; AND GET OUT
                   2753
                   2754      ; A PAGE THAT HAS THE NEW NAME IS ON DISPLAY HERE
OF1D 3A8612        2755 MNAM2:       LDA    LTERM
OF20 A7            2756              ANA    A
OF21 CA2F0F        2757              JZ     SETTXA       ; IF NOT A RESPONSE
OF24 B8            2758              CMP    B
OF25 C22F0F        2759              JNZ    SETTXA       ; DIRECTED TO THIS TERM. ONLY
                   2760              UNPACK
OF29 210713        2762              LXI    H,CSPFG
OF2C 3601          2763              MVI    M,1          ; SET ABORT FLAG, IN CASE SCREEN IS RESET
                   2764              PACK
OF2F 21A62F        2766 SETTXA:      LXI    H,LFAB6A     ; LOOK FOR TEXT AND POSSIBLE GS CHARACTER
OF32 C3660E        2767              JMP    LS1          ; STORE VECTOR TABLE AND EXIT
                   2768
                   2769
                   2770 ;*********************************************************
                   2771 ; GENERATE A MASK FOR KEYSTATIONS PRESENT
                   2772 ; (ATMSK, WITH TERM #5 PRESENCE CONTROLLED BY MES300/312 SELECT STRAP)
                   2773 ; RETURNS:  A = ATMSK IF MES300
                   2774 ;           A = ATMSK - 10H IF MES312
                   2775 ; NO OTHER REGISTERS ALTERED
                   2776 ;*********************************************************
OF35 DBC2          2777 TMASK:       IN     STRAPS       ; READ CONFIGURATION STRAPS
OF37 1F            2778              RAR
OF38 E610          2779              ANI    10H          ; BIT SET IF MES312
OF3A EE1F          2780              XRI    ATMSK
OF3C C9            2781              RET
                   2782
                   2783 ;*********************************************************
                   2784 ; PROCESS DC2 CHARACTER -- LOG OFF MESSAGE
OF3D 3E2B          2785 LDC2:        MVI    A,'+'        ; SET A = LOGGED-OFF STATUS BYTE
OF3F CDD20C        2786              CALL   DISSTA       ; INSTALL IT AND DISPLAY COMMS FAULT MESSAGE
OF42 C3890E        2787              JMP    LIDL1        ; AND GO SET INCOMING LINE IDLE
                   2788
                   2789 ;*********************************************************
                   2790 ; PROCESS DC4 CHARACTER -- SYSTEM STATUS OR ALERT MESSAGE COMING
OF45 CD350F        2791 LDC4:        CALL   TMASK        ; GET BITS FOR ALL KEYSTATIONS
OF48 328F12        2792              STA    VDUP         ; ALL PAGES SET
OF4B 21E703        2793              LXI    H,3E7H       ; SYSTEM STATUS MESSAGE AREA - 1 ( BELL LOCATION )
OF4E 229012        2794              SHLD   VDUAD
OF51 CD200E        2795              CALL   BCCAD        ; ADD TO BCC
OF54 AF            2796              XRA    A
OF55 32D812        2797              STA    UNUPD        ; RESET UNSOLICITED UPDATE FLAG
OF58 21672F        2798              LXI    H,LTAB5      ; SET TABLE TO LOOK FOR '*' ( ALERT MSG )
OF5B C3660E        2799              JMP    LS1
                   2800
                   2801 ;*********************************************************
                   2802 ; PROCESS TEXT INPUT FROM LINE
OF5E 3E60          2803 LTXT:        MVI    A,60H        ; SEE IF CONTROL CHAR
OF60 A1            2804              ANA    C
OF61 CA890E        2805              JZ     LIDL1        ; IF IT IS
OF64 CD200E        2806 LTXT1:       CALL   BCCAD
OF67 E2B12E        2807              JPO    LERR         ; IF PARITY ERROR
OF6A CD8503        2808              CALL   CHOD         ; CHANGE 0 TO O
OF6D 3E3F          2809              MVI    A,03FH       ; MASK OFF BLINK BIT
OF6F A1            2810              ANA    C
OF70 4F            2811              MOV    C,A          ; C HAS CHAR TO 6 BITS
OF71 3A9C12        2812              LDA    ALERT        ; LOAD THE ALERT FLAGS
OF74 E6E0          2813              ANI    0E0H         ; CHECK THE FLAG BITS
OF76 CA900F        2814              JZ     LTXTX        ; JUMP IF NOT SYSTAT MSG OR ALERT
OF79 FE80          2815              CPI    80H          ; ELSE, CHECK IF SYS STATUS MSG
OF7B C2A70F        2816              JNZ    LTXT4        ; IF NO, GO PROCESS ALERT TEXT
                   2817
                   2818 ; PROCESS TEXT OF A SYSTEM STATUS MESSAGE
OF7E 118512        2819              LXI    D,SYSTAT+24  ; END OF BUFFER TO CHECK FOR OVERRUN
OF81 2ACE12        2820 LTXTB:       LHLD   STPTR        ; GET MEMORY BUFFER POINTER
                   2821              COMPDH              ; AND SEE IF RUNNING OVER
```

| LOC OBJ | LINE | SOURCE STATEMENT | | | |
|---|---|---|---|---|---|
| 0F85 CAB12E | 2823 | | JZ | LERR | ;ELSE- SAVE |
| 0F88 71 | 2824 | | MOV | M,C | ;MSG IN BUFFER |
| 0F89 23 | 2825 | | INX | H | |
| 0F8A 22CE12 | 2826 | | SHLD | STPTR | |
| 0F8D C39E0F | 2827 | | JMP | LTXT3 | ; AND GO STORE THE TEXT |
| | 2828 | | | | |
| | 2829 | ; PROCESS PLAIN TEXT ( NOT ALERT OR SYSTEM STATUS MESSAGE ) | | | |
| 0F90 2A9012 | 2830 | LTXTX: | LHLD | VDUAD | ; CHECK THAT NORMAL TEXT ISN'T WRITTEN TO SYSTAT AREA |
| 0F93 11E703 | 2831 | | LXI | D,3E7H | |
| | 2832 | | COMPDH | | ; COMPARE CURRENT TO START OF SYSSTAT AREA |
| 0F97 D2B12E | 2834 | | JNC | LERR | ; NAK INCOMING TRANSMISSION AND FLAG ERROR |
| 0F9A 21DB12 | 2835 | | LXI | H,TUDCNT | ;COUNT THE CHARACTER IN THE LAST UPDATE FIELD |
| 0F9D 34 | 2836 | | INR | M | |
| 0F9E CDEF01 | 2837 | LTXT3: | CALL | LDSTR | ;STORE TO THE DISPLAYS |
| 0FA1 DAB12E | 2838 | | JC | LERR | ; IF AN INVALID ADDRESS |
| | 2839 | | | | ;  IS ENCOUNTERED FLAG |
| | 2840 | | | | ; AN ERROR. |
| 0FA4 C3372C | 2841 | | JMP | SETTX | ; ELSE, GO SET TABLE TO STORE MORE TEXT |
| | 2842 | | | | |
| | 2843 | ; THIS TEXT IS PART OF AN INCOMING ALERT MESSAGE | | | |
| 0FA7 DAE20F | 2844 | LTXT4: | JC | LTXT6 | ; IF IN MIDDLE OF AN ALERT MESSAGE |
| 0FAA 2A9012 | 2845 | | LHLD | VDUAD | ; ELSE, CHECK IF LINE #14 OR LINE #16 |
| 0FAD 11E803 | 2846 | | LXI | D,3E8H | ; BY CHECKING IF IN FIRST POS. OF RESPECTIVE AREAS |
| | 2847 | | COMPDH | | ; CHECK IF LINE #16 ALERT AREA |
| 0FB1 C2BF0F | 2849 | | JNZ | LTXT5 | ; IF NOT |
| | 2850 | | | | |
| | 2851 | ; ELSE, THIS MESSAGE IS A LINE 16 ALERT | | | |
| 0FB4 CD350F | 2852 | | CALL | TMASK | ; SET ALL KS BIT FLAGS |
| 0FB7 F640 | 2853 | | ORI | 40H | ; WITH THE LINE 16 ALERT BIT |
| 0FB9 329C12 | 2854 | | STA | ALERT | ; AND STORE THE NEW LINE 16 FLAGS |
| 0FBC C3E20F | 2855 | | JMP | LTXT6 | ; GO SET BLINK AND STORE THE NEW CHARACTER |
| | 2856 | | | | |
| | 2857 | ; CHECK IF FIRST CHARACTER OF A LINE 14 ALERT | | | |
| 0FBF 116803 | 2858 | LTXT5: | LXI | D,368H | ; STARTING POS. OF LINE 14 ALERT AREA |
| | 2859 | | COMPDH | | ; IS THIS WHERE WE ARE? |
| 0FC3 C29E0F | 2861 | | JNZ | LTXT3 | ; IF NOT, THEN JUST GO STORE A REGULAR CHARACTER |
| 0FC6 CD350F | 2862 | | CALL | TMASK | ; ELSE, SET ALL KS BIT FLAGS |
| 0FC9 32B512 | 2863 | | STA | ALR14 | ; IN THE LINE #14 ALERT FLAGS |
| 0FCC 219C12 | 2864 | | LXI | H,ALERT | ; POINT TO THE LINE 16 FLAG BYTE |
| 0FCF A6 | 2865 | | ANA | M | ; AND MASK JUST THE CURRENT ALERT BITS |
| 0FD0 F620 | 2866 | | ORI | 20H | ; THEN SET THE LINE 14 ALERT FLAG BIT |
| 0FD2 77 | 2867 | | MOV | M,A | |
| 0FD3 21B612 | 2868 | | LXI | H,ALRTM | ; INITIALIZE THE POINTER INTO THE ALERT MSG BUFFER |
| 0FD6 22CE12 | 2869 | | SHLD | STPTR | ; SO THAT MESSAGE MAY BE BUFFERED IN MEMORY |
| 0FD9 0618 | 2870 | | MVI | B,24 | ; NOW CLEAR THE BUFFER TO BLANKS |
| 0FDB 3620 | 2871 | LTXT7: | MVI | M,' ' | |
| 0FDD 05 | 2872 | | DCR | B | |
| 0FDE 23 | 2873 | | INX | H | |
| 0FDF C2DB0F | 2874 | | JNZ | LTXT7 | ; UNTIL BUFFER CLEARED |
| | 2875 | | | | |
| | 2876 | ; STORING ALERT TEXT --- SEE IF LINE #14 ALERT WHICH MUST BE BUFFERED-- | | | |
| 0FE2 79 | 2877 | LTXT6: | MOV | A,C | ; GET THE TEXT CHARACTER |
| 0FE3 F640 | 2878 | | ORI | 40H | ; AND SET THE BLINK BIT |
| 0FE5 4F | 2879 | | MOV | C,A | |
| 0FE6 3A9C12 | 2880 | | LDA | ALERT | ;TEST FOR TYPE OF ALERT |
| 0FE9 E620 | 2881 | | ANI | 20H | ; IS IT A LINE #14? |
| 0FEB 11CE12 | 2882 | | LXI | D,ALRTM+24 | ; LOAD END OF BUFFER ADDRESS TO CHECK FOR OVERRUN |
| 0FEE C2810F | 2883 | | JNZ | LTXT8 | ; IF A LINE 14 ALERT, GO STORE IT TO THE BUFFER TOO |
| 0FF1 C39E0F | 2884 | | JMP | LTXT3 | ; ELSE, JUST STORE THE NEW CHARACTER TO THE SCREEN |
| | 2885 | | | | |
| | 2886 | $EJECT | | | |
| | 2887 | ;************************************************************** | | | |
| | 2888 | ; | | | |
| | 2889 | ; REORIGIN PROGRAM TO UPPER PART OF THIRD | | | |
| | 2890 | ; PROM FOR MORE ROOM. ALSO GENERATE ERROR | | | |
| | 2891 | ; IF PREVIOUS SECTION OF PROGRAM EXCEEDS | | | |
| | 2892 | ; FIRST TWO PROMS | | | |
| | 2893 | ; | | | |
| | 2894 | ;************************************************************** | | | |
| | 2895 | ; | | | |
| 0FF4 | 2896 | ENDP2 | EQU | $ | |
| | 2897 | | | | |
| | 2898 | | IF ENDP2 GT 0FFFH | | |
| | 2899 | ERROR | DS | 0 | ;ERROR GENERATOR |
| | 2900 | | ENDIF | | |
| | 2901 | | | | |
| | 2902 | | | | |
| 2C00 | 2903 | | ORG | 2C00H | ;REORIGIN TO UPPER PROM |
| | 2904 | ;************************************************************** | | | |
| | 2905 | ;************************************************************** | | | |
| | 2906 | ;PROCESS DC3 CHARACTER -- ERROR RESPONSE | | | |
| 2C00 CD200E | 2907 | LDC3: | CALL | BCCAD | ;ADD TO BCC |
| 2C03 3A8612 | 2908 | | LDA | LTERM | ;CHECK TERMINAL # |
| 2C06 A7 | 2909 | | ANA | A | |
| 2C07 328F12 | 2910 | | STA | VDUP | |
| 2C0A CA1D2C | 2911 | | JZ | LDC31 | ;IF ZERO, NOT A REPLY |
| | 2912 | | UNPACK | | ;ELSE, UNPACK TERM DATA |
| 2C0E 2AF112 | 2914 | | LHLD | CCMIN | |
| 2C11 113F00 | 2915 | | LXI | D,63 | |
| 2C14 19 | 2916 | | DAD | D | ;POINTER TO ERROR LINE |
| 2C15 229012 | 2917 | | SHLD | VDUAD | |
| 2C18 3EFF | 2918 | | MVI | A,-1 | |

```
LOC  OBJ         LINE        SOURCE STATEMENT

2C1A 328A12      2919             STA    LERSP    ;SET ERROR RESPONSE FLAG
2C1D 216D2F      2920 LDC31:      LXI    H,LTAB6  ;STORE TEXT
2C20 C3660E      2921             JMP    LS1
                 2922
                 2923 ;*********************************************************
                 2924 ;PROCESS UNPACK SPACE COUNTS
2C23 CD200E      2925 SPACE       CALL   BCCAD    ;SUM TO BCC
2C26 E2B12E      2926             JPO    LERR     ;IF PARITY ERROR
2C29 79          2927             MOV    A,C      ;COMPUTE # OF SPACES
2C2A D63F        2928             SUI    3FH
2C2C 21DB12      2929             LXI    H,TUDCNT         ;TO ADD TO COUNT FOR UPDATE FLASHER
2C2F 86          2930             ADD    M
2C30 77          2931             MOV    M,A      ;AND SUM IT TO THE COUNT
2C31 CD5F03      2932             CALL   SPUNP
2C34 DAB12E      2933             JC     LERR     ;IF AN INVALID ADDRESS
                 2934                             ;IS ENCOUNTERED FLAG
                 2935                             ;AN ERROR
2C37 216D2F      2936 SETTX       LXI    H,LTAB6  ;SET STORE TEXT
2C3A C3660E      2937             JMP    LS1      ;FINISH UP
                 2938
                 2939
                 2940 ;*********************************************************
                 2941 ;PROCESS SUB CHAR
                 2942 ;SETS UP UNPACK SPACES
2C3D CD200E      2943 LSUB:       CALL   BCCAD
2C40 21792F      2944             LXI    H,LTAB7
2C43 C3660E      2945             JMP    LS1
                 2946
                 2947 ;*********************************************************
                 2948 ;PROCESS DLE CHARACTER
2C46 CD200E      2949 LDLE:       CALL   BCCAD
2C49 217C2F      2950             LXI    H,LTAB8  ;TO PROCESS X COORDINATE
2C4C C3660E      2951             JMP    LS1
                 2952
                 2953 ;*********************************************************
                 2954 ;PROCESS X COORDINATE OF DLE SEQUENCE
2C4F CD200E      2955 XCOOR       CALL   BCCAD
2C52 E2B12E      2956             JPO    LERR     ;IF PARITY ERROR
2C55 79          2957             MOV    A,C
2C56 D640        2958             SUI    40H      ;X = 0 TO 15
2C58 6F          2959             MOV    L,A
2C59 2600        2960             MVI    H,0
2C5B 29          2961             DAD    H        ;COMPUTE X*64
2C5C 29          2962             DAD    H
2C5D 29          2963             DAD    H
2C5E 29          2964             DAD    H
2C5F 29          2965             DAD    H
2C60 29          2966             DAD    H
2C61 229012      2967             SHLD   VDUAD    ;SAVE IT
2C64 217F2F      2968             LXI    H,LTAB9  ;DO THE Y NEXT
2C67 C3660E      2969             JMP    LS1
                 2970
                 2971
                 2972 ;*********************************************************
                 2973 ;PROCESS Y COORDINATE OF DLE SEQUENCE
2C6A CD200E      2974 YCOOR       CALL   BCCAD
2C6D E2B12E      2975             JPO    LERR     ;IF PARITY ERROR
2C70 79          2976             MOV    A,C
2C71 D640        2977             SUI    40H      ;Y = 0 TO 63
2C73 2A9012      2978             LHLD   VDUAD    ;SAVED X DISPLACEMENT
2C76 1600        2979             MVI    D,0
2C78 5F          2980             MOV    E,A
2C79 19          2981             DAD    D        ;64*X+Y
2C7A 229012      2982             SHLD   VDUAD
2C7D 22D912      2983             SHLD   TUDADR   ;SAVE STARTING ADDRESS OF NEW FIELD
2C80 AF          2984             XRA    A
2C81 32DB12      2985             STA    TUDCNT   ;AND ZERO THE COUNT TOO
2C84 C3372C      2986             JMP    SETTX    ;SET STORE TEXT
                 2987
                 2988 ;*********************************************************
                 2989 ;NAK RECEIVED WHILE TXMITTING
2C87 3A8612      2990 LNAK        LDA    LTERM    ;SEE IF FROM TERMINAL
2C8A A7          2991             ANA    A
2C8B C4EF07      2992             CNZ    LRKBD    ;LOCK KBD IF YES
2C8E C30B07      2993             JMP    POL6     ;GO RETXMIT
                 2994
                 2995
                 2996 ;*********************************************************
                 2997 ;ACK RECEIVED--WAIT FOR PDP-11 TO REPLY
2C91 21882F      2998 LACK        LXI    H,LTABC
2C94 C3660E      2999             JMP    LS1
                 3000
                 3001 ;*********************************************************
                 3002 ;PROCESS ETX FROM THE LINE
2C97 CD200E      3003 LETX:       CALL   BCCAD    ;SUM IT TO BCC
2C9A 3E1F        3004             MVI    A,ATMSK
2C9C 219C12      3005             LXI    H,ALERT
2C9F A6          3006             ANA    M        ;CLEAR LINE ALERT/SYSTAT FLAG BITS
2CA0 77          3007             MOV    M,A
2CA1 21852F      3008             LXI    H,LTABB  ;SET UP FOR BCC IN
2CA4 C3660E      3009             JMP    LS1      ;DAT'S ALL
                 3010
```

```
LOC  OBJ        LINE        SOURCE STATEMENT 3011
                3012 ;******************************************************************
                3013 ; EOT CHARACTER RECEIVED
                3014 ; INITIALIZE MSG RECEIVED
2CA7 219A2F     3015 LEOT:   LXI     H,LTABD   ;LOOK AT LINK #
2CAA AF         3016        XRA     A          ; CLEAR THE UNSOLICITED UPDATE FLAG
2CAB 32D812     3017        STA     UNUPD
2CAE C3660E     3018        JMP     LS1
                3019
                3020 ;******************************************************************
                3021 ;CHECK FOR CONTROL CHAR AND SET IDLE IF IT IS
                3022 ;OTHERWISE EXIT THROUGH LINE INTERRUPT EXIT
2CB1 3E60       3023 NCTRL:  MVI     A,60H    ;MASK OF D5 & D6
2CB3 A1         3024        ANA     C
2CB4 C2080E     3025        JNZ     LIEX     ;IGNORE IF NON CONTROL
2CB7 C3890E     3026        JMP     LIDL1    ;ELSE SET IDLE LINE
                3027
                3028 ;******************************************************************
                3029 ;LOOK FOR BUZZER CHARACTER AFTER A DC4
2CBA 219C12     3030 LBUZZ:  LXI     H,ALERT  ; HL => ALERT FLAGS
2CBD 79         3031        MOV     A,C      ; TEST IF INPUT CHARACTER = '*'
2CBE FEAA       3032        CPI     '*' OR 80H ; (WITH THE PARITY BIT ON)
2CC0 C2D12C     3033        JNZ     LBUZ2    ; IF NOT, THIS IS A SYSTEM STATUS MESSAGE
                3034
                3035 ; ELSE, THIS IS AN ALERT MESSAGE ---
2CC3 7E         3036        MOV     A,M      ; LOAD CURRENT LINE 16 ALERT FLAGS
2CC4 F6C0       3037        ORI     0C0H     ; AND SET ALERT AND SYSTAT MESSAGE BITS
2CC6 77         3038        MOV     M,A      ; STORE THE FLAGS
2CC7 3E09       3039        MVI     A,9      ; AND SOUND THE ALARM
2CC9 D3A3       3040        OUT     BUZZR
2CCB 3D         3041        DCR     A        ; RESET BUZZ
2CCC D3A3       3042        OUT     BUZZR
2CCE C3640F     3043        JMP     LTXT1    ; GO STORE THE ASTERISK AS THE FIRST CHARACTER OF
                3044                         ; THE ALERT MESSAGE AND ENABLE FUTURE STORAGE OF TEXT
                3045
                3046 ;THIS IS A SYSTEM STATUS MESSAGE - SET
                3047 ;DESTINATION = ALL TERMINALS WITHOUT A LINE #16 ALERT MSG ON DISPLAY
2CD1 7E         3048 LBUZ2:  MOV     A,M      ; GET OLD 'ALERT ON DISPLAY' FLAGS
2CD2 E61F       3049        ANI     ATMSK
2CD4 F680       3050        ORI     80H      ; SET THE SYSTEM STATUS MESSAGE FLAG BIT
2CD6 77         3051        MOV     M,A      ; AND STORE THE ALERT FLAGS
2CD7 219D12     3052        LXI     H,SYSTAT ; INITIALIZE THE POINTER INTO THE
2CDA 22CE12     3053        SHLD    STPTR    ; SYSTEM STATUS MESSAGE RAM BUFFER
2CDD 2F         3054        CMA              ; GENERATE NOT ALERT 16 MASK
2CDE 47         3055        MOV     B,A      ; SAVE IN B REG
2CDF CD350F     3056        CALL    TMASK    ; GET ALL KEYSTATION BITS
2CE2 A0         3057        ANA     B        ; AND SET ONLY THOSE WITHOUT AN ALERT ON LINE #16
2CE3 328F12     3058        STA     VDUP     ; STORE AS DESTINATION OF MESSAGE
2CE6 C35E0F     3059        JMP     LTXT
                3060
                3061 ;******************************************************************
                3062 ; PROCESS A 'GS' CHARACTER RECEIVED IMMEDIATELY FOLLOWING A PAGE NAME.
                3063 ; NOTE: NO LONGER GS -- ASTERISK INSTEAD.
                3064 ;******************************************************************
2CE9 CD200E     3065 LGS:    CALL    BCCAD    ; ADD TO BCC SUM
2CEC AF         3066        XRA     A
2CED 32D812     3067        STA     UNUPD    ; CLEAR UNSOLIC. UPDATE FLAG IF SHIPPING ALERT
2CF0 3A8F12     3068        LDA     VDUP     ; CHECK TO SEE IF PAGE NAME MATCHED ANYTHING
2CF3 A7         3069        ANA     A
2CF4 CA372C     3070        JZ      SETTX    ; IF NOT, THIS IS NOT AN ALERT TO THIS CONTROLLER
2CF7 218000     3071        LXI     H,128    ; ELSE, THIS IS A VALID ALERT --
2CFA 229012     3072        SHLD    VDUAD    ; SET DESTINATION = LINE 3 ON THE SCREEN
2CFD 3AB512     3073        LDA     ALR14    ; SET FLAG FOR A GS ALERT MESSAGE (BIT #7)
2D00 F680       3074        ORI     80H
2D02 32B512     3075        STA     ALR14    ; TO BE ACTED ON BY THE BCC CHARACTER ROUTINE
2D05 C3372C     3076        JMP     SETTX    ; AND GO SET TABLE TO STORE TEXT
                3077
                3078 ;******************************************************************
                3079 ;PROCESS BCC CHARACTER TO FINISH UP MESSAGE INPUT
2D08 79         3080 LBCC:   MOV     A,C
2D09 A7         3081        ANA     A        ;SET FLAGS ON CHAR.
2D0A EAB12E     3082        JPE     LERR     ;IF WRONG PARITY
2D0D 3A9212     3083        LDA     CBCC
2D10 A9         3084        XRA     C
2D11 E67F       3085        ANI     7FH      ;IGNORE PARITY BIT
2D13 C2B12E     3086        JNZ     LERR     ;IF INCORRECT BCC
2D16 21450D     3087        LXI     H,OTAB7
2D19 228D12     3088        SHLD    OPTAB    ;SET SEND ACK
2D1C CDE80C     3089        CALL    TXINIT   ;TURN ON MODEM
2D1F 3A8612     3090        LDA     LTERM
2D22 A7         3091        ANA     A        ;TEST IF REPLY
2D23 CA5C2D     3092        JZ      LBCC1    ;IF NOT, CHECK IF THIS WAS A VALID GS ALERT MESSAGE
                3093        UNPACK           ;UNPACK TERMINAL DATA
2D27 AF         3095        XRA     A
2D28 320713     3096        STA     CSPFG    ;CLEAR SPEC PROC FLAG
2D2B 218A12     3097        LXI     H,LERSP  ;CHECK IF ERROR RESPONSE
2D2E 7E         3098        MOV     A,M
2D2F A7         3099        ANA     A
2D30 3AEC12     3100        LDA     CTSTA    ;GET STATUS
2D33 C2092E     3101        JNZ     LBC3     ;ERROR RESPONSE
2D36 E640       3102        ANI     40H      ;AUTO REQ ?
2D38 C2892E     3103        JNZ     LBC6     ;IF IT IS
```

```
LOC  OBJ        LINE          SOURCE STATEMENT

2D3B CD7A03     3104          CALL    ELCLR    ;CLEAR ERROR LINE
2D3E 3AEC12     3105          LDA     CTSTA
2D41 E610       3106          ANI     10H      ;INSERT?
2D43 C2C2E      3107          JNZ     LBC4E    ;IF YES
2D46 0EFF       3108          MVI     C,0FFH   ;ELSE CLEAR LINE 15
2D48 CD7103     3109          CALL    TPSTR    ;CLEAR LINE 15
2D4B CDF505     3110          CALL    SCLE4    ;RESTORE ALERT IF UP
2D4E 21C12F     3111          LXI     H,KTAB4  ;KBD IDLE
2D51 AF         3112          XRA     A        ;CLEAR STATUS
2D52 22FB12     3113 LBC2A:   SHLD    CKTAB
2D55 32EC12     3114 LBC2:    STA     CTSTA
                3115 LBC2B:   PACK             ;SAVE TERM DATA
2D59 C3930E     3117          JMP     LIDL3    ;GO SET IDLE INPUT
                3118
                3119 ; CHECK IF MESSAGE JUST RECEIVED WAS A GS ALERT MESSAGE TO THIS CONTROLLER.
                3120 ; IF IT WAS, BIT #7 OF ALR14 WILL BE ON.
2D5C 3AB512     3121 LBCC1:   LDA     ALR14    ;LOAD LINE 14 ALERT FLAGS TO LOOK AT GS BIT
2D5F 17         3122          RAL
2D60 D2BF2D     3123          JNC     LBC7     ;IF FLAG BIT OFF, THIS WASN'T A GS ALERT
2D63 3A8F12     3124          LDA     VDUP     ;GET PAGES RECEIVING THE GS MESSAGE
2D66 47         3125          MOV     B,A      ;SET B = SCREENS WITH THE ALERTS LIST ON DISPLAY
2D67 113F03     3126          LXI     D,(13*64)-1 ;POINT TO LAST CHAR ON LINE 13 FOR ROLL DOWN
2D6A 0E8C       3127          MVI     C,DFROLL ;C = ROLL FUNCTION
                3128          DGADD            ;QUEUE THE ROLL DOWN OF THE SCREENS
2D6D 3AD612     3130          LDA     PRMODE   ;CHECK THE PRINTER MODE
2D70 3C         3131          INR     A        ;TO SEE IF ALERT PRINT NECESSARY
2D71 C2892D     3132          JNZ     LBCC2    ;IF NOT, SKIP AROUND THE QUEUEING
                3133 ; ELSE, QUEUE THE PRINTING OF THE NEW ALERT MESSAGE
2D74 219512     3134          LXI     H,PRNTQ  ;POINT TO PRINT QUEUE BYTE
2D77 7E         3135          MOV     A,M      ;GET OLD QUEUE VALUE
2D78 E60F       3136          ANI     0FH      ;STRIP OFF CONTROL BITS
2D7A FE0A       3137          CPI     10       ;MAKE SURE THE QUEUE ISN'T FULL
2D7C D2892D     3138          JNC     LBCC2    ;IF IT IS, THE BOTTOM ALERT IS LOST
2D7F 7E         3139          MOV     A,M      ;ELSE, GET BACK THE ORIGINAL QUEUE
2D80 34         3140          INR     M        ;AND SIGNAL PRINT OF ONE ADDITIONAL LINE
2D81 A7         3141          ANA     A        ;WAS AN OLD PRINT IN PROGRESS
2D82 C2892D     3142          JNZ     LBCC2    ;IF YES, THEN THATS ALL THAT'S NECESSARY
2D85 3E33       3143          MVI     A,33H    ;ELSE, START THE PRINTER UART.
2D87 D3E1       3144          OUT     USR2C
2D89 11A82D     3145 LBCC2:   LXI     D,ALSTX  ;POINT TO 'SEE ALERTS PAGE' TEXT
2D8C 21B612     3146          LXI     H,ALRTM  ;HL=> LINE 14 ALERT MESSAGE BUFFER
2D8F 0E17       3147          MVI     C,23     ;23 CHARACTERS LONG
                3148          GOMOVE
2D92 060F       3150          MVI     B,ATMSK-10H ;SELECT ALL TERMINALS BUT #5
2D94 116803     3151          LXI     D,368H   ;DE => LINE 14 ALERT MESSAGE AREA
2D97 0E83       3152          MVI     C,DFAL14 ;DISPLAY LINE 14 ALERT MESSAGE BUFFER
                3153          DGADD            ;QUEUE IT TO THE DISPLAY
2D9A 78         3155          MOV     A,B
2D9B 32B512     3156          STA     ALR14    ;SET LINE #14 ALERT FLAGS
2D9E 3E09       3157          MVI     A,9      ;AND SOUND THE BELLS
2DA0 D3A3       3158          OUT     BUZZR
2DA2 3D         3159          DCR     A
2DA3 D3A3       3160          OUT     BUZZR    ;BY PULSING BUZZER BIT
2DA5 C39A0E     3161          JMP     LIDL2    ;GO SET LINE INPUT IDLE
                3162 ALSTX   FLASH   <<SEE ALERTS PAGE       >>
                3189
                3190 ; CHECK IF MESSAGE JUST RECEIVED WAS AN UNSOLICITED UPDATE THAT MUST BE BLINKED
2DBF 3AD812     3191 LBC7:    LDA     UNUPD    ;CHECK UNSOLICITED UPDATE FLAG
2DC2 47         3192          MOV     B,A
2DC3 3AD712     3193          LDA     UDFLSH   ;AND FLASH MODE TURNED ON
2DC6 A0         3194          ANA     B
2DC7 47         3195          MOV     B,A
2DC8 3A8F12     3196          LDA     VDUP     ;AND THAT SOME PAGES GOT THE UPDATE
2DCB A0         3197          ANA     B
2DCC CA9A0E     3198          JZ      LIDL2    ;IF NONE, JUST EXIT
2DCF 47         3199          MOV     B,A      ;SET B = PAGES THAT JUST GOT UPDATED
2DD0 0E85       3200          MVI     C,DFRPBL ;REPLACE BLINK FUNCTION
2DD2 2AD912     3201          LHLD    TUDADR   ;GET THE UPDATE ADDRESS
2DD5 114000     3202          LXI     D,64     ;AND MAKE SURE ITS NOT ON LINE #1
                3203          COMPDH
2DD9 110000     3205          LXI     D,0      ;ZERO DE IN CASE IT WAS
2DDC DAEE2D     3206          JC      LBC71    ;IF IT IS, JUST RESET OLD -- NEW UPDATE WONT BLINK
2DDF 3ADB12     3207          LDA     TUDCNT
2DE2 A7         3208          ANA     A        ;TEST FOR COUNT OF 0 (NULL UPDATE)
2DE3 CAEE2D     3209          JZ      LBC71    ;CAUSE IF 0, THE FIELD IS TOO SHORT
2DE6 3D         3210          DCR     A        ;COUNT - 1 TO PUT INTO RANGE OF 0 TO 63
2DE7 E63F       3211          ANI     3FH      ;MAKE SURE COUNT IS IN RANGE OF 0 - 63
2DE9 17         3212          RAL
2DEA 17         3213          RAL              ;PUT COUNT INTO TOP 6 BITS
2DEB B4         3214          ORA     H
2DEC 57         3215          MOV     D,A
2DED 5D         3216          MOV     E,L      ;DE = PACKED DATA FOR NEW BLINK FIELD
2DEE D5         3217 LBC71:   PUSH    D        ;SAVE DATA
                3218          DGADD            ;SEND REPLACE BLINK TO THE DISPLAY
2DF0 D1         3220          POP     D        ;RESTORE DATA
2DF1 21E612     3221          LXI     H,BLKTMR ;AND POINT TO TABLE OF TIMERS
2DF4 7A         3222          MOV     A,D
2DF5 B3         3223          ORA     E
2DF6 CAFB2D     3224          JZ      LBC72    ;CHECK IF JUST REMOVE WAS WRITTEN
2DF9 16FF       3225          MVI     D,0FFH   ;ELSE SET D = INITAL TIMER VALUE
2DFB 78         3226 LBC72    MOV     A,B
2DFC A7         3227 LBC720   ANA     A        ;ANY BS BITS LEFT?
```

```
LOC  OBJ         LINE         SOURCE STATEMENT

2DFD CA9A0E      3228              JZ       LIDL2       ; IF NOT, WERE ALL DONE
2E00 1F          3229              RAR                  ; ELSE, TEST NEXT KS
2E01 D2052E      3230              JNC      LBC73       ; IF NOT SELECTED, SKIP TO NEXT TABLE ENTRY
2E04 72          3231              MOV      M,D         ; ELSE, INIT TIMER VALUE
2E05 23          3232 LBC73:       INX      H           ; AND POINT TO NEXT ENTRY IN TIMER TABLE
2E06 C3FC2D      3233              JMP      LBC720      ; AND TRY NEXT KS
                 3234
                 3235
                 3236 ;END OF ERROR RESPONSE
2E09 47          3237 LBC3:        MOV      B,A         ;SAVE STATUS
2E0A AF          3238              XRA      A
2E0B 77          3239              MOV      M,A         ;CLEAR ERROR RESP FLAG
2E0C 78          3240              MOV      A,B
2E0D 17          3241              RAL
2E0E 17          3242              RAL
2E0F DA982E      3243              JC       LBC6E       ;IF AUTO REG ERROR
2E12 17          3244              RAL
2E13 17          3245              RAL
2E14 DA362E      3246              JC       LBC4I       ;IF INSERT ERROR
2E17 17          3247              RAL
2E18 DA742E      3248              JC       LBC5        ;IF OPR ERROR
                 3249 ;ELSE, PROCESS PAGE REQUEST ERROR
2E1B AF          3250              XRA      A
2E1C 32FF12      3251              STA      CTNAM       ;CLEAR PAGE NAME IF RETR
2E1F 0E1B        3252              MVI      C,'[' AND 3FH
2E21 CD3702      3253              CALL     IP1ST       ;STORE [ TO INPUT LINE
2E24 3AEC12      3254              LDA      CTSTA
2E27 E63F        3255              ANI      3FH
2E29 C3552D      3256              JMP      LBC2        ;FINISH UP
                 3257
                 3258 ; INSERT ACCEPTED
2E2C 3AEB12      3259 LBC4E:       LDA      CTNO
2E2F 47          3260              MOV      B,A
2E30 0E2A        3261              MVI      C,'*' AND 3FH
2E32 11C003      3262              LXI      D,3C0H
                 3263              DGADD                ;STORE * ON ERROR LINE
2E36 AF          3265 LBC4I:       XRA      A
2E37 4F          3266              MOV      C,A         ;FUNC 0 = DELETE CURSOR
2E38 2AEF12      3267              LHLD     CKCRS       ;CURRENT CURSOR
2E3B EB          3268              XCHG
2E3C 3AEB12      3269              LDA      CTNO
2E3F 47          3270              MOV      B,A         ;TERM #
                 3271              DGADD                ;STORE IT
2E41 218203      3273              LXI      H,382H      ;HL=> SECOND CHARACTER IN INPUT LINE STRING
2E44 DBC2        3274              IN       STRAPS      ;READ CONFIGURATION STRAPS
2E46 E620        3275              ANI      20H         ;TEST IF 300 OR 312
2E48 C2522E      3276              JNZ      LBC4I1      ;IF MBS312, TRY TO SET CURSOR TO 2nd CHAR ON LINE
2E4B 11FCFF      3277              LXI      D,-4        ;ELSE, SET DE = -4 TO OFFSET CURSOR 5 CHARS FROM RIGHT
2E4E 2AED12      3278              LHLD     CIMAX       ;GET ADDRESS OF LAST CHAR TYPED
2E51 19          3279              DAD      D           ;OFFSET IT
2E52 EB          3280 LBC4I1:      XCHG                 ;PUT NEW CURSOR DEST. INTO DE
2E53 2AF112      3281              LHLD     CCMIN       ;MAKE SURE IT IS NOT LESS THAN START
2E56 EB          3282              XCHG
                 3283              COMPDH
2E58 D25C2E      3285              JNC      LBC4R       ;IF NEW DESTINATION IS OK
2E5B EB          3286              XCHG                 ;ELSE, SET TO MINIMUM CURSOR POSITION
2E5C 22EF12      3287 LBC4R:       SHLD     CKCRS       ;AND SAVE THE NEW POSITION
2E5F EB          3288              XCHG
2E60 1B          3289              DCX      D           ;INSTALL THE NEW CURSOR BY DOING A
2E61 0E89        3290              MVI      C,DFCFWD    ;CURSOR FORWARD FUNCT
                 3291              DGADD
2E64 0E1B        3293              MVI      C,'[' AND 3FH   ;RE-INSTALL THE CURSOR BRACKET
2E66 CD3702      3294              CALL     IP1ST
2E69 2AFD12      3295              LHLD     CLKTB       ;RESTORE OLD KBD TABLE
2E6C 3AEC12      3296              LDA      CTSTA
2E6F E63F        3297              ANI      3FH
2E71 C3522D      3298              JMP      LBC2A
                 3299
                 3300 ;PROCESS ERROR IN OPR MODE
2E74 3E10        3301 LBC5:        MVI      A,10H       ;RESTORE INSERT STATUS
2E76 32EC12      3302              STA      CTSTA
2E79 110313      3303              LXI      D,CRNAM
2E7C 21FF12      3304              LXI      H,CTNAM
2E7F 0E04        3305              MVI      C,4
                 3306              GOMOVE
2E82 AF          3308              XRA      A
2E83 320313      3309              STA      CRNAM       ;CLEAR RESET NAME
2E86 C3362E      3310              JMP      LBC4I
                 3311
                 3312 ;PROCESS END OF AUTO REG (GOOD RESPONSE)
2E89 3AEB12      3313 LBC6:        LDA      CTNO
2E8C 47          3314              MOV      B,A
2E8D CDF505      3315              CALL     SCLE4       ;RESTORE ALERT IF UP
2E90 3AEC12      3316              LDA      CTSTA
2E93 E6BF        3317              ANI      0BFH        ;REMOVE AUTO REG BIT
2E95 C3552D      3318              JMP      LBC2        ;AND LEAVE
                 3319
                 3320 ;ERROR RESPONSE TO AUTO REG
2E98 CD5D05      3321 LBC6E:       CALL     REEST       ;CLEAR SCREEN AND SET RESET MODE
2E9B 210100      3322              LXI      H,1
2E9E 22EF12      3323              SHLD     CKCRS
2EA1 2B          3324              DCX      H
```

| LOC OBJ | LINE | SOURCE STATEMENT | | | |
|---|---|---|---|---|---|
| 2EA2 EB | 3325 | | XCHG | | |
| 2EA3 3AEB12 | 3326 | | LDA | CTNO | |
| 2EA6 47 | 3327 | | MOV | B,A | ;B=CRT# |
| 2EA7 0E89 | 3328 | | MVI | C,DFCFWD | |
| | 3329 | | DGADD | | ;INSTALL CURSOR |
| 2EAA 2AF512 | 3331 | | LHLD | CKPTR | |
| 2EAD 23 | 3332 | | INX | H | ;BUMP PTR TO CKNAM |
| 2EAE C3582D | 3333 | | JMP | LBC2B | |
| | 3334 | ;************************************************************ | | | |
| | 3335 | | | | |
| | 3336 | ;LINE ERROR-- SEND NAK AND AWAIT RE TRANSMISSION | | | |
| 2EB1 21882F | 3337 | LERR | LXI | H,LTAB0 | |
| 2EB4 C35107 | 3338 | | JMP | DONK1 | |
| | 3339 | | | | |
| | 3340 | ;************************************************************ | | | |
| | 3341 | ;PROCESS LINK CHAR. AND STORE IT IF FIRST TIME | | | |
| | 3342 | ;OR NAK IF IT DOESN'T COMPARE | | | |
| 2EB7 79 | 3343 | LLNK | MOV | A,C | |
| 2EB8 A7 | 3344 | | ANA | A | |
| 2EB9 E2B12E | 3345 | | JPO | LERR | ; JUMP IF BAD PARITY |
| 2EBC E67F | 3346 | | ANI | 7FH | ; ELSE, STRIP OFF PARITY BIT |
| 2EBE 4F | 3347 | | MOV | C,A | |
| 2EBF 21D212 | 3348 | | LXI | H,LINKC | ; POINT TO LINK CHARACTER STORAGE |
| 2EC2 BE | 3349 | | CMP | M | ; COMPARE TO NEW LINK |
| 2EC3 CACC2E | 3350 | | JZ | LLNK0 | ; IF =, ITS OK |
| 2EC6 7E | 3351 | | MOV | A,M | ; ELSE, CHECK IF FIRST LINK SINCE POWER ON |
| 2EC7 A7 | 3352 | | ANA | A | ; OR LINK FROM INPUT SWITCHES |
| 2EC8 C2B12E | 3353 | | JNZ | LERR | ; IF NOT FIRST LINK, THIS IS A BAD LINK # |
| 2ECB 71 | 3354 | | MOV | M,C | ; ELSE, STORE THE NEW LINK # |
| 2ECC AF | 3355 | LLNK0 | XRA | A | ; CLEAR OUT ANY ALERTS THAT MAY BE ACTIVE |
| 2ECD 329C12 | 3356 | | STA | ALERT | ; BY CLEARING ALERT BITS |
| 2ED0 328512 | 3357 | | STA | ALR14 | ; AND LINE 14 ALERT FLAGS |
| 2ED3 CD350F | 3358 | | CALL | TMASK | ; GET ALL KEYSTATION BITS |
| 2ED6 47 | 3359 | | MOV | B,A | ; AND SET DESTINATION OF ALERT CLEAR FUNCTION |
| 2ED7 0ED7 | 3360 | | MVI | C,0BFH+24 | ; UNPACK 24 SPACES INTO |
| 2ED9 116803 | 3361 | | LXI | D,368H | ; THE LINE #14 ALERT MSG AREA |
| | 3362 | | DGADD | | |
| 2EDD 78 | 3364 | | MOV | A,B | ; RESTORE ALL KEYSTATION BITS INTO A |
| 2EDE 3C | 3365 | | INR | A | ; ADD ONE TO GIVE JUST BIT POS. PAST VALID TERMS |
| 2EDF F5 | 3366 | | PUSH | PSW | ; INITIALIZE TERMINAL # TO PROCESS |
| 2EE0 F1 | 3367 | LLNK2 | POP | PSW | ; ACTUAL TERM # |
| 2EE1 1F | 3368 | | RAR | | ; NEXT TERMINAL TO DO |
| 2EE2 DA052F | 3369 | | JC | LLNK1 | ; IF BIT SHIFTED OUT, WE ARE DONE |
| 2EE5 F5 | 3370 | | PUSH | PSW | ; ELSE, SAVE TERMINAL BIT FOR NEXT LOOP |
| | 3371 | | UNPACK | | ;UNPACK TERM DATA |
| 2EE7 11FF12 | 3373 | | LXI | D,CTNAM | ; POINT TO TERMINAL NAME |
| 2EEA 1A | 3374 | | LDAX | D | |
| 2EEB A7 | 3375 | | ANA | A | ;PAGE ON DISPLAY?? |
| 2EEC CAE02E | 3376 | | JZ | LLNK2 | ;IF NOT |
| 2EEF 21F712 | 3377 | | LXI | H,CKNAM | ; ELSE, SET DESTINATION FOR NAME |
| 2EF2 0E04 | 3378 | | MVI | C,4 | ; AND SET MOVE COUNT = 4 |
| | 3379 | | GOMOVE | | ;MOVE PAGE NAME |
| 2EF5 AF | 3381 | | XRA | A | |
| 2EF6 32FF12 | 3382 | | STA | CTNAM | ;CLEAR OUT PAGE NAME |
| 2EF9 3AEC12 | 3383 | | LDA | CTSTA | |
| 2EFC F640 | 3384 | | ORI | 40H | ;SET AUTO REQ |
| 2EFE 32EC12 | 3385 | | STA | CTSTA | |
| | 3386 | LLNK4 | PACK | | ;PACK DATA BACK |
| 2F02 C3E02E | 3388 | | JMP | LLNK2 | ;GO LOOK FOR MORE |
| 2F05 3EFF | 3389 | LLNK1 | MVI | A,-1 | ; SET A = -1 FOR ON-LINE STATUS |
| 2F07 32D312 | 3390 | | STA | LINSTA | ; SET THE LINE STATUS = ON-LINE |
| 2F0A 214C2F | 3391 | | LXI | H,LTAB0 | ;INPUT LINE IDLE |
| 2F0D 228B12 | 3392 | | SHLD | PLTAB | |
| 2F10 21450D | 3393 | | LXI | H,OTAB7 | |
| 2F13 C31A07 | 3394 | | JMP | PDL7 | ;SET SEND ACK AND GET OUT |
| | 3395 | | | | |
| | 3396 | | | | |
| | 3397 | ;************************************************************ | | | |
| | 3398 | ;PROGRAM IDENTIFICATION INFORMATION | | | |
| | 3399 | ; (REUTER MONITOR VER UKXX) | | | |
| | 3400 | ;************************************************************ | | | |
| | 3401 | PROGID | TEXT | <<REUTER MONITOR VER WW>> | |
| 2F2C 37 | 3427 | | DB | HIGH VERS,LOW VERS | |
| 2F2D 30 | | | | | |
| 2F2E | 3428 | IDEND | EQU | $ | |
| | 3429 | | REPT | 24-(IDEND-PROGID) | ; STORE ENUF BLANKS TO MAKE 24 CHARS. |
| | 3430 | | DB | | |
| | 3431 | | ENDM | | |
| | 3432 | ;************************************************************ | | | |
| | 3433 | ; COMMUNICATIONS FAULT MESSAGE DISPLAYED IN SYSTEM STATUS MESSAGE | | | |
| | 3434 | ; AREA WHEN A TIME OUT OF THE LINE OCCURS OR WHEN THE CONTROLLER IS | | | |
| | 3435 | ; LOGGED OFF BY THE CENTRAL SYSTEM | | | |
| | 3436 | ; (COMMS FAULT MONITOR) | | | |
| | 3437 | ;************************************************************ | | | |
| | 3438 | COMTX | TEXT | <<COMMS FAULT MONITOR>> | |
| 2F42 | 3462 | CMTEND | EQU | $ | |
| | 3463 | | REPT | 24-(CMTEND-COMTX) | |
| | 3464 | | DB | | |
| | 3465 | | ENDM | | |
| | 3470 | | | | |
| | 3471 | ;************************************************************ | | | |
| | 3472 | ;LINE INPUT CONTROL TABLES | | | |

```
LOC  OBJ        LINE        SOURCE STATEMENT
                3473
                3474 ;TABLE USED WHEN OUTPUTTING
2F46 95         3475 LTAB3:  DB      NAK
2F47 872C       3476         DW      LNAK        ;GO RETRANSMIT
2F49 06         3477         DB      ACK
2F4A 912C       3478         DW      LACK        ;WAIT FOR REPLY
                3479 ;TABLE FOR IDLE INPUT
2F4C 81         3480 LTAB0:  DB      81H
2F4D 5A0E       3481         DW      LSOH        ;SOH
2F4F 00         3482         DB      0           ;ANY THING ELSE
2F50 0106       3483         DW      POLCK       ;GO CHECK FOR POLL CODE
                3484
                3485 ;LOOK FOR STX OR EOT
2F52 82         3486 LTAB1:  DB      82H
2F53 B30E       3487         DW      LSTX        ;IF STX
2F55 84         3488         DB      84H
2F56 A72C       3489         DW      LEOT        ;IF EOT
2F58 00         3490         DB      0
2F59 890E       3491         DW      LIDL1       ;SET LINE IDLE
                3492
                3493 ;LOOK FOR DC2,DC3,DC4, OR NAME
2F5B 14         3494 LTAB2:  DB      14H
2F5C 450F       3495         DW      LDC4        ;DC4 -- STATUS MESSAGE
2F5E 93         3496         DB      93H
2F5F 002C       3497         DW      LDC3        ;DC3 -- ERROR MESSAGE
2F61 12         3498         DB      12H
2F62 3D0F       3499         DW      LDC2        ;DC2 -- LOG OFF MSG
2F64 00         3500 LTAB4:  DB      0
2F65 C80E       3501         DW      LNMF        ;PROCESS NAME
                3502
                3503 ;LOOK FOR A BUZZZZZZ
2F67 00         3504 LTAB5:  DB      0
2F68 BA2C       3505         DW      LBUZZ
                3506
                3507 ; LOOK FOR FIRST TEXT FOLLOWING NAME INPUT
2F6A AA         3508 LTAB6A: DB      0AAH        ;* - MES312 ALERT FLAG
2F6B E92C       3509         DW      LGS
                3510 ;STORE TEXT
2F6D 90         3511 LTAB6:  DB      90H
2F6E 462C       3512         DW      LDLE        ;DLE--PROCESS X&Y
2F70 9A         3513         DB      9AH
2F71 3D2C       3514         DW      LSUB        ;SUB--UNPACK SPACES
2F73 03         3515         DB      ETX
2F74 972C       3516         DW      LETX        ;PROCESS THE ETX
2F76 00         3517         DB      0
2F77 5E0F       3518         DW      LTXT        ;TEXT TO STORE
                3519
                3520 ;SPACES TO UNPACK
2F79 00         3521 LTAB7:  DB      0
2F7A 232C       3522         DW      SPACE       ;UNPACK THEM
                3523
                3524 ;X COORDINATE
2F7C 00         3525 LTAB8:  DB      0
2F7D 4F2C       3526         DW      XCOOR
                3527
                3528 ;Y COORDINATE
2F7F 00         3529 LTAB9:  DB      0
2F80 6A2C       3530         DW      YCOOR
                3531
                3532 ;ADDRESS CHARACTER
2F82 00         3533 LTABA:  DB      0
2F83 6C0E       3534         DW      LADR
                3535
                3536 ;BCC CHARACTER
2F85 00         3537 LTABB:  DB      0
2F86 082D       3538         DW      LBCC
                3539
                3540 ;AWAIT A REPLY OR A RETRANSMISSION
2F88 90         3541 LTABC:  DB      90H
2F89 080E       3542         DW      LIEX        ;IGNORE DLE
2F8B 9A         3543         DB      9AH
2F8C 080E       3544         DW      LIEX        ;IGNORE SUB
2F8E 03         3545         DB      3
2F8F 080E       3546         DW      LIEX        ;IGNORE ETX
2F91 1D         3547         DB      1DH
2F92 080E       3548         DW      LIEX        ;IGNORE GS CHARACTER
2F94 82         3549         DB      82H
2F95 B30E       3550         DW      LSTX        ;STX FOUND!!!!
2F97 00         3551         DB      0
2F98 B12C       3552         DW      NCTRL       ;GO IDLE ON ANY OTHER CONTROL CHARS
                3553
                3554 ;LINK # RECEIVED
2F9A 00         3555 LTABD:  DB      0
2F9B 872E       3556         DW      LLNK        ;PROCESS IT
                3557
                3558
                3559
                3560 ;KEYBOARD CONTROL TABLES
                3561
2F9D 04         3562 KTAB1:  DB      4
2F9E 9304       3563         DW      PCNCL       ;CANCEL PRINT
2FA0 00         3564 KTAB0:  DB      0
```

```
LOC  OBJ        LINE        SOURCE STATEMENT

2FA1 3604       3565            DW      KBEX1   ;IGNORE ALL ELSE
                3566 ;IN INSERT MODE
2FA3 07         3567 KTAB6: DB      7
2FA4 3D04       3568            DW      KPRNT   ;PRINT PAGE
2FA6 05         3569            DB      5
2FA7 F004       3570            DW      INSRT   ;INSERT AGAIN
2FA9 7C         3571            DB      7CH
2FAA 5008       3572            DW      FORWD   ;PAGE FWD
2FAC 7E         3573            DB      7EH
2FAD 9608       3574            DW      BAKWD   ;PAGE BACK
                3575 ;RETRIEVE MODE
2FAF 07         3576 KTAB3: DB      7       ; PRINT KEY
2FB0 E908       3577            DW      ALPTST  ; SET MODE SWITCH FROM/TO ALERTS PRINT MODE
2FB2 06         3578            DB      6
2FB3 D303       3579            DW      KBTXM   ;TRANSMIT
2FB5 02         3580            DB      2
2FB6 0703       3581            DW      CRSBK   ;BACK ARROW
2FB8 03         3582            DB      3
2FB9 DD02       3583            DW      CRSFD   ;FWD ARROW
2FBB 04         3584            DB      4
2FBC 2A05       3585            DW      RESET
2FBE 00         3586            DB      0
2FBF 4202       3587            DW      KBCST   ;DEFAULT TO STORE DATA
                3588
                3589 ;
                3590 ;WHEN TERMINAL IS IDLE WITH PAGE ON DISPLAY
2FC1 07         3591 KTAB4: DB      7
2FC2 3D04       3592            DW      KPRNT   ;PRINT PAGE
2FC4 05         3593            DB      5
2FC5 F004       3594            DW      INSRT   ;INSERT
                3595 ;WHILE WAITING FOR A POLL
2FC7 04         3596 KTAB5: DB      4
2FC8 2A05       3597            DW      RESET
2FCA 7C         3598            DB      7CH
2FCB 5008       3599            DW      FORWD
2FCD 7E         3600            DB      7EH
2FCE 9608       3601            DW      BAKWD
2FD0 00         3602            DB      0
2FD1 3108       3603            DW      ALFA
                3604
                3605 ;WHILE WAITING FOR POLL IN INSERT MODE
2FD3 04         3606 KTAB8: DB      4
2FD4 2A05       3607            DW      RESET   ;ONLY RESET ALLOWED
2FD6 00         3608            DB      0
2FD7 3604       3609            DW      KBEX1
                3610
                3611 ; LOOK FOR SECOND KEY IN ENABLE/DISABLE ALERTS PRINT FACILITY
2FD9 45         3612 KTAB9: DB      'E'
2FDA 0909       3613            DW      ALENA   ; E = ENABLE ALERTS PRINT
2FDC 44         3614            DB      'D'
2FDD 2809       3615            DW      ALDIS   ; D = DISABLE ALERTS PRINT
2FDF 04         3616            DB      4
2FE0 2A05       3617            DW      RESET   ;RESET IS VALID
2FE2 00         3618            DB      0
2FE3 2209       3619            DW      SETRTR  ;ELSE, EXIT THE SEQUENCE
                3620 ;
                3621 ;*********************************
                3622 ;
                3623 ;       CHECK TO SEE THAT PROGRAM DOES NOT
                3624 ;       OVERFLOW INTO DIAGNOSTIC PROGRAM
                3625 ;       IF IT DOES, GENERATE AN ASSEMBLY TIME
                3626 ;       ERROR
                3627 ;*********************************
                3628
2FE5            3629 ENDPRG EQU     $
                3630            IF ENDPRG GT 2FFFH
                3631 ERROR  DS      0       ;ERROR GENERATOR
                3632            ENDIF
                3633 $EJECT
                3634 ;************************************************************
                3635 ; SYSTEM EQUATES
                3636 ;************************************************************
                3637 ;LINE OUTPUT CONTROL VECTORS
0D83            3638 OTAB1  EGU     STXO    ;SEND STX
0D6D            3639 OTAB2  EGU     TEXTO   ;SEND TEXT FROM TXMIT BUFFER
0D2C            3640 OTAB3  EGU     BCCO    ;SEND BCC CHAR
0D4A            3641 OTAB4  EGU     NULLO   ;END TRANSMISSION
0D4A            3642 OTAB5  EGU     OTAB4   ;TURN OFF TXMITTER
0D40            3643 OTAB6  EGU     NAKO    ;SEND A NAK
0D45            3644 OTAB7  EGU     ACKO    ;SEND AN ACK
0D27            3645 OTAB8  EGU     ABTO    ;SEND ABORT CHAR
                3646
                3647 ;*******************************************************
                3648 ;SYSTEM I/O EQUATES
                3649 ;*******************************************************
00A3            3650 BUZZR  EGU     0A3H    ;BIT SET/RESET
00A2            3651 SLCT   EGU     0A2H    ;READ CONTROLLER #
00D0            3652 USR1D  EGU     0D0H    ;LINE DATA IN/OUT
00D1            3653 USR1C  EGU     0D1H    ;LINE USART CONTROL
00E0            3654 USR2D  EGU     0E0H    ;PRINTER DATA OUT
00E1            3655 USR2C  EGU     0E1H    ;PRINTER USART CONTROL
00A0            3656 KBD1   EGU     0A0H    ;KEYBOARD I/O PORTS
```

```
LOC   OBJ        LINE            SOURCE STATEMENT

00A1             3657 KBD2       EQU     0A1H
00B0             3658 KBD3       EQU     0B0H
00B1             3659 KBD4       EQU     0B1H
00CC             3660 KBD5       EQU     0CCH
0090             3661 INT1C      EQU     90H       ;MASTER 8259 CONTROL
0080             3662 INT2C      EQU     80H       ;SLAVE 8259 CONTROL
00A3             3663 CH1        EQU     0A3H      ;CONTROL 8255 #1
00B3             3664 CH2        EQU     0B3H      ;          "     #2
00C3             3665 CH3        EQU     0C3H      ;          "     #3
0091             3666 INT1I      EQU     91H       ;8259 2ND CONTROL PORTS
0081             3667 INT2I      EQU     81H
00C2             3668 STRAPS     EQU     0C2H      ;MES300/MES312 CONFIGTURATION STRAPS
00C1             3669 LNKSW      EQU     0C1H      ; --- NEW HARDWARE LAYOUT LINK SWITCHES ---
                 3670 ;************************************************************************
                 3671 ; DISPLAY DRIVER FUNCTION EQUATES
                 3672 ;************************************************************************
0080             3673 DFSS16     EQU     80H       ; SYSTEM STATUS MESSAGE RESTORE
0081             3674 DFPTOP     EQU     81H       ; PAGE TO PAGE INTERNAL TXFER
0082             3675 DFXPRT     EQU     82H       ; TXFER TEXT TO PRINTER BUFFER
0083             3676 DFAL14     EQU     83H       ; RESTORE LINE 14 ALERT MESSAGE
0084             3677 DFXMIT     EQU     84H       ; TRANSFER TEXT TO TXMIT BUFFER
0085             3678 DFRPBL     EQU     85H       ; REPLACE UNSOLIC. UPDATE BLINKING FIELD WITH NEW DATA
                 3679
                 3680 ;***** CODES 86H - 87H RESERVED *****
                 3681
0088             3682 DFCCBW     EQU     88H       ; BACKUP CURSOR 1 POSITION
0089             3683 DFCCFWD    EQU     89H       ; CURSOR FORWARD 1 POSITION
008A             3684 DFSCLR     EQU     8AH       ; CLEAR SCREEN FUNCTION
008B             3685 DFALST     EQU     8BH       ; PUT UP ALERTS LIST HEADING
008C             3686 DFROLL     EQU     8CH       ; ROLL DOWN THE ALERTS LIST
                 3687
                 3688 ;************************************************************************
                 3689 ; SOME CHARACTER EQUATES
                 3690 ;************************************************************************
0003             3691 ETX        EQU     3         ;ETX CHAR W. EVEN PARITY
0095             3692 NAK        EQU     95H
0006             3693 ACK        EQU     6
0005             3694 ABT        EQU     5         ;ABORT CHAR
                 3695 ;************************************************************************
                 3696 ;************************************************************************
                 3697 ; MISCELLANEOUS EQUATES
                 3698 ;************************************************************************
001F             3699 ATMSK      EQU     1FH       ;ALL 5 TERMINALS MASK
                 3700
1000             3701 RAM        EQU     1000H     ;SCRATCHPAD RAM
1400             3702 RAMTOP     EQU     RAM+400H  ; TOP OF SCRATCHPAD+1 (FOR STACK SETUP)
                 3703
3000             3704 DIAGST     EQU     3000H     ;DIAGNOSTIC PROGRAM START ADDRESS
0044             3705 TSTKEY     EQU     44H       ;D KEY FOR DIAGNOSTICS
                 3706
0960             3707 TIME       EQU     2400      ; 40 SECONDS * 60 INTERRUPTS/SEC
                 3708
                 3709 ;************************************************************************
                 3710 ;RAM DEFINITIONS
                 3711 ;************************************************************************
1000             3712            ORG     RAM       ;START OF SYSTEM RAM
                 3713
1000             3714 CBBEG:     DS      480       ;DISPLAY DRIVER TCB
11DF             3715 CBEND      EQU     $-1       ;LAST BYTE IN BLOCK
11E0             3716 BWPTR:     DS      2         ;TCB FILL POINTER
11E2             3717 BRPTR:     DS      2         ;TCB READ POINTER
11E4             3718 DSRDY:     DS      2         ;BUFFER READY FLAG POINTER
11E6             3719 DSPND:     DS      1         ;DISPLAY SUSPEND FLAG
11E7             3720 DSPFG:     DS      1         ;PAGE REQ /OUTPUT FLAG
11E8             3721 DSCHR:     DS      1         ;CHAR/FUNCT OF INTEREST
11E9             3722 PRPTR:     DS      2         ;CHAR POINTER INTO PRINT BUF
11EB             3723 PRADD:     DS      2         ;ADDR OF NEXT LINE TO PRINT
11ED             3724 PCNFG:     DS      1         ;PRINT CANCEL FLAG
11EE             3725 PLCNT:     DS      1         ;PRINT LINE COUNT
11EF             3726 PBRDY:     DS      1         ;PRINT BUFFER READY FLAG
11F0             3727 PBFSTR:    DS      2         ; LEADING CR/LF FOR ALERTS PRINT
11F2             3728 PRBUF:     DS      64        ;PRINTER BUFFER
1232             3729 PBFEND:    DS      3         ;CR,LF,NUL FOR PRINTER LINE
1235             3730 UDPRB:     DS      1         ;PRINT BUFFER UPDATE IN PROGRESS
1236             3731 TXON:      DS      1         ;MODEM ON FLAG
1237             3732 TXPTR:     DS      2         ;POINTER INTO TXBUF
1239             3733 TBRDY:     DS      1         ;TX BUFFER READY FLAG
123A             3734 TXNAM:     DS      4         ;PAGE NAME TO TRANSMIT
123E             3735 TXBUF:     DS      64        ;TRANSMIT BUFFER
127E             3736 LNAME:     DS      4         ;LATEST NAME INPUT
1282             3737 LESCNM:    DS      4         ;NAME TO GENERATE PAGE CLEAR FOR (FROM UPDATE)
1286             3738 LTERM:     DS      1         ;LINE TERM #
1287             3739 LNMCT:     DS      1         ;LINE NAME CHAR
1288             3740 LNMPT:     DS      2         ;POINTER INTO LINE NAME
128A             3741 LERSP:     DS      1         ;ERROR RESPONSE FLAG
128B             3742 PLTAB:     DS      2         ;CURRENT LINE INPUT TABLE
128D             3743 OPTAB:     DS      2         ;CURRENT LINE OUTPUT TABLE
128F             3744 VDUP:      DS      1         ;PAGE(S) ACCESSED BY LINE INPUT
1290             3745 VDUAD:     DS      2         ;ADDR ON PAGE
1292             3746 CBCC:      DS      1         ;BCC SUM IN/OUT
1293             3747 TXEMP:     DS      1         ;FLAG TO TURN OFF MODEM
1294             3748 TXOCT:     DS      1         ;TURN OFF MODEM TIMER
```

| LOC | OBJ | LINE | | SOURCE STATEMENT | |
|---|---|---|---|---|---|
| 1295 | | 3749 | PRNTQ | DS 5 | ;PRINTER QUEUE |
| 129A | | 3750 | PQPTR | DS 2 | ;POINTER INTO PRINTQ |
| 129C | | 3751 | ALERT | DS 1 | ;BIT #7 = SYSTAT MSG COMING ( IF BIT #6 AND #5 =0) |
| | | 3752 | | | ;BIT #6 = LINE #16 ALERT |
| | | 3753 | | | ;BIT #5 = LINE #14 ALERT |
| 129D | | 3754 | SYSTAT | DS 24 | ;STATUS BUFFER AREA |
| 12B5 | | 3755 | ALR14 | DS 1 | ;ALERT ON LINE 14, BIT #7 = GS ALERT COMING IN |
| 12B6 | | 3756 | ALRTM | DS 24 | ;LINE 14 ALERT TEXT |
| 12CE | | 3757 | STPTR | DS 2 | ;POINTER TO STATUS BUFFER |
| 12D0 | | 3758 | LIMAX | DS 1 | ;DISPL TO LAST CHAR TYPED +1 |
| 12D1 | | 3759 | KBPRI | DS 1 | ;1ST KBD TO SCAN ON POLL |
| 12D2 | | 3760 | LINKC | DS 1 | ;LINK CHARACTER STORAGE BYTE |
| 12D3 | | 3761 | LINSTA | DS 1 | ;LINE STATUS CHARACTER |
| 12D4 | | 3762 | LINTIM | DS 2 | ;LINE TIMEOUT COUNTER |
| 12D6 | | 3763 | PRMODE | DS 1 | ;PRINTER MODE: 0 = NORMAL, -1 = PRINT GS ALERTS ONLY |
| | | 3764 | | | ; -2 = FINISH THIS ALERT AND THEN REVERT TO NORMAL MODE |
| 12D7 | | 3765 | UDFLSH | DS 1 | ;UPDATE FLASH ENABLE FLAG -- 0 = DISABLED, OFF = ENABLED |
| 12D8 | | 3766 | UNUPD | DS 1 | ;INCOMING MSG IS UNSOLIC. UPDATE FLAG |
| 12D9 | | 3767 | TUDADR | DS 2 | ;ADDRESS OF LAST FIELD VECTORED TO ON LINE INPUT |
| 12DB | | 3768 | TUDCNT | DS 1 | ;COUNT OF # OF CHARACTERS IN LAST FIELD (MUST BE <=64) |
| 12DC | | 3769 | BLKTAB | DS 10 | ;TABLE OF LATEST FIELDS BEING FLASHED ( UNSOLIC. UPDATES) |
| | | 3770 | | | ; EACH KS HAS A WORD ENTRY PACKED AS FOLLOWS: |
| | | 3771 | | | ; UPPER 6 BITS = LENGTH OF FIELD (0 - 63 CHARS) MINUS 1 |
| | | 3772 | | | ; LOWER 10 BITS = ADDRESS ON SCREEN OF START OF FIELD |
| 12E6 | | 3773 | BLKTMR | DS 5 | ;TABLE OF FLASHING UPDATE TIMERS, ONE PER KEYSTATION. |
| | | 3774 | | | |
| | | 3775 | | | |
| | | 3776 | ;COMMON TERMINAL AREA | | |
| | | 3777 | CMBLK | | |
| 12EB | | 3778 | CTNO | DS 1 | ;BIT= DISP # |
| 12EC | | 3779 | CTSTA | DS 1 | ;TERM STATUS |
| 12ED | | 3780 | CIMAX | DS 2 | ;MAX CHAR TYPED ON INSERT |
| 12EF | | 3781 | CKCRS | DS 2 | ;CURRENT CURSOR POS. |
| 12F1 | | 3782 | CCMIN | DS 2 | ;MIN POS |
| 12F3 | | 3783 | CCMAX | DS 2 | ;MAX POS |
| 12F5 | | 3784 | CKPTR | DS 2 | ;POINTER INTO RETRIEVE NAME |
| 12F7 | | 3785 | CKNAM | DS 4 | ;NAME FOR RETRIEVE |
| 12FB | | 3786 | CKTAB | DS 2 | ;CURRENT KEYBOARD TABLE |
| 12FD | | 3787 | CLKTB | DS 2 | ;PREV TABLE USED |
| 12FF | | 3788 | CTNAM | DS 4 | ;PAGE ON DISPLAY |
| 1303 | | 3789 | CRNAM | DS 4 | ;PAGE TO ESCAPE |
| 1307 | | 3790 | CSPFG | DS 1 | ;SPEC KBD PROCESSING FLAG |
| 1308 | | 3791 | EOC | EQU $ | ;END OF COMMON BLOCK |
| | | 3792 | | | |
| | | 3793 | ;STORAGE AREA FOR TERMINAL DATA | | |
| 1308 | | 3794 | TT0 | DS EOC-CMBLK | |
| 1325 | | 3795 | TT1 | DS EOC-CMBLK | |
| 1342 | | 3796 | TT2 | DS EOC-CMBLK | |
| 135F | | 3797 | TT3 | DS EOC-CMBLK | |
| 137C | | 3798 | TT4 | DS EOC-CMBLK | |
| 001D | | 3799 | TTCNT | EQU TT1-TT0 | ;LENGTH OF BLOCK |
| 1399 | | 3800 | EORAM | EQU $ | ;LAST LOCATION IN RAM |
| | | 3801 | | | |
| | | 3802 | | END | |

PUBLIC SYMBOLS

EXTERNAL SYMBOLS

```
USER SYMBOLS
ABT    A 0005  A3T0   A 0D27  ACK    A 0006  ALKO   A 0D45  AHPOS  A 0013  AHTND  A 0BF0  AHTXT  A 0BD6
ALDIS  A 0928  ALDIS2 A 093E  ALENA  A 0909  ALERT  A 129C  ALFA   A 0831  ALPTST A 0BE9  ALR14  A 12B5
ALRTM  A 12B6  ALSTX  A 2DAB  ALTPNX A 0A49  ALTPOF A 0A63  ALTPRT A 09F7  ALTPWT A 0A2B  ARSR1  A 07D1
ARSR2  A 07E1  ARSRC  A 07C9  ATMSK  A 001F  BAKWO  A 0BA1  BAKW1  A 0BAB  BAKWD  A 0B96  BCCAD  A 0E20
BCCO   A 0D2C  BKTADR A 0C6A  BLKTAB A 12DC  BLKTMR A 12E6  BRPTR  A 11E2  BUZZR  A 00A3  BWPTR  A 11E0
CBBEG  A 1000  CBCC   A 1292  CBEND  A 11DF  CCMAX  A 12F3  CCMIN  A 12F1  CDEHL  A 0018  CHOO   A 0385
CH1    A 00A3  CH2    A 00C3  CH3    A 00C3  CHKOP1 A 0E55  CHKOPR A 0E2E  CIMAX  A 12ED  CKCRS  A 12EF
CKNAM  A 12F7  CKPTR  A 12F5  CKTAB  A 12FB  CLKTB  A 12FD  CMBLK  A 12EB  CM6TO  A 01F4  CMST1  A 0202
CMTEND A 2F42  COMPDH + 0004  COMTX  A 2F2E  CRFDO  A 02E0  CRFD2  A 02EE  CRNAM  A 1303  CRSBK  A 0307
CRSFD  A 02DD  CSPFG  A 1307  CTNAM  A 12FF  CTNO   A 12EB  CTSTA  A 12EC  DFAL14 A 0083  DFALST A 008B
DFCBKW A 0088  DFCFWD A 0089  DFPTOP A 0081  DFROLL A 008C  DFRPBL A 0085  DFSCLR A 008A  DFSS16 A 0080
DFXMIT A 0084  DFXPRT A 0082  DIAGST A 3000  DISSTA A 0CD2  DONAK  A 074E  DONK1  A 0751  DQADD  + 0002
DSAHD1 A 08C8  DSAHDR A 0B83  DSBLK  A 0AAB  DSBLF1 A 0C41  DSBLR2 A 0C4E  DSBLR3 A 0C3B  DSBLRP A 0C2B
DSCHR  A 11EB  DSCK1  A 0ABB  DSCK2  A 0A9D  DSELF  A 0CCB  DSE01  A 0C92  DSE02  A 0C99  DSE03  A 0CAF
DSE04  A 0CBA  DSEOP  A 0C76  DSF2L  A 0B2F  DSF56  A 0B76  DSF57  A 0B84  DSF97  A 0B7F  DSF98  A 0B5C
DSFBKS A 0B46  DSFC0  A 0AE2  DSFC1  A 0B20  DSFC2  A 0B29  DSFC4  A 0B53  DSFCG  A 0B93  DSFFWS A 0B4E
DSFND  A 0B42  DSFPL  A 0C0C  DSFPP  A 0C0B  DSFRA  A 0BA2  DSFRB  A 0BA7  DSFRLL A 0BF9  DSFROL A 0BF0
DSFRS  A 0BAB  DSFRX  A 0B6A  DSFTR  A 0C17  DSFUNP A 0B1C  DSLP1  A 0ABE  DSPFG  A 11E7  DSPLA  A 0A73
DSPND  A 11E6  DSFP2  A 0B41  DSRD1  A 11E4  DSTRP  A 0B62  ELCLR  A 037A  ENDP2  A 0FF4  ENDPRG A 2FE5
EOC    A 1308  EORAM  A 1399  ETX    A 0003  FLASH  + 0001  FLSHST A 0401  FORWO  A 085B  FORW1  A 0865
FORW2  A 0B6D  FORW3  A 087C  FORWD  A 0850  FRTAB  A 034A  FWBK1  A 0BC2  FWBK3  A 0BDB  FWBKT  A 0BB6
GOMOVE + 0003  HPSR   A 021C  HPSR1  A 022B  IGEND  A 2F2E  INSRT  A 04F0  INT1C  A 0090  INT1I  A 0091
INT2C  A 0060  INT2I  A 0081  IP1ST  A 0237  JSSBF  A 0AFC  KBCOM  A 00CE  KBCS1  A 02CA  KBCS2  A 02A9
KBCS5  A 02F5  KBCST  A 0242  KBD1   A 0CA0  KBD2   A 00A1  KBD3   A 0080  KBD4   A 0081  KBD5   A 00C0
KBEX1  A 0436  KBEX5  A 0435  KBPRI  A 12D1  KBPNT  A 043D  KBT1   A 0407  KBTX1  A 0411  KBXIT  A 0432
KPRN1  A 0468  KPRNT  A 043D  KTAB0  A 2FAD  KTAB1  A 2F9D  KTAB3  A 2FAF  KTAB4  A 2FC1  KTAB5  A 2FC7
KTAB6  A 2FA3  KTAB8  A 2FD3  KTAB9  A 2FD9  LAIK   A 2091  LADR   A 0E6C  LADR1  A 0E77  LBC2   A 2D55
LBC2A  A 2052  LBC2B  A 2D58  LBC3   A 2E09  LBC4E  A 2E2C  LBC41  A 2E36  LBC411 A 2E52  LBC4R  A 2E5C
LBC5   A 2E74  LBC6   A 2E89  LBC6E  A 2E9A  LBC7   A 2DBF  LBC71  A 2DEE  LBC72  A 2DFB  LBC720 A 2DFC
LBC71  A 2E05  LBCC   A 2DD8  LBCC1  A 2D50  LBCF   A 2D9D  LBUZ2  A 2CD1  LBUZZ  A 2CBA  LDC2   A 0F3D
LDC3   A 2000  LDC34  A 201D  LDC4   A 2F42  LDE6   A 2146  LDST1  A 0217  LDSTP  A 01EF  LEOT   A 2CA7
LERR   A 2EB1  LERSP  A 12BA  LESCNM A 128C  LEX    A 2097  LEXT1  A 0E0A  LEXT2  A 0E0C  LGS    A 2CE9
LIDL1  A 0E89  LIDL2  A 0E9A  LIDL3  A 0E94  LIMA   A 0E08  LIMAX  A 12D0  LINE1  A 01DA  LINKC  A 12D2
LINSTA A 12D3  LINTIM A 12D4  LKKB1  A 07F9  LKWD0  A 07EF  LLNK   A 2EB7  LLNK0  A 2ECC  LLNK1  A 2F05
```

What is claimed is:

1. In a communication network capable of providing textual data messages to a plurality of subscriber terminals throughout the said network, at least a portion of said plurality of subscriber terminals comprising keystations, each of said keystations comprising a keyboard means for requesting and inputting textual data messages and associated data control signals and display means for providing a textual display of said keyboard generated data input; the improvement comprising a plurality of message switching node interface means operatively connected to each other at different geographic locations throughout the network and a plurality of keystation controller interface means with at least one keystation being operatively connected to one of said keystation controller interface means for each of said message switching node interface means, each of said message switching node interface means comprising message routing logic means and local storage means operatively connected to said message routing local control means for providing message routing logic control signals thereto, each of said keystation controller interface means comprising display control logic means and local display storage means for locally storing textual data to be displayed on said one connected keystation display means, said one connected keystation keyboard means comprising means for inputting a plurality of selectable message routing logic control signals to said node interface local storage means for creating a locally stored alert message routing control page comprising a plurality of different selectable message routing logic control signals, each of said keystation controller interface means having a unique address message code in said network corresponding to a unique logic control signal, each of said different locally stored alert message routing logic control signals comprising at least one of said controller interface unique address code logic control signals, different sets of said controller interface unique address code logic control signals comprising said different selectable message routing logic control signals, each of said one connected keystation keyboard means further comprising means for providing an original textual data alert message and selection control signal to said keystation controller interface means for selecting at least one of said different alert message routing logic control signals for uniquely defining a keystation recipient group for said original input textual data alert message, said keystation controller interface means comprising logic means responsive to said provided textual data alert message and selection control signals for providing said textual data alert message and selection control signal to said node interface means message routing logic means associated with said original message providing keystation, said message switching node interface logic means being responsive to said selection control signal for selecting said at least one corresponding locally stored alert message routing logic signal and for transmitting said one selected alert message routing logic signal and said original textual data alert message to at least a keystation recipient group plurality of node interface means corresponding to said controller interface unique address code logic control signals comprised in said selected alert message routing logic control signal, said keystation recipient group node interface logic means selectively routing said received textual data alert message to said connected keystation controller interface means corresponding to said node interface associated controller interface unique address code logic control signals defined in said keystation recipient group, said associated keystation controller interface means locally storing said received alert message in said local display storage means for providing a display thereof on said one connected keystation display means in said selected keystation recipient group, said message originating keystation keyboard means being capable of varying both the content of said textual data alert message to be transmitted and the recipients for said transmitted alert message by varying either the contents of said locally stored alert message routing control page or the alert message routing logic control signal selected; whereby any of said keystations in the network can rapidly disseminate individually tailored alert messages to individually tailored recipients therefor for display thereof.

2. An alert message communication network in accordance with claim 1 whereon said display means comprises video display means for providing a video display of said textual data.

3. An alert message communication network in accordance with claim 2 wherein said keystation controller interface logic means further comprises means for providing an alert alarm signal to said connected keystation means for indicating reception of an alert message.

4. An alert message communication network in accordance with claim 3 wherein said connected keystation keyboard means comprises means for providing an alert message display selection control signal to said keystation controller interface means display control logic in response to said alert alarm signal, said keystation controller interface means display control logic providing a display of said locally stored textual alert message on said display means in response to said alert message display selection control signal.

5. An alert message communication network in accordance with claim 4 wherein said message originating keystation selection control signal providing means comprises means for providing a selection control signal for selecting a plurality of said different alert message routing logic control signals uniquely defining a plurality of different keystation recipient groups.

6. An alert message communication network in accordance with claim 6 wherein said network further comprises a retrievable data base of displayable data, each of said keystation means further being capable of selectively retrieving said displayable data from said data base for display on said display means, said displayable data being storable in said keystation controller interface display storage means in addition to said textual data alert messages, said display logic control means providing a selectable display thereof on said display means in response to a display selection control signal from said keystation keyboard means, whereby both subscriber selected retrievable data and subscriber originated alert messages may be displayed at a keystation.

7. An alert message communications network in accordance with claim 6 wherein said keystation keyboard means further comprises means for inputting retrievable data to said retrievable data base which may be selectively retrieved for display by other keystation means in said network.

8. An alert message communication network in accordance with claim 7 wherein said keystation controller interface means and said node interface means are operatively connected in said network in a telephone line type of distribution network.

9. An alert message communication network in accordance with claim 8 wherein said keystation controller interface means further comprises hard copy printer means for selectively providing a hard copy print out of said locally storable textual data alert messages.

10. An alert message communication network in accordance with claim 9 wherein said keystation controller interface means local storage means comprises means for storing a plurality of different category alert messages, said keystation controller interface means comprising means for selecting one of said alert message categories for display in response to a display selection control signal corresponding thereto.

11. An alert message communication network in accordance with claim 1 wherein said keystation controller interface logic means further comprises means for providing an alert alarm signal to said connected keystation means for indicating reception of an alert message.

12. An alert message communication network in accordance with claim 2 wherein said connected keystation keyboard means comprises means for providing an alert message display selection control signal to said keystation controller interface means display control logic in response to said alert alarm signal, said keystation controller interface means display control logic providing a display of said locally stored textual alert message on said display means in response to said alert message display selection control signal.

13. An alert message communication network in accordance with claim 1 wherein said message originating keystation selection control signal providing means comprises means for providing a selection control signal for selecting a plurality of said different alert message routing logic control signals uniquely defining a plurality of different keystation recipient groups.

14. An alert message communication network in accordance with claim 1 wherein said network further comprises a retrievable data base of displayable data, each of said keystation means further being capable of selectively retrieving said displayable data from said data base for display on said display means, said displayable data being storable in said keystation controller interface display storage means in addition to said textual data alert messages, said display logic control means providing a selectable display thereof on said display means in response to a display selection control signal from said keystation keyboard means, whereby both subscriber selected retrievable data and subscriber originated alert messages may be displayed at a keystation.

15. An alert message communication network in accordance with claim 14 wherein said keystation keyboard means further comprises means for inputting retrievable data to said retrievable data base which may be selectively retrieved for display by other keystation means in said network.

16. An alert message communication network in accordance with claim 15 wherein said alert message corresponds to a unique address code for at least a portion of said retrievable data, whereby a subscriber keystation may input retrievable data for selective retrieval by subscribers in said keystation recipient group who may rapidly be informed of its availability for retrieval.

17. An alert message communication network in accordance with claim 14 wherein said alert message corresponds to a unique address code for at least a portion of said retrievable data.

18. An alert message communication network in accordance with claim 1 wherein said keystation controller interface means and said node interface means are operatively connected in said network in a telephone line type of distribution network.

19. An alert message communication network in accordance with claim 1 wherein said keystation controller interface means further comprises had copy printer means for selectively providing a hard copy print out of said locally storable textual data alert messages.

20. An alert message communication network in accordance with claim 1 wherein said keystation controller interface means local storage means comprises means for storing a plurality of different category alert messages, said keystation controller interface means comprising means for selecting one of said alert message categories for display in response to a display selection control signal corresponding thereto.

* * * * *